United States Patent
Chamberlain et al.

(10) Patent No.: US 11,742,977 B2
(45) Date of Patent: Aug. 29, 2023

(54) POLARIZATION DIVISION MULTIPLEXED (PDM) COMMUNICATION SYSTEMS AND DEVICES AND METHODS OF USE THEREOF

(71) Applicants: Roger Chamberlain, St. Louis, MO (US); Darko Ivanovich, St. Louis, MO (US); Viktor Gruev, St. Louis, MO (US)

(72) Inventors: Roger Chamberlain, St. Louis, MO (US); Darko Ivanovich, St. Louis, MO (US); Viktor Gruev, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 16/773,951

(22) Filed: Jan. 27, 2020

(65) Prior Publication Data
US 2021/0376949 A1 Dec. 2, 2021

Related U.S. Application Data

(60) Provisional application No. 62/796,719, filed on Jan. 25, 2019.

(51) Int. Cl.
*H04B 10/00* (2013.01)
*H04J 14/06* (2006.01)

(52) U.S. Cl.
CPC .................. *H04J 14/06* (2013.01)

(58) Field of Classification Search
CPC ... H04J 14/06; H04B 10/6166; H04B 10/614; G01J 3/2803; G01J 4/04
See application file for complete search history.

(56) References Cited

U.S. PATENT DOCUMENTS

| | | | | |
|---|---|---|---|---|
| 2008/0138070 A1* | 6/2008 | Yan | .......................... | H04J 14/06 398/65 |
| 2009/0269081 A1* | 10/2009 | Cai | ........................ | H04L 1/0045 398/202 |
| 2013/0293871 A1* | 11/2013 | Gruev | ........................ | G01J 4/04 356/73 |
| 2014/0079391 A1* | 3/2014 | Kim | ...................... | H04B 10/532 398/30 |
| 2016/0170110 A1* | 6/2016 | Pau | ....................... | G02B 5/3016 356/364 |

FOREIGN PATENT DOCUMENTS

WO WO-2015106924 A1 * 7/2015 ......... H04B 10/1121

OTHER PUBLICATIONS

J. Estarán, "Quad-Polarization Transmission for High-Capacity IM/DD Links", ECOC 2014, All pages (Year: 2014).*
Herard, C, "Three Channel Transmission Through A Single Optical Fiber By Polarization Multiplexing", Sep. 18, 1987, SPIE, All pages (Year: 1987).*

* cited by examiner

*Primary Examiner* — Pranesh K Barua

(57) ABSTRACT

Among the various aspects of the present disclosure is the provision of systems or methods for polarization division multiplexed (PDM) optical transmission. For example, the PDM optical transmission system can comprise a chip with one or more aluminum nanowire filters attached to the surface of the chip, such as division of focal Plane (DoFP) polarimeter filter array bonded on the receiver IC.

13 Claims, 87 Drawing Sheets
(49 of 87 Drawing Sheet(s) Filed in Color)

Intensity ———▶ $I$

Wavelength ———▶ $\lambda$

Polarization ———▶ Vector $E$

Light Input Data Channels with polarization angles 0°, 60°, 120° and Sum of these three channels $S_0$ ×  0 1 0 1 0 1 0 1

$S_{60}$ ×  0 0 1 1 0 0 1 1

$S_{120}$ ×  0 0 0 0 1 1 1 1

$S_{INPUT} = S_0 + S_{60} + S_{120} =$

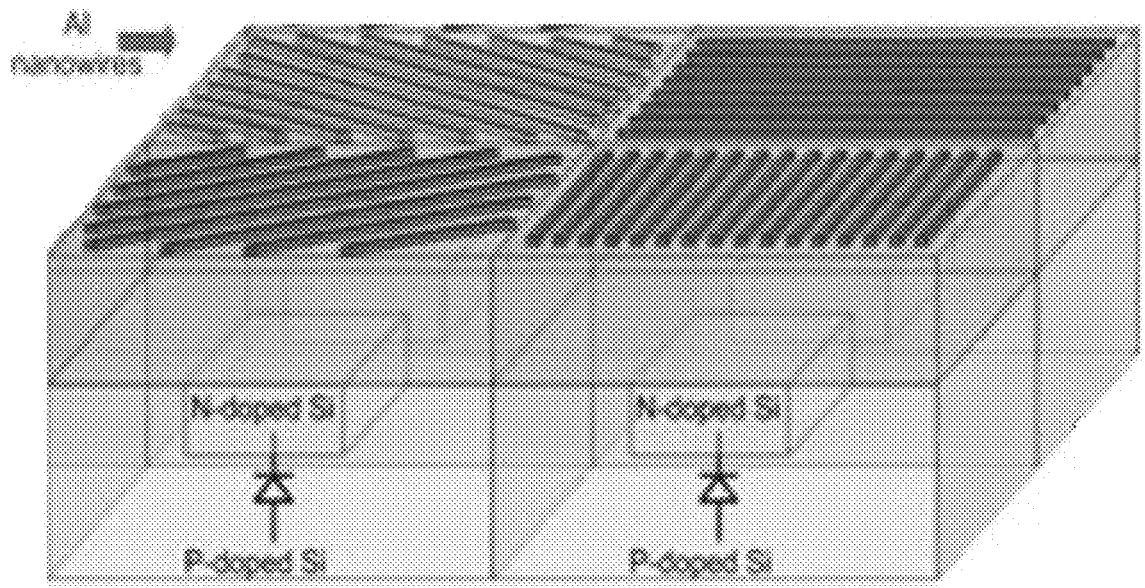
FIG. 47
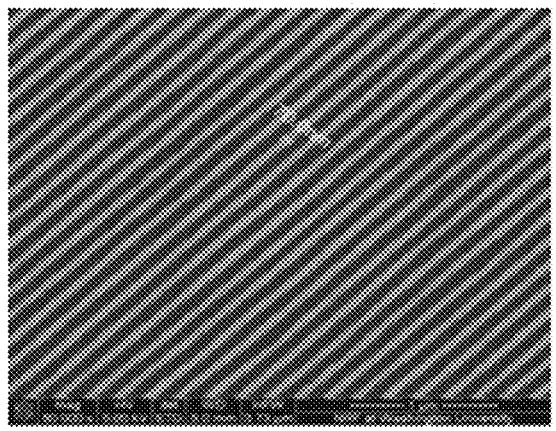
SEM image of 45 degree oriented aluminum nanowire
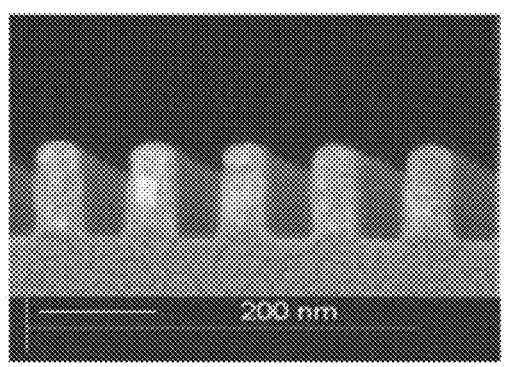
SEM Image of a side view of aluminum nanowire
FIG. 48

$$S_{FIBER} = \begin{bmatrix} 0 \\ 0 \\ 0 \\ 0 \end{bmatrix} \begin{bmatrix} 0.2075 \\ 0.1849 \\ 0.074 \\ 0.074 \end{bmatrix} \begin{bmatrix} 0.2075 \\ -0.1849 \\ -0.074 \\ -0.074 \end{bmatrix} \begin{bmatrix} 0.415 \\ 0 \\ 0 \\ 0 \end{bmatrix}$$

with $S_{0°}\,x$ values: 0, 1, 0, 1 and $S_{90°}\,x$ values: 0, 0, 1, 1.

FIG. 94

$$S_{reflected\_1} = M_R S_{AIR} = \begin{bmatrix} 0 & 1 & 0 & 1 \\ 0 & 0 & 1 & 1 \\ \hline 0 \\ 0 \\ 0 \\ 0 \end{bmatrix} \begin{bmatrix} 0.0683 \\ 0.064 \\ 0 \\ 0 \end{bmatrix} \begin{bmatrix} 0.4317 \\ -0.431 \\ 0 \\ 0 \end{bmatrix} \begin{bmatrix} 0.5 \\ -0.367 \\ 0 \\ 0 \end{bmatrix}$$

FIG. 101

$$S_{reflected\_2} = M_R S_{reflected\_1} = \begin{bmatrix} 0 & 1 & 0 & 1 \\ 0 & 0 & 1 & 1 \\ \hline 0 \\ 0 \\ 0 \\ 0 \end{bmatrix} \begin{bmatrix} 0.0214 \\ 0.0138 \\ 0 \\ 0 \end{bmatrix} \begin{bmatrix} 0.748 \\ -0.7478 \\ 0 \\ 0 \end{bmatrix} \begin{bmatrix} 0.7694 \\ -0.734 \\ 0 \\ 0 \end{bmatrix}$$

FIG. 102

$$S_{reflected\_1} = \begin{bmatrix} 0 \\ 0 \\ 0 \\ 0 \end{bmatrix} \begin{bmatrix} 0.0683 \\ 0.064 \\ 0 \\ 0 \end{bmatrix} \begin{bmatrix} 0.341 \\ -0.308 \\ 0.1386 \\ 0.045 \end{bmatrix} \begin{bmatrix} 0.409 \\ -0.243 \\ 0.1386 \\ 0.045 \end{bmatrix} \begin{bmatrix} 0.341 \\ -0.308 \\ -0.139 \\ -0.045 \end{bmatrix} \begin{bmatrix} 0.409 \\ -0.243 \\ -0.139 \\ -0.045 \end{bmatrix} \begin{bmatrix} 0.6817 \\ -0.615 \\ 0 \\ 0 \end{bmatrix} \begin{bmatrix} 0.75 \\ -0.551 \\ 0 \\ 0 \end{bmatrix}$$

Preceded by matrix:
$$\begin{bmatrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \end{bmatrix}$$

FIG. 104

$$\begin{bmatrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \end{bmatrix}$$

$$S_{reflected\_2} = \begin{bmatrix} 0 \\ 0 \\ 0 \\ 0 \end{bmatrix} \begin{bmatrix} 0.0213 \\ 0.0138 \\ 0 \\ 0 \end{bmatrix} \begin{bmatrix} 0.5667 \\ -0.558 \\ 0.08 \\ 0.058 \end{bmatrix} \begin{bmatrix} 0.5873 \\ -0.543 \\ 0.08 \\ 0.058 \end{bmatrix} \begin{bmatrix} 0.5667 \\ -0.558 \\ -0.08 \\ -0.058 \end{bmatrix} \begin{bmatrix} 0.5873 \\ -0.543 \\ -0.08 \\ -0.058 \end{bmatrix} \begin{bmatrix} 1.1327 \\ -1.115 \\ 0 \\ 0 \end{bmatrix} \begin{bmatrix} 1.1541 \\ -1.101 \\ 0 \\ 0 \end{bmatrix}$$

FIG. 105

$$\begin{array}{cccccccc} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 0 & 0 & 0 & 0 & 0 & 0 & 0 & 0 \end{array}$$

---

$$S_{AIR} = \begin{bmatrix} 0.1528 \\ -0.1512 \\ 0 \\ 0 \end{bmatrix} \begin{bmatrix} 0.3403 \\ 0.0344 \\ 0 \\ 0 \end{bmatrix} \begin{bmatrix} 0.3528 \\ -0.1512 \\ 0.198 \\ 0 \end{bmatrix} \begin{bmatrix} 0.5403 \\ 0.0344 \\ 0.198 \\ 0 \end{bmatrix} \begin{bmatrix} 0.25 \\ -0.2475 \\ 0 \\ 0 \end{bmatrix} \begin{bmatrix} 0.4375 \\ -0.0619 \\ 0 \\ 0 \end{bmatrix} \begin{bmatrix} 0.45 \\ -0.2475 \\ 0.198 \\ 0 \end{bmatrix} \begin{bmatrix} 0.6375 \\ -0.0619 \\ 0.198 \\ 0 \end{bmatrix}$$

$$\begin{array}{cccccccc} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 1 & 1 & 1 & 1 & 1 & 1 & 1 & 1 \end{array}$$

---

$$S_{AIR} = \begin{bmatrix} 0.5278 \\ -0.1512 \\ -0.3713 \\ 0 \end{bmatrix} \begin{bmatrix} 0.7153 \\ 0.0344 \\ -0.3713 \\ 0 \end{bmatrix} \begin{bmatrix} 0.7278 \\ -0.1512 \\ -0.1733 \\ 0 \end{bmatrix} \begin{bmatrix} 0.9153 \\ 0.0344 \\ -0.1733 \\ 0 \end{bmatrix} \begin{bmatrix} 0.625 \\ -0.2475 \\ -0.3713 \\ 0 \end{bmatrix} \begin{bmatrix} 0.8125 \\ -0.0619 \\ -0.3713 \\ 0 \end{bmatrix} \begin{bmatrix} 0.825 \\ -0.2475 \\ -0.1733 \\ 0 \end{bmatrix} \begin{bmatrix} 1.0125 \\ -0.0619 \\ -0.1733 \\ 0 \end{bmatrix}$$

FIG. 107

$$\begin{bmatrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 0 & 0 & 0 & 0 & 0 & 0 & 0 & 0 \end{bmatrix}$$

$$S_{reflected\_1} = \begin{bmatrix} 0.2637 \\ -0.2633 \\ 0 \\ 0 \end{bmatrix} \begin{bmatrix} 0.315 \\ -0.2153 \\ 0 \\ 0 \end{bmatrix} \begin{bmatrix} 0.4637 \\ -0.4181 \\ 0.128 \\ 0.0416 \end{bmatrix} \begin{bmatrix} 0.515 \\ -0.3621 \\ 0.128 \\ 0.0416 \end{bmatrix} \begin{bmatrix} 0.4317 \\ -0.431 \\ 0 \\ 0 \end{bmatrix} \begin{bmatrix} 0.4829 \\ -0.383 \\ 0 \\ 0 \end{bmatrix} \begin{bmatrix} 0.6317 \\ -0.5778 \\ 0.128 \\ 0.0416 \end{bmatrix} \begin{bmatrix} 0.6829 \\ -0.5298 \\ 0.128 \\ 0.0416 \end{bmatrix}$$

$$\begin{bmatrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 1 & 1 & 1 & 1 & 1 & 1 & 1 & 1 \end{bmatrix}$$

$$S_{reflected\_1} = \begin{bmatrix} 0.6387 \\ -0.5386 \\ -0.2399 \\ -0.078 \end{bmatrix} \begin{bmatrix} 0.69 \\ -0.4906 \\ -0.2399 \\ -0.078 \end{bmatrix} \begin{bmatrix} 0.8387 \\ -0.6854 \\ -0.112 \\ -0.0364 \end{bmatrix} \begin{bmatrix} 0.89 \\ -0.6374 \\ -0.112 \\ -0.0364 \end{bmatrix} \begin{bmatrix} 0.8067 \\ -0.7063 \\ -0.2399 \\ -0.078 \end{bmatrix} \begin{bmatrix} 0.8579 \\ -0.6583 \\ -0.2399 \\ -0.078 \end{bmatrix} \begin{bmatrix} 1.0067 \\ -0.8531 \\ -0.112 \\ -0.0364 \end{bmatrix} \begin{bmatrix} 1.0579 \\ -0.8051 \\ -0.112 \\ -0.0364 \end{bmatrix}$$

FIG. 108

$$\begin{matrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 0 & 0 & 0 & 0 & 0 & 0 & 0 & 0 \end{matrix}$$

$$S_{reflected\_2} = \begin{bmatrix} 0.457 \\ -0.4569 \\ 0 \\ 0 \end{bmatrix} \begin{bmatrix} 0.4731 \\ -0.4466 \\ 0 \\ 0 \end{bmatrix} \begin{bmatrix} 0.7648 \\ -0.7505 \\ 0.074 \\ 0.0537 \end{bmatrix} \begin{bmatrix} 0.7808 \\ -0.7402 \\ 0.074 \\ 0.0537 \end{bmatrix} \begin{bmatrix} 0.748 \\ -0.7478 \\ 0 \\ 0 \end{bmatrix} \begin{bmatrix} 0.764 \\ -0.7375 \\ 0 \\ 0 \end{bmatrix} \begin{bmatrix} 1.0558 \\ -1.0414 \\ 0.074 \\ 0.0537 \end{bmatrix} \begin{bmatrix} 1.0718 \\ -1.0311 \\ 0.074 \\ 0.0537 \end{bmatrix}$$

$$\begin{matrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 1 & 1 & 1 & 1 & 1 & 1 & 1 & 1 \end{matrix}$$

$$S_{reflected\_2} = \begin{bmatrix} 1.0341 \\ -1.0074 \\ -0.1387 \\ -0.1008 \end{bmatrix} \begin{bmatrix} 1.0501 \\ -0.9971 \\ -0.1387 \\ -0.1008 \end{bmatrix} \begin{bmatrix} 1.3418 \\ -1.301 \\ -0.0647 \\ -0.047 \end{bmatrix} \begin{bmatrix} 1.3578 \\ -1.2907 \\ -0.0647 \\ -0.047 \end{bmatrix} \begin{bmatrix} 1.3251 \\ -1.2983 \\ -0.1387 \\ -0.1008 \end{bmatrix} \begin{bmatrix} 1.3411 \\ -1.288 \\ -0.1387 \\ -0.1008 \end{bmatrix} \begin{bmatrix} 1.6328 \\ -1.5919 \\ -0.0647 \\ -0.047 \end{bmatrix} \begin{bmatrix} 1.6488 \\ -1.5816 \\ -0.0647 \\ -0.047 \end{bmatrix}$$

FIG. 109

POLARIZATION DIVISION MULTIPLEXED (PDM) COMMUNICATION SYSTEMS AND DEVICES AND METHODS OF USE THEREOF

CROSS-REFERENCE TO RELATED APPLICATIONS

This application claims the benefit of U.S. Provisional Application No. 62/796,719 filed Jan. 25, 2019, the contents of which are incorporated by reference in its entirety.

STATEMENT REGARDING FEDERALLY SPONSORED RESEARCH OR DEVELOPMENT

This invention was made with government support under W911NF-18-1-0037 awarded by the Army Research Office. The government has certain rights in the invention.

FIELD OF THE DISCLOSURE

The present disclosure generally relates to optical communication devices, systems, and methods.

BACKGROUND OF THE DISCLOSURE

Light has three basic properties: intensity, wavelength, and polarization. The first two properties, intensity and wavelength, are the basis of modern high-speed optical communication systems based on fiber optics. Fiber optic communication systems frequently use Wavelength Division Multiplexing (WDM) for separation of multiple optical channels. Modulated input optical signals that carry many data channels encoded by different wavelengths are separated on the receiver side using well-known WDM techniques.

It was previously demonstrated that visible light communication systems based on polarization division multiplexing could be used for gigabit data transfers. However, this demonstration was on an optical bench, and therefore not well suited for CMOS integration. Effective signal separation with two optical channels arranged 90° apart was demonstrated.

Another existing method makes use of division-of-focal-plane (DoFP) polarimeters integrated with CMOS technology to enable compact, real-time polarization imaging systems. The DoFP polarimeters are manufactured from aluminum nanowire materials and mounted on custom CMOS ICs. This system contains an entire image processing pipeline that operates at frame rates of 40 frames per second or higher and thus enables real-time extraction of the polarization properties from the imaged environment.

Recently, the design and successful integration of high speed photodiodes on CMOS ICs for a fully operational CMOS-Compatible optical digital clock distribution and electrical recovery system in a 0.35 µm CMOS process was demonstrated. This work demonstrates the viability of inexpensive optical-electrical signal transformations at GHz speeds.

Other objects and features will be in part apparent and in part pointed out hereinafter.

SUMMARY

Among the various aspects of the present disclosure is the provision of systems or methods for polarization division multiplexed (PDM) optical transmission. For example, the PDM optical transmission system can comprise a chip with one or more aluminum nanowire filters attached to the surface of the chip, such as division of focal Plane (DoFP) polarimeter filter array bonded on the receiver IC. Among the various aspects of the present disclosure is the provision of systems or methods for polarization division multiplexed (PDM) optical transmission. For example, the PDM optical transmission system can comprise a chip with one or more aluminum nanowire filters attached to the surface of the chip, such as division of focal Plane (DoFP) polarimeter filter array bonded on the receiver IC.

Multiple parallel channels are ubiquitous in optical communications, with spatial division multiplexing (separate physical paths) and wavelength division multiplexing (separate optical wavelengths) being the most common forms. Here, we investigate the viability of polarization division multiplexing, the separation of distinct parallel optical communication channels through the polarization properties of light. Two or more linearly polarized optical signals (at different polarization angles) are transmitted through a common medium, filtered using aluminum nanowire optical filters fabricated on-chip, and received using individual silicon photodetectors (one per channel). The entire receiver (including optics) is compatible with standard CMOS fabrication processes.

The filter model is based upon an input optical signal formed as the sum of the Stokes vectors for each individual channel, transformed by the Mueller matrix that models the filter proper, resulting in an output optical signal that impinges on each photodiode. The results show that two- and three-channel systems can operate with a fixed-threshold comparator in the receiver circuit, but four-channel systems (and larger) will require channel coding of some form. For example, in the four-channel system, 10 of 16 distinct bit patterns are separable by the receiver. The model supports investigation of the range of variability tolerable in the fabrication of the on-chip polarization filters.

We investigate the viability of a Polarization Division Multiplexing (PDM) Visible Light Communication (VLC) system based on Division of Focal Plane (DoFP) polarimeters mounted on a custom CMOS IC. A modulated light source encodes two, three or four channels of digital input data, in which each optical channel has a distinct angle of polarization. The modulated input light is aligned to a DoFP polarimeter array to separate the channels. The array of DoFP polarimeters is mounted on the top of a CMOS IC, and each individual polarimeter is positioned above a photodiode. Each channel recovery circuit consist of a photodiode, bias circuit, amplifier, and comparator.

The contributions of the disclosure include: (1) the design and implementation of a VerilogA model for division-of-focal-plane optical polarization filters; (2) the calibration of the simulation model from empirical measurements; (3) the design, analysis, and simulation of several polarization division multiplexed optical communications systems; and (4) the (simulation-based) characterization of the properties of the optical communications channels under realistic variation in the fabrication of the filters.

We first investigate a 2-channel system with two filters, having 0° and 90° angles of polarization. In our second design approach, for a 3-channel system, the DoFP polarimeter array has three filters with polarization angles of 0°, 60°, and 120°. Finally, in our third design, for a 4-channel system, the DoFP polarimeter array has four filters with polarization angles of 0°, 45°, 90°, and 135°.

Each filter from the DoFP polarimeter array is connected to data channel circuitry. Each data channel consists of a high-speed photodiode that converts the modulated incident light signal with a specific polarization angle into an electrical signal that is then passed through bias circuitry, amplified, and sent to a comparator with hysteresis that decides whether the input signal is a low voltage (digital LOW) or high voltage (digital HIGH).

We model the complete optical and electrical signal pathway of several PDM optical communication systems. The optical signal incident on the DoFP polarimeter array is modeled as the sum of the Stokes vectors for each channel, the filters are modeled by the appropriate Mueller matrix1 (calibrated from empirical measurements on physically constructed filters), and the circuitry for each channel is modeled using standard techniques. Our analysis of the entire VLC system demonstrates the viability of the two- or three-channel design. For the four-channel design, due to optical signal crosstalk, we cannot extract all the bits from the input signal.

Example 1 describes our vision for polarization division multiplexed optical communication channels. Example 2 provides the details of the simulation model used to characterize the optical filters and the receiver circuitry. Example 3 gives performance predictions.

Other objects and features will be in part apparent and in part pointed out hereinafter.

DESCRIPTION OF THE DRAWINGS

The patent or application file contains at least one drawing executed in color. Copies of this patent or patent application publication with color drawing(s) will be provided by the Office upon request and payment of the necessary fee.

The following drawings illustrate various aspects of the disclosure. Those of skill in the art will understand that the drawings, described below, are for illustrative purposes only. The drawings are not intended to limit the scope of the present teachings in any way.

FIG. 47: Custom IC with DoFP filters mounted on the surface of the IC.

FIG. 48: 45° oriented aluminum nanowire filter.

FIG. 94: Two channel light signal exiting the fiber.

FIG. 101: $S_{reflected\_1}$ for two channel chip-to-chip system.

FIG. 102: $S_{reflected\_2}$ for two channel chip-to-chip system.

FIG. 104: $S_{reflected\_1}$ for three channel chip-to-chip system.

FIG. 105: $S_{reflected\_2}$ for three channel chip-to-chip system.

FIG. 107: $S_{AIR}$ for four channel chip-to-chip system.

FIG. 108: $S_{reflected\_1}$ for four channel chip-to-chip system.

FIG. 109: $S_{reflected\_2}$ for 4 channel chip-to-chip system.

Figure 1:
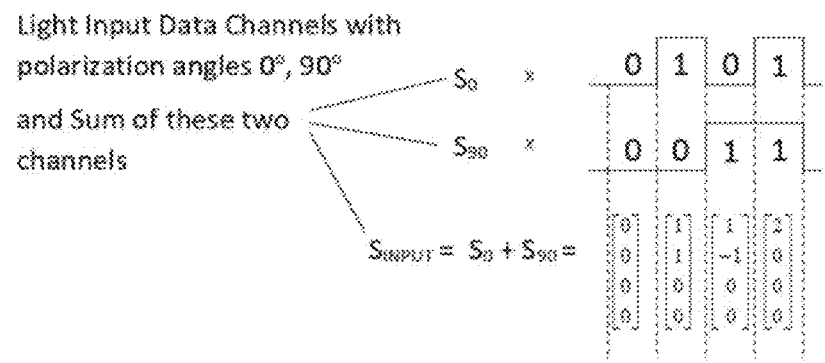
FIG. 1. Input light signal modulated as binary sequence for two data channels with polarization angles of 0° and 90°.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE INVENTION

The present disclosure is based, at least in part, on the discovery that on-chip (as opposed to conventional optical bench) technology can expand PDM beyond 2 channels enable PDM communication for 2 or more channels. Here, on-chip technology has been discovered for filtering and achieving multi-channel PDM without an optical bench. As shown herein, aluminum nanowire filters can be fabricated directly onto the surface of the chip, greatly reducing the cost to build a polarization division multiplexed system. As described herein, the system can provide for double or triple the bandwidth (data transfer rate) of short distance (chip-to-chip or board-to-board) optical communication links, at lower cost to manufacture than traditional wavelength division multiplexing techniques.

The filter as described herein can be bonded on a chip using any readily available, established methods. The PDM system described herein can be manufactured for about the same cost as a single channel PDMoptical communications link. This technology can be used for any distance, such as super short distance, e.g., on-chip; short distance, e.g., chip-to-chip, in a machine room; or long distance, e.g., over city-to-city. The disclosed technology can further include channel coding to expand the number of channels or expand the noise margin. As described herein, the PDM technology can include multiple channels (e.g., two or more channels, three or more channels, or four or more channels).

The crucial capability of the invention is the ability to use polarization division multiplexing techniques for multi-channel optical communications while substantially reducing the associated manufacturing costs. Currently, short distance (chip-to-chip or board-to-board) optical communication techniques have essentially one channel per fiber. Long haul communications use expensive wavelength division multiplexing techniques that enable many channels per fiber. Polarization division multiplexing is an approach to expand the number of channels. However, the manufacturing costs grow when off-the-shelf polarization filters are used to separate the channels.

In the present disclosure, aluminum nanowire filters can be fabricated directly onto the surface of the chip, greatly reducing the cost to build a polarization division multiplexed system.

The present disclosure can provide for double or triple the bandwidth (data transfer rate) of short distance (chip-to-chip or board-to-board) optical communication links, at lower cost to manufacture than traditional wavelength division multiplexing techniques.

Multiple parallel channels are ubiquitous in optical communications, with spatial division multiplexing (separate physical paths) and wavelength division multiplexing (separate optical wavelengths) being the most common forms. These two forms of multiplexing are used in modern high-speed data communications systems that operate on both short and long distances. Our definition of the phrases short distance and long distance means distances ranging from chip to chip on a circuit board all the way to city-to-city distances.

Wavelength division multiplexing has been a backbone of modern high-speed bidirectional fiber-optic digital data communications for a long time. It is a technology which uses multiplexing of a number of optical carrier signals onto a single optical fiber by using different wavelengths (or colors) of laser light.

Figure 21:
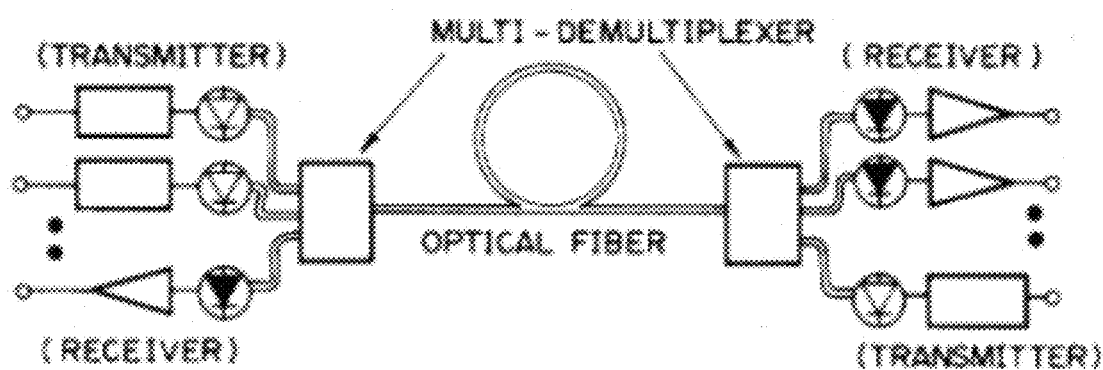
FIG. 21: Wavelength division multiplexing optical transmission system.

A typical wavelength division multiplexing bidirectional optical transmission system is shown in FIG. 21. Modern wavelength division multiplexing systems can handle 160 signals each with different wavelength and carrying a 100 Gbit/s digital data rate. This means that a single fiber pair can carry over 16 Tbit/s data rates. Modern wavelength division multiplexing systems dominate high-speed digital data communications for long distances (e.g., multi-kilometer lengths).

Spatial division multiplexing is a technology that uses separate physical paths for communications. Spatial division multiplexing systems perform data transmission based on multiple parallel fibers, each with a separate cladding comprising one or more cores, without coupling between the fibers.

Figure 22:
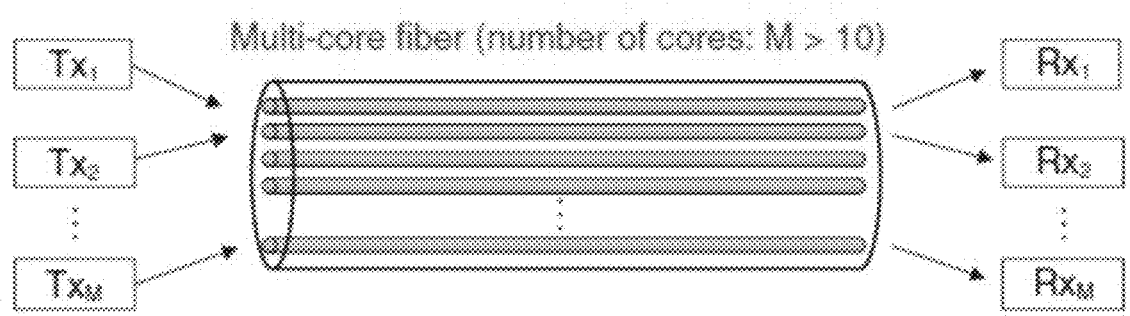
FIG. 22: Spatial division multiplexing optical transmission system.

In order for spatial division multiplexing to be considered for future high-speed fiber-optic communications systems this technology needs to be compatible with existing systems and also it has to outperform existing systems in terms of data rates, costs and power consumption. FIG. 22 shows an example of a modern spatial division multiplexing optical transmission system.

There have also been systems that use both techniques. For example, previously published results demonstrated a system designed for short-distance (between processor and memory) communications using four distinct wavelengths and 12 parallel fibers. The performance implications of using optics in the processor-to-memory data path were investigated (in simulation) in previously published results as an approach to address the performance limitations of the memory wall.

In this disclosure, we investigate the viability of polarization division multiplexing (PDM), the separation of distinct parallel optical communication channels through the polarization properties of light. Two or more linearly polarized optical signals (at different polarization angles) are transmitted through a common medium, filtered using aluminum nanowire optical filters fabricated on-chip, and received using individual silicon photodetectors (one per channel).

We desire the entire transmitter and receiver to be compatible with standard CMOS fabrication processes. Our interest is in both the practical aspects (e.g., the degree to which manufacturing variability effects the operation of the system) and the theoretical limits (e.g., the fundamental trade-offs among optical power, noise margin and number of channels).

The motivation for this work is primarily short distance (on-chip, chip-to-chip on board, and box-to-box within a machine room). As such, an important consideration is the cost of implementation (especially relative to the fairly expensive end-point designs that can be economically justified for long-haul, or city-to-city, distances).

In this disclosure, we investigate the viability of polarization division multiplexing (PDM), the separation of distinct parallel optical communication channels through the polarization properties of light. Two or more linearly polarized optical signals (at different polarization angles) are transmitted through a common medium, filtered using aluminum nanowire optical filters fabricated on-chip, and received using individual silicon photodetectors (one per channel).

We desire the entire transmitter and receiver to be compatible with standard CMOS fabrication processes. Our interest is in both the practical aspects (e.g., the degree to which manufacturing variability effects the operation of the system) and the theoretical limits (e.g., the fundamental trade-offs among optical power, noise margin and number of channels).

The motivation for this work is primarily short distance (on-chip, chip-to-chip on board, and box-to-box within a machine room). As such, an important consideration is the cost of implementation (especially relative to the fairly expensive end-point designs that can be economically justified for long-haul, or city-to-city, distances).

According to a recent article by Levi, there have been many attempts in the last 20 years to integrate optical communications for electronic applications at short distances, such as chip-to-chip communications, board-to-board, box-to-box within equipment racks, and rack-to-rack within a room or a building.

These efforts have not yielded extensive usage of optical communication systems for short distance applications, and in that realm, traditional electrical wire communications are still dominant. According to, the main reason for this is that the cost penalty for using optical wavelength division multiplexing systems is too high for commercial companies to adopt the approach. Expensive wavelength division multiplexing receiver filtering designs are not practical to be placed on processor chips and that is the main reason why the much faster and higher bandwidth optical communication systems that are used for long distances are not used for short distance applications.

The disclosure described in this dissertation is motivated by the desire to investigate and effectively utilize optics in high speed digital communications using polarization division multiplexing. In modern high speed digital communications, optics dominates in long distance communications where very large amounts of data are transferred between the cities, countries, across oceans, etc., using wavelength division multiplexing.

However, in short distance high speed digital communications, for example within the building, room, between servers, board-to-board, or chip-to-chip, electrical signals using copper connections are still predominantly used. A common reason why optics is not utilized as much for short distances and why electrical signaling copper communication links are still dominant is that wavelength division multiplexing is not practical to be introduced on short distances.

Placing wavelength division multiplexing on integrated circuits that are used in servers or computers inside offices and similar environments is not very practical because it would require a lot of resources on the integrated chips and it would be very costly.

On the other hand, polarization division multiplexing, even if it has practical limitations with actual number of channels, can be very effectively used in digital communications links with short distances. Optical digital communications links on short distances that utilize polarization division multiplexing are compatible with standard CMOS processing, which is a significant cost benefit.

In the examples disclosed below, we developed several optical multi-channel digital communication systems based on polarization division multiplexing.

Source laser light signals are polarized using DoFP filter arrays that create multiple channels of high speed digital data each differentiated from the rest of channels by its angle of polarization. Polarized light signals are represented with Stokes vectors and DoFP filters are represented with their Mueller matrix. The process of polarization of light and creation of multiple channels of data is simulated in this disclosure. DoFP filters are currently used in imaging applications as they are routinely bonded on integrated chips and used for image processing applications such are medical imaging.

In this disclosure, we use these DoFP filter arrays to show that they can be effectively used in high-speed optical communications. In addition, they are very cost effective and they do not take a lot of resources on the integrated chips.

Polarized light data channels are combined and they travel via air or a fiber optic cable until they reach the receiver. This light traveling through the air or through a fiber optic cable is also simulated in this disclosure. When the combined polarized light data channels reach the receiver they are separated by a DoFP filter array in the same way as they were polarized on the transmitter side.

This is also simulated in the disclosure. The separated light channels are then converted by a photodiode into an electrical signal, amplified and processed through a comparator to recover the input digital data stream. This receiver circuitry is defined, designed and simulated using the Cadence 0.5 µm process software tools.

The analysis shows that two and three channel systems are viable (with positive noise margins); however, the four channel system is unable to uniquely decode all 16 possible inputs. We addressed this limitation by introducing simple channel coding techniques to the four channel system.

Channel coding on the input transmitter side means that we applied different amplitudes for different light source channels. On the output receiver side the channel coding means that we applied different thresholds on comparators for different channels and for some channels multiple comparators were used together with multiplexers that were controlled by other channels outputs to recover correct data streams.

In addition, an example of the system receiver was designed and fabricated using Cadence 0.5 µm process. Test showed that the receiver chip correctly operates with either an electrical or an optical input signal.

We explored the noise properties of the system though data collection that utilized two distinct CMOS imaging sensors. The first has a linear response, and the second has a logarithmic response. These data are used to calibrate the noise models used in each of our systems.

Finally, and end-to-end analysis of the systems illustrates the trade-offs between signal power, number of channels, and noise margins for a wide variety of candidate designs. Quantitative results are presented for two and three channel systems using binary (on-off) modulation as well as a two channel system that exploits pulse amplitude modulation (PAM4) on each optical channel.

We propose an optical communication system based on polarization division multiplexing. Even though the channel count for PDM in a given transmission media is modest (3 to 4 channels) compared with over 100 data channels for long-haul WDM systems, it represents a significant improvement over traditional electrical communication systems.

As part of this work, an end-to-end polarization division multiplexing system is modeled (both mathematically and using the Cadence simulation tools) to investigate this concept. The system simulation starts from an array of input signals that are multiplexed into one light signal travelling through several media as transmission paths (free space, an optical fiber, and free space with a pair of mirrors).

Figure 23:
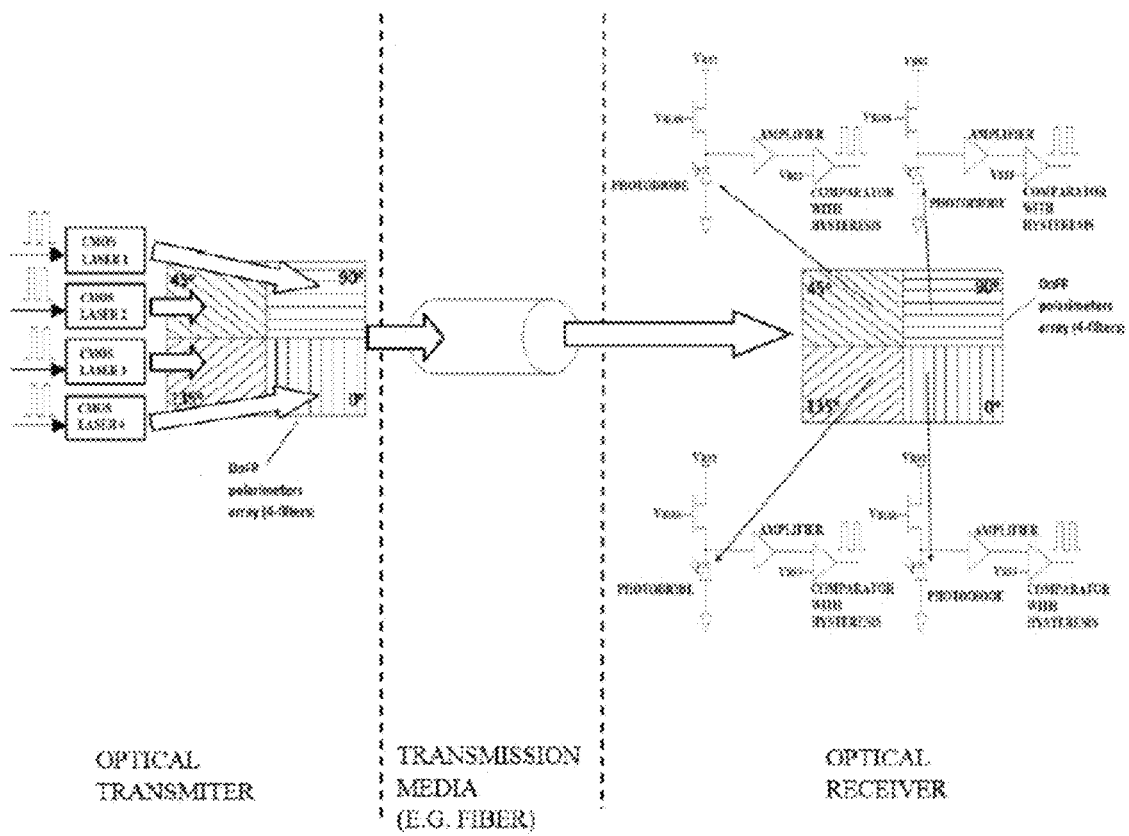
FIG. 23: Polarization division multiplexing optical transmission system.

The light signal is represented as the sum of Stokes vectors for each individual data channel, and the media is modeled via its Mueller matrix. This light signal hits the filters that are mounted on the receiver CMOS integrated chip. The filter model is based upon this input optical signal transformed by the Mueller matrix that models the filter proper, resulting in an output optical signal that impinges on each photodiode. An illustration of a polarization division multiplexing optical transmission system is shown in FIG. 23.

The results show that two and three channel systems can operate with a fixed-threshold comparator in the receiver circuit, but four-channel systems (and larger) will require channel coding of some form. For example, in the four-channel system, 10 of 16 distinct bit patterns are separable by the receiver without using channel coding. The model also supports investigation of the range of variability tolerable in the fabrication of the on-chip polarization filters. The system model is supported by the development and testing of a custom receiver CMOS integrated chip.

To overcome the signal level limitations of the four channel system, simple channel coding techniques are introduced that support four channel operation. The resulting noise margins, however, are quite limited.

Two, three, and four channel systems are investigated using a variety of transmission media, including air, fiber optics, and mirrored reflections. In addition, the general relationships between input optical power, number of channels, and noise margins in the receiver decoders are shown, including designs of 2, 3 and 4 channel Visible Light Communication (VLC) Polarization Division Multiplexing (PDM) systems for usage in short distance communications such as chip-to-chip, board-to-board, box-to-box within equipment racks, and rack-to-rack within a room or a building, designs of 2, 3 and 4 channel VLC PDM systems with transmission media such as air, fiber optic cables and air with mirror reflections. The media are represented by their respective Mueller matrices, usage of DoFP polarimeters bonded on a receiver chip for separation of polarized light communication channels, and cadence simulation of the full 2, 3 and 4 channel VLC PDM systems with air transmission media.

Also disclosed is a design of VerilogA models for optical parts of the system from transmitter in-put lasers, through transmitter's DoFP polarimeters, via transmission media to receiver's DoFP polarimeters, design of VerilogA models for photodiodes, design of receiver channel amplifier circuit, and design of receiver channel comparator with hysteresis circuit, design of receiver channel 2-to-1 multiplexer.

Also disclosed are a variety of noise analyses, including noise analysis of the entire 2, 3 and 4 channel VLC PDM systems with transmission media such as air, fiber optic cables, and air with mirror reflections, noise analysis of optical part of the system, and noise analysis of electrical part of the system.

Also disclosed are the development of coding techniques to overcome noise problems caused by system optical and electrical noise models. Also disclosed are design, layout, and fabrication of a prototype test receiver chip to demonstrate system concept. Also disclosed are design, layout, and fabrication of a printed circuit board (PCB) for testing the prototype receiver chip. Also disclosed are experimental results for characterizations of components of the VLC PDM system.

Figure 24:
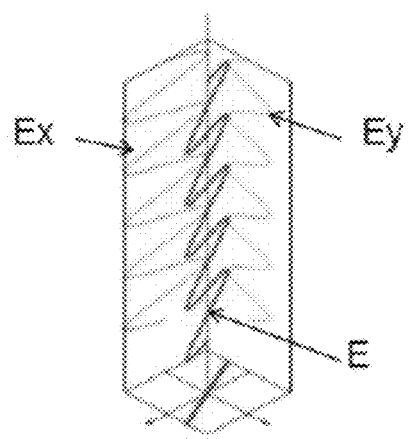
FIG. 24: Properties of light.

Light has three basic properties: intensity, wavelength, and polarization as shown in FIG. 24. The first two properties, intensity and wavelength, are the basis of modern high-speed optical communication systems based on fiber optics. Fiber optic communication systems frequently use Wavelength Division Multiplexing (WDM) for separation of multiple optical channels. Modulated input optical signals that carry many data channels encoded by different wavelengths are separated on the receiver side using well-known WDM techniques.

Our focus is on the exploitation of polarization, which can be efficiently represented using Stokes parameters. Using Stokes vectors, we characterize the polarized light signals coming from modulated CMOS-based optical lasers which are used as the transmitters in our PDM optical transmission system. These polarized light signals are sent through some transmission media (e.g. fiber cable) and then they are received by CMOS-based receiver with Division of Focal Plane (DoFP) polarimeter filter array bonded on the receiver chip surface.

Both transmission media and DoFP polarimeter filter array are represented by Mueller matrices. Extending a previously published approach, the models for various transmission media can be derived and used for simulation of high-speed optical data communications systems. The DoFP polarimeter filter array on the CMOS receiver separates optical signals with different polarization angles. Each optical signal is then converted to electrical signal using high-speed photodiode and it is conditioned into digital data stream for each channel on the CMOS receiver.

There have been reported a number of research projects of PDM system designs built on an optical bench. Several previously published results demonstrated that visible light communication systems based on polarization division multiplexing could be used for gigabit data transfers. These demonstrations were all on an optical bench, and therefore not well suited for CMOS integration.

They showed effective signal separation with two optical channels arranged 90° apart. In addition, there has been some previous work where three optical signals with different polarization angles were sent thru a single-mode fiber cable (without polarization preservation) and these signals were recovered on receiver side of the experiment. This experiment was also performed on an optical bench. Further, Chen et al. showed a similar optical bench PDM system for four independent channels.

Previously published results proposed a PDM system based on nonlinear Fourier transforms and their simulation results show feasibility for PDM communication systems over single-mode fiber. Yao at el. also showed two-channel PDM system on an optical bench. Dou et al. reported two channel PDM system of chaotic laser secure communications on an optical bench. Olsson et al. showed a two channel PDM system over 200 km long optical fiber. Evangelides et al. showed that polarization division multiplexing with solitons can be using for optical data transfer over very long distance equal to 10000 km.

Recent work using Division of focal plane (DoFP) polarimeters integrated with CMOS technology enables compact, real-time polarization imaging systems. The DoFP polarimeters are manufactured from aluminum nanowire materials and mounted on custom CMOS ICs. This system contains an entire image processing pipeline that operates at frame rates of 40 frames per second or higher and thus enables real-time extraction of the polarization properties from the imaged environment.

Recently, Thangaraj et al. described the design and successful integration of high speed photodiodes on CMOS ICs for a fully operational CMOS-compatible optical digital clock distribution and electrical recovery system in a 0.35 nm CMOS process. This work demonstrates the viability of inexpensive optical-electrical signal transformations at GHz speeds in CMOS technology.

There are reported designs of high-speed CMOS based optical laser drivers that can be used as the transmitters of high-speed digital data.

We will build upon these designs to show the viability of an entire high-speed PDM optical transmission system where both the transmitter and the receiver are CMOS-based and where the transmission media might be any of the following: free space, waveguides, fiber optic cable with preservation of polarization, and fiber optic cable without preservation of polarization. There are available literature resources and experimental data that model all these different types of transmission media.

In this disclosure work for the receiver chip channel design we use slower circuit design that has amplifier and comparator with hysteresis that operate in the MHz frequency range. For future VLC PDM high-speed system design in the multiple GHz range we will use transimpedance amplifier (TIA) designs which are well described in the literature.

Stokes Vector Representation of Light

The Stokes parameters are a set of values that describe the polarization state of a traveling light beam. The Stokes parameters are usually combined into a vector, known as the Stokes vector which can be defined as $$S_\Theta = \begin{bmatrix} S_0 \\ S_1 \\ S_2 \\ S_3 \end{bmatrix}. \tag{2.1}$$

Here $\Theta$ is polarization angle and $S_0$ is the intensity of the light beam and it is defined as $$S_0 = I \tag{2.2}$$

where I is the total intensity of the light beam.

Figure 25:
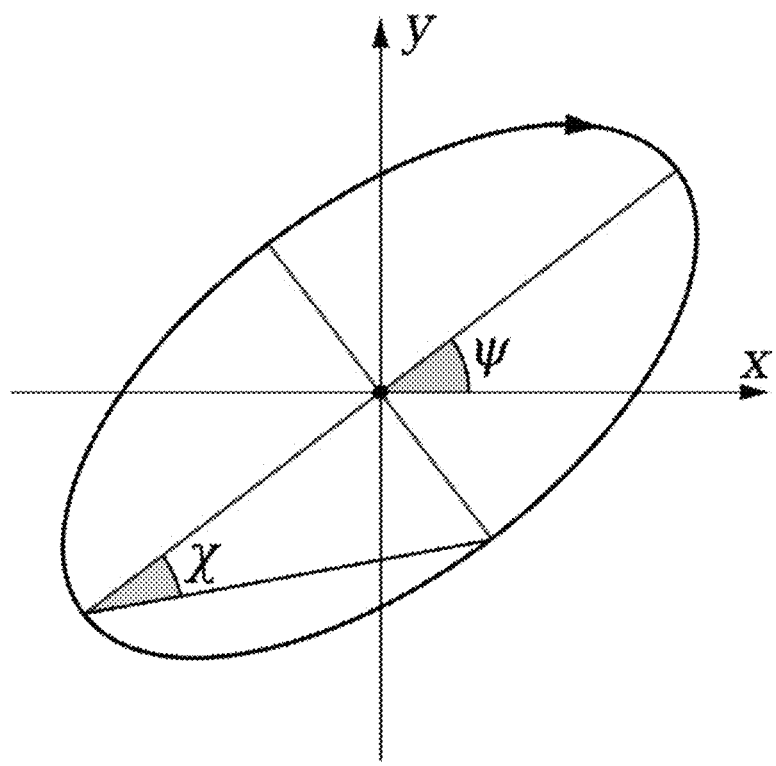
FIG. 25: Polarization ellipse, showing the relationship to the Poincare sphere parameters and x.
Figure 26:
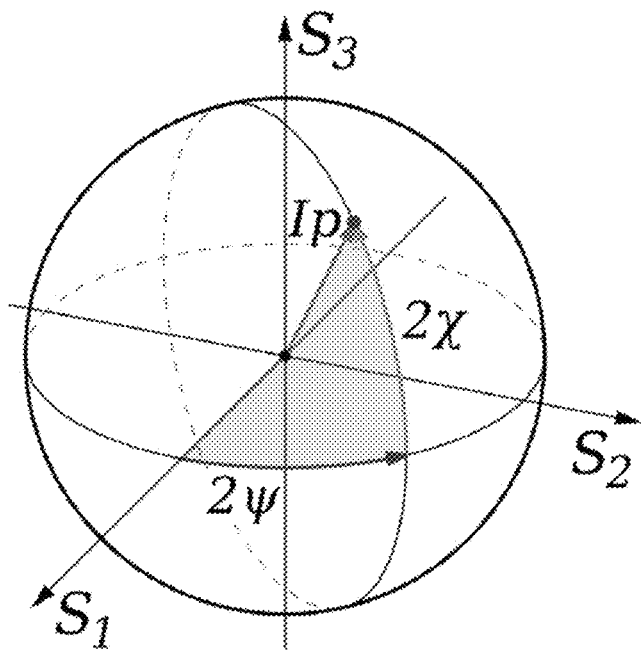
FIG. 26: The Poincare sphere is the parametrization of the last three Stokes parameters in spherical coordinates.

$(S_1, S_2, S_3)$ are the Cartesian coordinates of the three-dimensional vector of position in space of the light beam. These Cartesian coordinates $S_1$, $S_2$ and $S_3$ can be transformed into the spherical coordinates $I_p$, $2\psi$ and $2\chi$ as is shown in FIG. 25 and FIG. 26.

Here p is the degree of polarization that is defined as $0 \leq p \leq 1$. The factor of two before $\psi$ represents the fact that any polarization ellipse is indistinguishable from one rotated by 180°. In addition, the factor of two before $\chi$ indicates that an ellipse is indistinguishable from one with the semi-axis lengths swapped accompanied by a 90° rotation. Note that the phase information of the polarized light is not recorded in the Stokes parameters.

The Cartesian coordinates S1, S2 and S3 are defined as:

$$S_1 = Ip \cos 2\psi \cos 2\chi \tag{2.3}$$

$$S_2 = Ip \sin 2\psi \cos 2\chi \tag{2.4}$$

$$S_3 = Ip \sin 2\chi \tag{2.5}$$

If we have defined the Stokes parameters $S_0$, S1, S2 and S3 we can calculate the spherical coordinates as $$I = S_0 \tag{2.6}$$

$$p = \frac{\sqrt{S_1^2 + S_2^2 + S_3^2}}{S_0} \tag{2.7}$$

$$2\psi = \arctan \frac{S_2}{S_1} \tag{2.8}$$

$$2\chi = \arctan \frac{S_2}{\sqrt{S_1^2 + S_2^2}} \tag{2.9}$$

Here are some examples of the Stokes vectors that we will extensively use in this disclosure:

1. The Stokes vector for unpolarized light is defined as $$S_{unpolarized} = \begin{bmatrix} 1 \\ 0 \\ 0 \\ 0 \end{bmatrix}. \tag{2.10}$$

This makes sense because in this case the spherical coordinates are $$I=1; p=0; 2\psi=0°; 2\chi=0°; \tag{2.11}$$

2. The Stokes vector for 0° linearly polarized light is defined as $$S_{0°} = \begin{bmatrix} 1 \\ 1 \\ 0 \\ 0 \end{bmatrix}. \tag{2.12}$$

Which also makes sense because in this case the spherical coordinates are $$I=1; p=1; 2\psi=0°; 2\chi=0°; \tag{2.13}$$

3. The Stokes vector for 45° linearly polarized light is defined as $$S_{45°} = \begin{bmatrix} 1 \\ 0 \\ 1 \\ 0 \end{bmatrix}. \tag{2.14}$$

In this case the spherical coordinates are $$I=1; p=1; 2\psi=90°; 2\chi=0°; \tag{2.15}$$

4. The Stokes vector for 90° linearly polarized light is defined as $$S_{90°} = \begin{bmatrix} 1 \\ -1 \\ 0 \\ 0 \end{bmatrix}. \tag{2.16}$$

In this case the spherical coordinates are $I=1; p=1; 2\psi=180°; 2\chi=0°;$ (2.17)

5. The Stokes vector for 135° linearly polarized light is defined as $$S_{135°} = \begin{bmatrix} 0 \\ -1 \\ 0 \\ 1 \end{bmatrix}.$$ (2.18)

In this case the spherical coordinates are $I=1; p=1; 2\psi=270°; 2\chi=0°;$ (2.19)

6. The Stokes vector for 60° linearly polarized light is defined as $$S_{60°} = \begin{bmatrix} 1 \\ -\frac{1}{2} \\ \frac{\sqrt{3}}{2} \\ 0 \end{bmatrix}.$$ (2.20)

In this case the spherical coordinates are $I=1; p=1; 2\psi=120°; 2\chi=0°;$ (2.21)

7. The Stokes vector for 120° linearly polarized light is defined as $$S_{120°} = \begin{bmatrix} 1 \\ -\frac{1}{2} \\ -\frac{\sqrt{3}}{2} \\ 0 \end{bmatrix}.$$ (2.22)

In this case the spherical coordinates are $I=1; p=1; 2\psi=240°; 2\chi=0°;$ (2.23)

When exploiting multiple distinct polarization angles for separate channels, we follow the theoretical guidance of previously published results and evenly space the channels around the circle.

Mueller Matrix Representation of Aluminum Mirror with Oxide Layer

In Example 4, we will model a chip-to-chip path that includes mirrors. What follows is the derivation of a Mueller matrix model that represents an aluminum mirror with oxide layer, from previously published results.

We can recall that as light travels through the space it is defined with two electromagnetic waves that are perpendicular to each other and they can be defined as p-polarized light or horizontal axis directed electromagnetic wave and s-polarized light or vertical axis directed electromagnetic wave. Here, we are adopting the notation of previously published results, which are equivalent to the notions of 0° and 90° polarization described above.

The Mueller matrix of the aluminum mirror with oxide layer ($Al_2O_3$) MR is shown below and it is defined with the reflection coefficients of p-polarized light $r_P$ and the reflection coefficients of s-polarized light $r_S$.

$$M_R = \begin{bmatrix} 1 & \frac{-R_p + R_s}{R_p + R_s} & 0 & 0 \\ \frac{-R_p + R_s}{R_p + R_s} & 1 & 0 & 0 \\ 0 & 0 & \frac{-2\sqrt{R_pR_s}\cos(E_p - E_s)}{E_p + E_s} & \frac{-2\text{sqrt}R_pR_s\sin(E_p - E_s)}{R_p + R_s} \\ 0 & 0 & \frac{2\sqrt{R_pR_s}\sin(E_p - E_s)}{E_p + E_s} & \frac{-2\sqrt{R_pR_s}\cos(E_p - E_s)}{E_p + E_s} \end{bmatrix}$$ (2.24)

Since both rP and rS are complex numbers, we define the elements from the Muller matrix for the aluminum mirror as $R_P = |r_P|^2$ (2.25)

$R_S = |r_S|^2$ (2.26)

$E_P = \arg(r_P)$ (2.27)

$E_S = \arg(r_S)$ (2.28)

The reflection coefficient of p-polarized light $r_P$ is defined as $$r_p = \frac{\eta_m E_m - H_m}{\eta_m E_m + H_m}$$ (2.29)

where $$E_m = \cos \delta_f + i\frac{\eta_i}{\eta_f}\sin \delta_f$$ (2.30)

$$H_m = \eta_i \cos \epsilon_f + i\eta_f \sin \delta_f$$ (2.31)

with $$\delta_f = \frac{2\pi}{\lambda} n_j(\lambda) d_f \cos \Theta_f$$ (2.32)

$$\eta_b = n_b(\lambda) \cos \Theta_b$$ (2.33)

$$\eta_f = n_j(\lambda) \cos \Theta_f$$ (2.34)

and $$\eta_m = n_m(\lambda) \cos \Theta_o$$ (2.35)

Also the angles $\Theta_b$ and $\Theta_f$ are calculated using Snell's law, $$n_m(\lambda)\sin \Theta_o = n_f(\lambda)\sin \Theta_f \quad (2.36)$$

$$n_b(\lambda)\sin \Theta_b = n_f(\lambda)\sin \Theta_f \quad (2.37)$$

If we make calculations for wavelength $\lambda=500$ nm, we can calculate the reflection coefficient of p-polarized light rP as it is shown below. The index of refraction of air is $$n_m(\lambda)=1. \quad (2.38)$$

The angle of incidence when the polarized multiple channel light beam reflects of the aluminum mirror is $$\Theta_o=45°. \quad (2.39)$$

From nm ($\lambda$) and $\Theta_o$ we obtain $\eta_m$ using equation (2.35)

$$\eta_m=0.7071. \quad (2.40)$$

Index of refraction of the aluminum mirror is $$n_f(\lambda)=1.61/ \quad (2.41)$$

Also thickness of aluminum oxide layer on the mirror is $$d_f=4.12 \text{ nm}. \quad (2.42)$$

Using Snell's law equation (2.36) we can obtain $$\Theta_f=26.0526°. \quad (2.43)$$

Index of refraction of bulk metal is $$n_b(\lambda)=0.769-15.88. \quad (2.44)$$

Using Snell's law equation (2.37) we obtain $\Theta_b$. Note that in equation (2.37) we only used the real part of nb ($\lambda$)

$$\Theta_b=06.855°. \quad (2.45)$$

Using equation (2.33), we obtain $\eta$b. Note that in equation (2.33) we only used the real part of nb ($\lambda$)

$$\eta_b=0.3023. \quad (2.46)$$

Using equation (2.32) we obtain $\delta f$ $$\delta_f=4.2906°. \quad (2.47)$$

From equation (2.34) we get $\eta f$ $$\eta_f=1.4464. \quad (2.48)$$

Using equations (2.30) and (2.31) we obtain Em and Hm $$E_m=0.9972+i0.0156 \quad (2.49)$$

$$H_m=0.3015+i0.1082. \quad (2.50)$$

Finally, using equation (2.29) we obtain the reflection coefficient of p-polarized light rP $$r_P=0.3841+i0.142. \quad (2.51)$$

Using equations (2.25) and (2.27) we obtain $$R_P=0.1677 \quad (2.52)$$

and $$E_P=-20.2891°. \quad (2.53)$$

The reflection coefficient of s-polarized light rS is also defined as $$r_s = \frac{\eta_m E_m - H_m}{\eta_m E_m + H_m} \quad (2.54)$$

-continued $$E_m = \cos \delta_f + i\frac{\eta_b}{\eta_f}\sin \delta_f \quad (2.55)$$

$$H_m = \eta_b \cos \delta_f + i\eta_f \sin \delta_f \quad (2.56)$$

where $$\delta_f = \frac{2\pi}{\lambda}\eta_f(\lambda)d_f \cos \Theta_f \quad (2.57)$$

$$\eta_b = \frac{n_b(\lambda)}{\cos \Theta_b} \quad (2.58)$$

$$\eta_f = \frac{n_f(\lambda)}{\cos \Theta_f} \quad (2.59)$$

and $$\eta_m = \frac{n_m(\lambda)}{\cos \Theta_a} \quad (2.60)$$

Also the angles $\Theta_b$ and $\Theta_f$ are calculated using Snell's law, $$n_m(\lambda)\sin \Theta_o = n_f(\lambda)\sin \Theta_f \quad (2.61)$$

$$n_b(\lambda)\sin \Theta_b = n_f(\lambda)\sin \Theta_f \quad (2.62)$$

Again if we make calculations for wavelength $\lambda=500$ nm, we can calculate the reflection coefficient of s-polarized light rS as it is shown below. The index of refraction of air is $$n_m(\lambda)=1 \quad (2.63)$$

The angle of incidence when the polarized multiple channel light beam reflects of the aluminum mirror is $$\Theta_o=45°. \quad (2.64)$$

From nm ($\lambda$) and $\Theta_o$ we obtain $\eta$m using equation (2.60)

$$\eta_m=1.4142 \quad (2.65)$$

Again, index of refraction of the aluminum mirror is $$n_f(\lambda)=1.61. \quad (2.66)$$

Also thickness of aluminum oxide layer on the mirror is $$d_f=4.12 \text{ nm}. \quad (2.67)$$

Using Snell's law equation (2.61) we obtain $$\Theta_f=26.0526°. \quad (2.68)$$

Index of refraction of bulk metal is $$n_b(\lambda)=0.769-i5.88. \quad (2.69)$$

Using Snell's law equation (2.62) we obtain $\Theta_b$. Note that in equation (2.62) we only used the real part of nb ($\lambda$)

$$\Theta_b=66.855°. \quad (2.70)$$

Using equation (2.58), we obtain $\eta$b. Note that in equation (2.58) we only used the real part of nb ($\lambda$)

$$\eta_b=1.9564. \quad (2.71)$$

Using equation (2.57) we obtain $\delta f$ $$\delta_f=4.2006°. \quad (2.72)$$

From equation (2.59) we get if $$\eta_f=1.7921. \quad (2.73)$$

Using equations (2.55) and (2.56) we obtain Em and Hm $$E_m=0.9972+i0.0817 \quad (2.74)$$

$$H_m=1.9509+i0.1341. \quad (2.75)$$

Finally, using equation (2.54) we obtain the reflection coefficient of s-polarized light $r_S$ $$r_S=-0.1604+i0.0064. \quad (2.76)$$

Using equations (2.26) and (2.28) we obtain $$R_S = 0.0258 \quad (2.77)$$

and $$E_S = 177.7151°. \quad (2.78)$$

Finally, the Mueller matrix of the aluminum mirror is defined as □

$$M_H = \begin{bmatrix} 1 & -0.734 & 0 & 0 \\ -0.734 & 1 & 0 & 0 \\ 0 & 0 & 0.6463 & -0.21 \\ 0 & 0 & 0.21 & 0.6463 \end{bmatrix} \quad (2.79)$$

I. Polarization Division Multiplexing

A light signal is defined by its intensity, wavelength and polarization. In the present system, we use intensity to encode the information to be delivered, and polarization to separate multiple channels. Each input light signal at a different polarization angle is modulated to represent one digital data channel. All these input light signals are combined at the source into one incident light signal traveling in free space. This incident light signal will form the input to our system.

Each data channel has a unique angle of polarization. If it is a dual data channel system then data channel angles of polarization are 0° and 90°. If it is a three channel system then data channel angles of polarization are 0°, 60° and 120°. And if it is a four channel system then data channel angles of polarization are 0°, 45°, 90° and 135°.

This aggregate input light signal is received at a DoFP polarimeter array that may have two, three or four filters depending if we have a two, three or four channel design. Each filter from the array will have its own polarization angle that will match a polarization angle of one channel of input light. The operation of the polarimeter array is modeled via its Mueller matrix, which has been parameterized using measurements from fabricated devices.1

As described herein, we will define the appropriate mathematical models behind PDM for two, three or four channel designs.

a) Two Channel DoFP Polarization Filter Array

For a two channel DoFP polarization filter array, the two input data channels have angles of polarization of 0° and 90°, respectively. Each input data channel is represented by a Stokes vector SΘ.1 The Stokes vectors for incident input light channels with polarization angles of 0° and 90° and intensity i are:

$$S_{0°} = \begin{bmatrix} S_0 \\ S_1 \\ S_2 \\ S_3 \end{bmatrix}, S_{0°} = \begin{bmatrix} i \\ i \\ 0 \\ 0 \end{bmatrix}, S_{90°} = \begin{bmatrix} i \\ -i \\ 0 \\ 0 \end{bmatrix}$$

The incident light that includes both data channels' signals has the total Stokes vector SINPUT at any moment of time defined as $$S_{INPUT} = b_0 S_{0°} b_{90} b_{90°} \quad (1)$$

where $b_0$ and $b_{90}$ represent the modulating bits (each valued at either 0 or 1).

If we modulate an incident input light signal (of intensity i=1) with the binary sequence for two data channels, then the total Stokes vector SINPUT for incident input light at any moment is illustrated in FIG. 1.

Figure 2:
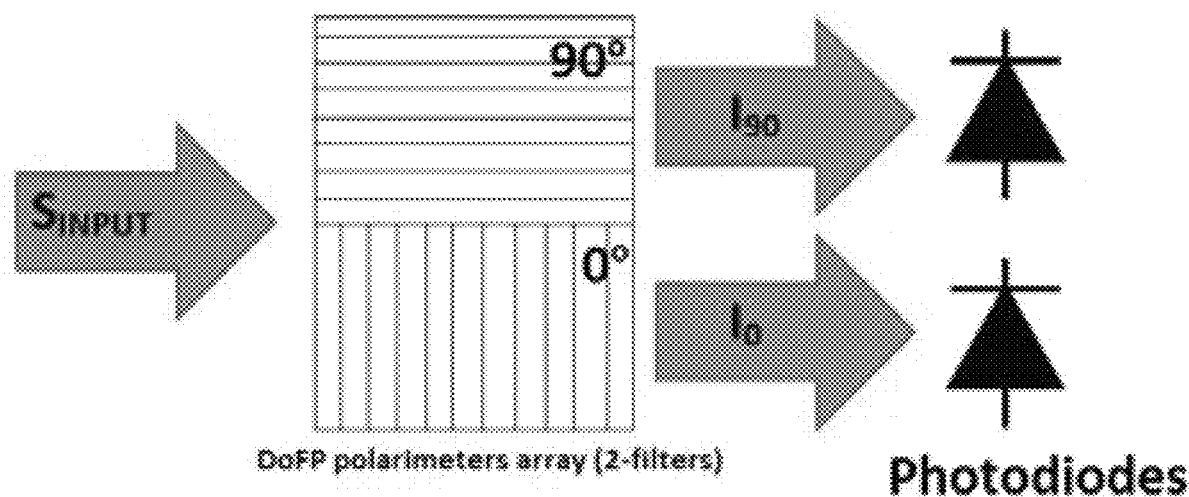
FIG. 2. The input light signal for two data channels with polarization angles of 0° and 90° incident upon the DoFP polarization filter array and the output light signals from the filters $I_0$ and $I_{90}$.

The incident light signal SINPUT reaches the DoFP polarization filter array, which separates the two channels. Each polarization filter is represented by the filter's Mueller matrix MΘ.

$$M_\Theta = \frac{1}{2}\begin{bmatrix} (p_x^2 + p_y^2) & (p_x^2 - p_y^2)\cos(2\Theta) & (p_x^2 - p_y^2)\sin(2\Theta) & 0 \\ (p_x^2 - p_y^2)\cos(2\Theta) & (p_x^2 + p_y^2)\cos^2(2\Theta) + 2p_xp_y\sin^2(2\Theta) & \frac{1}{2}(p_x - p_y)^2\sin(2\Theta) & 0 \\ (p_x^2 - p_y^2)\sin(2\Theta) & \frac{1}{2}(p_x - p_y)^2\sin(2\Theta) & 2p_xp_y\cos^2(2\Theta) + (p_x^2 + p_y^2)\sin^2(2\Theta) & 0 \\ 0 & 0 & 0 & p_xp_y \end{bmatrix} \quad (2)$$

where Θ is the angle of polarization and px and py are the transmission coefficients in the x and y axes (they characterize the properties, including imperfections, of the aluminum nanowire filters). FIG. 2 illustrates the input light signal SINPUT that reaches the DoFP polarization filter array and the output light signals from the filters $I_0$ and $I_{90}$.

The output of each filter from the DoFP polarization filter array is:

$$I_\Theta = g[1\ 0\ 0\ 0]M_\Theta S_{INPUT} + d \quad (3)$$

In the equation above IΘ represents the light intensity of each filter from the DoFP polarization filter array. Variables g and d are the internal gain and dark offset of each filter. We will assume that gain is equal to 1. Also for our application we can ignore the dark offset because this current is measured in fA and a single channel's photodiode current is between fA when there is no light and a few μA when there is light so the dark offset current is negligible. Therefore, $$I_\Theta = [1\ 0\ 0\ 0]M_\Theta S_{INPUT} \quad (4)$$

This yields the following model for the filter output:

$$I_\Theta = \begin{bmatrix} \frac{1}{2} & 0 & 0 & 0 \end{bmatrix} \begin{bmatrix} (p_x^2 + p_y^2) & (p_x^2 - p_y^2)c_{2\Theta} & (p_x^2 - p_y^2)s_{2\Theta} & 0 \\ (p_x^2 - p_y^2)c_{2\Theta} & (p_x^2 + p_y^2)(2c_{2\Theta})^2 + 2p_x p_y (s_{2\Theta})^2 & \frac{1}{2}(p_x - p_y)^2 s_{2\Theta} & 0 \\ (p_x^2 - p_y^2)s_{2\Theta} & \frac{1}{2}(p_x - p_y)^2 s_{2\Theta} & 2p_x p_y (s_{2\Theta})^2 + (p_x^2 + p_y^2)(s_{2\Theta})^2 & 0 \\ 0 & 0 & 0 & p_x p_y \end{bmatrix} \quad (5)$$

where $c2\Theta$ is cos $2\Theta$, $s2\Theta$ is sin $2\Theta$, and $s4\Theta$ is sin $4\Theta$. Assuming that the intensity in the Stokes vectors for $S_{0\pi}$ and $S_{90°}$ is 2, this will yield the following Stokes vectors for incident input light with polarization angles of 0° and 90°:

$$S_{0°} = \begin{bmatrix} 2 \\ 2 \\ 0 \\ 0 \end{bmatrix}, S_{90°} = \begin{bmatrix} 2 \\ -2 \\ 0 \\ 0 \end{bmatrix} \quad (6)$$

Each filter output $I\Theta$ is defined as $$I_\Theta = \tfrac{1}{2}[S_0(p_x^3 + p_y^2) + S_1(p_x^2 - p_y^2)\cos(2\theta) + S_2(p_x^2 - p_y^2)\sin(2\theta)] \quad (7)$$

We use the following approximations to calculate the filter's outputs $I\Theta$:

$$T = (p_x^2 + p_y^2) = \frac{1}{2} \quad (8)$$

$$D = \frac{(p_x^2 - p_y^2)}{(p_x^2 + p_y^2)} = 0.99 \quad (9)$$

These represent the physical properties of the fabricated filters themselves. The above leads to filter output $I\Theta$ represented by $$I_\Theta = \frac{1}{4}S_0 + \frac{0.99}{4}S_1 \cos(2\Theta) + \frac{0.99}{4}S_2 \sin(2\Theta) \quad (10)$$

so for the filter with polarization angle of 0° the output light signal is calculated as:

$$I_0 = \frac{1}{4}S_0 + \frac{0.99}{4}S_1 \cos(0°) + \frac{0.99}{4}S_2 \sin(0°)$$
$$= \frac{1}{4}S_0 + \frac{0.99}{4}S_1 \quad (11)$$

and for the filter with polarization angle of 90° the output light signal is calculated as:

$$I_{90} = \frac{1}{4}S_0 + \frac{0.99}{4}S_1 \cos(180°) + \frac{0.99}{4}S_2 \sin(180°)$$
$$= \frac{1}{4}S_0 - \frac{0.99}{4}S_1 \quad (12)$$

If we examine a binary truth table for this two channel DoFP polarization filter array we can see that we can have the correct binary outputs given we use a reasonable comparison point for light intensity (anywhere near 0.5 will be sufficient). This is shown in Table 1.

TABLE 1

Binary truth table for two channel DoFP polarization filter array.

| $b_{90}$ | $b_0$ | $S_{INPUT}$ | $I_{90}$ | $I_0$ |
|---|---|---|---|---|
| 0 | 0 | $[0\ 0\ 0\ 0]^T$ | 0 | 0 |
| 0 | 1 | $[2\ 2\ 0\ 0]^T$ | 0.005 | 0.995 |
| 1 | 0 | $[2\ -2\ 0\ 0]^T$ | 0.995 | 0.005 |
| 1 | 1 | $[4\ 0\ 0\ 0]^T$ | 1 | 1 |

Three Channel DoFP Polarization Filter Array

For a three channel DoFP polarization filter array the three input data channels have angles of polarization of 0°, 60° and 120°, respectively. The Stokes vectors for incident input light (of intensity i) with polarization angles of 0°, 60°, and 120° are:

$$S_{0°} = \begin{bmatrix} 1 \\ 1 \\ 0 \\ 0 \end{bmatrix}, S_{90°} = \begin{bmatrix} i \\ -\frac{1}{2}i \\ \frac{\sqrt{3}}{2}i \\ 0 \end{bmatrix}, S_{120°} = \begin{bmatrix} i \\ -\frac{1}{2}i \\ -\frac{\sqrt{3}}{2}i \\ 0 \end{bmatrix} \quad (13)$$

The incident input light signal that includes all of the channels' signals has the total Stokes vector SINPUT at any moment of time defined as $$S_{INPUT} = b_0 S_{0°} + b_{60} S_{60°} + b_{120} S_{120°} \quad (14)$$

Figures 3, 4:
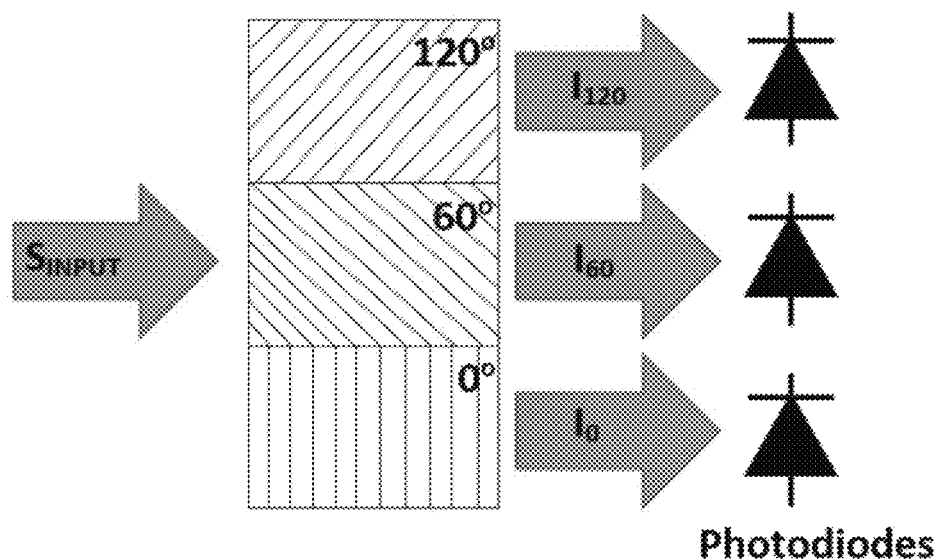
FIG. 3. The light signal modulated as binary sequence for three data channels with polarization angles of 0°, 60° and 120°.
FIG. 4. The incident input light signal modulated as binary sequence for two data channels with polarization angles of 0°, 60° and 120° reaches DoFP polarization filter array and the output light signals from the filters $I_0$, $I_{60}$ and $I_{120}$.

If we modulate an intensity i=1 light signal with the binary sequence for three data channels, then the total Stokes vector SINPUT for incident input light at any moment is illustrated in FIG. 3. FIG. 4 shows the filter system.

Again each DoFP polarization filter is represented by the filter's Mueller matrix $M\Theta$ from equation (2), and the output of each filter is:

$$I_\Theta = [1\ 0\ 0\ 0]M_\Theta S_{INPUT} \quad (15)$$

If we assume that intensity i in the Stokes vectors for $S_{0°}$, $S_{60°}$ and $S_{120°}$ is 2, this will yield $$S_{0°} = \begin{bmatrix} 2 \\ 2 \\ 0 \\ 0 \end{bmatrix}, S_{90°} = \begin{bmatrix} 2 \\ -1 \\ \sqrt{3} \\ 0 \end{bmatrix}, S_{180°} = \begin{bmatrix} 2 \\ -1 \\ -\sqrt{3} \\ 0 \end{bmatrix} \quad (16)$$

Each filter output $I\Theta$ is again defined as $$I_\Theta = \tfrac{1}{2}[s_0(p_x^2 + p_y^2) + S_1(p_x^2 - p_y^2)\cos(2\theta) + S_2(p_x^2 - p_y^2)\sin(2\theta)] \quad (17)$$

Using equations (8), (9), and (10) gives filter output RI For the filter with polarization angle of 0° the output light signal is:

$$I_0 = \frac{1}{4}S_0 + \frac{0.99}{4}S_1 \cos(0°) + \frac{0.99}{4}S_2 \sin(0°) \quad (18)$$
$$= \frac{1}{4}S_0 + \frac{0.99}{4}S_1$$

for the filter with polarization angle of 60° the output light signal is:

$$I_{90} = \frac{1}{4}S_0 + \frac{0.99}{4}S_1 \cos(120°) + \frac{0.99}{4}S_2 \sin(120°) \quad (19)$$
$$= \frac{1}{4}S_0 - \frac{0.99}{8}S_1 + \frac{0.99}{8}\sqrt{3}S_2$$

and for the filter with polarization angle of 120° the output light signal is:

$$I_{120} = \frac{1}{4}S_0 + \frac{0.99}{4}S_1 \cos(240°) + \frac{0.99}{4}S_2 \sin(240°) \quad (20)$$
$$= \frac{1}{4}S_0 - \frac{0.99}{8}S_1 - \frac{0.99}{8}\sqrt{3}S_2$$

If we examine the binary truth table for this three channel DoFP polarization filter array (see Table 2) we can see that we can still have the correct output binary values with an appropriately chosen threshold; all input 0s have output intensity ≤0.505 and all input 1s have output intensity ≥0.995. However, the available noise margin is significantly reduced due to crosstalk between the channels.

Four Channel DoFP Polarization Filter Array

In a four channel DoFP Polarization filter array four input data channels have angles of polarization of 0°, 45°, 90° and 135°, respectively. The Stokes vectors for incident input light with polarization angles of 0°, 45°, 90°, and 135° and intensity i are:

$$S_{0°} = \begin{bmatrix} i \\ i \\ 0 \\ 0 \end{bmatrix}, S_{45°} = \begin{bmatrix} i \\ 0 \\ i \\ 0 \end{bmatrix}, S_{90°} = \begin{bmatrix} i \\ -i \\ 0 \\ 0 \end{bmatrix}, S_{180°} = \begin{bmatrix} i \\ 0 \\ -i \\ 0 \end{bmatrix} \quad (21)$$

TABLE 2

Binary truth table for three channel DoFP polarization filter array.

| $b_{120}$ | $b_{60}$ | $b_0$ | $S_{INPUT}$ | $I_{120}$ | $I_{60}$ | $I_0$ |
|---|---|---|---|---|---|---|
| 0 | 0 | 0 | $[0\ 0\ 0\ 0]^T$ | 0 | 0 | 0 |
| 0 | 0 | 1 | $[2\ 2\ 0\ 0]^T$ | 0.253 | 0.253 | 0.995 |
| 0 | 1 | 0 | $[2\ -1\ \sqrt{3}\ 0]^T$ | 0.253 | 0.995 | 0.253 |
| 0 | 1 | 1 | $[4\ 1\ \sqrt{3}\ 0]^T$ | 0.505 | 1.248 | 1.248 |
| 1 | 0 | 0 | $[2\ -1\ -\sqrt{3}\ 0]^T$ | 0.995 | 0.253 | 0.253 |
| 1 | 0 | 1 | $[4\ 1\ -\sqrt{3}\ 0]^T$ | 1.248 | 0.505 | 1.248 |
| 1 | 1 | 0 | $[4\ -2\ 0\ 0]^T$ | 1.248 | 1.248 | 0.505 |
| 1 | 1 | 1 | $[6\ 0\ 0\ 0]^T$ | 1.5 | 1.5 | 1.5 |

The incident input light signal that includes all data channels has the total Stokes vector SINPUT defined as $$S_{INPUT} = b_0 S_{0°} + b_{45} S_{45°} + b_{90} S_{90°} + b_{135} S_{135°} \quad (22)$$

Once again, each filter is represented by the filter's Mueller matrix MΘ from equation (2), and the output of each filter is:

$$I_\Theta = [1\ 0\ 0\ 0]M_\Theta S_{INPUT} \quad (23)$$

If we assume that the intensity parameter i in the Stokes vectors $S_{0°}$, $S_{45°}$, $S_{90°}$ and $S_{135°}$ is 2, this will yield $$S_{0°} = \begin{bmatrix} 2 \\ 2 \\ 0 \\ 0 \end{bmatrix}, S_{45°} = \begin{bmatrix} 2 \\ 0 \\ 2 \\ 0 \end{bmatrix}, S_{90°} = \begin{bmatrix} 2 \\ -2 \\ 0 \\ 0 \end{bmatrix}, S_{120°} = \begin{bmatrix} 2 \\ 0 \\ -2 \\ 0 \end{bmatrix} \quad (24)$$

Figure 5:
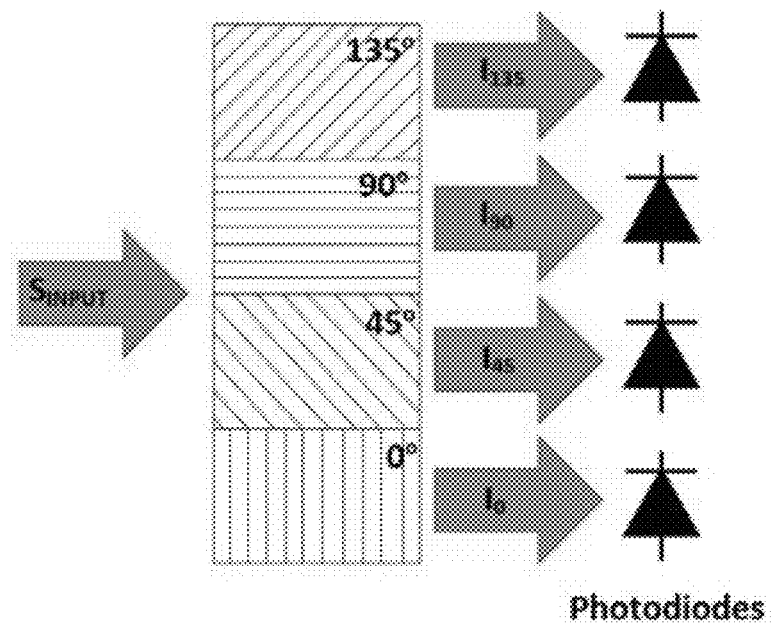
FIG. 5. The incident input light signal modulated as binary sequence for four data channels with polarization angles of 0°, 45°, 90° and 135° reaches DoFP polarization filter array and the output light signals from the filters $I_0$, $I_{45}$, $I_{90}$ and $I_{135}$.

FIG. 5 shows the input light SINPUT that reaches the DoFP polarization filter array and the output light signals from the filters $I_0$, $I_{45}$, $I_{90}$ and $I_{135}$.

Each filter output IΘ is $$I_\Theta = \tfrac{1}{2}[s_0(p_x^2 + p_y^2) + S_1(p_x^2 - p_y^2)\cos(2\Theta) + S_2(p_x^2 - p_y^2)\sin(2\Theta)] \quad (25)$$

Using equations (8), (9) and (10) gives filter output IΘ. For the filter with polarization angle of 0° the output light signal is calculated as:

$$I_0 = \frac{1}{4}S_0 + \frac{0.99}{4}S_1 \cos(0°) + \frac{0.99}{4}S_2 \sin(0°) \quad (26)$$
$$= \frac{1}{2}S_0 + \frac{0.99}{4}S_1$$

for the filter with polarization angle of 45° the output light signal is calculated as:

$$I_{45} = \frac{1}{4}S_0 + \frac{0.99}{4}S_1 \cos(90°) + \frac{0.99}{4}S_2 \sin(90°) \quad (27)$$
$$= \frac{1}{2}S_0 + \frac{0.99}{4}S_2$$

for the filter with polarization angle of 90° the output light signal is calculated as:

$$I_{90} = \frac{1}{4}S_0 + \frac{0.99}{4}S_1 \cos(180°) + \frac{0.99}{4}S_2 \sin(180°) \quad (28)$$
$$= \frac{1}{2}S_0 - \frac{0.99}{4}S_2$$

and for the filter with polarization angle of 135° the output light signal is calculated as:

$$I_{135} = \frac{1}{4}S_0 + \frac{0.99}{4}S_1 \cos(270°) + \frac{0.99}{4}S_2 \sin(270°) \quad (29)$$
$$= \frac{1}{2}S_0 - \frac{0.99}{4}S_2$$

When we examine the binary truth table for the four channel DoFP polarization filter array, we see that we cannot have the correct output for each input combination (see Table 3). At the very least, the input combination 0101 will be indistinguishable from input combination 1010.

TABLE 3

Binary truth table for four channel DoFP polarization filter array.

| $b_{135}$ | $b_{90}$ | $b_{45}$ | $b_0$ | $S_{INPUT}$ | $I_{135}$ | $I_{90}$ | $I_{45}$ | $I_0$ |
|---|---|---|---|---|---|---|---|---|
| 0 | 0 | 0 | 0 | $[0\ 0\ 0\ 0]^T$ | 0 | 0 | 0 | 0 |
| 0 | 0 | 0 | 1 | $[2\ 2\ 0\ 0]^T$ | 0.5 | 0.005 | 0.5 | 0.995 |
| 0 | 0 | 1 | 0 | $[2\ 0\ 2\ 0]^T$ | 0.005 | 0.5 | 0.995 | 0.5 |
| 0 | 0 | 1 | 1 | $[4\ 2\ 2\ 0]^T$ | 0.505 | 0.505 | 1.495 | 1.495 |
| 0 | 1 | 0 | 0 | $[2\ -2\ 0\ 0]^T$ | 0.5 | 0.995 | 0.5 | 0.005 |
| 0 | 1 | 0 | 1 | $[4\ 0\ 0\ 0]^T$ | 1 | 1 | 1 | 1 |
| 0 | 1 | 1 | 0 | $[4\ -2\ 2\ 0]^T$ | 0.505 | 1.495 | 1.495 | 0.505 |
| 0 | 1 | 1 | 1 | $[6\ 0\ 2\ 0]^T$ | 1.005 | 1.5 | 1.995 | 1.5 |
| 1 | 0 | 0 | 0 | $[2\ 0\ -2\ 0]^T$ | 0.995 | 0.5 | 0.005 | 0.5 |
| 1 | 0 | 0 | 1 | $[4\ 2\ -2\ 0]^T$ | 1.495 | 0.505 | 0.505 | 1.495 |
| 1 | 0 | 1 | 0 | $[4\ 0\ 0\ 0]^T$ | 1 | 1 | 1 | 1 |
| 1 | 0 | 1 | 1 | $[6\ 2\ 0\ 0]^T$ | 1.5 | 1.005 | 1.5 | 1.995 |
| 1 | 1 | 0 | 0 | $[4\ -2\ -2\ 0]^T$ | 1.495 | 1.495 | 0.505 | 0.505 |
| 1 | 1 | 0 | 1 | $[6\ 0\ -2\ 0]^T$ | 1.995 | 1.5 | 1.005 | 1.5 |
| 1 | 1 | 1 | 0 | $[6\ -2\ 0\ 0]^T$ | 1.5 | 1.995 | 1.5 | 1.005 |
| 1 | 1 | 1 | 1 | $[8\ 0\ 0\ 0]^T$ | 2 | 2 | 2 | 2 |

For example, if we posit a threshold of 0.7 for each of four filter outputs $I_0$, $I_{45}$, $I_{90}$ and $I_{135}$ in Table 3 we can see that:
1. $I_{135}$ will not result in 0 for two input sequences 0101 and 0111.
2. $I_{90}$ will not result in 0 for two input sequences 1010 and 1011.
3. $I_{45}$ will not result in 0 for two input sequences 0101 and 1101.
4. $I_0$ will not result in 0 for two input sequences 1010 and 1110.

The crosstalk between neighboring channels is sufficiently large that only 10 of the 16 input combinations give unique output combinations. We leave it to future work to determine whether appropriate coding techniques can improve upon this.

We have developed VerlogA models for DoFP filter arrays of two, three and four channels. As described herein, we will describe a simulation model of the complete receiver system, including both the optical and electronic subsystems.

II. Simulation Model

Figure 6:
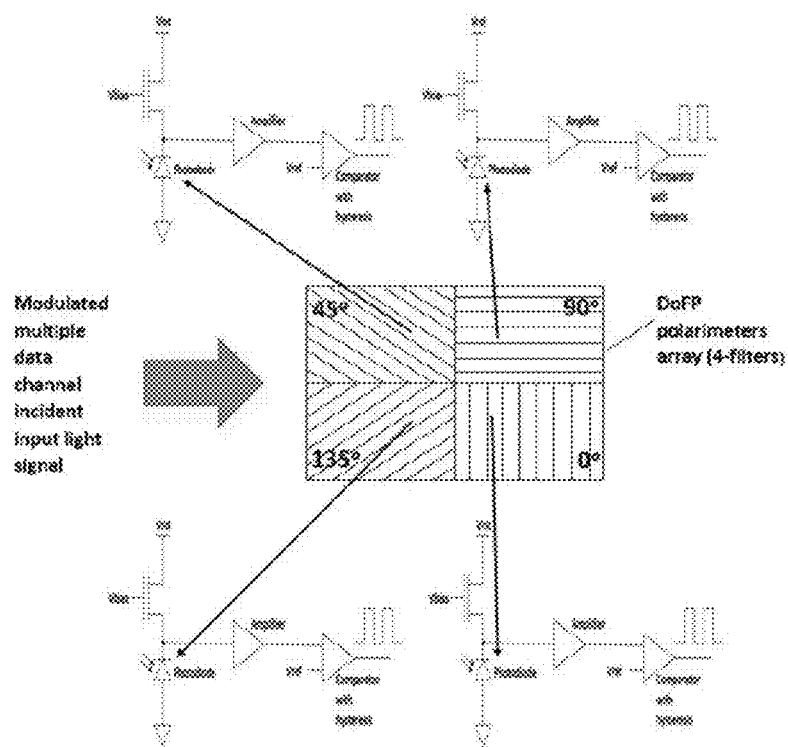
FIG. 6. Four channel VLC system.

FIG. 6 shows the entire four channel VLC system. Simulation models have been constructed for two, three and four channel systems.

Figure 7:
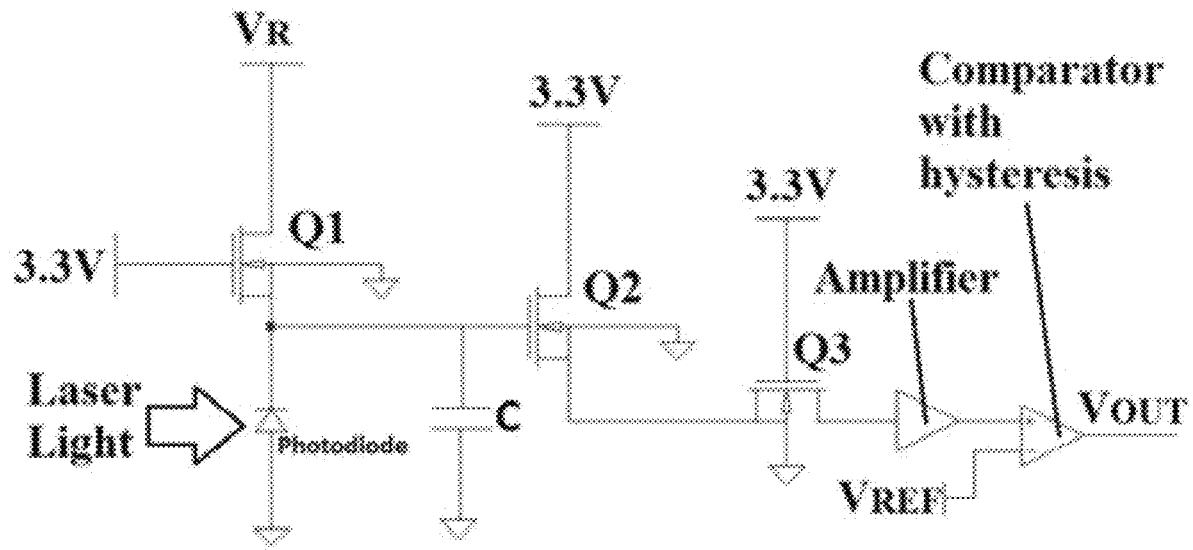
FIG. 7. One data channel of VLC system.

Laser input signals are simulated with square wave voltage sources with proper amplitudes that represent input laser signal power. These laser input signals are connected to DoFP filter arrays for two, three and four channel VLC designs. The DoFP filter arrays are modeled using VerilogA. They are connected to the photodiode in each data communication channel. Each photodiode is also modeled using VerilogA. The rest of the simulation model was designed using Cadence 180 nm node design software. The electronic subsystem for each data channel is designed as shown in FIG. 7.

Photodiode

Figure 8:
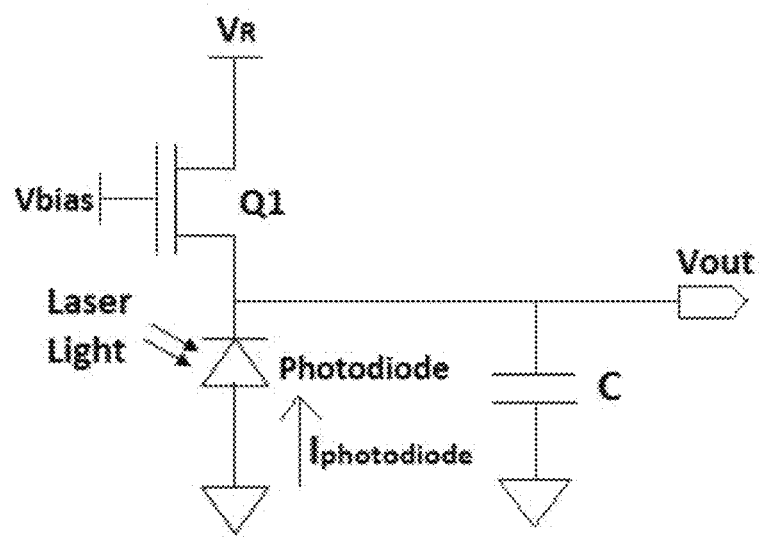
FIG. 8. Photodiode circuit of one data channel of VLC system.

Photodiodes used in the VLC system have to be fast switching diodes and they should have low capacitance. Fast switching photodiodes have been used for optical high speed digital clocking in various silicon chips. The photodiode model was designed using VerilogA. Examples of complex photodiode model designs created in VerilogA exist in the literature. For the VLC system, we will use a simpler photodiode model. The photodiode circuit is shown in FIG. 8.

The photodiode is reverse biased by VR=2.25 V, a voltage source connected through the active CMOS transistor Q1. The transistor Q1 is biased with V bias=3.3 V, and a parallel capacitance (20 fF) simulates the photodiode's internal capacitance. In the VerilogA model, the photodiode current is calculated using the following expression:

$$I_{photodiode} = I_{forward} - I_{optical} = \qquad (30)$$

$$qA\left(\frac{D_p}{L_p}p_n + \frac{D_n}{L_n}n_p\right)\left(e^{V_x/V_y} - 1\right) - qAg_{cp}(L_p + L_n + W)$$

The photodiode forward current $I_{forward}$ is a dark current approximation that represents current flowing from anode to cathode when reverse bias voltage V R is applied and no light shines on the photodiode.

$$I_{forward} = qA\left(\frac{D_p}{L_p}p_n + \frac{D_n}{L_n}n_p\right)\left(e^{V_x/V_y} - 1\right) \qquad (31)$$

This current is in the order of few fA, which is negligible current for this application. The photodiode optical current $I_{optical}$ is a reverse current created by shining light on the photodiode. This current is in the order of few µA.

$$I_{optical} = qAg_{op}(L_p + L_n + W) \qquad (32)$$

The model parameters for the above expressions are given in Table 4.

TABLE 4

Photodiode model parameters[11,12]

| Parameter | Symbol | Value |
|---|---|---|
| Basic Electric Charge | q | $1.6 \times 10^{-19}$ C |
| Area of Si-pn junction | A | 0.0001 cm$^2$ |
| Temperature | T | 300 K |
| Boltzmann constant | K | $1.38 \times 10^{-23} \frac{m^2 kg}{S^2 K}$ |
| Thermal voltage | $V_T$ | $\frac{KT}{q} = 0.025875$ V |
| Intrinsic electron and hole concentration for Si at 25° C. | $n_i$ | $1.5 \times 10^{-10}$ cm$^{-3}$ |
| Dielectric constant of vacuum | $\varepsilon_0$ | $8.85 \times 10^{-14}$ F/cm |
| Relative dielectric constant of Si | $\varepsilon_r$ | 11.8 |
| Acceptor concentration of photodiode N-junction | $N_d$ | $10^{15}$ cm$^{-3}$ |
| Carrier recombination lifetime of photodiode N-junction | $\tau_p$ | 0.00001 s |
| Electron mobility of photodiode N-junction | $\mu_n$ | $1300 \frac{cm^2}{V_S}$ |
| Hole mobility of photodiode N-junction | $\mu_p$ | $450 \frac{cm^2}{V_S}$ |
| Acceptor concentration of photodiode P-junction | $N_a$ | $10^{17}$ cm$^{-3}$ |
| Carrier recombination lifetime of photodiode P-junction | $\tau_n$ | 0.0000001 s |
| Electron mobility of photodiode P-junction | $\mu_n$ | $700 \frac{cm^2}{V_S}$ |

TABLE 4-continued

Photodiode model parameters[11,12]

| Parameter | Symbol | Value |
|---|---|---|
| Hole mobility of photodiode P-junction | $\mu_p$ | $200\dfrac{cm^2}{V_S}$ |
| Optical generation rate | $g_{op}$ | $\dfrac{\alpha P_O}{E_{PH}q} = 8.68056 \times 10^{19}$ |
| Absorption coefficient of Si | $\alpha$ | 500 cm$^{-1}$ |
| Uniform illumination of red light | $E_{PH}$ | 1.8 eV |
| Laser optical power | $P_O$ | $0.05\dfrac{W}{cm^2}$ |
| Diffusion coefficient on photodiode N-junction | $D_p$ | $V_T\mu_p$ |
| Diffusion coefficient on photodiode P-junction | $D_n$ | $V_T\mu_n$ |
| Diffusion length for holes | $L_p$ | $\sqrt{D_p\tau_p}$ |
| Diffusion length for electrons | $L_n$ | $\sqrt{D_n\tau_n}$ |
| Minority concentration of electrons in photodiode P-junction | $p_n$ | $\dfrac{n_i^2}{N_d}$ |
| Minority concentration of holes in photodiode N-junction | $n_p$ | $\dfrac{n_i^2}{N_a}$ |
| Contact potential | $V_0$ | $V_T\ln\left(\dfrac{N_a N_d}{n_i^2}\right)$ |
| Depletion region width | W | $\sqrt{\dfrac{2\varepsilon_0\varepsilon_r}{q}(V_0 - V_R)\left(\dfrac{1}{N_a} + \dfrac{1}{N_d}\right)}$ |

Amplifier

Figure 9:
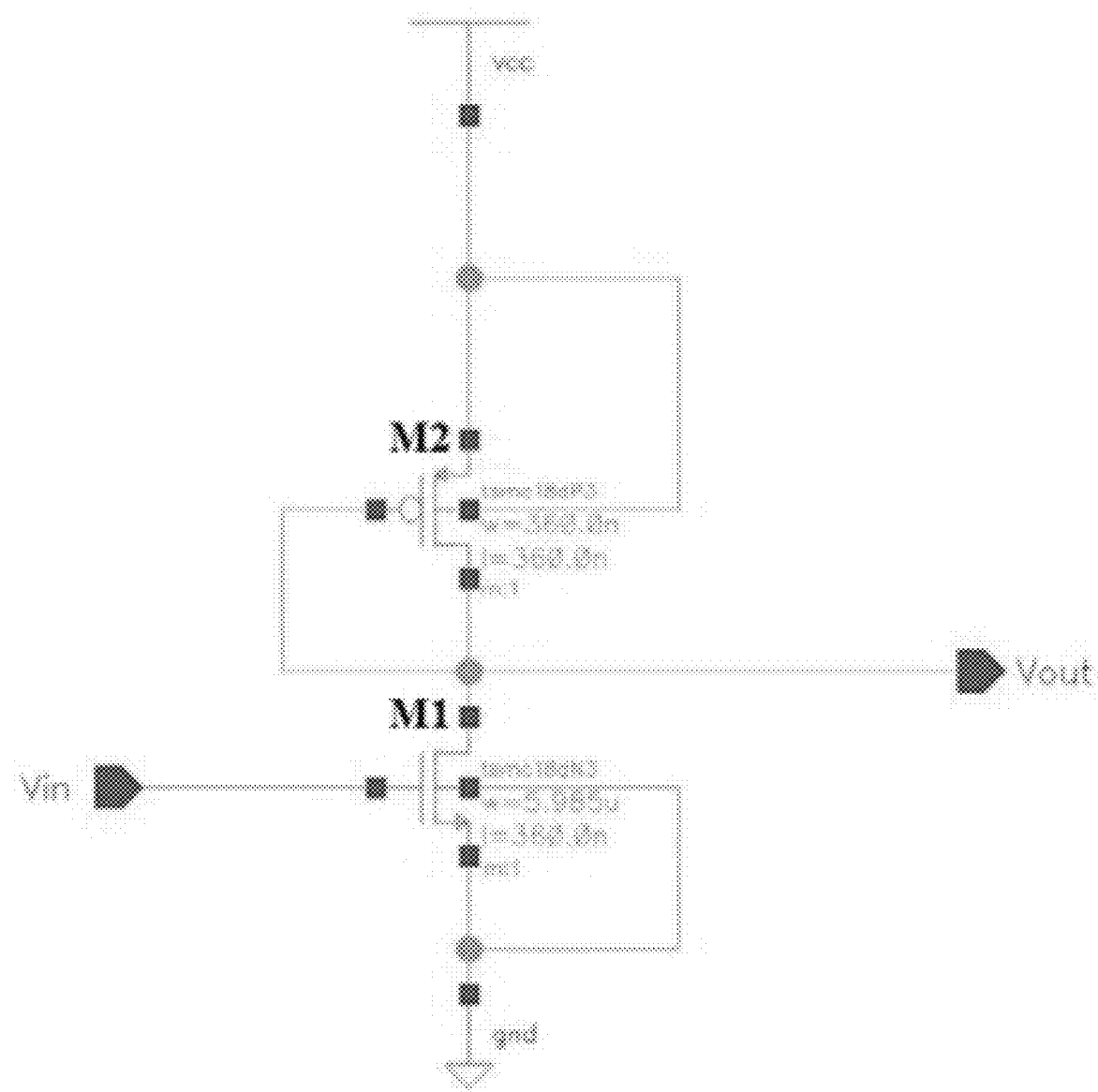
FIG. 9. Amplifier circuit of one data channel of VLC system.

The amplifier circuit shown in FIG. 9 is used to boost the input voltage signal range to an appropriate level for the comparator. It is a common-source stage amplifier with a diode-connected PMOS device used as an active load.13

Figure 10:
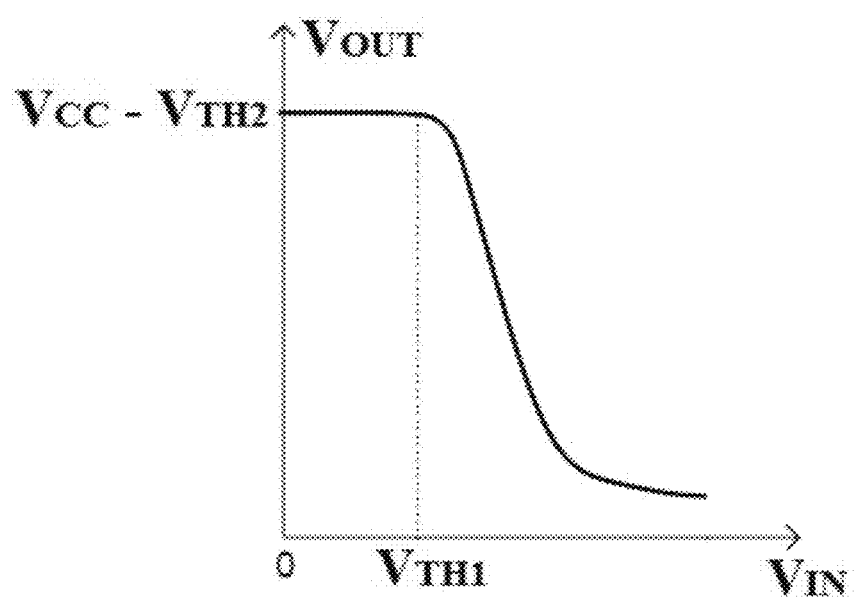
FIG. 10. Input-output characteristics of common-stage amplifier with diode-connected PMOS device as load.

The relationship between $V_{IN}$ and $V_{OUT}$ is shown in FIG. 10. $V_{IN}$ is the voltage coming out of the photodiode circuit stage and it is in the range 600 mV to 850 mV. Using a common-source stage amplifier with diode-connected PMOS device this voltage range is changed to the inverted $V_{OUT}$ signal in range 1.5 V to 2.5 V.

Comparator

Figure 11:
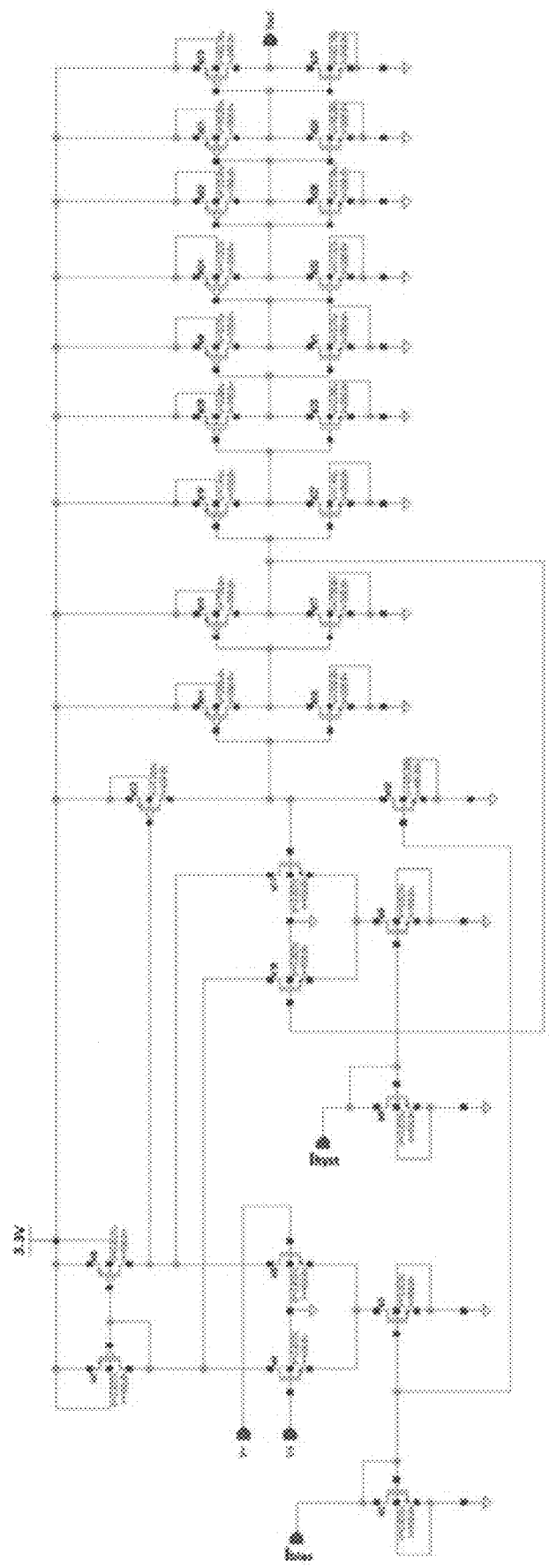
FIG. 11. The three-stage comparator with internal hysteresis one data channel of VLC system.
Figure 12:
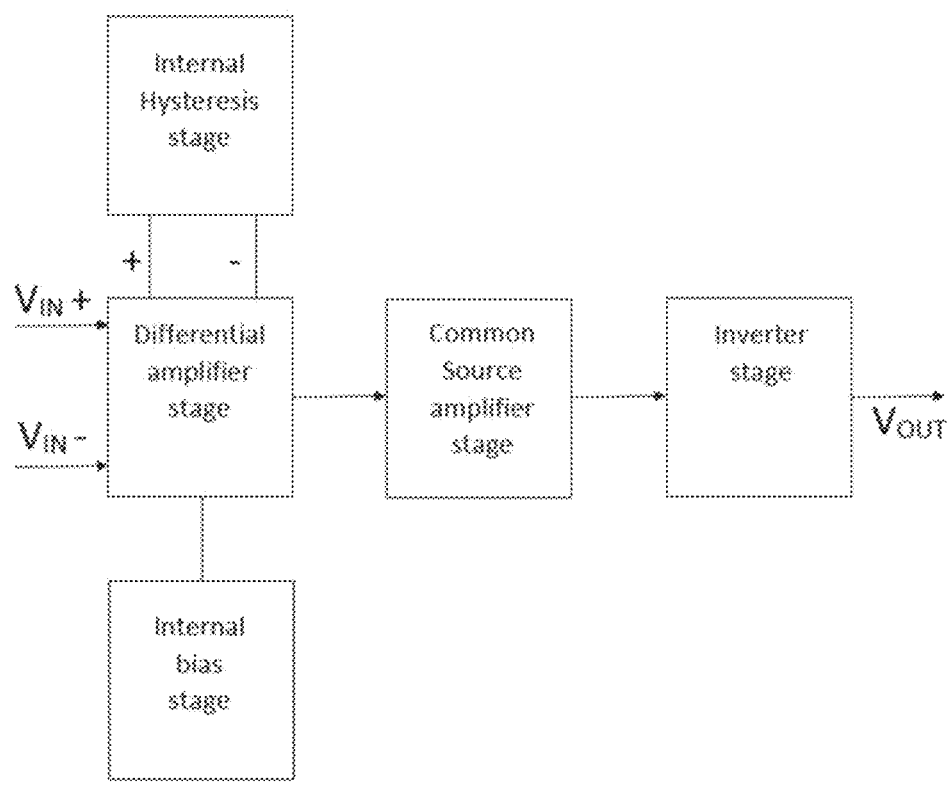
FIG. 12. Block diagram of the three-stage comparator with internal hysteresis.

A comparator with settable hysteresis band is used to differentiate between a high voltage or binary 1 and a low voltage or binary 0 in each data channel. In the simulated design each channel uses a three-stage comparator with internal hysteresis, which is shown in FIG. 11. FIG. 12 shows a high-level block diagram.

The comparator consists of five blocks. The first block is a differential stage that uses internal bias and internal hysteresis blocks to detect a voltage high or voltage low. The Common Source amplifier block is used to increase the gain. Finally the last block stage is an inverter stage, it is used to increase the gain and to improve the slew-rate of the output voltage. The inverter stage consists of nine inverters for the VLC system design.

The $V_{IN+}$ input of the comparator is connected to the output voltage of the amplifier stage of the VLC system. The $V_{IN-}$ input is connected to a reference voltage which is used to compare to the input voltage $V_{IN+}$.

III. Results

The results that follow, we will illustrate the correct operation of the two channel and three channel systems, show the resilience of the three channel system to variations in the fabrication of the filters, and demonstrate how the four channel system is capable of reliably delivering 10 of 16 possible bit patterns.

For the two channel system, we will show a number of internal signals, indicating the internal operation of each channel. For the three channel system, we will highlight the internal signals that vary as the fabricated instances can vary.

Two Channel VLC System

Figure 13:
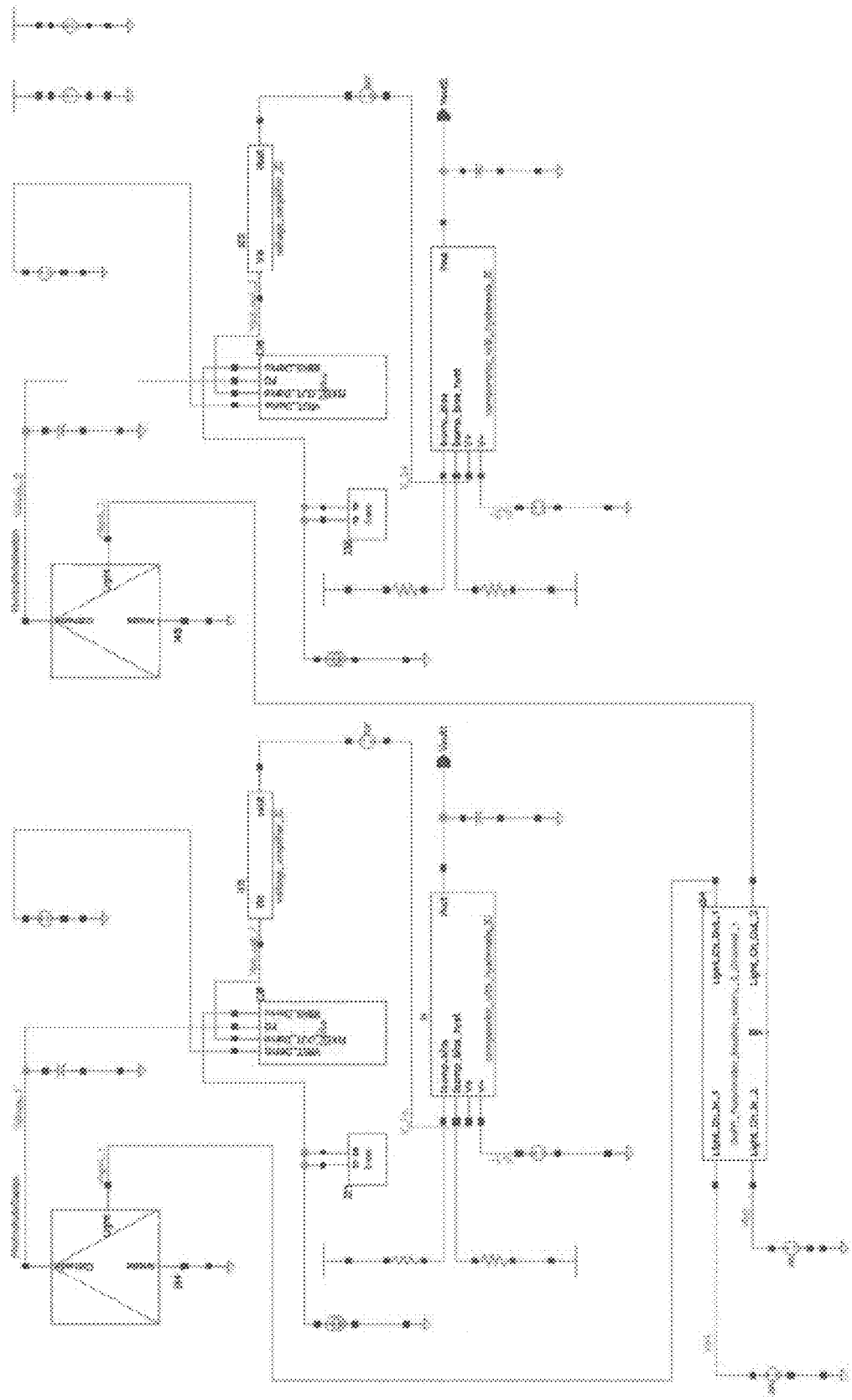
FIG. 13. Two channel VLC system with 0° and 90° polarization angles.

The two channel VLC system consists of 0° and 90° polarization angle data channels. The schematic diagram for the two channel VLC system is shown in FIG. 13. Two laser input sources are in the lower left-hand corner of the schematic. They are simulated using square wave voltage sources each with amplitudes of 50 mV and with frequency of 1 MHz. One square wave voltage source represents the laser input source with 0° polarization angle and other square wave voltage source represents the laser input source with 90° polarization angle. In the VerilogA model, we use a 50 mV amplitude voltage signal to represent light power of 50 mW. These two square wave voltage sources are inputs to two channel DoFP filter array.

Two channel DoFP filter array, immediately to the right of the light sources is based on the Muller matrix computation described herein. Two channel DoFP filter array was designed in VerilogA and it is defined as custom part of the VLC system that is simulated in Cadence.

Each DoFP filter array output is connected to a photodiode described in Example 2 (shown at the top of the schematic). The photodiode was also modeled in VerilogA and it is defined as a custom part of the VLC system. The photodiode output is connected to the common-source amplifier with diode-connected PMOS device described in Example 2. The output of the common-source stage amplifier is connected to the comparator with internal hysteresis described in Example 2.

Figure 14:
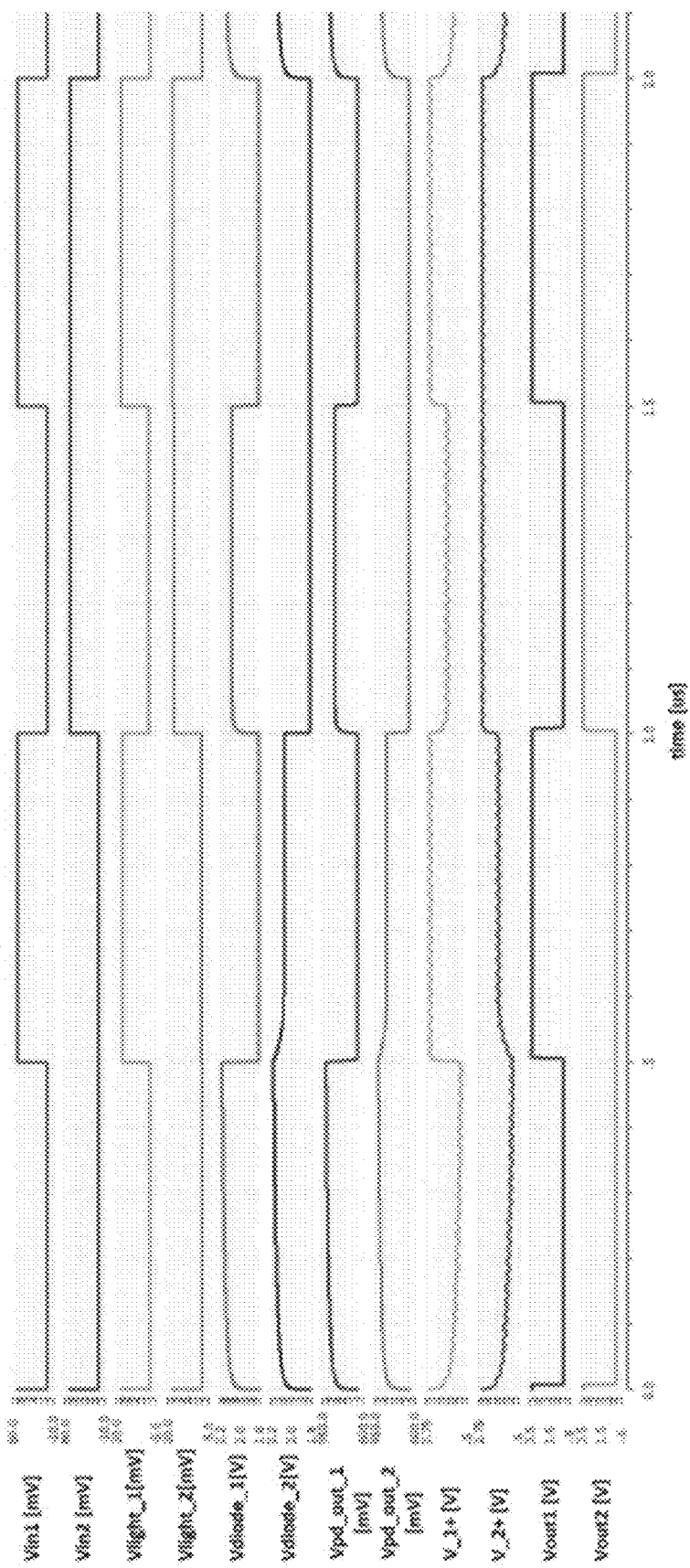
FIG. 14. Two channels with 0° and 90° polarization angles.

FIG. 14 shows two modulated laser sources as input signals $V_{in1}$ with 0° polarization angle and $V_{in2}$ with 90° polarization angle. $V_{light\_1}$ and $V_{light\_2}$ represent the light signals from the filter array, Vdiode_1 and Vdiode_2 represent the signals from the photodiodes, Vpd_out_1 and Vpd_out_2 represent the output of the bias circuit (input to the amplifier), and $V_{1+}$ and $V_{2+}$ are the non-inverting inputs to the comparator. The input light signals are completely recovered at each data channel output of the VLC system, $V_{out1}$ and $V_{out2}$.

Three Channel VLC System

Figure 15:
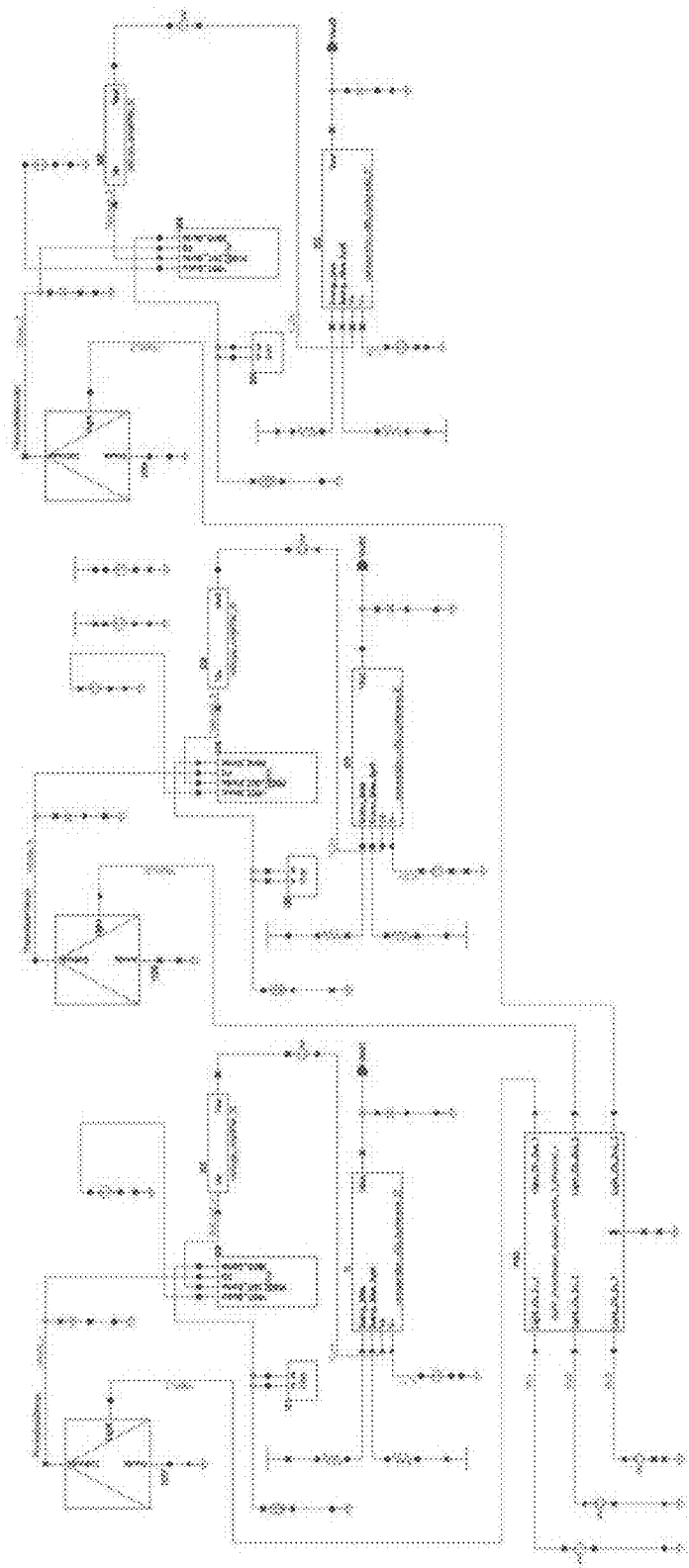
FIG. 15. Three channel VLC system with 0°, 60° and 120° polarization angles.

The three channel VLC system consists of 0°, 60° and 120° polarization angles data channels and is shown in FIG. 15. Three laser sources are simulated with square wave voltage sources each 100 mW (100 mV) that are input to a three channel DoFP filter array. The rest of the three channel VLC system is exactly the same as the two channel VLC system. Again, the light sources and filter are in the lower left-hand corner of the schematic and the photodiodes are across the top.

Figure 16:
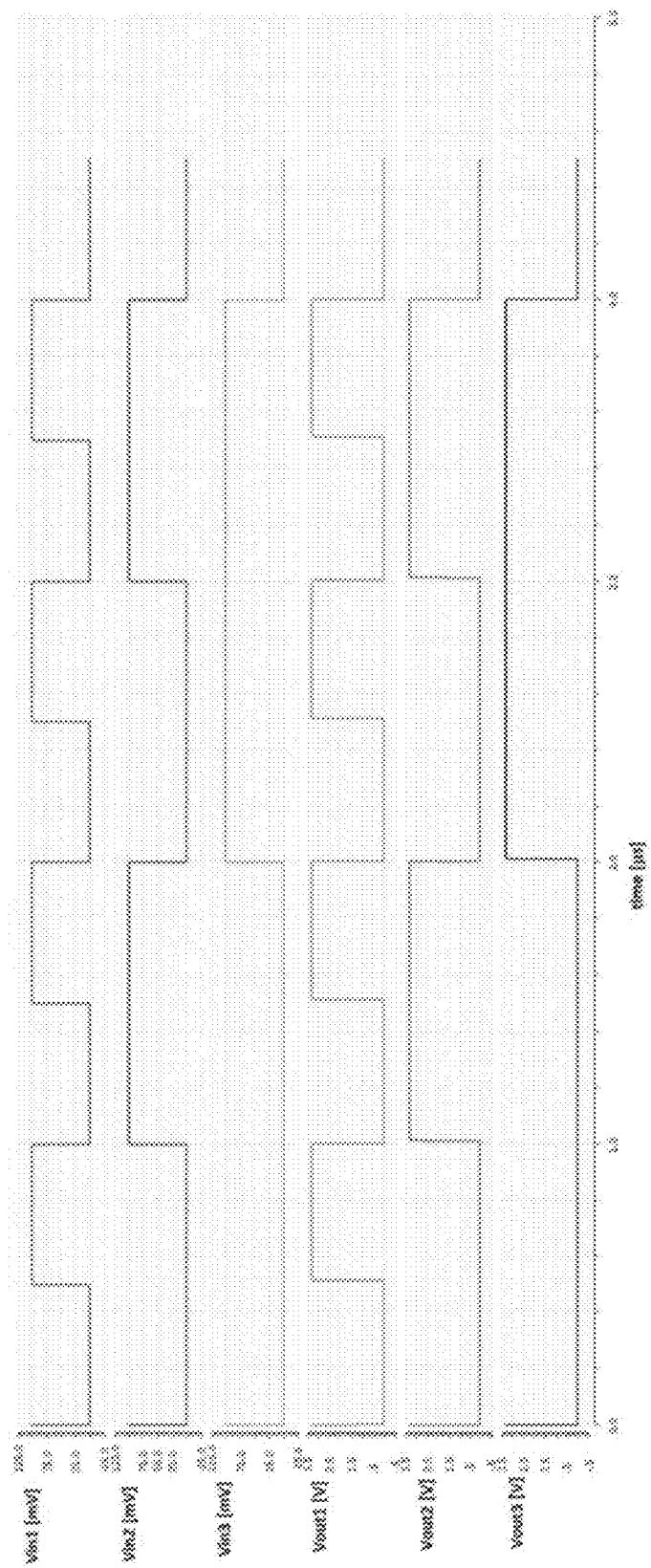
FIG. 16. Three channel VLC system with 0°, 60° and 120° polarization angles input and output signals.

FIG. 16 shows that three modulated laser sources input signals are completely recovered at each data channel output of the VLC system.

A (simulation-based) characterization of the properties of the optical communications channels under realistic variation in the fabrication of the filters is performed on the three channel VLC system. Due to fabrication imperfections, DoFP filter array polarization angles can have errors of 51°

Figure 17:
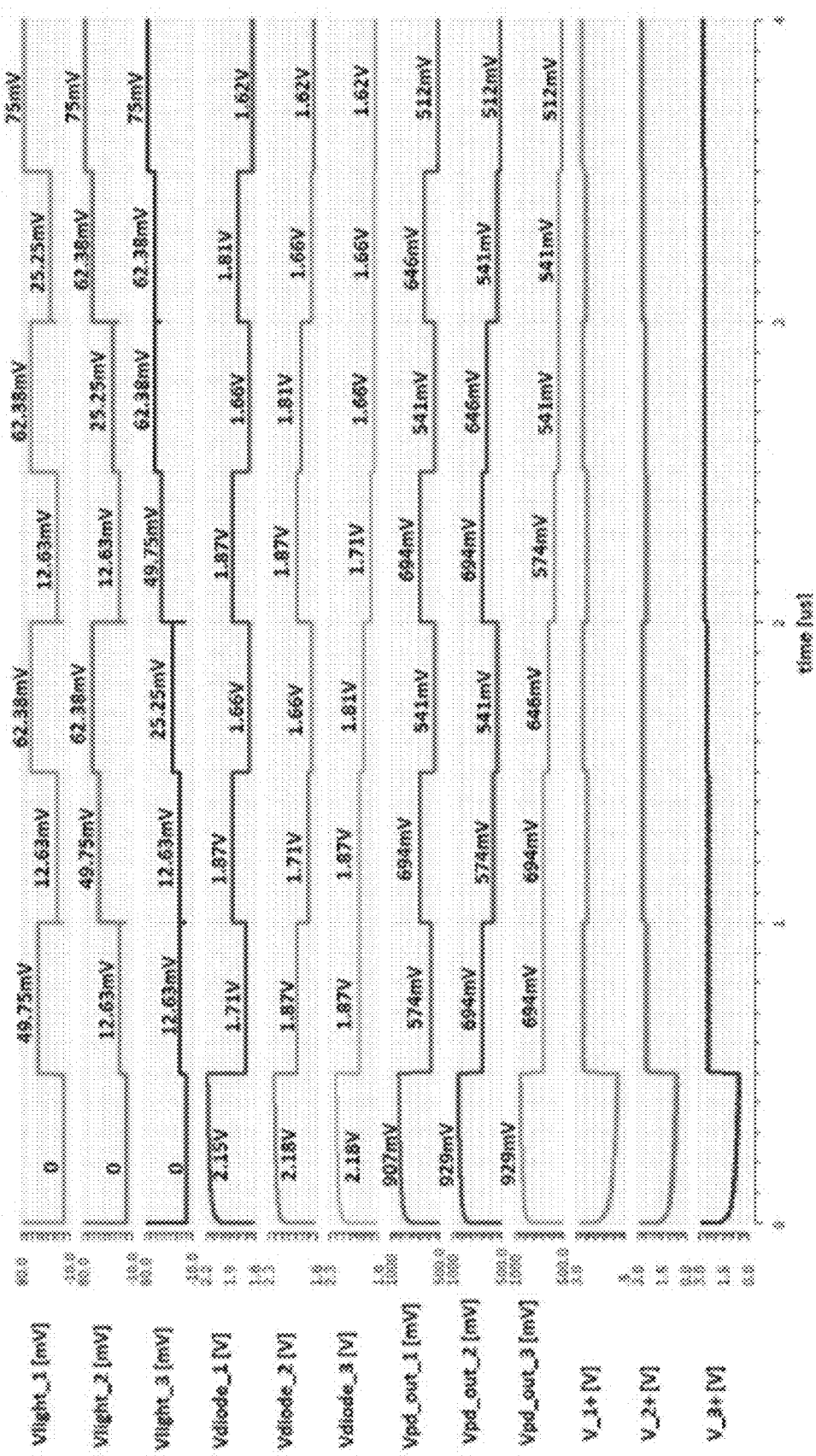
FIG. 17. Three channel VLC system with 0°, 60° and 120° polarization angles internal signals.
Figure 18:
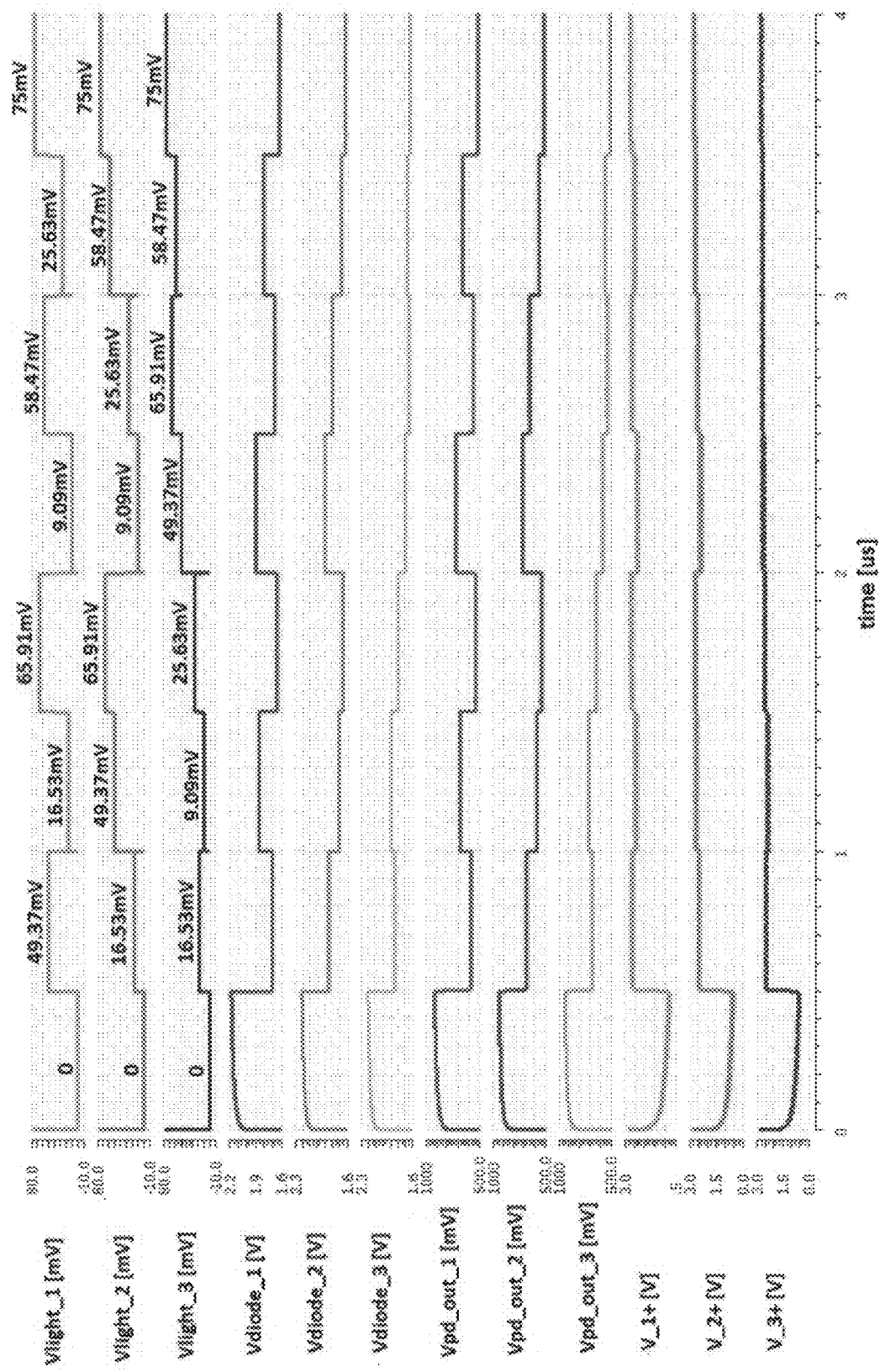
FIG. 18. Three channel VLC system with 5°, 55° and 125° polarization angles internal signals.

FIG. 17 shows internal signals of the three Channel VLC system when DoFP filter array polarization angles are 0°, 60° and 120°, while FIG. 18 shows the same internal signals when DoFP filter array polarization angles are 5°, 55° and 125° which is the worst case of fabrication imperfections. Only DoFP filter array output signals $V_{light\_1}$, $V_{light\_2}$ and $V_{light\_3}$ have different signal levels and all other following internal signals of the VLC system are almost identical between the two simulations. As a result, the performance of the three channel VLC system is not impacted by the fabrication imperfection of the filters.

Four Channel VLC System

Figure 19:
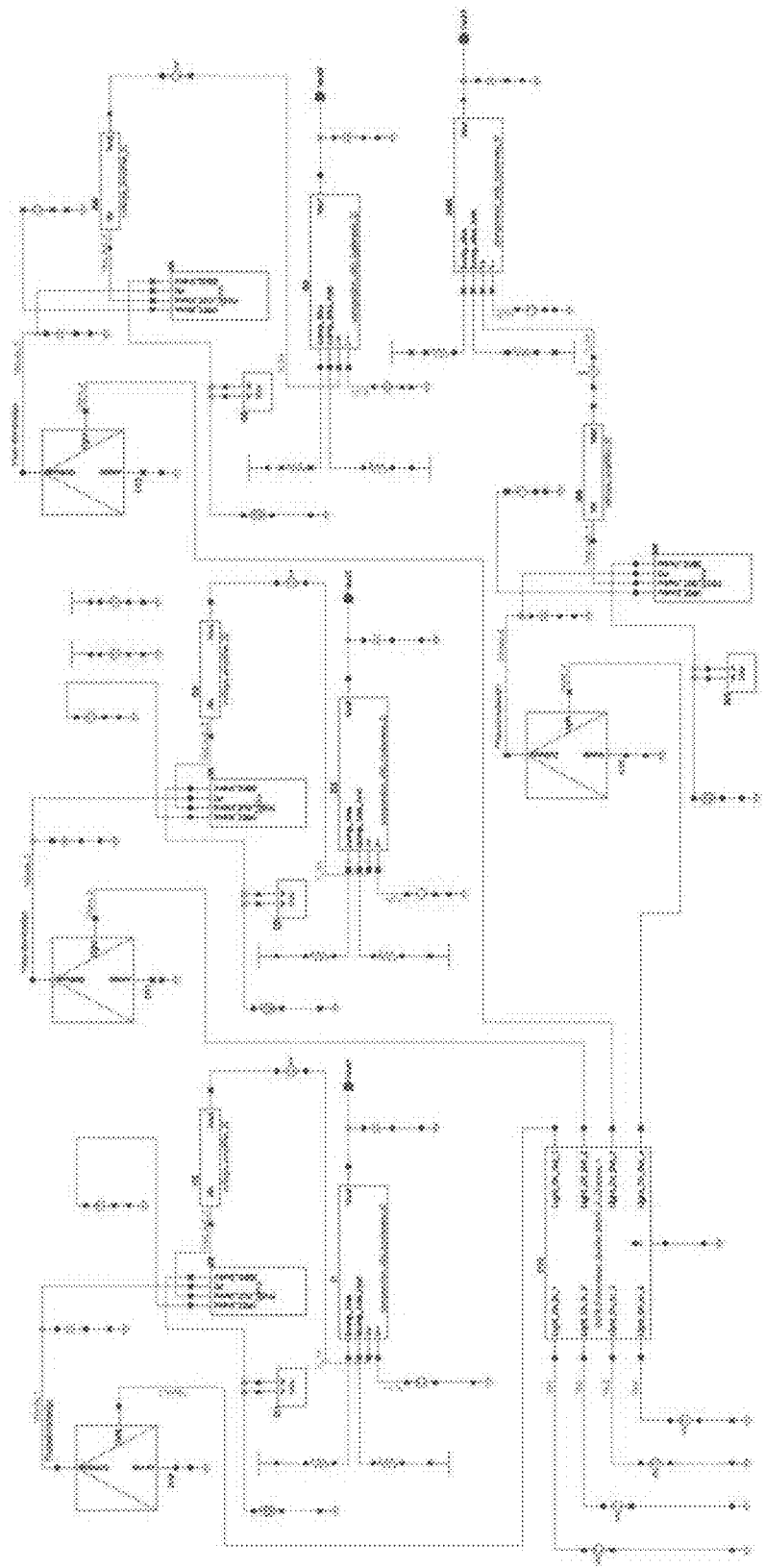
FIG. 19. Four-channel with 0°, 45°, 90° and 135° polarization angles VLC system.

The four channel VLC system consists of 0°, 45°, 90° and 135° polarization angles data channels and is shown in FIG. 19. Four laser sources are simulated with square wave voltage sources each 100 mW (100 mV) that are input to a four channel DoFP filter array. The rest of the four channel VLC system is the same as the two or three channel VLC systems.

Figure 20:
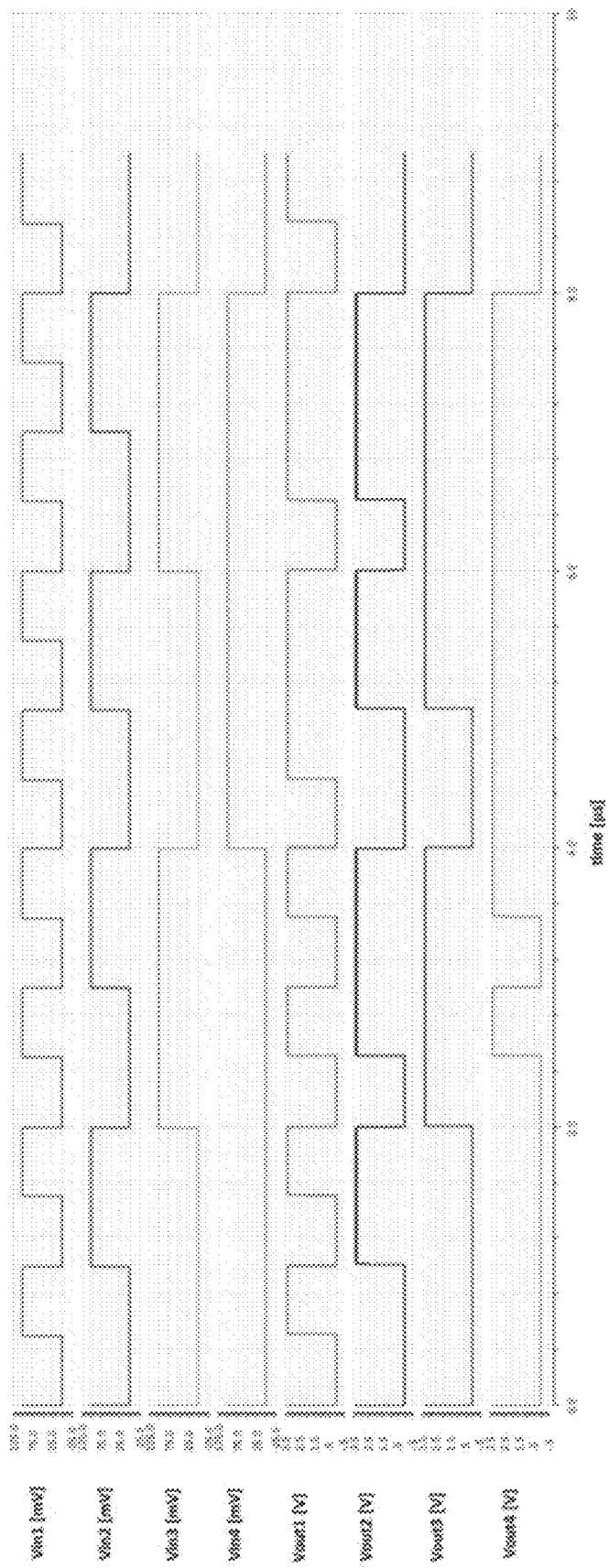
FIG. 20. Four-channel with 0°, 45°, 90° and 135° polarization angles VLC system input and output signals.

FIG. 20 shows that four modulated laser input signals are not completely recovered at each data channel output of the VLC system. Crosstalk between the channels on the input of the VLC system and DoFP filters supports the recovery of 10 out of 16 distinct symbols and the outputs of the VLC system.

IV. Conclusions and Future Work

This disclosure has presented a VerilogA model of a polarization division multiplexing visual light communication system. The model is calibrated using data from fabricated filters, and is combined with a diode model and receiver circuit model. Good results are obtained for the two and three channel VLC systems, including resilience to fabrication misalignment in the positioning of the filters. The four channel system, however, suffers from sufficient crosstalk between the channels that not all input bit patterns can be reliably recovered at the output.

This work represents a good starting point for investigation on how to obtain better results for a four channel VLC system, including the use of channel coding to improve the response. This might enable five, six and even more than six channels in a VLC system. A custom CMOS chip has been fabricated to enable us to empirically verify the simulation models developed, and early testing is showing promising results.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a sever computer. In a further aspect, the system is being run in a Windows® environment (Windows is a registered trademark of Microsoft Corporation, Redmond, Wash.). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independent and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate various aspects of the present disclosure.

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Polarization-Sensitive Receiver

Example 1 describes the conversion of combined polarized light data channels for 2, 3 and 4 channels VLC PDM systems into individual electrical signals (one per channel). Relevant background information about VLC PDM systems, input lasers, DoFP polarimeters, fiber optic cables, high-speed photodiodes, and Transimpedance Amplifiers (TIA) circuits used for high speed data processing within receiver chip is described herein.

A light signal is defined by its intensity, wavelength and polarization. In the present system, we use intensity to encode the information to be delivered, and polarization to separate multiple channels. Each input light signal at a different polarization angle is modulated to represent one digital data channel. All these input light signals are combined at the source into one incident light signal traveling in free space. This incident light signal will form the input to our receiver.

Each data channel has a unique angle of polarization. If it is a dual data channel system then data channel angles of polarization are 0° and 90°. If it is a three channel system then data channel angles of polarization are 0°, 60° and 120°. And if it is a four channel system then data channel angles of polarization are 0°, 45°, 90° and 135°.

This aggregate input light signal is received at a DoFP polarimeter array that may have two, three or four filters depending if we have a two, three or four channel design. Each filter from the array will have its own polarization angle that will match a polarization angle of one channel of input light. The operation of the polarimeter array is modeled via its Mueller matrix, which has been parameterized using measurements from fabricated devices.

In the remainder of this example, we will define the appropriate mathematical models behind PDM for two, three, or four channel receiver designs.

Two Channel DoFP Polarization Filter Array

For a two channel DoFP polarization filter array the two input data channels have angles of polarization of 0° and 90°, respectively. Each input data channel is represented by a Stokes vector S$\Theta$. The Stokes vectors for incident input light channels with polarization angles of 0° and 90° and intensity i are:

$$I_\Theta = \begin{bmatrix} \frac{1}{2} \\ 0 \\ 0 \\ 0 \end{bmatrix}^T \begin{bmatrix} (p_x^2 + p_y^2) & (p_x^2 - p_y^2)c_{2\Theta} & (p_x^2 - p_y^2)s_{2\Theta} & 0 \\ (p_x^2 - p_y^2)c_{2\Theta} & (p_x^2 - p_y^2)(c_{2\Theta})^2 + 2p_x p_y(s_{2\Theta})^2 & \frac{1}{2}(p_x - p_y)^2 s_{2\Theta} & 0 \\ (p_x^2 - p_y^2)s_{2\Theta} & \frac{1}{2}(p_x - p_y)^2 s_{2\Theta} & 2p_x p_y(c_{2\Theta})^2 + (p_x^2 + p_y^2)(s_{2\Theta})^2 & 0 \\ 0 & 0 & 0 & p_x p_y \end{bmatrix} \begin{bmatrix} S_0 \\ S_1 \\ S_2 \\ S_3 \end{bmatrix} \quad (3.5)$$

$$S_\Theta = \begin{bmatrix} S_0 \\ S_1 \\ S_2 \\ S_3 \end{bmatrix}, S_{0°} = \begin{bmatrix} i \\ i \\ 0 \\ 0 \end{bmatrix}, S_{90°} = \begin{bmatrix} i \\ -i \\ 0 \\ 0 \end{bmatrix}$$

The incident light that includes both data channels' signals has the total Stokes vector SINPUT at any moment of time defined as $$S_{INPUT} = b_0 S_{0°} + b_{90} S_{90°} \quad (3.1)$$

where $b_0$ and $b_{90}$ represent the modulating bits (each valued at either 0 or 1).

Figure 27:
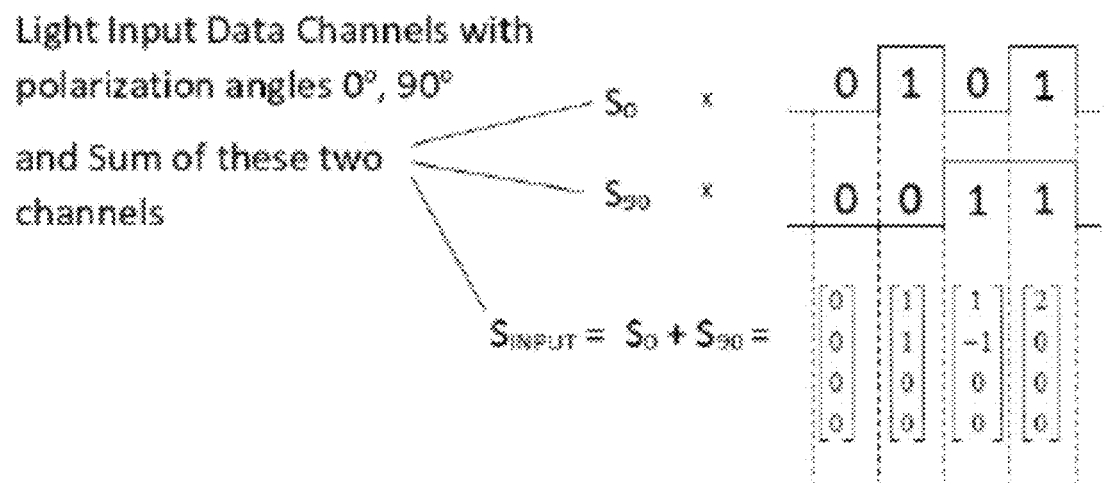
FIG. 27: Input light signal modulated as binary sequence for two data channels with polarization angles of 0° and 90°.

If we modulate an incident input light signal (of intensity i=1) with the binary sequence for two data channels, then the total Stokes vector SINPUT for incident input light at any moment is illustrated in FIG. 27.

Figure 28:
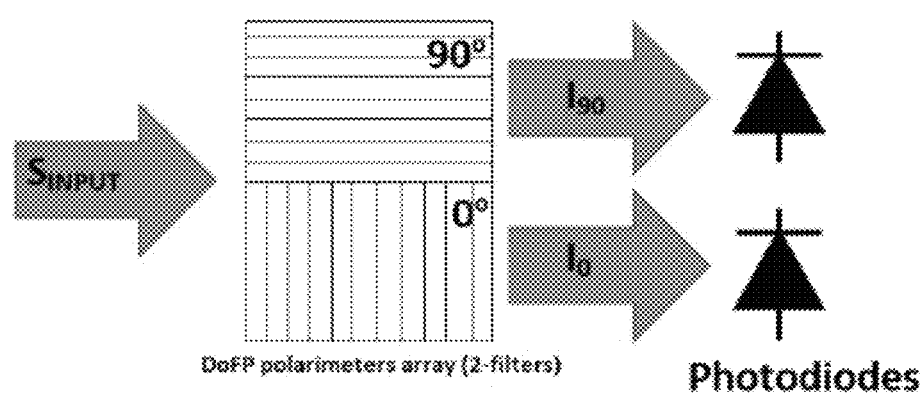
FIG. 28: The input light signal for two data channels with polarization angles of 0° and 90° incident upon the DoFP polarization filter array generates the output light signals from the filters $I_0$ and $I_{90}$.

The incident light signal SINPUT reaches the DoFP polarization filter array, which separates the two channels. Each polarization filter is represented by the filter's Mueller matrix M$\Theta$.

$$M_\Theta = \frac{1}{2} \begin{bmatrix} (p_x^2 + p_y^2) & (p_x^2 - p_y^2)c_{2\Theta} & (p_x^2 - p_y^2)s_{2\Theta} & 0 \\ (p_x^2 - p_y^2)c_{2\Theta} & (p_x^2 - p_y^2)(c_{2\Theta})^2 + 2p_x p_y(s_{2\Theta})^2 & \frac{1}{2}(p_x - p_y)^2 s_{2\Theta} & 0 \\ (p_x^2 - p_y^2)s_{2\Theta} & \frac{1}{2}(p_x - p_y)^2 s_{2\Theta} & 2p_x p_y(c_{2\Theta})^2 + (p_x^2 + p_y^2)(s_{2\Theta})^2 & 0 \\ 0 & 0 & 0 & p_x p_y \end{bmatrix} \quad (3.2)$$

where c2$\Theta$ is cos 2$\Theta$, s2$\Theta$ is sin 2$\Theta$, and s4$\Theta$ is sin 4$\Theta$. In the Mueller matrix M$\Theta$, $\Theta$ is the angle of polarization and px and py are the transmission coefficients in the x and y axes (they characterize the properties, including imperfections, of the aluminum nanowire filters). FIG. 28 illustrates the input light signal SINPUT that reaches the DoFP polarization filter array and the output light signals from the filters $I_{0°}$ and $I_{90°}$.

The output of each filter from the DoFP polarization filter array is:

$$I_\Theta = g[1\ 0\ 0\ 0] M_\Theta S_{INPUT} + d \quad (3.3)$$

In the equation above I$\Theta$ represents the light intensity of each filter from the DoFP polarization filter array. Variables g and d are the internal gain and dark offset of each filter. We will assume that gain is equal to 1. Also for our application we can ignore the dark offset because this current is measured in fA and a single channel's photodiode current is between fA when there is no light and a few µA when there is light so the dark offset current is negligible.

Therefore, $$I_\Theta = [1\ 0\ 0\ 0] M_\Theta S_{INPUT} \quad (3.4)$$

This yields the following model for the filter output:

where again c2$\Theta$ is cos 2$\Theta$, s2$\Theta$ is sin 2$\Theta$, and s4$\Theta$ is sin 4$\Theta$. Assuming that the intensity in the Stokes vectors for $S_{0\pi}$ and $S_{90°}$ is 2, this will yield the following Stokes vectors for incident input light with polarization angles of 0° and 90° (we allow for un-normalized expression of Stokes vectors):

$$S_{0°} = \begin{bmatrix} 2 \\ 2 \\ 0 \\ 0 \end{bmatrix}, S_{90°} = \begin{bmatrix} 2 \\ -2 \\ 0 \\ 0 \end{bmatrix} \quad (3.6)$$

Each filter output I$\Theta$ is defined as $$I_\Theta = \frac{1}{2}[S_0(p_x^2 + p_y^2) + S_1(p_x^2 - p_y^2)\cos(2\theta) + S_2(p_x^2 - p_y^2)\sin(2\theta)] \quad (3.7)$$

We use the following approximations to calculate the filter's outputs I$\Theta$:

$$T = (p_x^2 + p_y^2) = \frac{1}{2} \quad (3.8)$$

$$D = \frac{(p_x^2 - p_y^2)}{(p_x^2 + p_y^2)} = 0.99 \quad (3.9)$$

These represent the physical properties of the fabricated filters themselves. The above leads to filter output I$\Theta$ represented by $$I_\Theta = \frac{1}{4}S_0 + \frac{0.99}{4}S_1 \cos(2\Theta) + \frac{0.99}{4}S_2 \sin(2\Theta) \qquad (3.10)$$

so for the filter with polarization angle of 0° the output light signal is calculated as:

$$I_0 = \frac{1}{4}S_0 + \frac{0.99}{4}S_1 \cos(0°) + \frac{0.99}{4}S_2 \sin(0°) \qquad (3.11)$$
$$= \frac{1}{4}S_0 + \frac{0.99}{4}S_1$$

and for the filter with polarization angle of 90° the output light signal is calculated as:

$$I_{90} = \frac{1}{4}S_0 + \frac{0.99}{4}S_1 \cos(180°) + \frac{0.99}{4}S_2 \sin(180°) \qquad (3.12)$$
$$= \frac{1}{4}S_0 - \frac{0.99}{4}S_1$$

If we examine a binary truth table for this two channel DoFP polarization filter array we can see that we can have the correct binary outputs given we use a reasonable comparison point for light intensity (anywhere near 0.5 will be sufficient). This is shown in Table 3.1.

TABLE 3.1

Binary truth table for two channel DoFP polarization filter array.

| $b_{90}$ | $b_0$ | $S_{INPUT}$ | $I_{90}$ | $I_0$ |
|---|---|---|---|---|
| 0 | 0 | $[0\ 0\ 0\ 0]^T$ | 0 | 0 |
| 0 | 1 | $[2\ 2\ 0\ 0]^T$ | 0.005 | 0.995 |
| 1 | 0 | $[2\ -2\ 0\ 0]^T$ | 0.995 | 0.005 |
| 1 | 1 | $[4\ 0\ 0\ 0]^T$ | 1 | 1 |

Three Channel DoFP Polarization Filter Array

For a three channel DoFP polarization filter array the three input data channels have angles of polarization of 0°, 60° and 120°, respectively. The Stokes vectors for incident input light (of intensity i) with polarization angles of 0°, 60°, and 120° are:

$$S_{0°} = \begin{bmatrix} i \\ i \\ 0 \\ 0 \end{bmatrix}, S_{60°} = \begin{bmatrix} i \\ -\frac{1}{2}i \\ \frac{\sqrt{3}}{2}i \\ 0 \end{bmatrix}, S_{120°} = \begin{bmatrix} i \\ -\frac{1}{2}i \\ -\frac{\sqrt{3}}{2}i \\ 0 \end{bmatrix} \qquad (3.13)$$

The incident input light signal that includes all of the channels' signals has the total Stokes vector SINPUT at any moment of time defined as $$S_{INPUT} = b_0 S_{0°} + b_{60} S_{60°} + b_{120} S_{120°} \qquad (3.14)$$

Figures 29, 30:
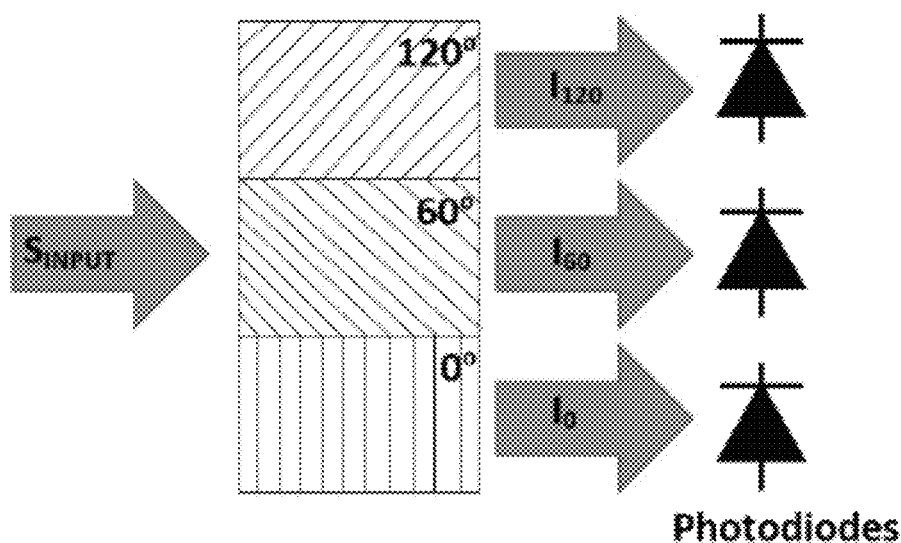
FIG. 29: The light signal modulated as binary sequence for three data channels with polarization angles of 0°, 60°, and 120°.
FIG. 30: The incident input light signal for three data channels with polarization angles of 0°, 60° and 120° reaches the DoFP polarization filter array and generates the output light signals from the filters $I_0$, $I_{60}$, and $I_{120}$.

If we modulate an intensity i=1 light signal with the binary sequence for three data channels, then the total Stokes vector SINPUT for incident input light at any moment is illustrated in FIG. 29. FIG. 30 shows the filter system.

Again each DoFP polarization filter is represented by the filter's Mueller matrix MΘ from equation (3.2), and the output of each filter is:

$$I_\Theta = [1\ 0\ 0\ 0] M_\Theta S_{INPUT} \qquad (3.15)$$

If we assume that intensity i in the Stokes vectors for $S_{0°}$, $S_{60°}$ and $S_{120°}$ is 2, this will yield $$S_{0°} = \begin{bmatrix} 2 \\ 2 \\ 0 \\ 0 \end{bmatrix}, S_{60°} = \begin{bmatrix} 2 \\ -1 \\ \sqrt{3} \\ 0 \end{bmatrix}, S_{120°} = \begin{bmatrix} 2 \\ -1 \\ -\sqrt{3} \\ 0 \end{bmatrix} \qquad (3.16)$$

Each filter output IΘ is again defined as $$I_\Theta = \frac{1}{2}[S_0(p_x^2+p_y^2)+S_1(p_x^2-p_y^2)\cos(2\Theta)+S_2(p_x^2-p_y^2)\sin(2\Theta)] \qquad (3.17)$$

Using equations (3.8), (3.9) and (3.10) gives filter output IΘ. For the filter with polarization angle of 0° the output light signal is:

$$I_0 = \frac{1}{4}S_0 + \frac{0.99}{4}S_1 \cos(0°) + \frac{0.99}{4}S_2 \sin(0°) \qquad (3.18)$$
$$= \frac{1}{4}S_0 + \frac{0.99}{4}S_1$$

for the filter with polarization angle of 60° the output light signal is:

$$I_{60} = \frac{1}{4}S_0 + \frac{0.99}{4}S_1 \cos(120°) + \frac{0.99}{4}S_2 \sin(120°) \qquad (3.19)$$
$$= \frac{1}{4}S_0 - \frac{0.99}{8}S_1 + \frac{0.99}{8}\sqrt{3}S_2$$

and for the filter with polarization angle of 120° the output light signal is:

$$I_{120} = \frac{1}{4}S_0 + \frac{0.99}{4}S_1 \cos(240°) + \frac{0.99}{4}S_2 \sin(240°) \qquad (3.20)$$
$$= \frac{1}{4}S_0 - \frac{0.99}{8}S_1 - \frac{0.99}{8}\sqrt{3}S_2$$

If we examine the binary truth table for this three channel DoFP polarization filter array (see Table 3.2) we can see that we can still have the correct output binary values with an appropriately chosen threshold; all input 0s have output intensity ≤0.505 and all input 1s have output intensity ≥0.995. However, the available noise margin is significantly reduced due to crosstalk between the channels.

TABLE 3.2

Binary truth table for three channel DoFP polarization filter array.

| $b_{120}$ | $b_{60}$ | $b_0$ | $S_{INPUT}$ | $I_{120}$ | $I_{60}$ | $I_0$ |
|---|---|---|---|---|---|---|
| 0 | 0 | 0 | $[0\ 0\ 0\ 0]^T$ | 0 | 0 | 0 |
| 0 | 0 | 1 | $[2\ 2\ 0\ 0]^T$ | 0.253 | 0.253 | 0.995 |
| 0 | 1 | 0 | $[2\ -1\ \sqrt{3}\ 0]^T$ | 0.253 | 0.995 | 0.253 |
| 0 | 1 | 1 | $[4\ 1\ \sqrt{3}\ 0]^T$ | 0.505 | 1.248 | 1.248 |
| 1 | 0 | 0 | $[2\ -1\ -\sqrt{3}\ 0]^T$ | 0.995 | 0.253 | 0.253 |
| 1 | 0 | 1 | $[4\ 1\ -\sqrt{3}\ 0]^T$ | 1.248 | 0.505 | 1.248 |
| 1 | 1 | 0 | $[4\ -2\ 0\ 0]^T$ | 1.248 | 1.248 | 0.505 |
| 1 | 1 | 1 | $[6\ 0\ 0\ 0]^T$ | 1.5 | 1.5 | 1.5 |

Four Channel DoFP Polarization Filter Array

In a four channel DoFP Polarization filter array four input data channels have angles of polarization of 0°, 45°, 90° and 135°, respectively. The Stokes vectors for incident input light with polarization angles of 0°, 45°, 90°, and 135° and intensity i are:

$$S_{0°} = \begin{bmatrix} i \\ i \\ 0 \\ 0 \end{bmatrix}, S_{45°} = \begin{bmatrix} 0 \\ i \\ 0 \\ i \end{bmatrix}, S_{90°} = \begin{bmatrix} i \\ -i \\ 0 \\ 0 \end{bmatrix}, S_{135°} = \begin{bmatrix} i \\ 0 \\ -i \\ 0 \end{bmatrix} \quad (3.21)$$

The incident input light signal that includes all data channels has the total Stokes vector SINPUT defined as $$S_{INPUT} = b_0 S_{0°} + b_{45} S_{45°} + b_{90} S_{90°} + b_{135} S_{135°} \quad (3.22)$$

Once again, each filter is represented by the filter's Mueller matrix MΘ from equation (3.2), and the output of each filter is:

$$I_\Theta = [1\ 0\ 0\ 0] M_\Theta S_{INPUT} \quad (3.23)$$

If we assume that the intensity parameter i in the Stokes vectors $S_{0°}$, $S_{45°}$, $S_{90°}$ and $S_{135°}$ is 2, this will yield $$S_{0°} = \begin{bmatrix} 2 \\ 2 \\ 0 \\ 0 \end{bmatrix}, S_{45°} = \begin{bmatrix} 2 \\ 0 \\ 2 \\ 0 \end{bmatrix}, S_{90°} = \begin{bmatrix} 2 \\ -2 \\ 0 \\ 0 \end{bmatrix}, S_{135°} = \begin{bmatrix} 2 \\ 0 \\ -2 \\ 0 \end{bmatrix} \quad (3.24)$$

Figure 31:
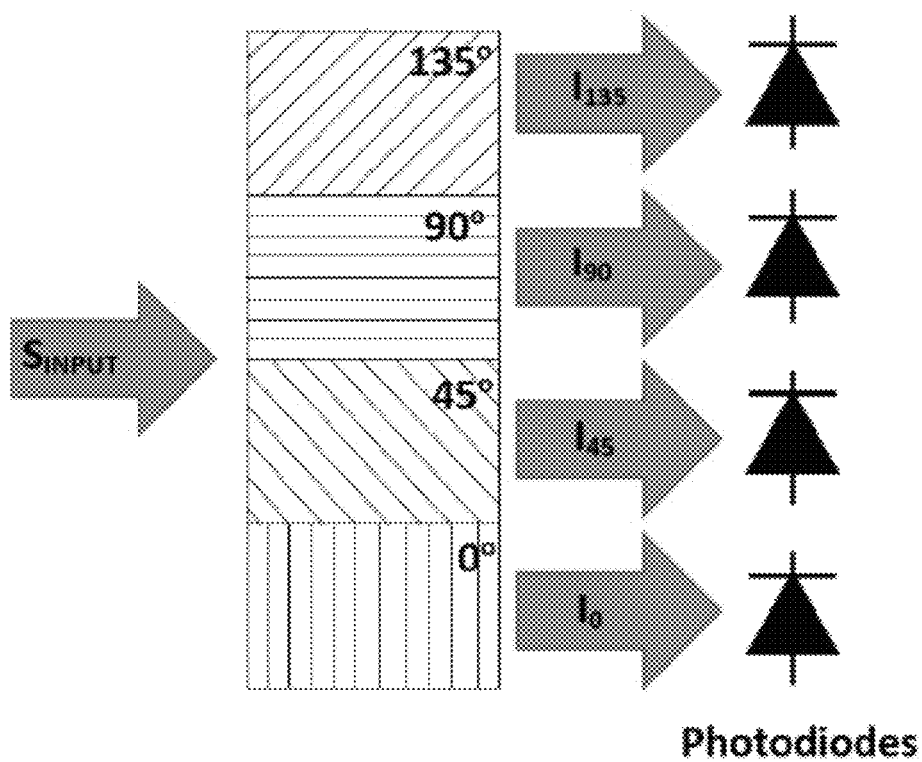
FIG. 31: The input light signal for four data channels with polarization angles of 0°, 45°, 90° and 135° reaches the DoFP polarization filter array and generates the output light signals from the filters $I_0$, $I_{45}$, $I_{90}$ and $I_{135}$.

FIG. 31 shows the input light SINPUT that reaches the DoFP polarization filter array and the output light signals from the filters $I_0$, $I_{45}$, $I_{90}$ and $I_{135}$.

Each filter output IΘ is $$I_\Theta = \tfrac{1}{2}[S_0(p_x^2 + p_y^2) + S_1(p_x^2 - p_y^2)\cos(2\theta) + S_2(p_x^2 - p_y^2)\sin(2\theta)] \quad (3.25)$$

Using equations (3.8), (3.9) and (3.25) gives filter output IΘ. For the filter with polarization angle of 0° the output light signal is calculated as:

$$I_0 = \frac{1}{4}S_0 + \frac{0.99}{4}S_1 \cos(0°) + \frac{0.99}{4}S_2 \sin(0°) \quad (3.26)$$
$$= \frac{1}{4}S_0 + \frac{0.99}{4}S_1$$

for the filter with polarization angle of 45° the output light signal is calculated as:

$$I_{45} = \frac{1}{4}S_0 + \frac{0.99}{4}S_1 \cos(90°) + \frac{0.99}{4}S_2 \sin(90°) \quad (3.27)$$
$$= \frac{1}{4}S_0 + \frac{0.99}{4}S_2$$

for the filter with polarization angle of 90° the output light signal is calculated as:

$$I_{90} = \frac{1}{4}S_0 + \frac{0.99}{4}S_1 \cos(180°) + \frac{0.99}{4}S_2 \sin(180°) \quad (3.28)$$
$$= \frac{1}{4}S_0 - \frac{0.99}{4}S_1$$

and for the filter with polarization angle of 135° the output light signal is calculated as:

$$I_{135} = \frac{1}{4}S_0 + \frac{0.99}{4}S_1 \cos(270°) + \frac{0.99}{4}S_2 \sin(270°) \quad (3.29)$$
$$= \frac{1}{4}S_0 - \frac{0.99}{4}S_2$$

When we examine the binary truth table for the four channel DoFP polarization filter array we see that we cannot have the correct output for each input combination (see Table 3.3). At the very least, the input combination 0101 will be indistinguishable from input combination 1010.

TABLE 3.3

Binary truth table for four channel DoFP polarization filter array.

| $b_{135}$ | $b_{90}$ | $b_{45}$ | $b_0$ | $S_{INPUT}$ | $I_{135}$ | $I_{90}$ | $I_{45}$ | $I_0$ |
|---|---|---|---|---|---|---|---|---|
| 0 | 0 | 0 | 0 | $[0\ 0\ 0\ 0]^T$ | 0 | 0 | 0 | 0 |
| 0 | 0 | 0 | 1 | $[2\ 2\ 0\ 0]^T$ | 0.5 | 0.005 | 0.5 | 0.995 |
| 0 | 0 | 1 | 0 | $[2\ 0\ 2\ 0]^T$ | 0.005 | 0.5 | 0.995 | 0.5 |
| 0 | 0 | 1 | 1 | $[4\ 2\ 2\ 0]^T$ | 0.505 | 0.505 | 1.495 | 1.495 |
| 0 | 1 | 0 | 0 | $[2\ -2\ 0\ 0]^T$ | 0.5 | 0.995 | 0.5 | 0.005 |
| 0 | 1 | 0 | 1 | $[4\ 0\ 0\ 0]^T$ | 1 | 1 | 1 | 1 |
| 0 | 1 | 1 | 0 | $[4\ -2\ 2\ 0]^T$ | 0.505 | 1.495 | 1.495 | 0.505 |
| 0 | 1 | 1 | 1 | $[6\ 0\ 2\ 0]^T$ | 1.005 | 1.5 | 1.995 | 1.5 |
| 1 | 0 | 0 | 0 | $[2\ 0\ -2\ 0]^T$ | 0.995 | 0.5 | 0.005 | 0.5 |
| 1 | 0 | 0 | 1 | $[4\ 2\ -2\ 0]^T$ | 1.495 | 0.505 | 0.505 | 0.495 |
| 1 | 0 | 1 | 0 | $[4\ 0\ 0\ 0]^T$ | 1 | 1 | 1 | 1 |
| 1 | 0 | 1 | 1 | $[6\ 2\ 0\ 0]^T$ | 1.5 | 1.005 | 1.5 | 1.995 |
| 1 | 1 | 0 | 0 | $[4\ -2\ -2\ 0]^T$ | 1.495 | 1.495 | 0.505 | 0.505 |
| 1 | 1 | 0 | 1 | $[6\ 0\ -2\ 0]^T$ | 1.995 | 1.5 | 1.005 | 1.5 |
| 1 | 1 | 1 | 0 | $[6\ -2\ 0\ 0]^T$ | 1.5 | 1.995 | 1.5 | 1.005 |
| 1 | 1 | 1 | 1 | $[8\ 0\ 0\ 0]^T$ | 2 | 2 | 2 | 2 |

For example, if we posit a threshold of 0.7 for each of four filter outputs $I_0$, $I_{45}$, $I_{90}$ and $I_{135}$ in Table 3.3 we can see that:
1. $I_{135}$ will not result in 0 for two input sequences 0101 and 0111.
2. $I_{90}$ will not result in 0 for two input sequences 1010 and 1011.
3. $I_{45}$ will not result in 0 for two input sequences 0101 and 1101.
4. $I_0$ will not result in 0 for two input sequences 1010 and 1110.

The crosstalk between neighboring channels is sufficiently large that only 10 of the 16 input combinations give unique output combinations. We defer until Example 4 to determine coding techniques that can improve upon this.

We have developed VerilogA models for DoFP polarization filter arrays of two, three and four channels. In the next example, we will describe a simulation model of the complete receiver system, including both the optical and electronic subsystems.

Simulation Model

Figure 32:
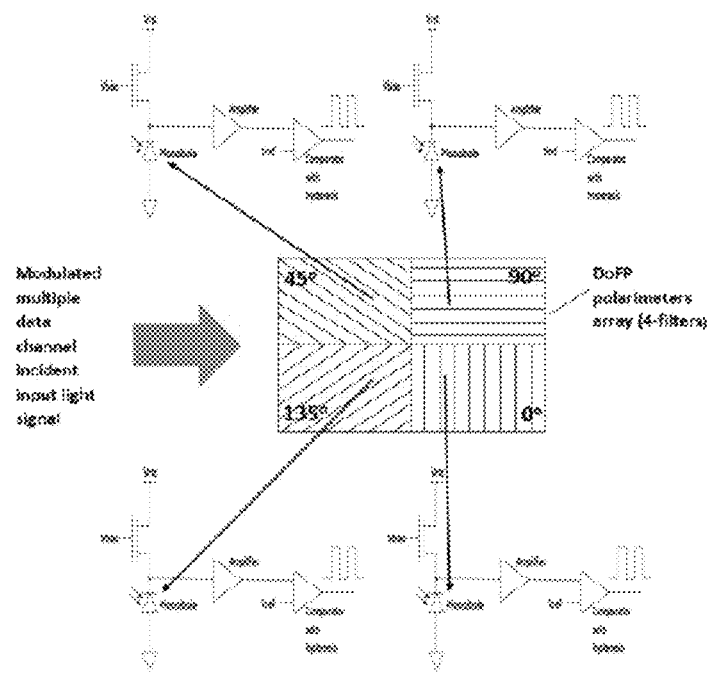
FIG. 32: Four channel VLC system.

FIG. 32 shows the entire four data channel receiver of the VLC PDM system. Simulation models have been constructed for two, three, and four data channel receiver subsystems using Cadence software tools.

Transmitter laser input signals are simulated with square wave voltage sources with proper amplitudes that represent input laser signal power. These transmitter laser input signals are connected to DoFP filter arrays for two, three and four channel VLC PDM designs.

The VLC PDM system receiver's DoFP filter arrays are modeled using VerilogA. They are connected to the photodiode in each data communication channel. Each photodiode is also modeled using VerilogA.

Figure 33:
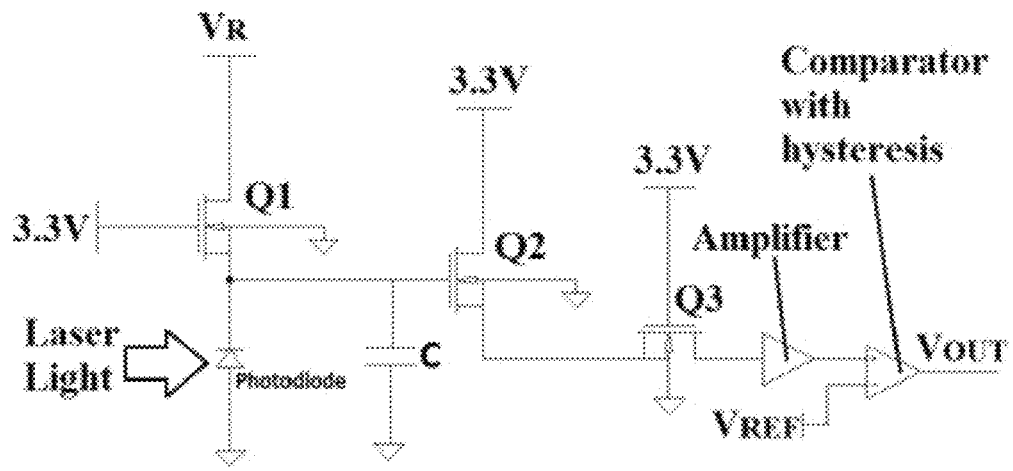
FIG. 33: One data channel of VLC system.

The rest of the simulation model was designed using Cadence 180 nm node design software. This part of each receiver channel has the amplifier circuit followed by the comparator with hysteresis circuit. The electronic subsystem for each data channel is designed as shown in FIG. 33.

Photodiode

Figure 34:
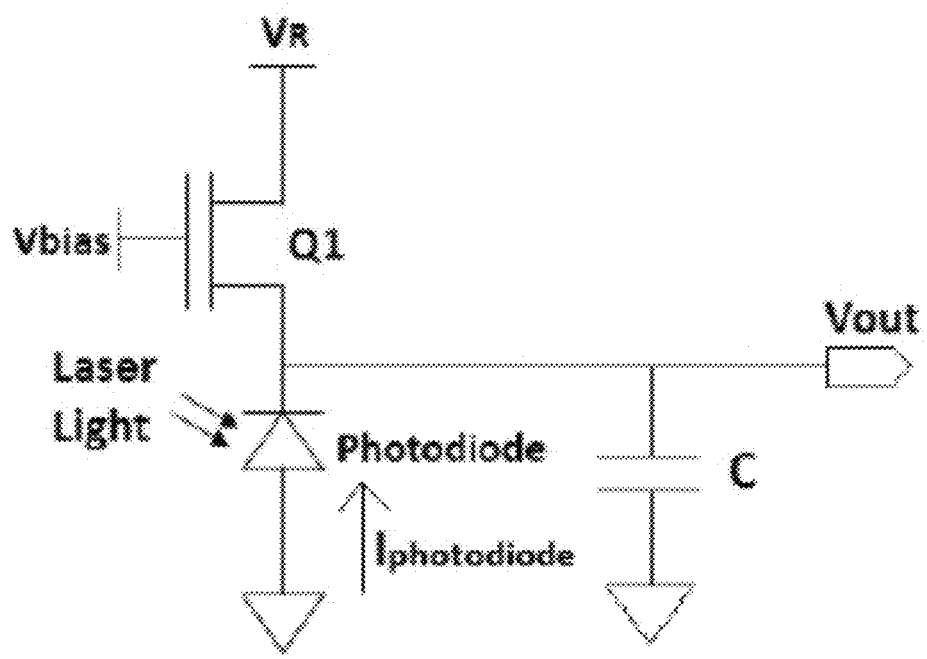
FIG. 34: Photodiode circuit of one data channel of VLC system.

Photodiodes used in the VLC system have to be fast switching diodes and they should have low capacitance. Fast switching photodiodes have been used for optical high speed digital clocking in various silicon chips. The photodiode model was designed using VerilogA. Examples of complex photodiode model designs created in VerilogA exist in the literature. For the VLC system we will use a simpler photodiode model. The photodiode circuit is shown in FIG. 34.

The photodiode is reverse biased by VR=2.25 V, a voltage source connected through the active CMOS transistor Q1. The transistor Q1 is biased with V bias=3.3 V, and a parallel capacitance (20 fF) simulates the photodiode's internal capacitance. In the VerilogA model, the photodiode current is calculated using the following expression:

$$I_{photodiode} - I_{forward} - I_{optical} = \quad (3.30)$$
$$qA\left(\frac{D_p}{L_p}p_n + \frac{D_n}{L_n}n_p\right)(e^{V_x/V_y} - 1) - qAg_{op}(L_x + L_n + W)$$

The photodiode forward current $I_{forward}$ is a dark current approximation that represents current flowing from anode to cathode when reverse bias voltage V R is applied and no light shines on the photodiode.

$$I_{forward} = qA\left(\frac{D_p}{L_p}p_n + \frac{D_n}{L_n}n_p\right)(e^{V_x/V_y} - 1) \quad (3.31)$$

This current is in the order of few fA, which is negligible current for this application. The photodiode optical current $I_{optical}$ is a reverse current created by shining light on the photodiode. This current is in the order of few μA.

$$I_{optical} = qAg_{op}(L_p + L_n + W) \quad (3.32)$$

The model parameters for the above expressions are given in Table 3.4.

TABLE 3.4

Photodiode model parameters [3, 72].

| Parameter | Symbol | Value |
|---|---|---|
| Basic Electric Charge | q | $1.6 \times 10^{-19}$ C |
| Area of Si-pn junction | A | $0.0001$ cm$^2$ |
| Temperature | T | 300 K |
| Boltzmann constant | K | $1.38 \times 10^{-23} \frac{m^2 kg}{S^2 K}$ |
| Thermal voltage | $V_T$ | $\frac{KT}{q} = 0.025875$ V |
| Intrinsic electron and hole concentration for Si at 25° C. | $n_i$ | $1.5 \times 10^{-10}$ cm$^{-3}$ |

TABLE 3.4-continued

Photodiode model parameters [3, 72].

| Parameter | Symbol | Value |
|---|---|---|
| Dielectric constant of vacuum | $\varepsilon_0$ | $8.85 \times 10^{-14}$ F/cm |
| Relative dielectric constant of Si | $\varepsilon_r$ | 11.8 |
| Acceptor concentration of photodiode N-junction | $N_d$ | $10^{15}$ cm$^{-3}$ |
| Carrier recombination lifetime of N-junction | $\tau_p$ | 0.00001 s |
| Electron mobility of photodiode N-junction | $\mu_n$ | $1300 \frac{cm^2}{V_S}$ |
| Hole mobility of photodiode N-junction | $\mu_p$ | $450 \frac{cm^2}{V_S}$ |
| Acceptor concentration of photodiode P-junction | $N_a$ | $10^{17}$ cm$^{-3}$ |
| Carrier recombination lifetime of P-junction | $\tau_n$ | 0.0000001 s |
| Electron mobility of photodiode P-junction | $\mu_n$ | $700 \frac{cm^2}{V_S}$ |
| Hole mobility of photodiode P-junction | $\mu_p$ | $200 \frac{cm^2}{V_S}$ |
| Optical generation rate | $g_{op}$ | $\frac{\alpha P_O}{E_{PH}q} = 8.68056 \times 10^{19}$ |
| Absorption coefficient of Si | $\alpha$ | 500 cm$^{-1}$ |
| Uniform illumination of red light | $E_{PH}$ | 1.8 eV |
| Laser optical power | $P_O$ | $0.05 \frac{W}{cm^2}$ |
| Diffusion coefficient on photodiode N-junction | $D_p$ | $V_T \mu_p$ |
| Diffusion coefficient on photodiode P-junction | $D_n$ | $V_T \mu_n$ |
| Diffusion length for holes | $L_p$ | $\sqrt{D_p \tau_p}$ |
| Diffusion length for electrons | $L_n$ | $\sqrt{D_n \tau_n}$ |
| Minority concentration of electrons in P-junction | $P_n$ | $\frac{n_i^2}{N_d}$ |
| Minority concentration of holes in N-junction | $n_p$ | $\frac{n_i^2}{N_a}$ |
| Contact potential | $V_0$ | $V_T \ln\left(\frac{N_a N_d}{n_i^2}\right)$ |
| Depletion region width | W | $\sqrt{\frac{2\varepsilon_0 \varepsilon_r}{q}(V_0 - V_R)\left(\frac{1}{N_a} + \frac{1}{N_d}\right)}$ |

Amplifier

Figure 35:
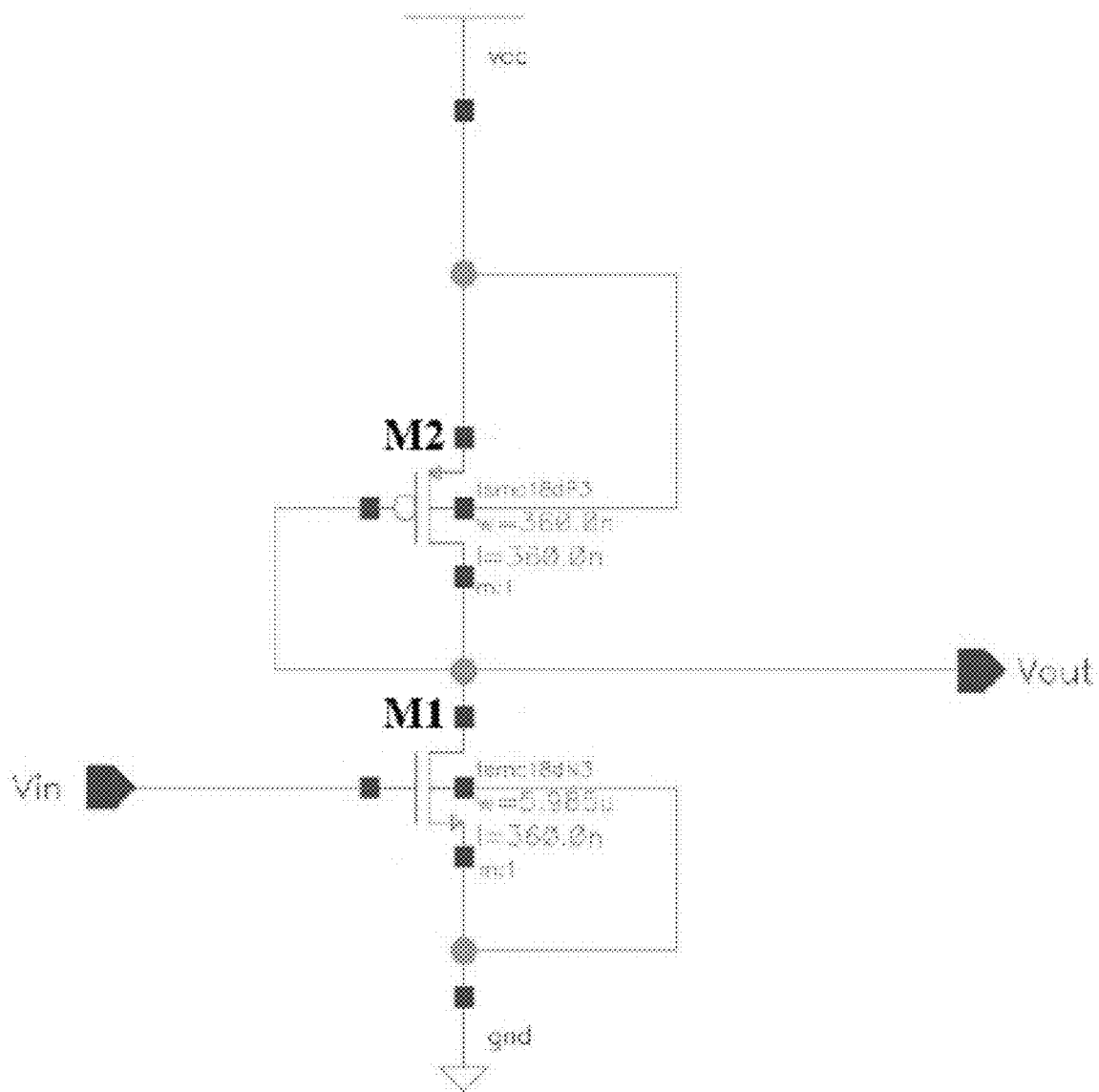
FIG. 35: Amplifier circuit of one data channel of VLC system.

The amplifier circuit shown in FIG. 35 is used to boost the input voltage signal range to an appropriate level for the comparator. It is a common-source stage amplifier with a diode-connected PMOS device used as an active load.

Figure 36:
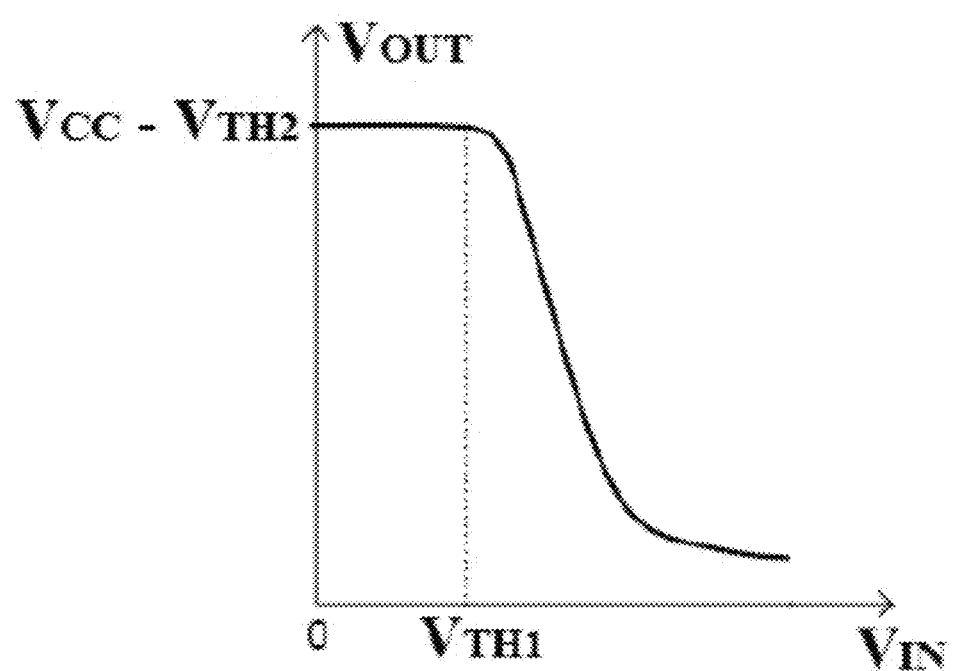
FIG. 36: Input-output characteristics of common-stage amplifier with diode-connected PMOS device as load.

The relationship between $V_{IN}$ and $V_{OUT}$ is shown in FIG. 36. $V_{IN}$ is the voltage coming out of the photodiode circuit stage and it is in the range 600 mV to 850 mV. Using a common-source stage amplifier with diode-connected PMOS device this voltage range is changed to the inverted $V_{OUT}$ signal in range 1.5 V to 2.5 V. This is much larger voltage range and it is easier for the comparator with hysteresis to detect between voltage low (binary "0") and voltage high (binary "1") with proper threshold voltage.

Comparator

Figure 37:
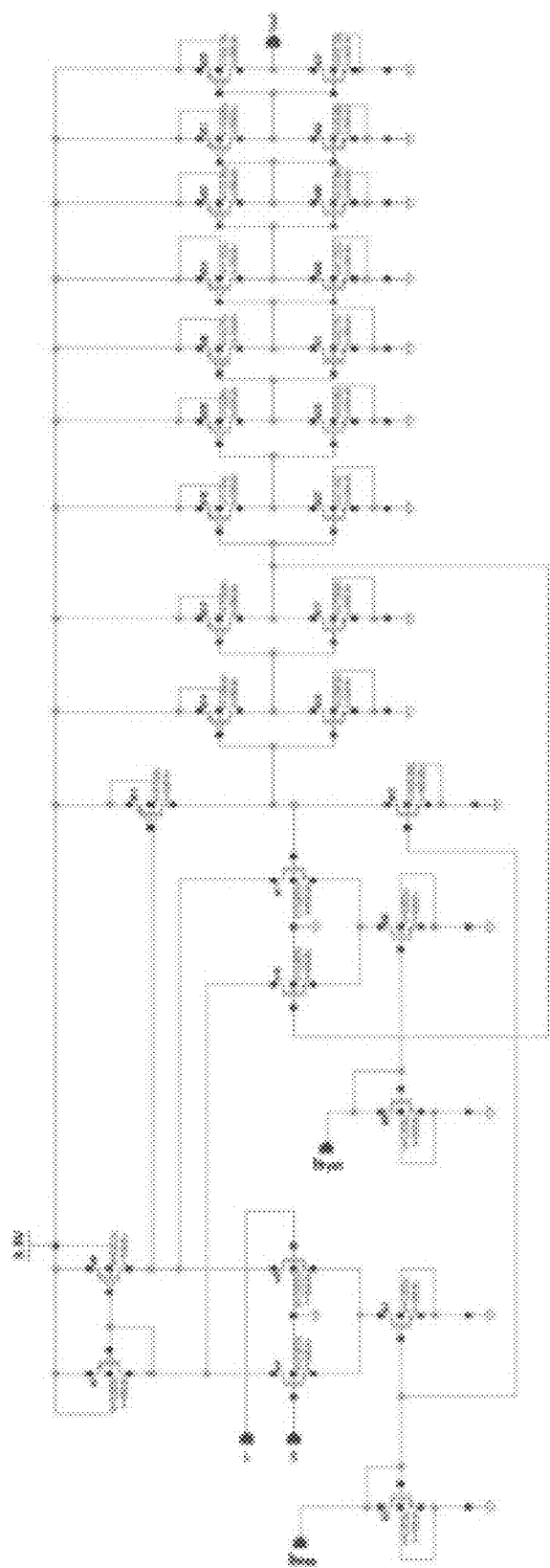
FIG. 37: The three-stage comparator with internal hysteresis.

A comparator with settable hysteresis band is used to differentiate between a high voltage or binary 1 and a low voltage or binary 0 in each data channel. In the simulated design, each channel uses a three-stage comparator with internal hysteresis, which is shown in FIG. 37.

Figure 38:
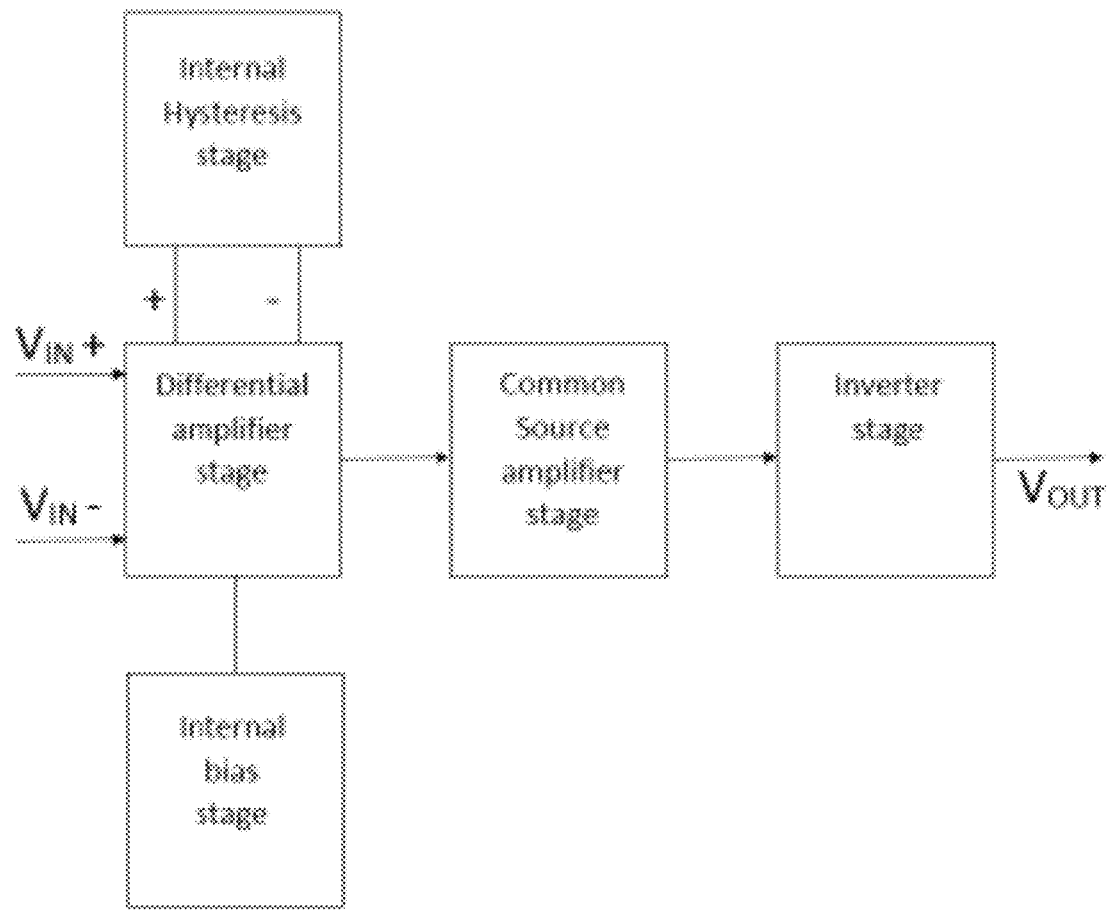
FIG. 38: Block diagram of the 3-stage comparator with internal hysteresis.

FIG. 38 shows a high-level block diagram. The comparator consists of five blocks. The first block is a differential stage that uses internal bias and internal hysteresis blocks to detect a voltage high or voltage low. The Common Source amplifier block is used to increase the gain. Finally, the last block stage is an inverter stage used to increase the gain and to improve the slew-rate of the output voltage. The inverter stage consists of nine inverters for the VLC system design.

The $V_{IN+}$ input of the comparator is connected to the output voltage of the amplifier stage of the VLC system. The $V_{IN-}$ input is connected to a reference voltage that is used to compare to the input voltage $V_{IN+}$.

Simulation Results

The results that follow, we will illustrate the correct operation of the two channel and three channel systems, show the resilience of the three channel system to variations in the fabrication of the filters, and demonstrate how the four channel system is capable of reliably delivering 10 of 16 possible bit patterns.

For the two channel system, we will show a number of internal signals, indicating the internal operation of each channel. For the three channel system, we will highlight the internal signals that vary as the fabricated instances can vary.

Two Channel System

Figure 39:
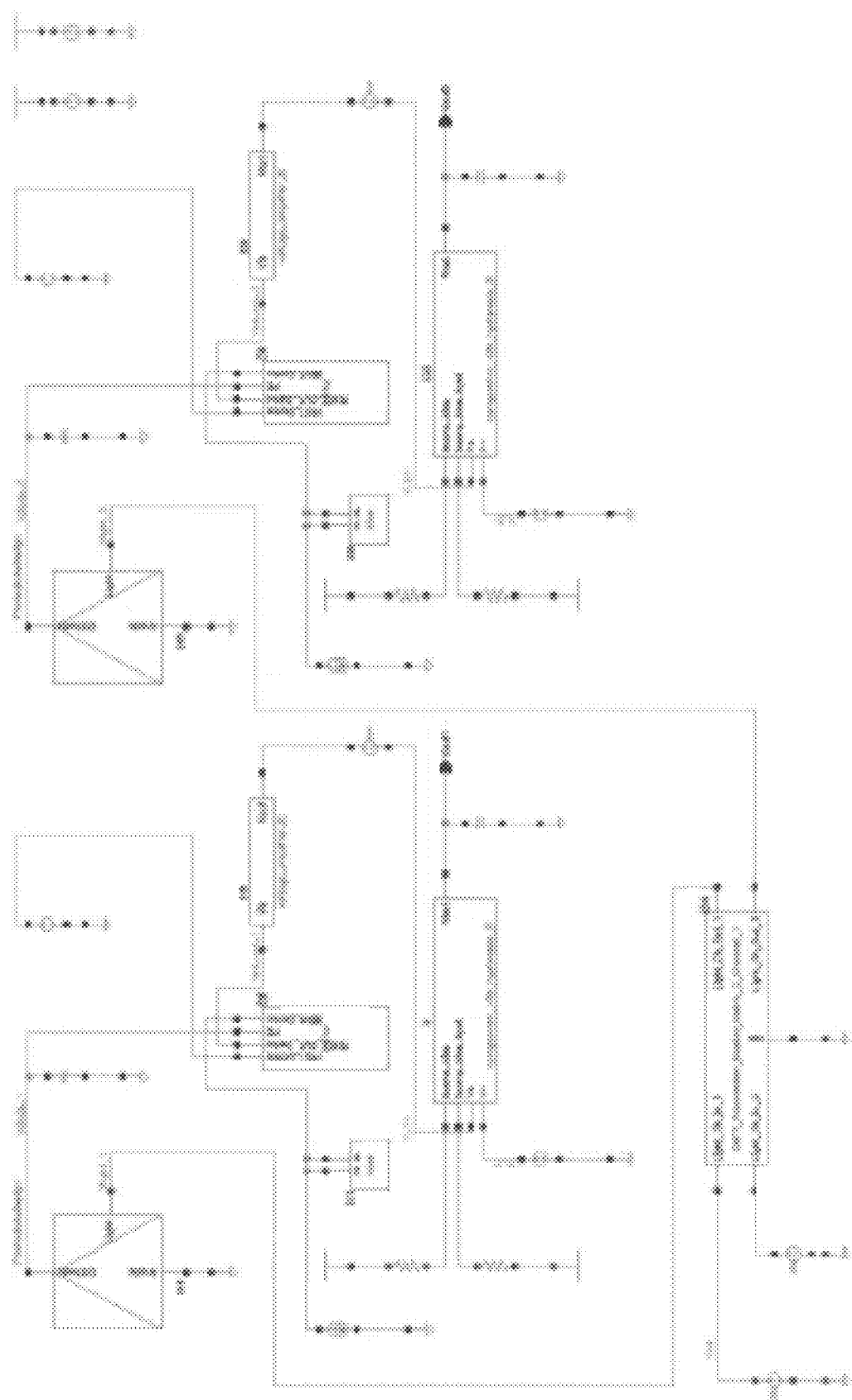
FIG. 39: Two channel system with 0° and 90° polarization angles.

The two channel VLC system consists of 0° and 90° polarization angle data channels. The schematic diagram for the two channel VLC system is shown in FIG. 39. Two laser input sources are in the lower left-hand corner of the schematic. They are simulated using square wave voltage sources each with amplitudes of 50 mV and with frequency of 1 MHz. One square wave voltage source represents the laser input source with 0° polarization angle and other square wave voltage source represents the laser input source with 90° polarization angle. In the VerilogA model, we use a 50 mV amplitude voltage signal to represent light power of 50 mW. These two square wave voltage sources are inputs to two channel DoFP filter array.

Two channel DoFP filter array, immediately to the right of the light sources is based on the Muller matrix computation described in Example 1. Two channel DoFP filter array was designed in VerilogA and it is defined as custom part of the VLC system that is simulated in Cadence.

Each DoFP filter array output is connected to a photodiode described Example 2 (shown at the top of the schematic). The photodiode was also modeled in VerilogA and it is defined as a custom part of the VLC system. The photodiode output is connected to the common-source amplifier with diode-connected PMOS device described in Example 2. The output of the common-source stage amplifier is connected to the comparator with internal hysteresis described in Example 2.

Figure 40:
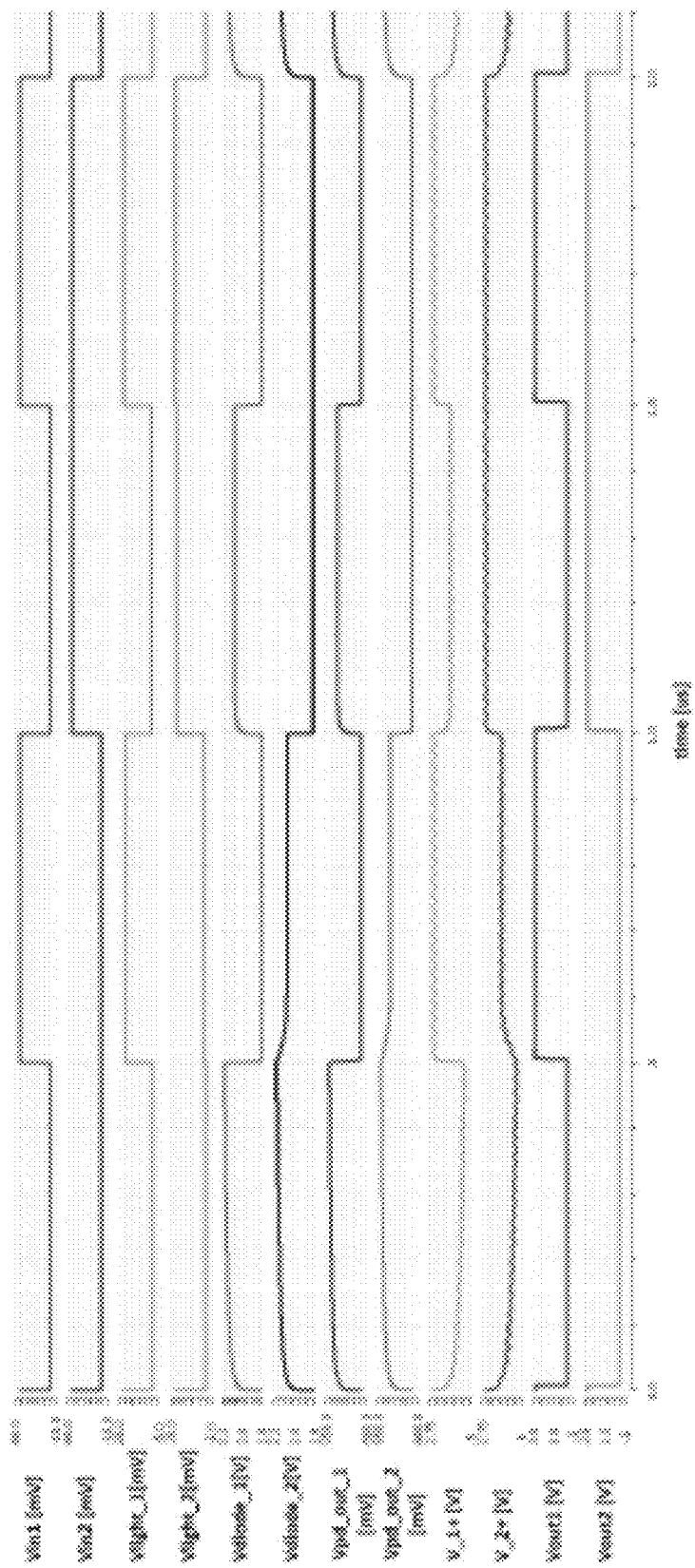
FIG. 40: Two channels with 0° and 90° polarization angles.

FIG. 40 shows two modulated laser sources as input signals $V_{in1}$ with 0° polarization angle and $V_{in2}$ with 90° polarization angle. $V_{light\_1}$ and $V_{light\_2}$ represent the light signals from the filter array, Vdiode_1 and Vdiode_2 represent the signals from the photodiodes, Vpd_out_1 and Vpd_out_2 represent the output of the bias circuit (input to the amplifier), and $V_{1+}$ and $V_{2+}$ are the non-inverting inputs to the comparator. The input light signals are completely recovered at each data channel output of the VLC system, $V_{out1}$ and $V_{out2}$.

Three Channel System

Figure 41:
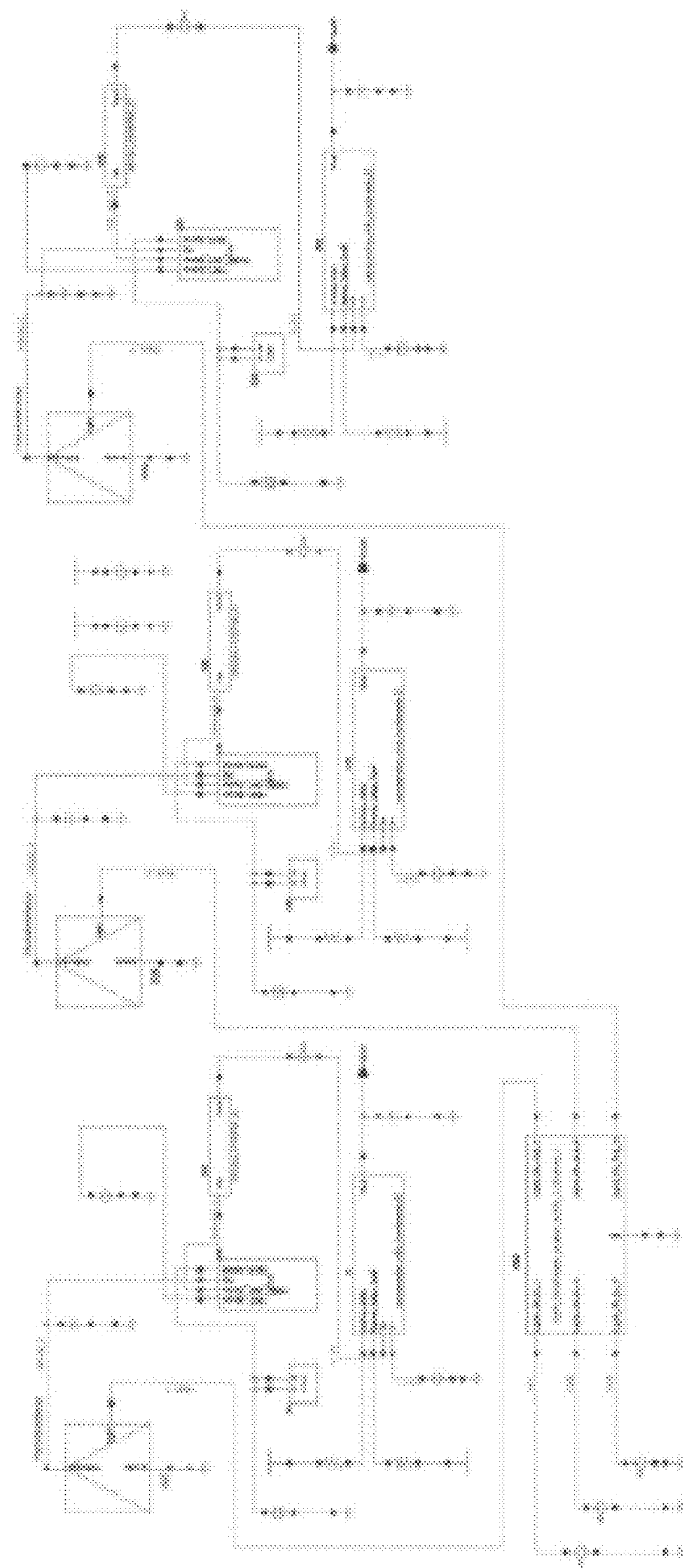
FIG. 41: Three channel system with 00, 60° and 120° polarization angles.

The three channel VLC system consists of 0°, 60° and 120° polarization angles data channels and is shown in FIG. 41. Three laser sources are simulated with square wave voltage sources each 100 mW (100 mV) that are input to a three channel DoFP filter array. The rest of the three channel VLC system is exactly the same as the two channel VLC system. Again, the light sources and filter are in the lower left-hand corner of the schematic and the photodiodes are across the top.

Figure 42:
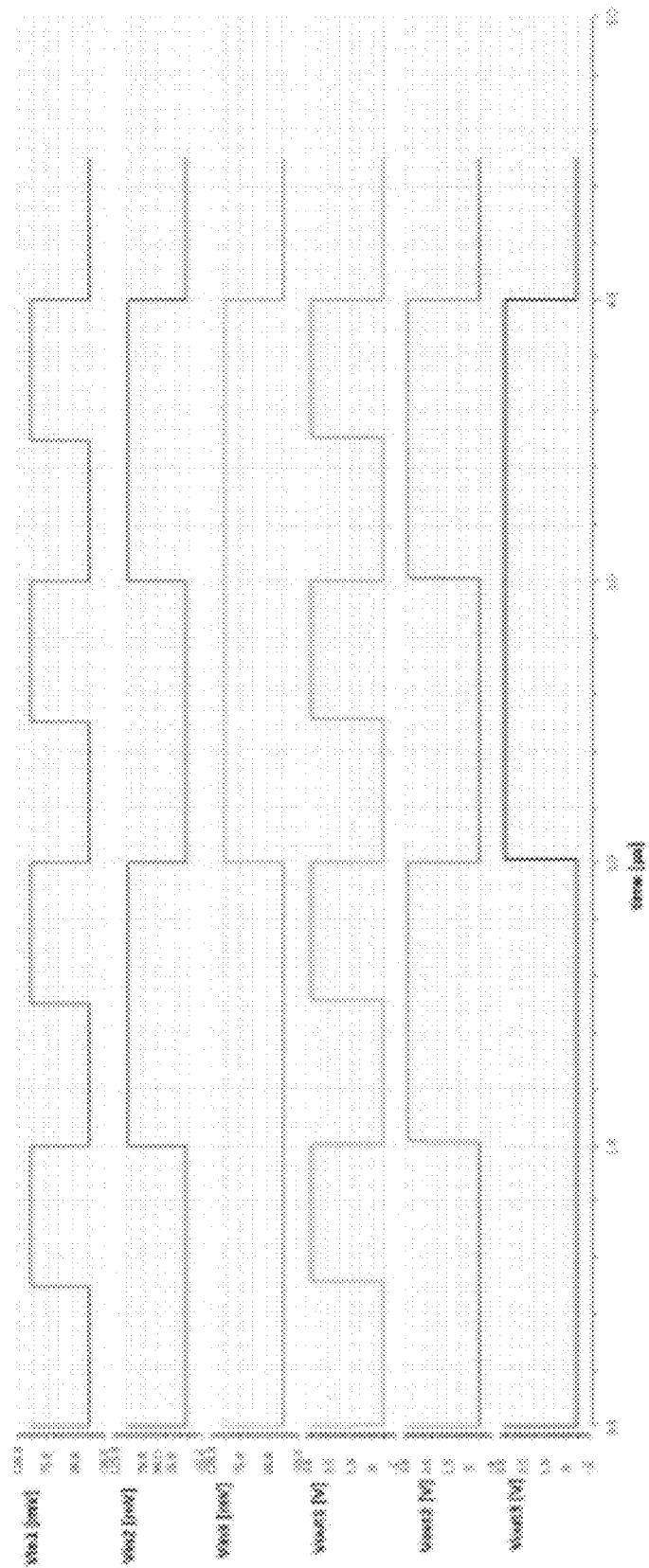
FIG. 42: Three channel system input and output signals.

FIG. 42 shows that three modulated laser sources input signals are completely recovered at each data channel output of the VLC system.

Figure 43:
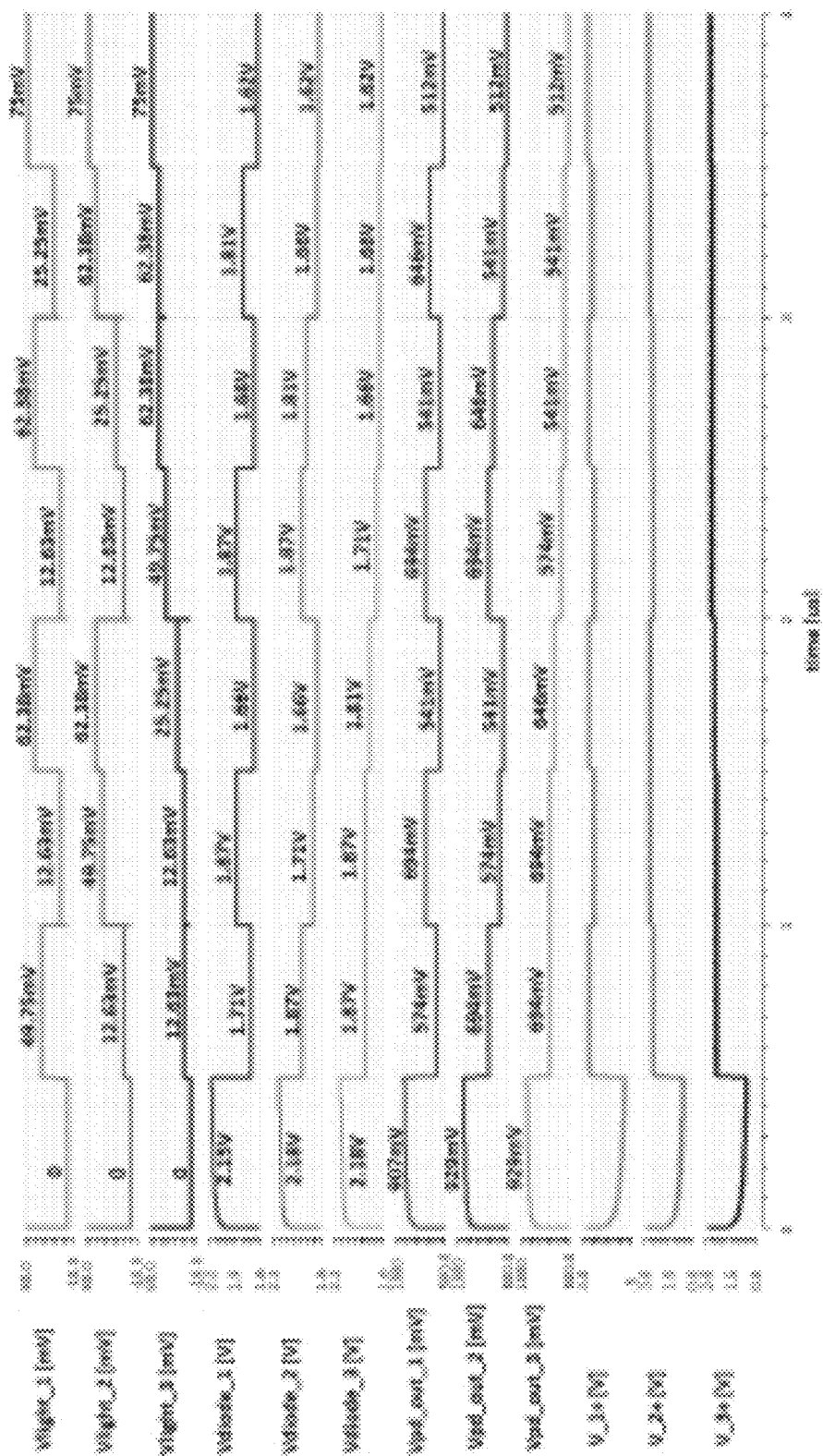
FIG. 43: 3 channel 0°, 60° and 120° polarization angles internal signals.
Figure 44:
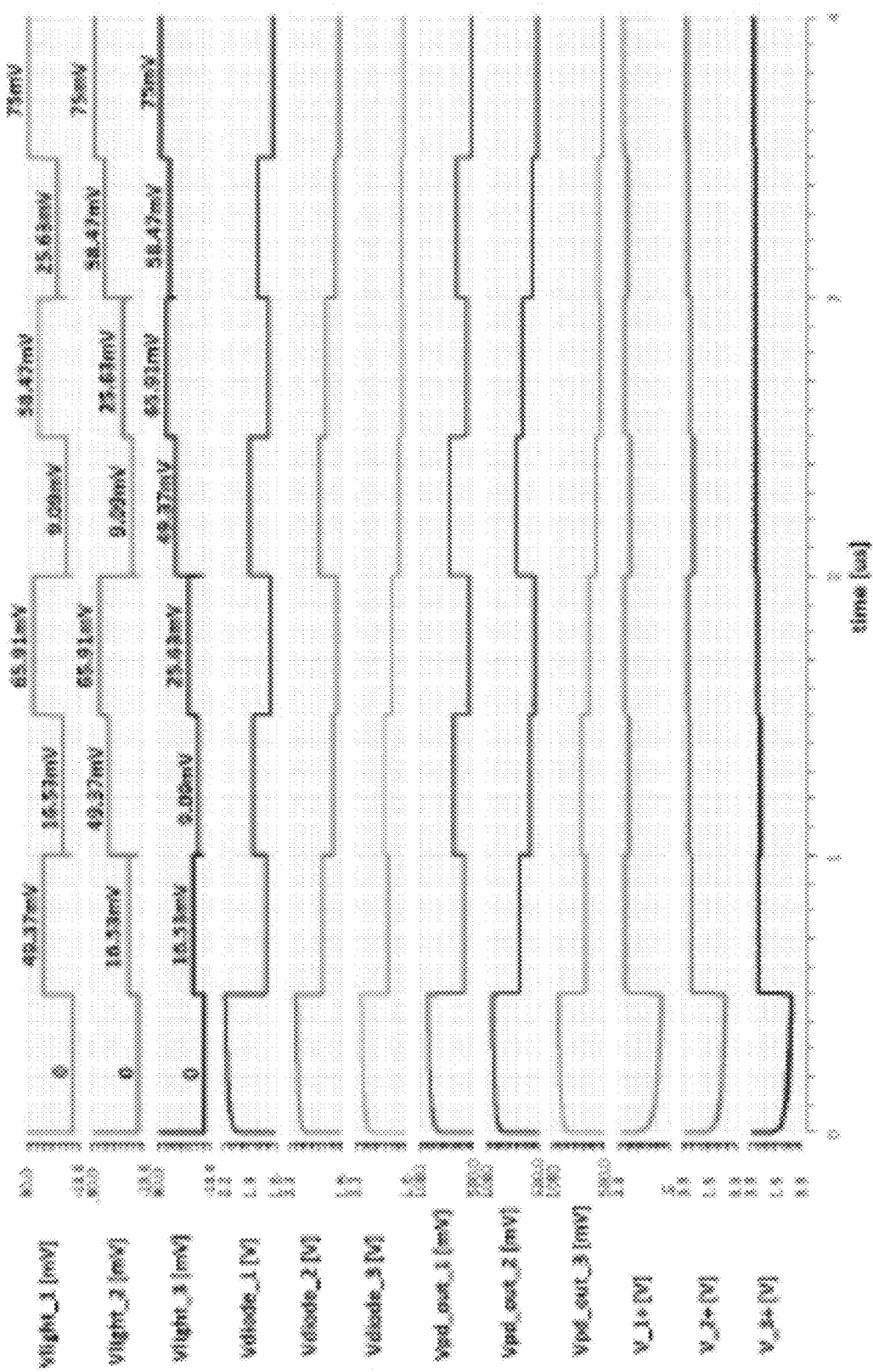
FIG. 44: 3 channel 5°, 55° and 125° polarization angles internal signals.

A (simulation-based) characterization of the properties of the optical communications channels under realistic variation in the fabrication of the filters is performed on the three channel VLC system. Due to fabrication imperfections, DoFP filter array polarization angles can have errors of 5°. FIG. 43 shows internal signals of the three Channel VLC system when DoFP filter array polarization angles are 0°, 60° and 120°, while FIG. 44 shows the same internal signals when DoFP filter array polarization angles are 5°, 55° and 125° which is the worst case of fabrication imperfections. Only DoFP filter array output signals $V_{light\_1}$, $V_{light\_2}$ and $V_{light\_3}$ have different signal levels and all other following internal signals of the VLC system are almost identical between the two simulations. As a result, the performance of the three channel VLC system is not impacted by the fabrication imperfection of the filters.

Four Channel System

Figure 45:
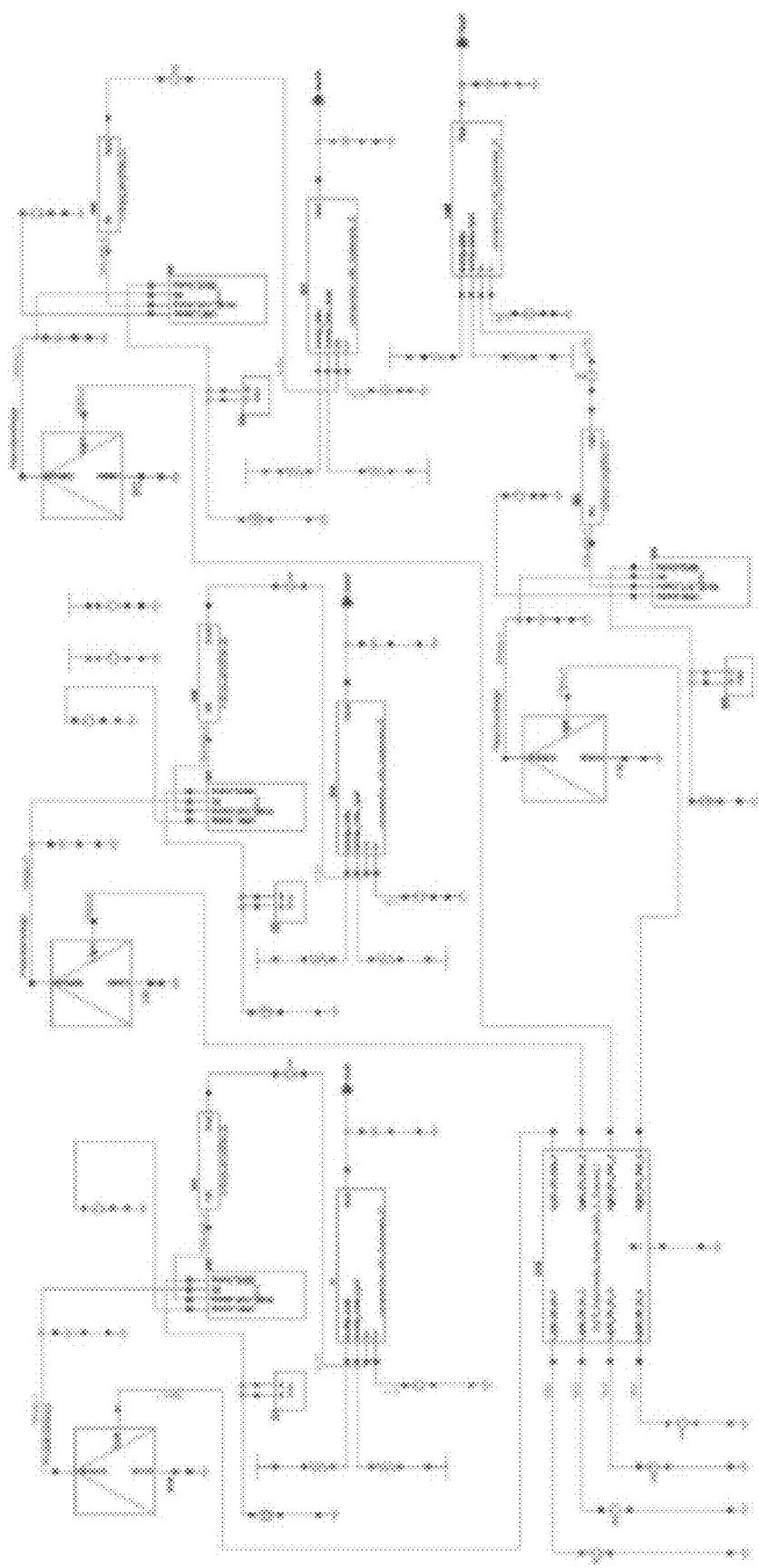
FIG. 45: 4 channel 0°, 45°, 90° and 135° polarization angles.

The four channel VLC system consists of 0°, 45°, 90° and 135° polarization angles data channels and is shown in FIG. 45. Four laser sources are simulated with square wave voltage sources each 100 mW (100 mV) that are input to a four channel DoFP filter array. The rest of the four channel VLC system is the same as the two or three channel VLC systems.

Figure 46:
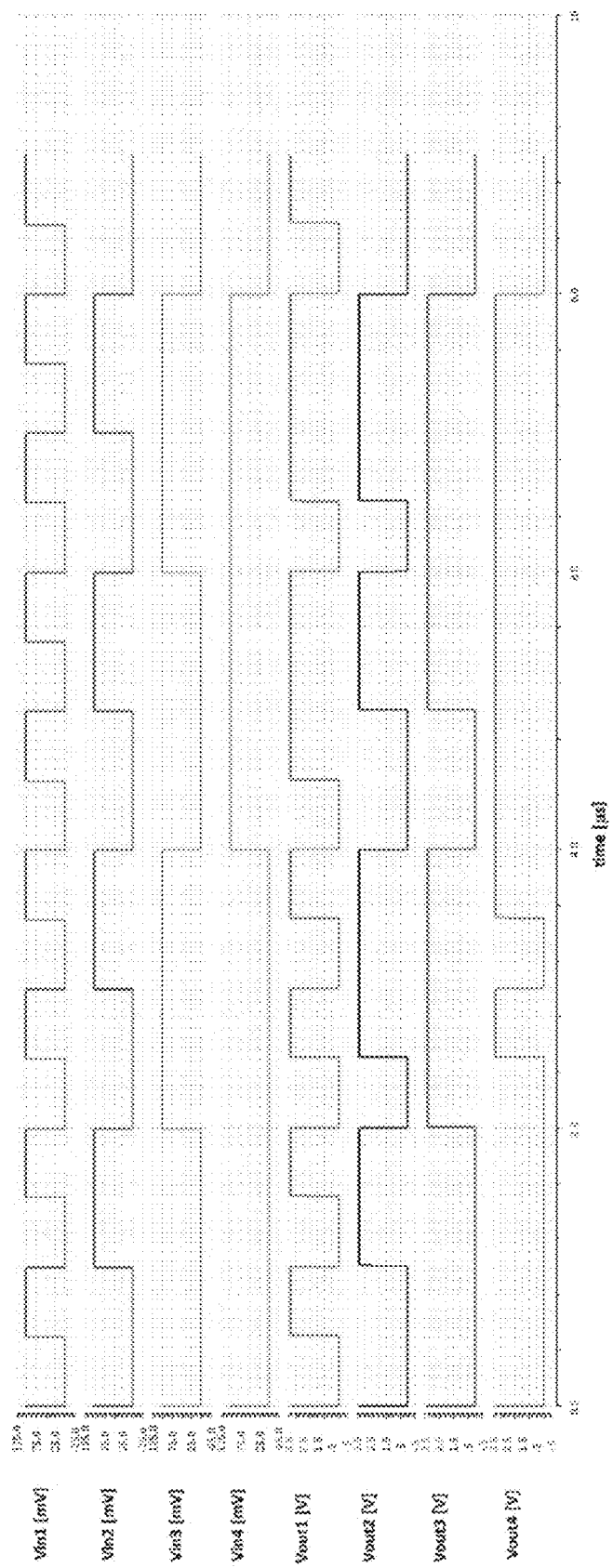
FIG. 46: Four channel system input and output signals.

FIG. 46 shows that four modulated laser input signals are not completely recovered at each data channel output of the VLC system. Crosstalk between the channels on the input of the VLC system and DoFP filters supports the recovery of 10 out of 16 distinct symbols at the outputs of the VLC system. We will return to this issue in Example 3.

Example 2: Experimental Evaluation of DoFP Polarimeters

Example 2 describes the design, layout and fabrication of the custom receiver chip and its testing. This example also describes some optical bench testing of DoFP polarimeters in air.

A receiver integrated chip (IC) looks as shown in FIG. 47. The IC is custom CMOS IC designed in 180 nm CMOS node technology. DoFP optical filters are designed to be mounted on the surface of the IC to create the optical receiver. The DoFP optical filters are made of aluminum nanowire and they have various incident angles of light polarization that is used to design independent digital communications channels.

FIG. 48 shows image of 45° oriented aluminum nanowire and side view of aluminum nanowire. Each filter is connected to high-speed photodiode that converts optical signal to electrical signal before the electrical signal is sent through digital data channel that is shown in FIG. 33. Since our IC design has two channels we will use 0° and 90° optical filters to observe various properties of this design.

Figure 49:
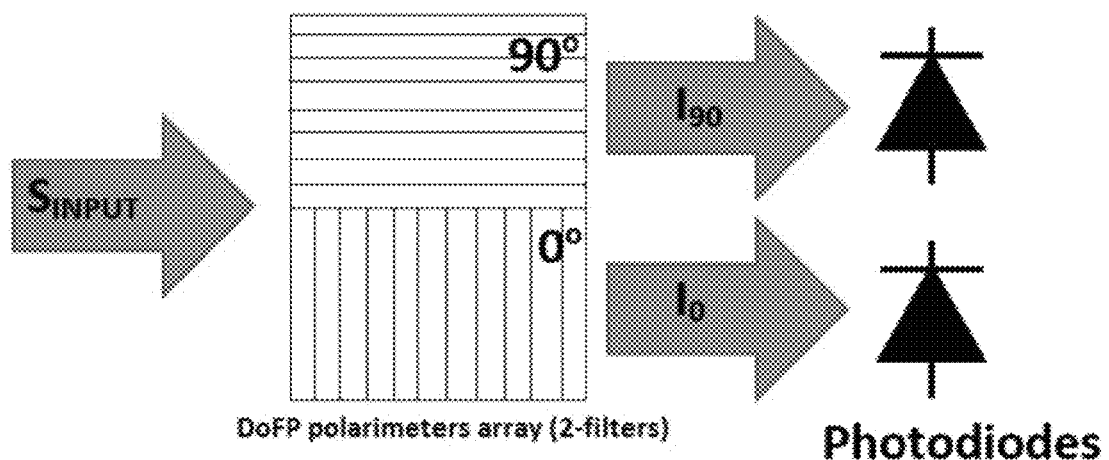
FIG. 49: Two channel optical to electrical conversion.

The approach is for two optical modulated input signals with different polarization angles to be sent to the IC and then observe output signals from both channels on the IC. FIG. 49 shows two channel system conversion of optical to electrical signal.

A custom two channel CMOS chip was designed using Cadence software chip layout 180 nm node technology. FIG. 33 shows the design of one channel of this chip. The photodiode circuit is input stage of a receiver's channel. It is followed by common-source stage amplifier with a diode-connected PMOS device that is used as an active load that is used as middle stage of the receiver's channel. The receiver's channel also has a comparator with externally adjustable hysteresis and inverter chain as output stage.

Figure 50:
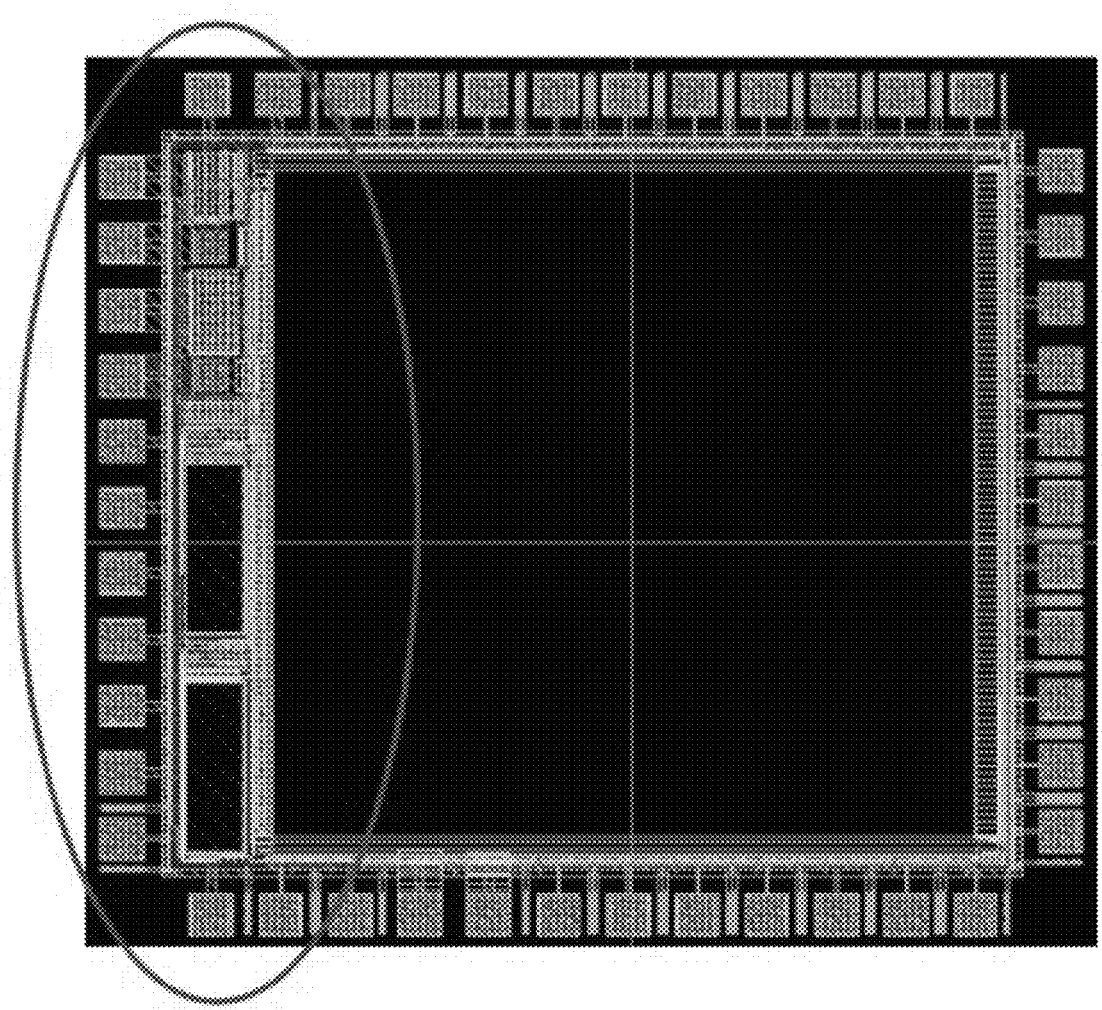
FIG. 50: Top view of IC 2 channel layout designed in Cadence 180 nm node.

FIG. 50 shows the top layout view of the chip. The circled area is the portion of the chip relevant to the present disclosure.

The photodiodes are laid out so that they cover as much surface area as possible, so that DoFP filters can be bonded easier over the each channel photodiode. This is also so that they can absorb as much light as possible. In that way we are trying to reduce input light power requirements as much as possible.

Figure 51:
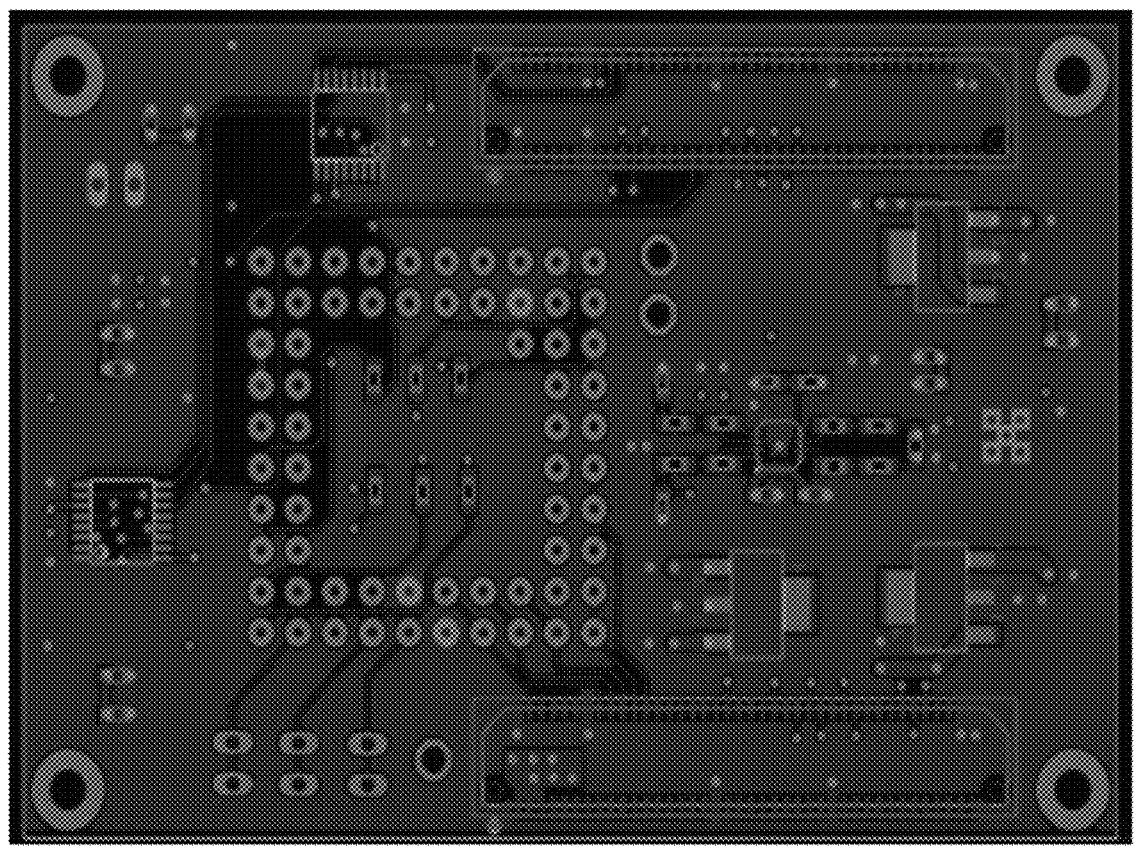
FIG. 51: Bottom view of PWB that is used for testing of the IC.

FIG. 51 shows bottom view of printed wiring board (PWB) that was designed together with the custom chip for testing purposes. The chip is placed in socket that is soldered on the PWB. The PWB is providing various functions for the custom chip. The PWB provides 3.3V rail voltage to the chip and surrounding circuitry. It also provides external resistors that are used to adjust threshold voltages and hysteresis for each channel's comparator. The PWB is also connected with external connector to a FPGA board for some possible future development.

Once fabricated, the CMOS chip was placed into the socket on the PWB. First test we applied was to power up the board and make sure that everything is connected properly. This test was successful and we then performed a chip functionality test.

Figure 52:
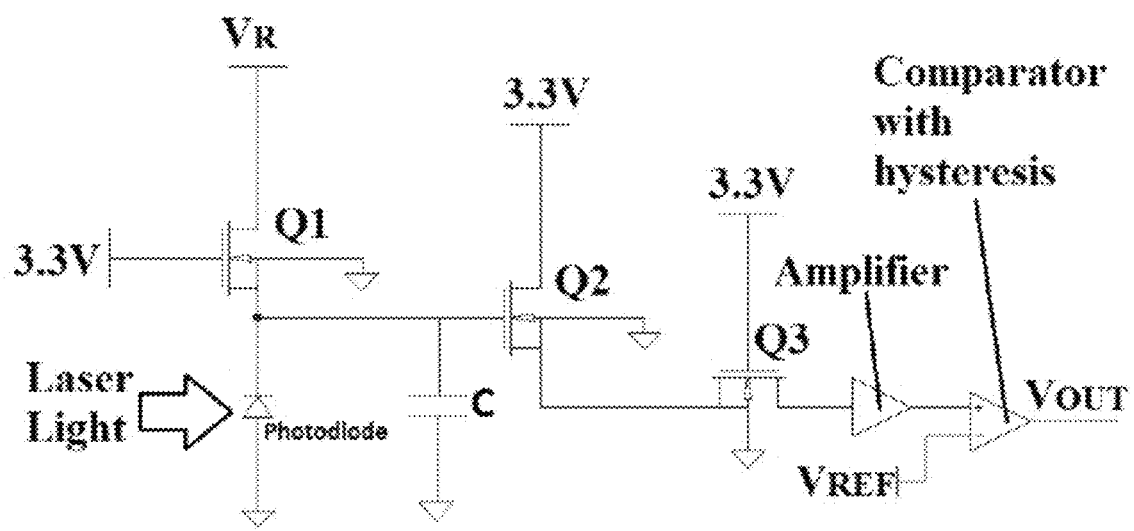
FIG. 52: One data channel of VLC system.

This test shows that the custom chip is functioning properly. In this test, we ignore the photodiode and we apply a square wave voltage with amplitude of 3.3V and with frequency of 1 MHz at V R input shown in FIG. 52. The same square wave voltage at the channel's output is expected.

Figure 53:
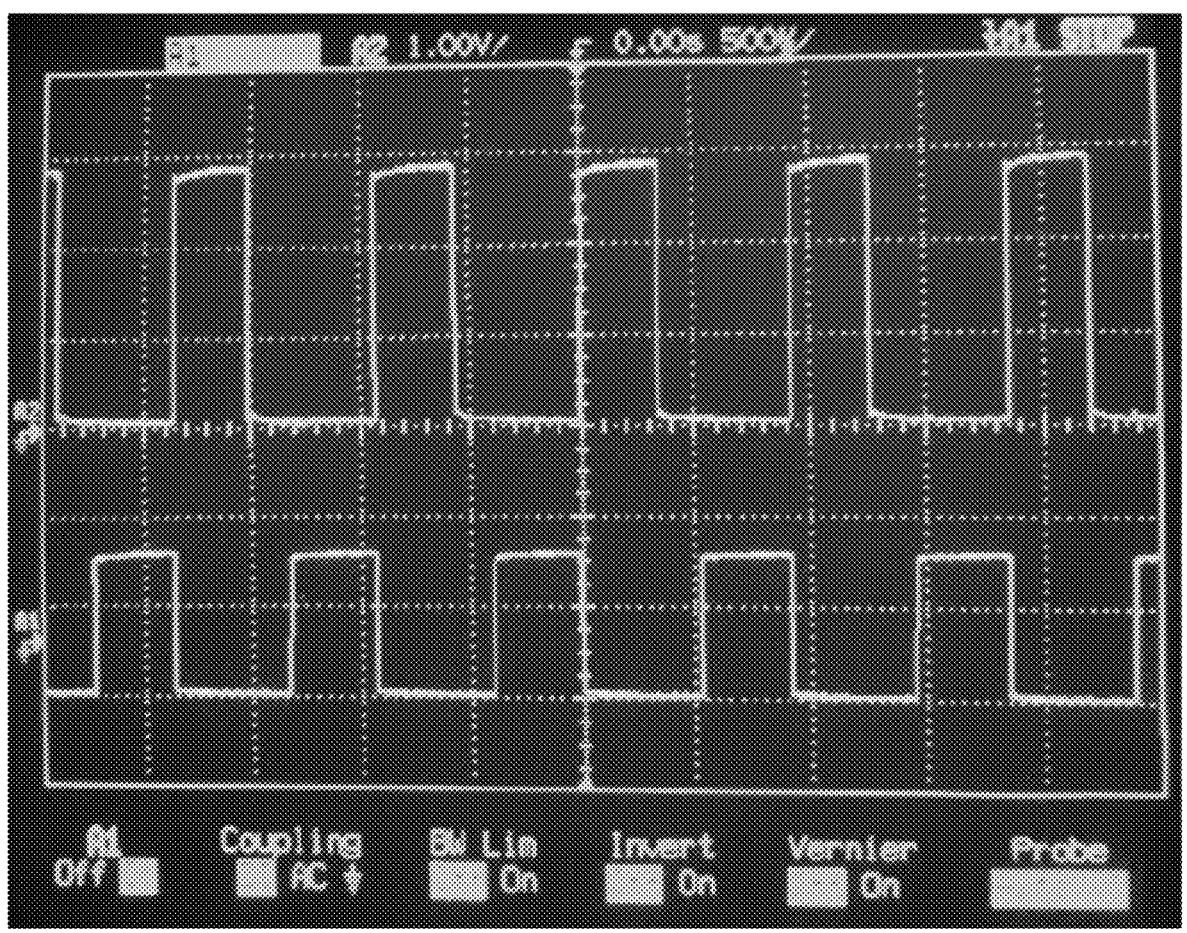
FIG. 53: Experiment 1 of the chip where photodiode was neglected.

Using a digital oscilloscope we observed the input square wave voltage signal and voltage output signal of the channel tested in this experiment. As we can see on FIG. 53, the input square wave voltage signal is oscilloscope channel A1 and the output signal is oscilloscope channel A2. We can see that the output voltage signal is also 3.3V, 1 MHz square wave that shows that the chip internal circuitry is working properly.

Figure 54:
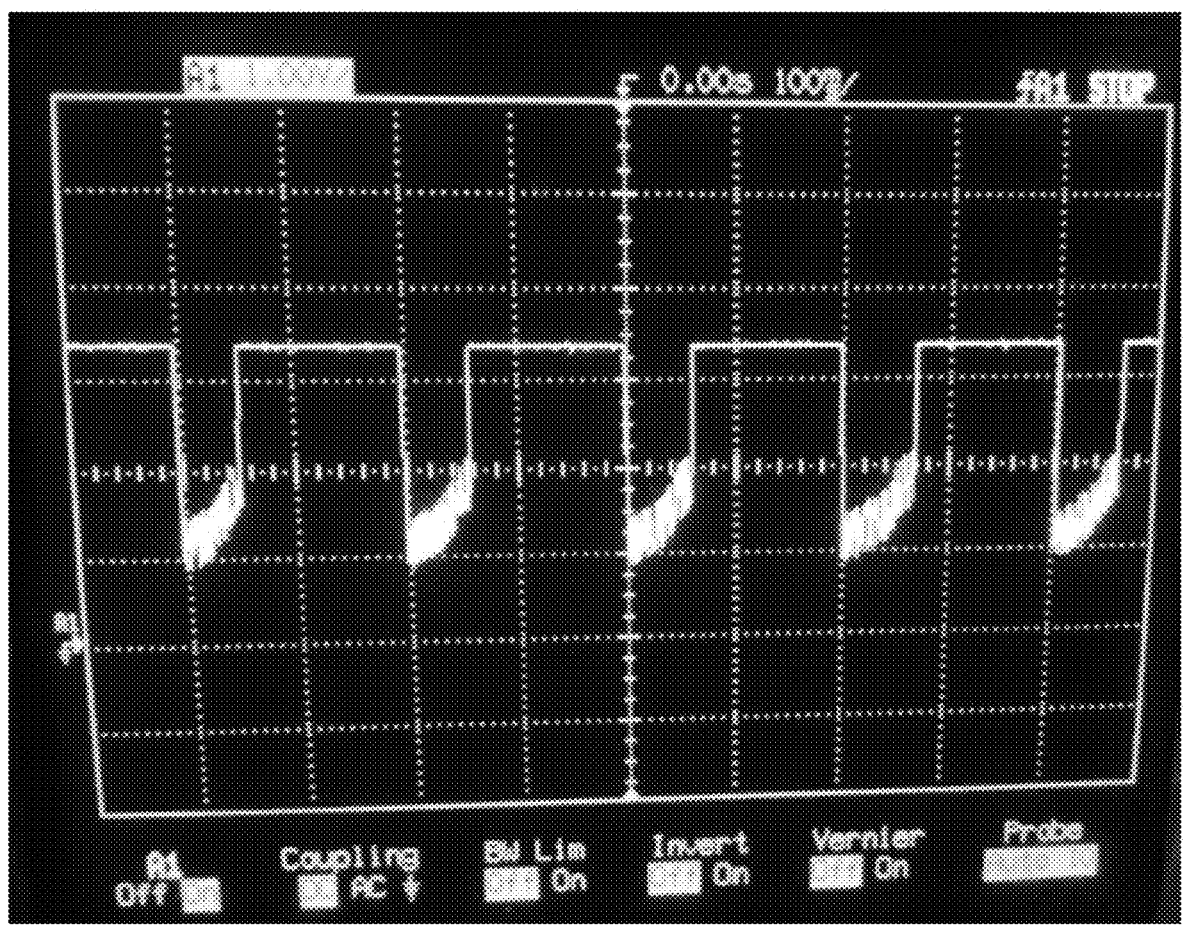
FIG. 54: Experiment 2 of the chip using photodiode.

In the second chip test, we apply a regular red LED diode as input optical signal transmitter device. The red LED was connected to signal generator square wave 1V, 5 Hz output and the LED was pointed to one custom chip channel and we observed the channel output, which is shown in FIG. 54.

As we can see from this test, the photodiode responds properly to LED diode light input signal and the receiver's channel output looks like desired 3.3V, 5 Hz square wave. Noise on the bottom of the output signal shown in FIG. 54 can be filtered by adjusting comparator hysteresis.

Linear CMOS Sensor Testing

Since we were unable to perform the optical experiments with the fabricated chip, we instead used a commercial image sensor. The experiment was performed on the optical bench shown in FIG. 55, and is intended to investigate two features of our system:
1. how will multiple polarized light signals interact in the air that is used as the transmission media, and
2. how does the electrical noise in the receiver compare with the optical interference we model between channels.

Figure 55:
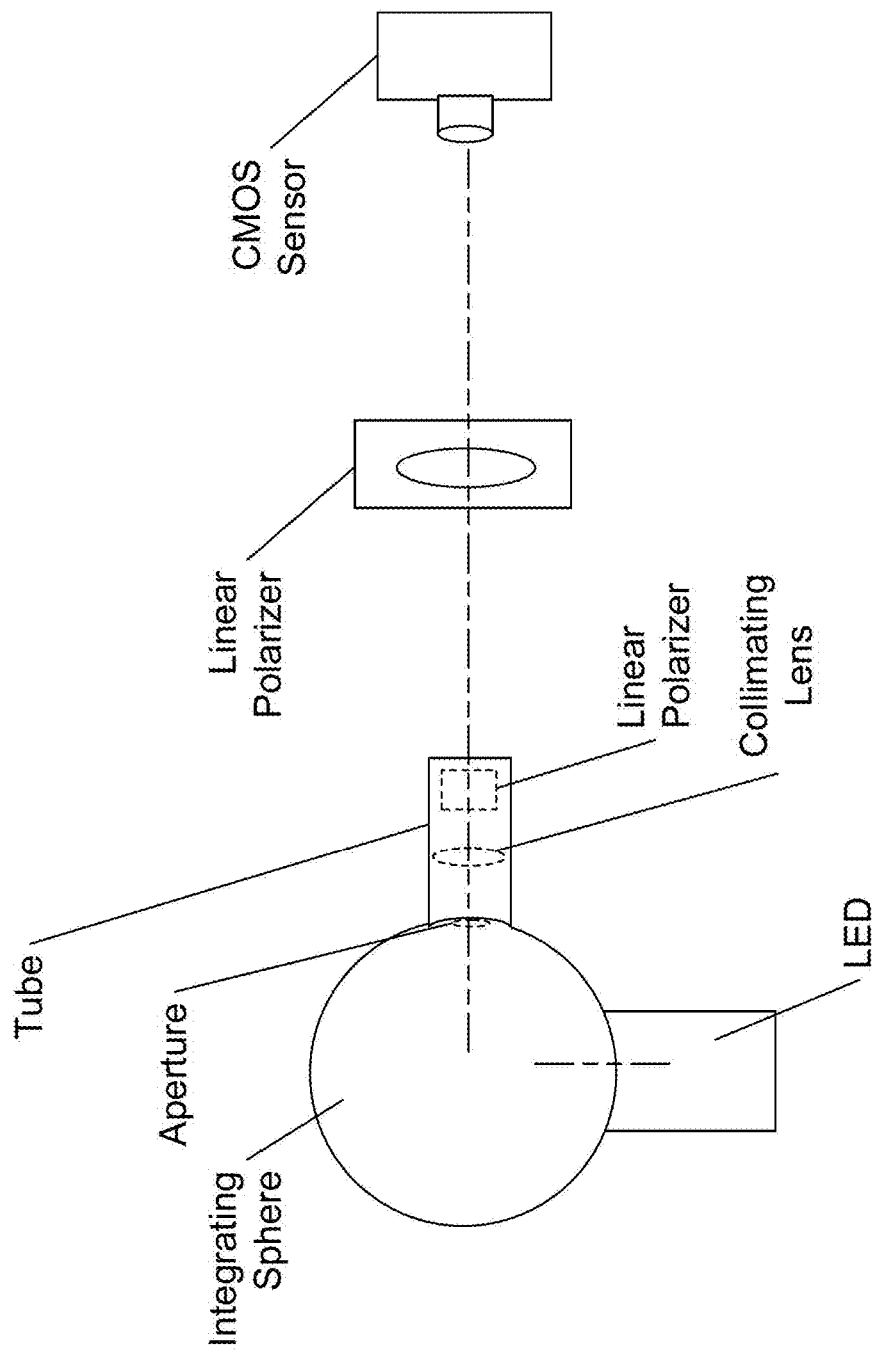
FIG. 55: Optical bench experiment.

From FIG. 55 we can see that a 530 nm uniform green LED light source illuminates light that travels to an integrating sphere where the light signal is diffused and then an aperture is used to create a narrow light beam. After this process, a collimating lens is used to create a straight, uniform beam.

This beam is polarized with a fixed linear polarizer (manufactured by Newport) located inside the tube that is adjacent to the integrating sphere. The polarized light travels through the air and passes through a rotation stage with linear polarizer also made by Newport that is manually rotated from 0° to 180° in steps of 2 degrees. The light is then passed to the linear low-noise monochrome CMOS sensor and the data is recorded.

The image received by the CMOS sensor is limited to a 100×100 pixel square array to ensure uniformity of illumination.

The measured data is a 4D array structure with 91 angles from 0° to 180°, every two degrees, 100 pixels in the x-axis direction, 100 pixels in the y-axis direction, with 64 frames of data for each angle.

Internal to the CMOS sensor, the light signal is digitized using a 12-bit analog-to-digital converter (ADC) with a 3.5 V reference voltage range.

Figure 56:
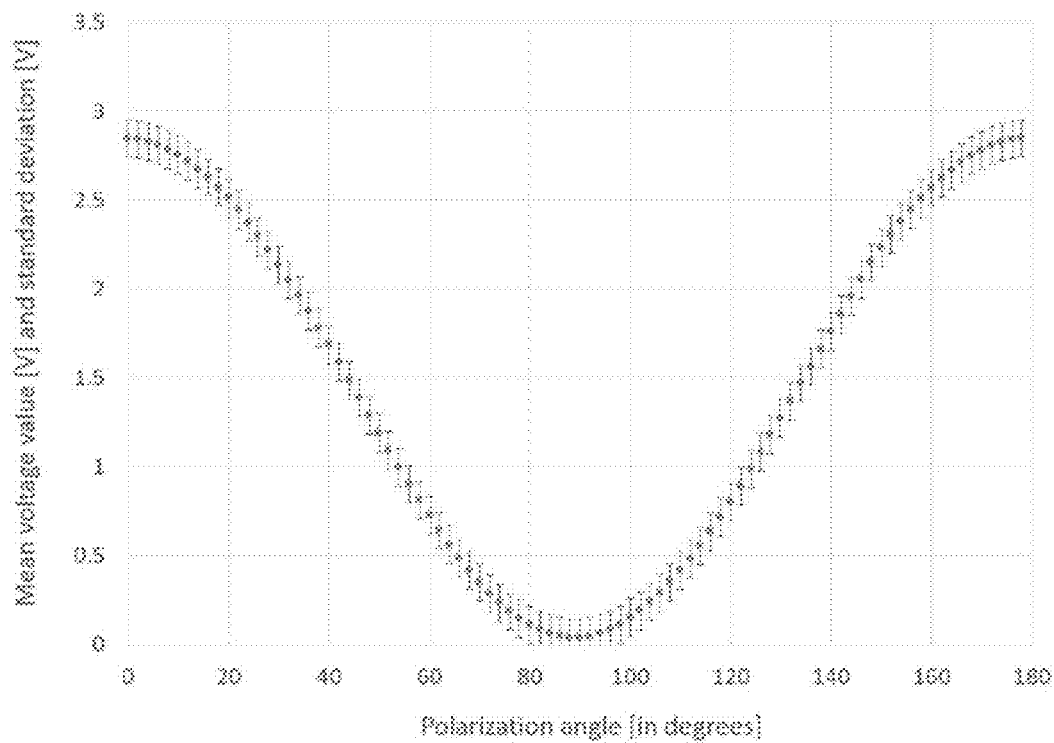
FIG. 56: Experimental results for the linear CMOS sensor.

For each angle, the mean sensor value was calculated from the 100 pixel by 100 pixel array each with 64 frames (samples). FIG. 56 shows these results, plotting mean and std. dev. of the signal value for each angle. The data is, as expected, showing Malus's law distribution with noise approximately equivalent to that predicted by shot noise.

When the angles of the two polarizers match (0° in the plot), the sensor reading is at a maximum. Also, when the two angles are 90° apart the sensor voltage reading is at its minimum.

Figure 57:
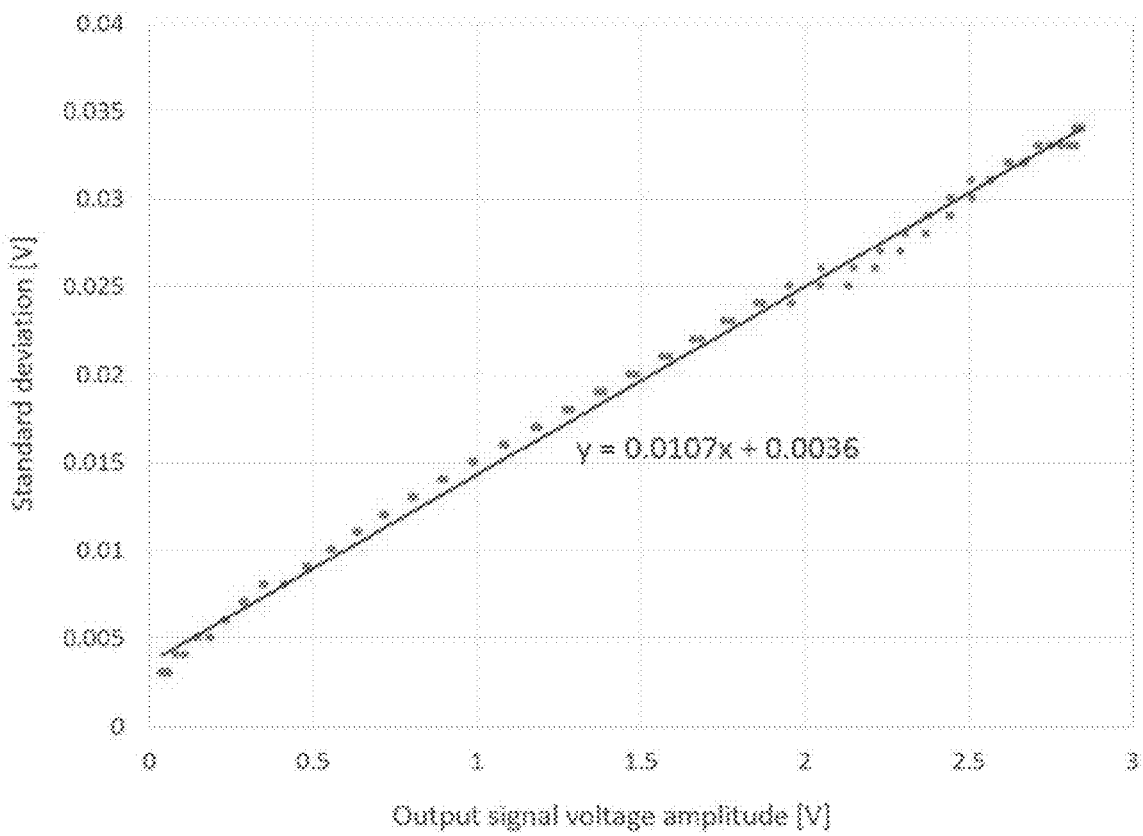
FIG. 57: Standard deviation versus mean signal for the linear CMOS sensor.

FIG. 57 shows the relationship between the standard deviation and received signal for the linear CMOS sensor. A least mean squared error curve fit to this data yields the expression $$y=0.0107x+0.0036 \tag{4.1}$$

where y is the std. dev. of the sensor reading and x is the mean reading for a fixed angle.

Figure 58:
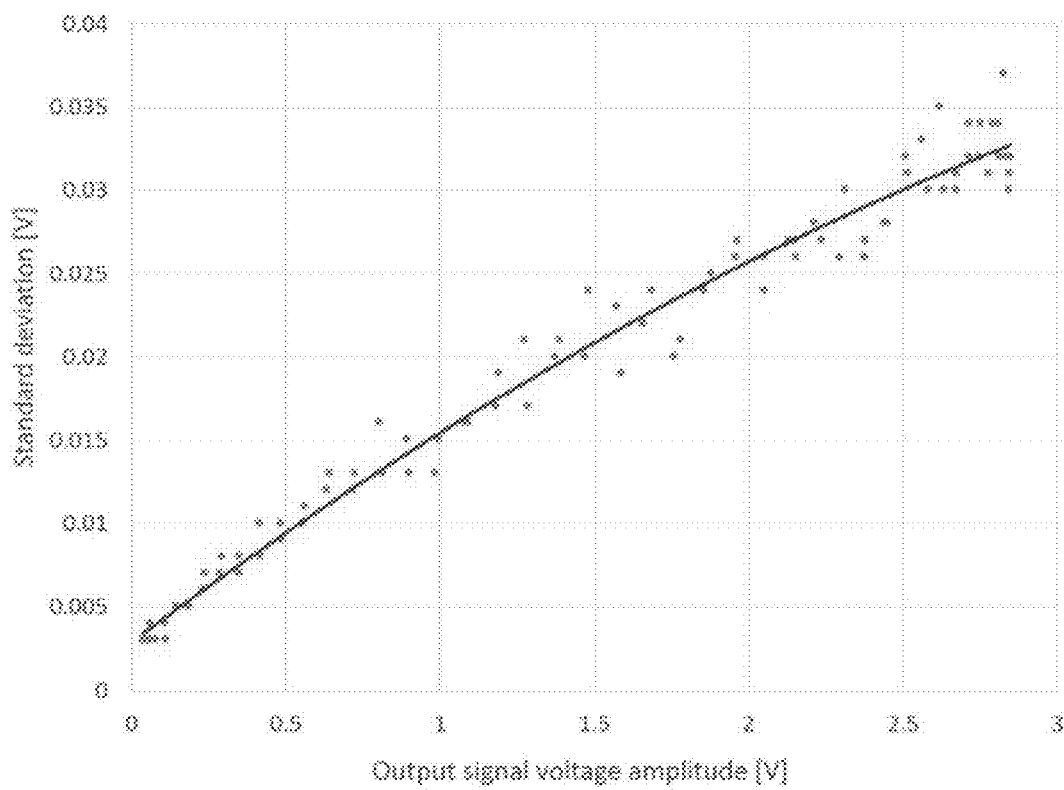
FIG. 58: Linear CMOS Sensor pixel (photodiode) has Poisson noise distribution.

FIG. 57 shows the noise data distribution for the entire set of pixels. If we only use noise data for one pixel (or photodiode) of the linear image sensor as it is shown in FIG. 58 we can see that photodiode shot noise follows Poisson noise distribution which is expected.

In what follows, we will use the relationship from the Equation (4.1) as a calibration (i.e., a proxy) for the electrical noise in linear receiver circuits, although clearly for practical applications it will be necessary to use the noise properties of the actual receiver electronics in use.

Implications for Two Channel System

In this experiment the angle where two polarizer angles match is 0° and the voltage reading for this angle is ADC value 3330 or 3330 (3.5 V)=0.81304 (3.5 V)=2.846 V. Similarly, for 90° the voltage reading is ADC value 45 or 45/409 (3.5 V)=0.010904 (3.5 V)=0.038 V.

Extrapolating these single-signal values back to the optical input signals of the two channel system described in Example 1, Table 4.1 shows the receiver's both channels photodiodes light inputs for all four data combinations of binary input values.

If we compare data from Table 4.1 with theoretical data from Table 3.1 from Example 1 we can see that they match reasonably well.

TABLE 4.1

Two channel linear low-noise CMOS sensor VLC PDM system.

| $b_{90°}$ | $b_{0°}$ | $I_{90}$ | $I_0$ |
|---|---|---|---|
| 0 | 0 | 0 | 0 |
| 0 | 1 | 0.011 | 0.813 |
| 1 | 0 | 0.813 | 0.011 |
| 1 | 1 | 0.824 | 0.824 |

Implications for Three Channel System

For the three-channel VLC system defined in Example 1, we will use three values from the experimental data. The first value is the 0° angle reading of the rotation stage which is already defined as ADC reading of 3330, or 0.81304 value referenced to 1.

The second reading is at 60° and it is an ADC reading of 847 or 0.206863 value referenced to 1. The third value is at 120° with an ADC reading of 938 or 0.229017 value referenced to 1.

Table 4.2 shows each channel 0°, 60°, and 120° photodiode outputs based on three experimental data points. Again the assumption is that max value is 1 (or 4096) and values are scaled to this reference value. As we can see from Table 4.2, the three channel VLC PDM system design will work well within adequate noise margins.

Threshold between binary value 0 and binary value 1 is 0.6 for this case. The noise margin went down comparing to the two channel VLC PDM system but it is still well within limits of constant proper operation.

Again, if we compare data from Table 4.2 with theoretical data from Table 3.2 from Example 1 we can see that they match reasonably well.

TABLE 4.2

Three channel linear low-noise CMOS sensor VLC PDM system.

| $b_{120°}$ | $b_{60°}$ | $b_{0°}$ | $I_{120}$ | $I_{60}$ | $I_0$ |
|---|---|---|---|---|---|
| 0 | 0 | 0 | 0 | 0 | 0 |
| 0 | 0 | 1 | 0.229 | 0.207 | 0.813 |
| 0 | 1 | 0 | 0.207 | 0.813 | 0.207 |
| 0 | 1 | 1 | 0.436 | 1 | 1 |
| 1 | 0 | 0 | 0.813 | 0.207 | 0.229 |
| 1 | 0 | 1 | 1 | 0.414 | 1 |
| 1 | 1 | 0 | 1 | 1 | 0.436 |
| 1 | 1 | 1 | 1 | 1 | 1 |

Logarithmic CMOS Sensor Testing

In this experiment the light is detected using a logarithmic CMOS sensor (in which the photodiode is operated in the forward bias region) and the data is recorded. The image received by the logarithmic CMOS sensor is limited to a 151×151 pixel square array to ensure uniformity of illumination.

The measured data is a 4D array structure with 180 angles from 0° to 179°, every degree, 151 pixels in the x-axis direction, 151 pixels in the y-axis direction, with 91 frames of data for each angle.

Again just like for the linear CMOS sensor, internal to the logarithmic CMOS sensor, the light signal is digitized using a 12-bit analog-to-digital converter (ADC) with a 3.5 V reference voltage range.

Figure 59:
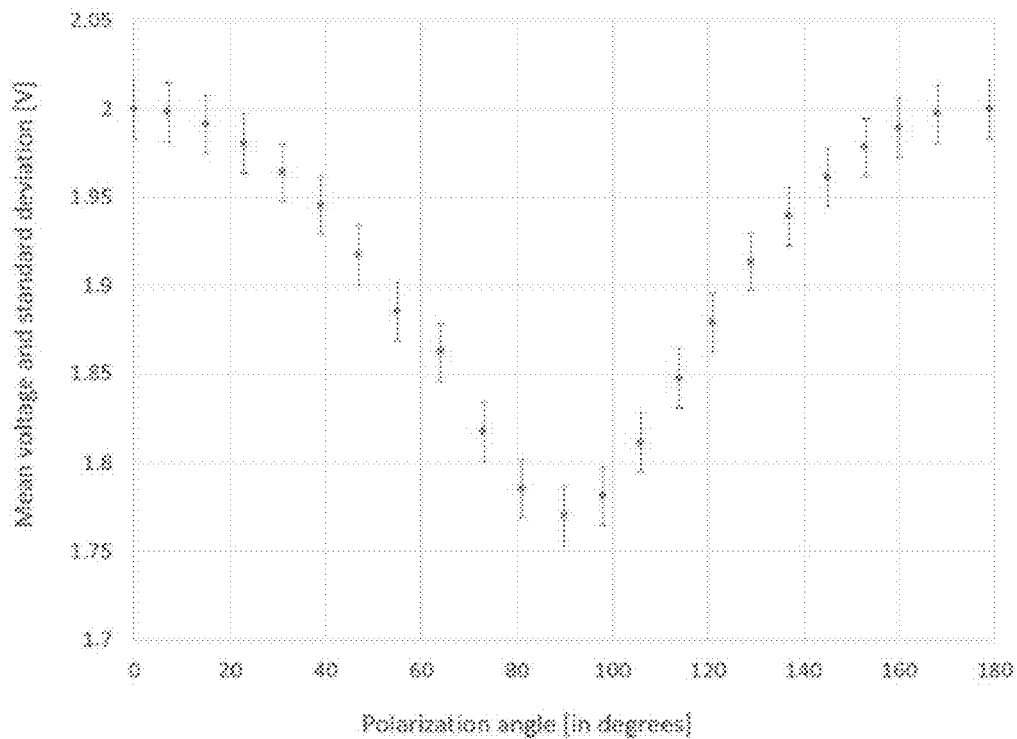
FIG. 59: Experimental results for the logarithmic CMOS sensor.

For each angle, the mean sensor value was calculated from the 151 pixel by 151 pixel array each with 91 frames (samples). FIG. 59 shows these results, plotting mean and std. dev. of the signal value for selected angles.

Just like for the linear CMOS sensor, when the angles of the two polarizers match (0° in the plot), the logarithmic CMOS sensor reading is at a maximum. Also, when the two angles are 90° apart the sensor voltage reading is at its minimum.

Figure 60:
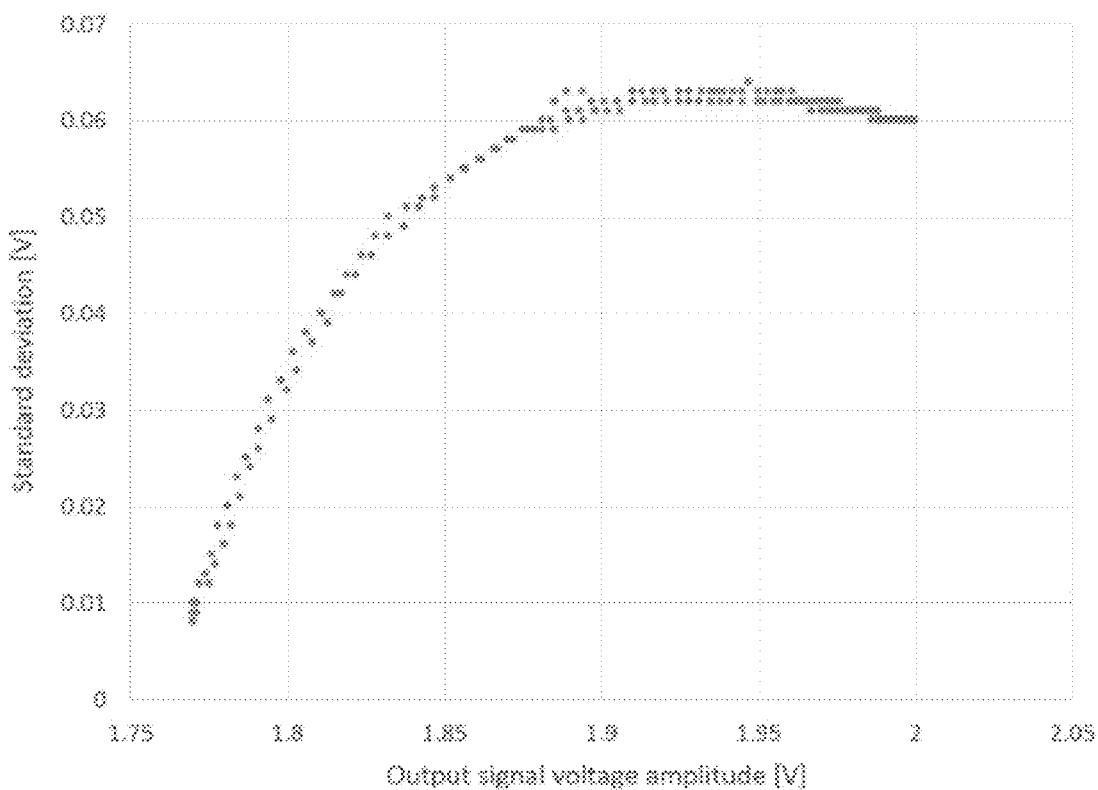
FIG. 60: Standard deviation versus mean signal for the logarithmic CMOS sensor.

FIG. 60 shows the relationship between the standard deviation and received signal for the logarithmic CMOS sensor. We can see from the figure that the relationship between the standard deviation and received signal increases for low light intensities and then is flat for higher light intensities. This style of detector provides interesting opportunities for the construction of systems that are limited by high shot noise at high signal amplitudes.

Example 3: Channel Coding

Example 3 describes the channel coding which is used to overcome noise problems that are an intrinsic part of the optical and electrical portions of the system.

In Example 1, we showed how 2 and 3 channel PDM systems work with a linear CMOS sensor. As we can see from that analysis, the 2 and 3 channel systems have wide enough noise margins that the receiver's channel outputs can easily recover the transmitter's input binary sequences.

For the four channel system as we observed that the noise margins are not wide enough so that 4 receivers' output channels are error free. In order to have an error free 4 channel system we need to introduce some simple channel coding techniques on the input transmitter's side and the output receiver's side. Note that in this example we refer to the techniques that we are proposing as channel coding. In the literature, it is occasionally referred to as line coding; however, we will consistently refer to it as channel coding.

Channel Coding Techniques at the Transmitter

Channel coding techniques on the input transmitter side of the system are based on applying different amplitudes for different input data channel's lasers. Each input data channel's laser is emitting a visible light beam with a defined light power. These visible light beams represent binary sequences.

Each data channel's light beam is not polarized and it is represented with the Stokes vector $SIN=[IT\ 0\ 0\ 0]^T$ where IT is the amplitude of the light signal. In order to perform channel coding on the transmitter side, we apply different values of IT to different input channels.

So if an input data channel's laser is sending binary value of '1' then the Stokes vector is $S_{IN1}=[G1IT\ 0\ 0\ 0]^T$ and when the laser is sending binary value of '0' then the Stokes vector is ideally close to $S_{IN2}=[0\ 0\ 0\ 0]^T$. Note that G1 is the channel's gain factor for a binary '1' and its value can be less than 1 or greater than 1.

The above approach allows the light amplitude for a binary '1' to vary from channel to channel (i.e., the gain G1 is channel specific). Occasionally it is also desirable to have a non-zero light amplitude when transmitting a binary '0'. In this case, the transmitter sends light with a Stokes vector $S_{IN2}=[G0IT\ 0\ 0\ 0]^T$. As above, G0 is channel specific. In each of the cases we illustrate below, G0<1.

Channel Decoding Techniques at the Receiver

Our general approach to channel decoding at the receiver is enabling multiple comparator threshold levels to be operational based on the input symbols received on other channels.

This is accomplished by employing multiple comparators in parallel and selecting which comparator output is relevant based on the received value from another channel or channels.

Specifically, on the receiver side of the 4 channel system we have one of the following three cases:

Regular receiver channel with one comparator

Receiver channel with 2 comparators with different thresholds and 2-to-1 multiplexer Receiver channel with 3 comparators with different thresholds and 3-to-1 multiplexer In the examples below, we describe all three channel decoding techniques used on the receiver's side of the 4 channel system.

Regular Receiver Channel with One Comparator

Figure 61:
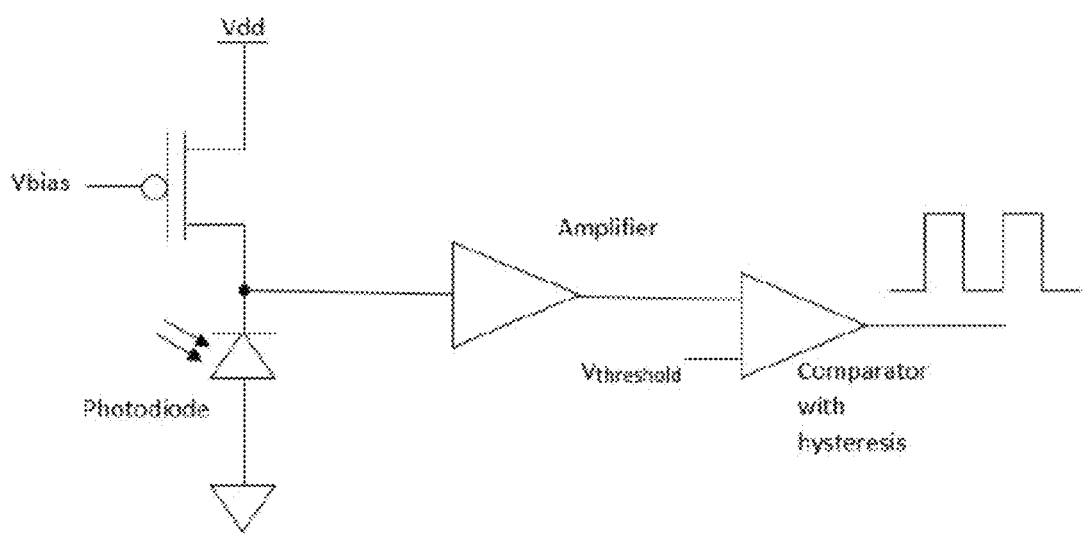
FIG. 61: Regular receiver channel with one comparator.

FIG. 61 shows a regular receiver channel with one comparator.

In this case the light signal is converted into an electrical current and then into an electrical voltage and then amplified before it reaches the comparator with hysteresis. The amplified electrical voltage signal is compared with the comparator threshold voltage to output either $V_{dd}$ or binary '1' or 0 or binary '0'. This receiver is one used in this disclosure.

Receiver Channel with Two Comparators

Figure 62:
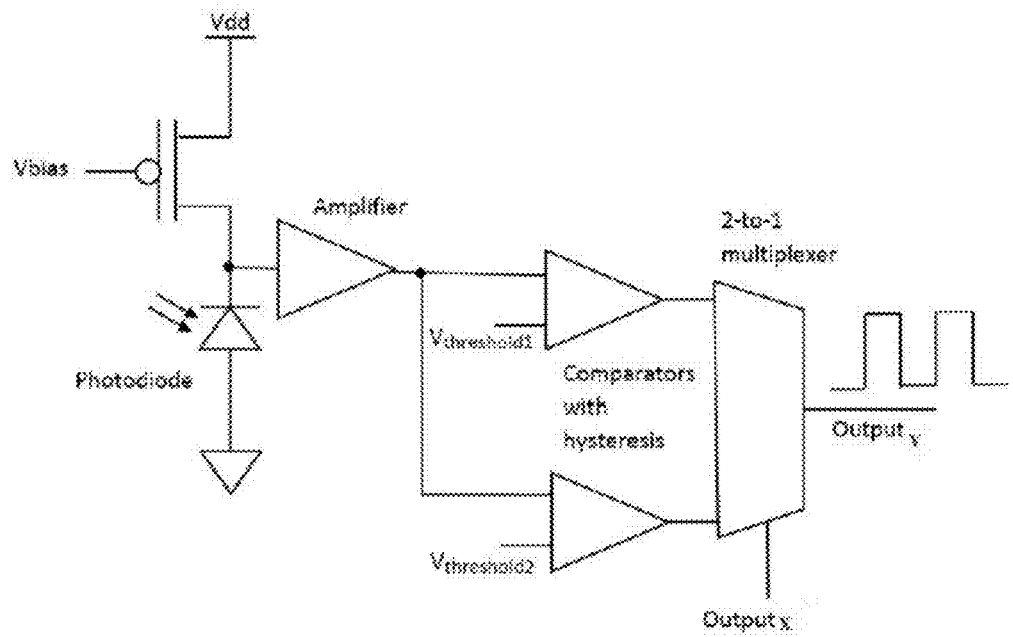
FIG. 62: Receiver channel with 2 comparators with different thresholds and 2-to-1 multiplexer.

The general approach to a multiple-threshold decoding is to have different thresholds sepa-rating the two output states that are dependent upon the decoded output from a different channel. FIG. 62 shows a receiver channel decoder with 2 comparators with different thresholds and 2-to-1 multiplexer.

In this case the channel's light signal is converted into an electrical current and then into an electrical voltage. The electrical voltage signal is then amplified before it is delivered, in parallel, to two comparators with hysteresis. The amplified electrical voltage signal is compared with each comparator's threshold voltage.

Depending on the value of the control signal OutputX as shown in FIG. 62 one of the two comparator outputs represents the receiver data channel's output OutputY. Note that the control signal OutputX is an output of different receiver data channel in the same system.

Receiver Channel with Three Comparators

Figure 63:
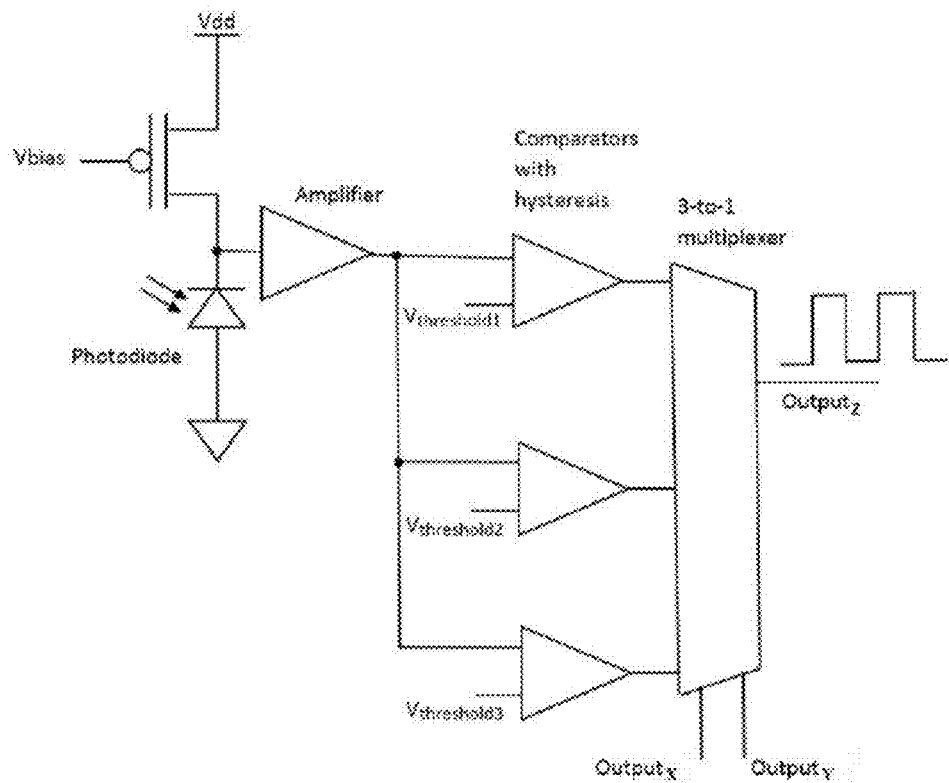
FIG. 63: Receiver channel with 3 comparators with different thresholds and 3-to-1 multiplexer.

The notion just described can easily be extended to more than just 2 thresholds. FIG. 63 shows a receiver channel with 3 comparators with different thresholds and a 3-to-1 multiplexer.

In this case the light signal is converted into an electrical current and then an electrical voltage. This voltage signal is then amplified before it reaches three comparators with hysteresis.

The amplified electrical voltage signal is compared with each comparator's different threshold voltage, and the three outputs are input to a 3-to-1 multiplexer. Depending on the values of the control signals OutputX and OutputY, one of the three comparator output signals represents the channel's output OutputZ. Note that the control signals OutputX and OutputY are outputs of different receiver data channels in the same system.

Channel Coding for a Four Channel System

In this example, we will describe a sufficient channel coding design that enables the four channel system of Example 1 to successfully decode all 16 combinations of binary input symbols. To make the example more concrete, we will exploit the measured data from Example 2 to quantify the operation of the system.

For the four channel system, we will use four values from the experimental data, at 0°, 45°, 90°, and 135°. These data are repeated in Table 5.1, with the signal level normalized to 1 (so as to ease comparisons with the analysis of Example 1).

TABLE 5.1

4 channel system experimental data.

| Angle | ADC value | Signal level |
|---|---|---|
| 0° | 3330 | 0.81304 |
| 45° | 1623 | 0.396315 |
| 90° | 53 | 0.012956 |
| 135° | 1944 | 0.0174507 |

Table 5.2 shows the 0° input laser data channel that represents binary stream b'0101010101010101'. For $S_{0°}$ if the light signal is sent, the Stokes vector is defined as $S_{0°}=0.81304[1\ 1\ 0\ 0]^T=[0.81304\ 0.81304\ 0\ 0]^T$, and if the light signal is not sent the Stokes vector is defined as $S_{0°}=[0\ 0\ 0\ 0]^T$.

TABLE 5.2

0° channel polarized light laser input.

| Binary input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Stokes vector | 0 | 0.813 | 0 | 0.813 | 0 | 0.813 | 0 | 0.813 | 0 | 0.813 | 0 | 0.813 | 0 | 0.813 | 0 | 0.813 |
|  | 0 | 0.813 | 0 | 0.813 | 0 | 0.813 | 0 | 0.813 | 0 | 0.813 | 0 | 0.813 | 0 | 0.813 | 0 | 0.813 |
|  | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 | 0 | 0 | 0 | 0 |

Table 5.3 shows 45° input laser data channel that represents binary stream b'0011001100110011'. For $S_{45°}$ if the light signal is sent $S_{45°}=0.59596[1\ 0\ 1\ 0]^T=[0.59596\ 0\ 0.59596\ 0]^T$ and if the light signal is not sent $S_{45°}=[0\ 0\ 0\ 0]^T$. Notice that 45° input laser data channel has 0.733 amplitude of the 0° input laser data channel.

Table 5.4 shows 90° input laser data channel that represents binary stream b'0000111100001111'. For $S_{90°}$ if the light signal is sent, $S_{90°}=0.91874[1\ -1\ 0\ 0]^T=[0.91874\ -0.91874\ 0\ 0]^T$ and if the light signal is not sent (i.e., the system wishes to transmit a binary '0'), $S_{90°}=0.59596[1\ -1\ 0\ 0]^T=[0.59596\ -0.59596\ 0\ 0]^T$. Here, notice that the 90° input laser data channel has 0.733 amplitude of the 0° input laser data channel when it is sending data value '0' and 1.13 amplitude of the 0° input laser data channel when it is sending data value '1'.

TABLE 5.3

45° channel polarized light laser input.

| Binary input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Stokes vector | 0 | 0 | 0.596 | 0.596 | 0 | 0 | 0.596 | 0.596 | 0 | 0 | 0.596 | 0.596 | 0 | 0 | 0.596 | 0.596 |
| | 0 | 0 | 0 | 0 | 0 | 0 | 0 | 0 | 0 | 0 | 0 | 0 | 0 | 0 | 0 | 0 |
| | 0 | 0 | 0.596 | 0.596 | 0 | 0 | 0.596 | 0.596 | 0 | 0 | 0.596 | 0.596 | 0 | 0 | 0.596 | 0.596 |
| | 0 | 0 | 0 | 0 | 0 | 0 | 0 | 0 | 0 | 0 | 0 | 0 | 0 | 0 | 0 | 0 |

TABLE 5.4

90° channel polarized light laser input

| Binary input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Stokes vector | 0.596 | 0.006 | 0.596 | 0.596 | 0.939 | 0.919 | 0.939 | 0.919 | 0.098 | 0.396 | 0.096 | 0.380 | 0.919 | 0.939 | 0.919 | 0.919 |
| | −0.6 | −0.6 | −0.6 | −0.6 | −0.92 | −0.92 | −0.92 | −0.92 | −0.6 | −0.6 | −0.6 | −0.6 | −0.6 | −0.92 | −0.92 | −0.92 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |

Table 5.5 shows 135° input laser data channel that represents binary stream b'0000000011111111'. For $S_{135°}$ if the light signal is sent from transmitter laser and polarized $S_{135°}=0.97565[1\ 0\ -1\ 0]^T=[0.97565\ 0\ -0.97565\ 0]^T$ and if the light signal is not sent $S_{135°}=[0\ 0\ 0\ 0]^T$. Notice that 135° input laser data channel has 1.2 amplitude of the 0° input laser data channel when it is sending data.

TABLE 5.5

135° channel polarized light laser input.

| Binary input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Stokes vector | 0 | 0 | 0 | 0 | 0 | 0 | 0 | 0 | 0.976 | 0.976 | 0.976 | 0.976 | 0.976 | 0.976 | 0.976 | 0.976 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | −0.98 | −0.98 | −0.98 | −0.98 | −0.98 | −0.98 | −0.98 | −0.98 |
| | 0 | 0 | 0 | 0 | 0 | 0 | 0 | 0 | 0 | 0 | 0 | 0 | 0 | 0 | 0 | 0 |

All 4 input LED data channels are added together $$S_{IN}=S_{0°}+S_{45°}+S_{90°}+S_{135°} \quad (5.1)$$

after the transmitter input polarization filter array and they travel through the air used as the transmission media in this example, until they reach the receiver polarization filter array. Table 5.6 shows all 4 channels' combined optical signal as it travels through the air between input and output polarization filter arrays.

TABLE 5.6

All 4 polarized channels' light signals combined.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Stokes vector | 0.096 | 1.409 | 1.192 | 2.005 | 0.019 | 1.732 | 1.015 | 2.336 | 1.572 | 2.385 | 2.168 | 2.981 | 1.894 | 2.707 | 2.49 | 3.303 |
| | −0.6 | 0.217 | −0.5 | 0.237 | −0.92 | −0.11 | −0.92 | −0.11 | −0.6 | 0.217 | −0.6 | 0.217 | −0.82 | −0.11 | −0.92 | −0.11 |
| | 0 | 0 | 0.596 | 0.596 | 0 | 0 | 0.096 | 0.596 | −0.98 | −0.98 | −0.38 | −0.38 | −0.98 | −0.98 | −0.38 | −0.38 |
| | 0 | 0 | 0 | 0 | 0 | 0 | 0 | 0 | 0 | 0 | 0 | 0 | 0 | 0 | 0 | 0 |

The receiver defined in Example 1 will yield 4 distinct channel outputs as shown in Table 5.7. Receiver outputs $I_{0°}$, $I_{45°}$, $I_{90°}$ and $I_{135°}$ are shown in the Table 5.7 and they are calculated using the same approach as in Example 1.

TABLE 5.7

| | All 4 receiver channels' output signals. | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| $I_{0°}$ | 0.001 | 0.406 | 0.15 | 0.553 | 0.062 | 0.507 | 0.151 | 0.656 | 0.245 | 0.63 | 0.304 | 0.799 | 0.246 | 0.658 | 0.296 | 0.8 |
| $I_{45°}$ | 0.149 | 0.352 | 0.445 | 0.649 | 0.23 | 0.433 | 0.526 | 0.729 | 0.151 | 0.358 | 0.415 | 0.657 | 0.232 | 0.435 | 0.529 | 0.732 |
| $I_{90°}$ | 0.296 | 0.299 | 0.445 | 0.448 | 0.157 | 0.488 | 0.636 | 0.608 | 0.84 | 0.542 | 0.689 | 0.481 | 0.701 | 0.706 | 0.85 | 0.852 |
| $I_{135°}$ | 0.149 | 0.352 | 0.15 | 0.54 | 0.23 | 0.633 | 0.231 | 0.484 | 0.684 | 0.536 | 0.636 | 0.839 | 0.215 | 0.018 | 0.717 | 0.92 |

Receiver output $I_{0°}$ for the 0° polarization data channel is obtained by applying comparator with threshold of 0.4 on data points from Table 5.7. From that data processing Table 5.8 is obtained which shows IV or 0° polarization data channel output binary stream is b'0101010101010101' as is expected.

TABLE 5.8

| | 0° polarization data receiver channel output signals. | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| $I_0$ | 0 | 1 | 0 | 1 | 0 | 1 | 0 | 1 | 0 | 1 | 0 | 1 | 0 | 1 | 0 | 1 |

Receiver output $I_{45°}$ for the 45° polarization data channel is obtained by applying comparator with threshold 0.44 on data points from Table 5.7. From that comparator data processing Table 5.9 is obtained and this table shows $I_{45°}$ or 45° polarization data channel output binary stream is b'0011001100110011' as is expected.

TABLE 5.9

| | 45° polarization data receiver channel output signals. | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| $I_{45}$ | 0 | 0 | 1 | 1 | 0 | 0 | 1 | 1 | 0 | 0 | 1 | 1 | 0 | 0 | 1 | 1 |

Receiver output $I_{135°}$ for the 135° polarization data channel is obtained by applying comparator with threshold of 0.445 on data points from the Table 5.7. From that comparator data processing Table 5.10 is obtained and this table shows $I_{135°}$ or 135° polarization data channel output binary stream is b'0000000011111111' as is expected.

TABLE 5.10

| | 135° polarization data receiver channel output signals. | | | | | | | | | | | | | | | |
|---|---|---|---|---|---|---|---|---|---|---|---|---|---|---|---|---|
| Input | 0 | 1 | 2 | 3 | 4 | 5 | 6 | 7 | 8 | 9 | 10 | 11 | 12 | 13 | 14 | 15 |
| $I_{135}$ | 0 | 0 | 0 | 0 | 0 | 0 | 0 | 0 | 1 | 1 | 1 | 1 | 1 | 1 | 1 | 1 |

Finally, receiver output $I_{90°}$ for the 90° polarization data channel is obtained by applying two comparators with thresholds 0.45 and 0.695 on data points from the Table 5.7. From those two comparators' data processing, Table 5.11 is obtained.

The data from Table 5.11 shows two comparator outputs for 90° polarization data receiver channel $I_{90°}$ for threshold 0.45 and $I_{90°}$ for threshold 0.695. Both of these 90° polarization data receiver channel's comparator outputs are inputs to 2-to-1 multiplexer controlled by the output from the 135° polarization data channel.

TABLE 5.11

90° polarization data receiver channel two comparators outputs.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{90} > 0.45$ | 0 | 0 | 0 | 0 | 1 | 1 | 1 | 1 | 1 | 1 | 1 | 1 | 1 | 1 | 1 | 1 |
| $I_{90} > 0.695$ | 0 | 0 | 0 | 0 | 0 | 0 | 0 | 0 | 0 | 0 | 0 | 0 | 1 | 1 | 1 | 1 |

Figure 64:
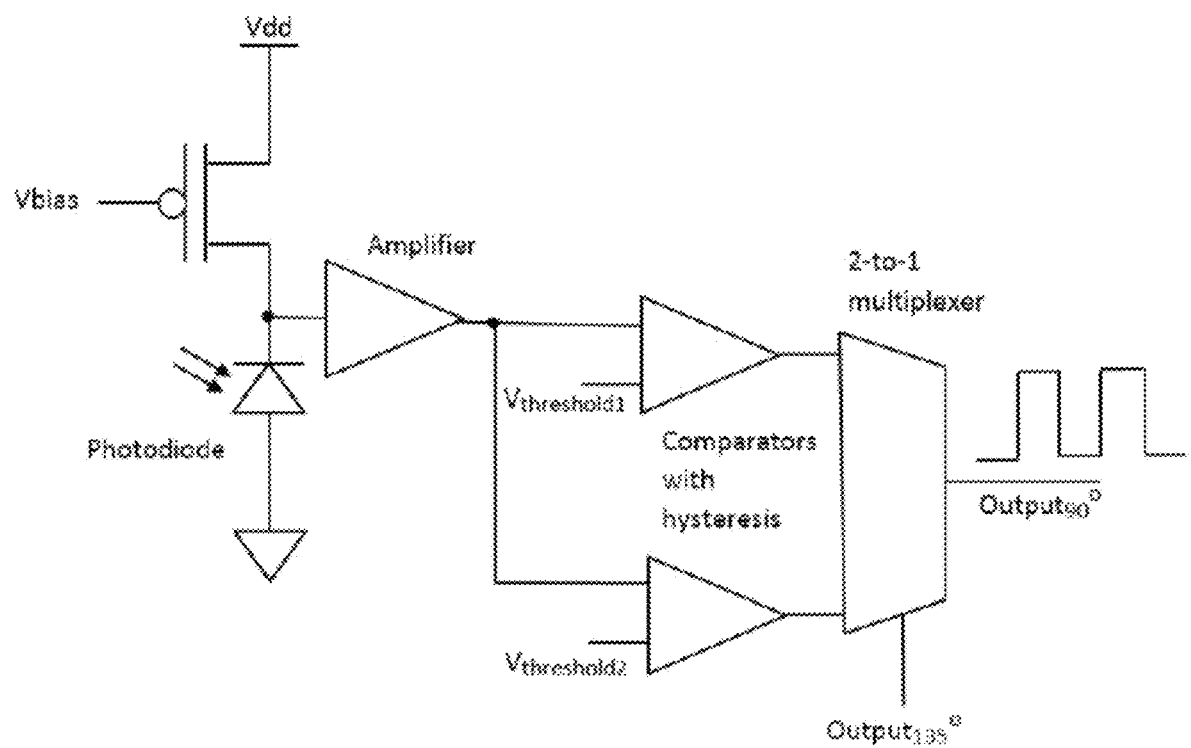
FIG. 64: 90° data channel circuit with 2 comparators and 2-to-1 multiplexer.

FIG. 64 shows the 90° data channel circuit block diagram on the receiver with two comparators and 2-to-1 multiplexer used for simple channel coding to recover proper channel data.

If $I_{135°}$ output is equal to b'0', then $I_{90°}$ polarization data with comparator threshold of 0.45 is 90° polarization data channel output and if $I_{135°}$ is equal to b'1', then $I_{90°}$ polarization data with comparator threshold of 0.695 is 90° polarization data channel output.

In this way we apply simple channel coding hardware based routine on the receiver's output side that creates proper binary data stream on the 90° polarization data channel output without any errors. This is shown in Table 5.12 which indicates that the 90° polarization data channel output binary stream is b'0000111100001111' is as expected.

TABLE 5.12

90° polarization data receiver channel output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{90}$ | 0 | 0 | 0 | 0 | 1 | 1 | 1 | 1 | 0 | 0 | 0 | 0 | 1 | 1 | 1 | 1 |

Example 4: Channel Models

Example 4 describes different 2, 3 and 4 channel VLC PDM system models with transmission media such as air, fiber optic cables, and air with mirror reflections. This example describes all these models analytically and using Cadence simulation.

In Example 1, we analyzed and simulated the receiver side of the 2, 3, and 4 channel VLC PDM systems assuming air as the transmission media. We now extend that work to include more of the optical path. Specifically, in this example we include in the analysis the polarization filters at the light source.

In addition, we will extend the transmission media investigations to include two more light paths. The first is a fiber-optic cable and the second is a free-space path that includes a pair of mirrors. For each of these channel models, we will analyze a 2, 3, and 4 channel system, and for the 4 channel systems will include channel coding as described in Example 3.

VLC PDM Systems with Air Transmission Media
Two Channel System

Figure 65:
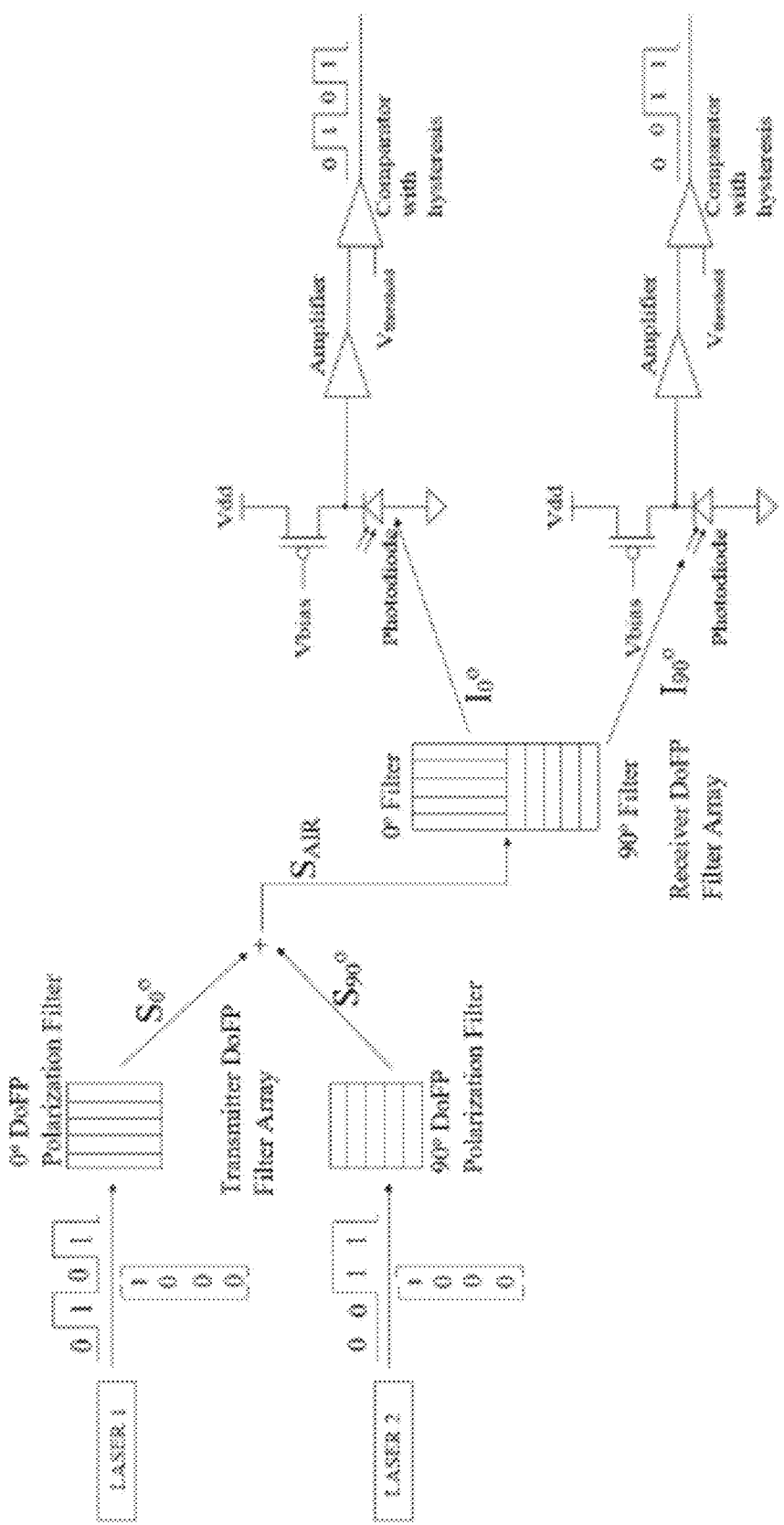
FIG. 65: Two channel system with air used as transmission media.

A diagram of the 2 channel VLC PDM system with air used as transmission media is shown in FIG. 65. The transmitter side of the system has two lasers that illuminate two light beams in two distinct and different binary patterns creating all four possible binary combinations.

For example, laser 1 light beam is polarized by the 0° DoFP polarization filter and laser 2 is polarized by the 90° DoFP polarization filter. These 0° and 90° polarized light beams are combined into one light beam and they travel through the air that is used as the transmission media. They are again separated by the DoFP polarization filter array bonded on the receiver chip.

Figure 66:
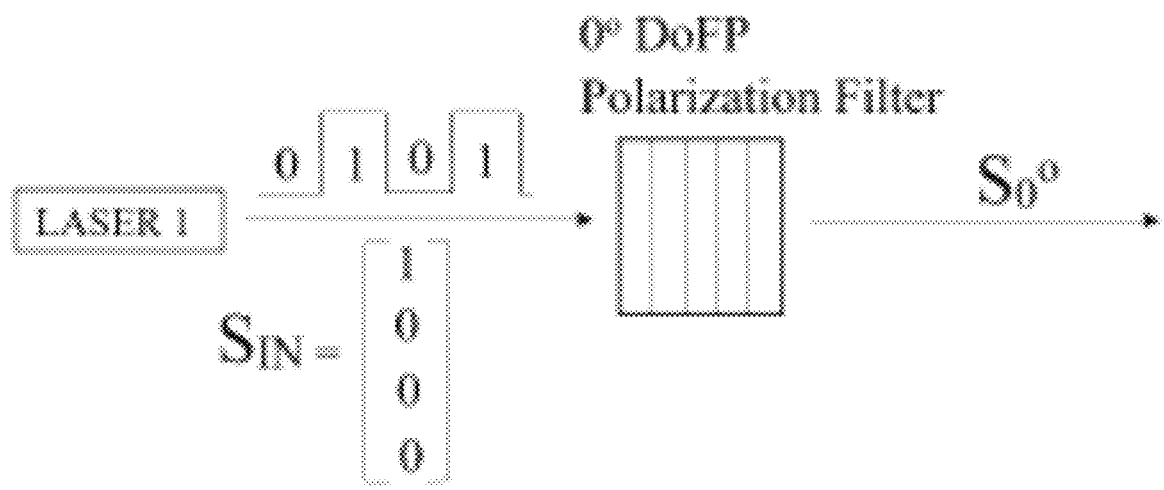
FIG. 66: Transmitter 1 illuminates light in binary sequence b'0101'.

Analysis of this two channel system can be done similarly as we have done the receiver analysis in Example 1. FIG. 66 shows transmitter laser 1 that illuminates light in binary sequence b'0101'. Note that the light beam is non-polarized until it reaches the transmitter's DoFP filter array and is represented with the Stokes vector $S_{IN}=[1\ 0\ 0\ 0]^T$.

When the non-polarized light beam from the transmitter laser 1 reaches DoFP filter array it gets polarized. This light beam is polarized with 0° DoFP polarization filter that has Mueller matrix representation $M\Theta$ as shown in Example 1, equation (3.2).

The output of the 0° DoFP polarization filter is the light beam that still represents the binary sequence b'0101' and its Stokes vector representation is defined as $S_{0°}$ which represents the Stokes vector for 0° polarized light. The Stokes vector $S_{0°}$ is shown below.

$$S_{0°} = M_{0°}S_{IN} = \frac{1}{2}\begin{bmatrix} (p_x^2 + p_y^2) \\ (p_x^2 - p_y^2)\cos(2\Theta) \\ (p_x^2 - p_y^2)\sin(2\Theta) \\ 0 \end{bmatrix} \quad (6.1)$$

We can use the measured parameters for Aluminum nanowire filters as we did in Example 1.

$$T = (p_x^2 + p_y^2) = \frac{1}{2} \quad (6.2)$$

$$D = \frac{(p_x^2 - p_y^2)}{(p_x^2 + p_y^2)} = 0.99 \quad (6.3)$$

Also since the polarization angle $\theta=0°$ we can see that $S_{0°}$ can be expressed as $$S_{0°} = \frac{1}{2}\begin{bmatrix} T \\ TD\cos(0°) \\ TD\sin(0°) \\ 0 \end{bmatrix} = \frac{1}{2}\begin{bmatrix} \frac{1}{2} \\ \frac{0.99}{2} \\ 0 \\ 0 \end{bmatrix} = \begin{bmatrix} 0.25 \\ 0.2475 \\ 0 \\ 0 \end{bmatrix} \quad (6.4)$$

Figure 67:
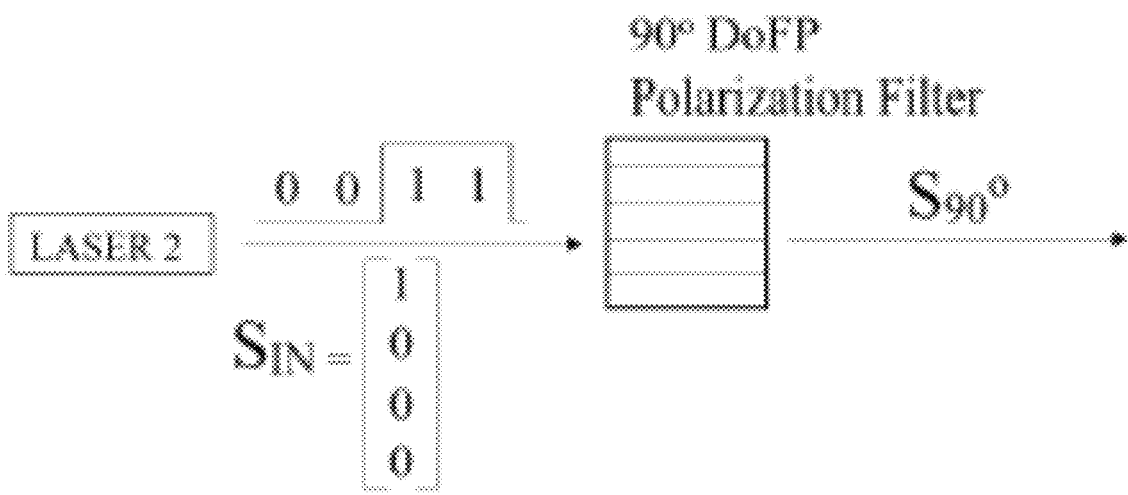
FIG. 67: Transmitter 2 illuminates light in binary sequence b'0011'.

FIG. 67 shows transmitter chip laser 2 that illuminates with binary sequence b'0011'. The light source is also represented with Stokes vector SIN=[1 0 0 0]$^T$. This light beam is polarized with a 90° DoFP polarization filter that has the same Mueller matrix representation MΘ as the 0° DoFP polarization filter but with an angle of 90°.

The output of the 90° DoFP polarization filter is the light beam that represents the binary sequence b'0011' and its Stokes vector representation is defined as $S_{90°}$ which represents the Stokes vector for 90° polarized light. The Stokes vector $S_{90°}$ is shown below.

$$S_{90°} = M_{90°}S_{IN} = \frac{1}{2}\begin{bmatrix}(p_x^2 + p_y^2) \\ (p_x^2 - p_y^2)\cos(2\Theta) \\ (p_x^2 - p_y^2)\sin(2\Theta) \\ 0\end{bmatrix} \quad (6.5)$$

We use again the measured values for parameters T and D. Also since the polarization angle θ=90° we can see that $S_{90°}$ can be expressed as $$S_{90°} = \frac{1}{2}\begin{bmatrix}T \\ TD\cos(180°) \\ TD\sin(180°) \\ 0\end{bmatrix} = \frac{1}{2}\begin{bmatrix}\frac{1}{2} \\ -0.99 \\ \frac{2}{0} \\ 0\end{bmatrix} = \begin{bmatrix}0.25 \\ -0.2475 \\ 0 \\ 0\end{bmatrix} \quad (6.6)$$

Figure 68:
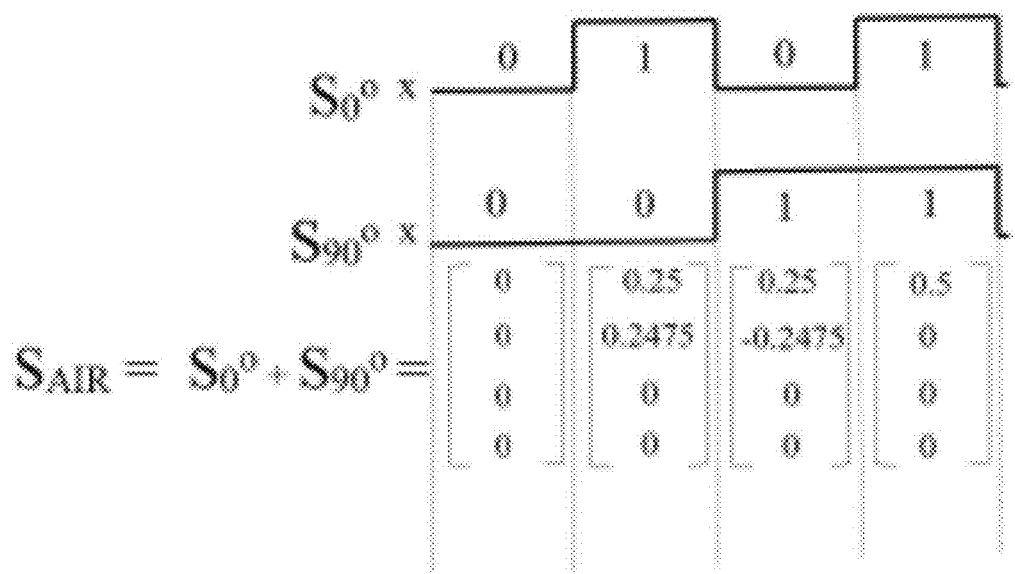
FIG. 68: Two combined light signals.

Two polarized light beams are combined in the air as shown in FIG. 68. The combined light beam is defined as $$S_{AIR}=b_0 S_{0°}+b_{90}S_{90°} \quad (6.7)$$

where $b_0$ and $b_{90}$ are binary 0 or 1 representing the data to be transmitted.

The combined light beam SAM will be filtered through each of the 0° and 90° filters on the receiver and light input to the photodiodes is represented by $I_{0°}$ and $I_{90°}$, which are $$\begin{aligned}I_{0°} &= [1\ 0\ 0\ 0]M_{0°}S_{AIR} & (6.8)\\ &= [1\ 0\ 0\ 0]M_{0°}[S_0\ S_1\ S_2\ S_3]^T & (6.9)\\ &= \frac{1}{2}\left(\frac{1}{2}S_0 + \frac{0.99}{2}S_1\right) & (6.10)\end{aligned}$$

$$\begin{aligned}I_{90°} &= [1\ 0\ 0\ 0]M_{90°}S_{AIR} & (6.11)\\ &= [1\ 0\ 0\ 0]M_{90°}[S_0\ S_1\ S_2\ S_3]^T & (6.12)\\ &= \frac{1}{2}\left(\frac{1}{2}S_0 - \frac{0.99}{2}S_1\right) & (6.13)\end{aligned}$$

We can now calculate all four possible values for each channel and we obtain Table 6.1. The table shows each channel (0° and 90°) photodiode light signal and $I_{90°}$. These signals are converted to an electrical signal, amplified, and compared to a threshold.

TABLE 6.1

Outputs from air 2 channel system.

| $I_{90°}$ | $I_{0°}$ | Output$_{90°}$ | Output$_{0°}$ |
|---|---|---|---|
| 0 | 0 | 0 | 0 |
| 0.001244 | 0.123756 | 0 | 1 |
| 0.123756 | 0.001244 | 1 | 0 |
| 0.125 | 0.125 | 1 | 1 |

With a threshold that corresponds to 0.06, the binary outputs that are intended are correctly recovered.

Three Channel System

Figure 69:
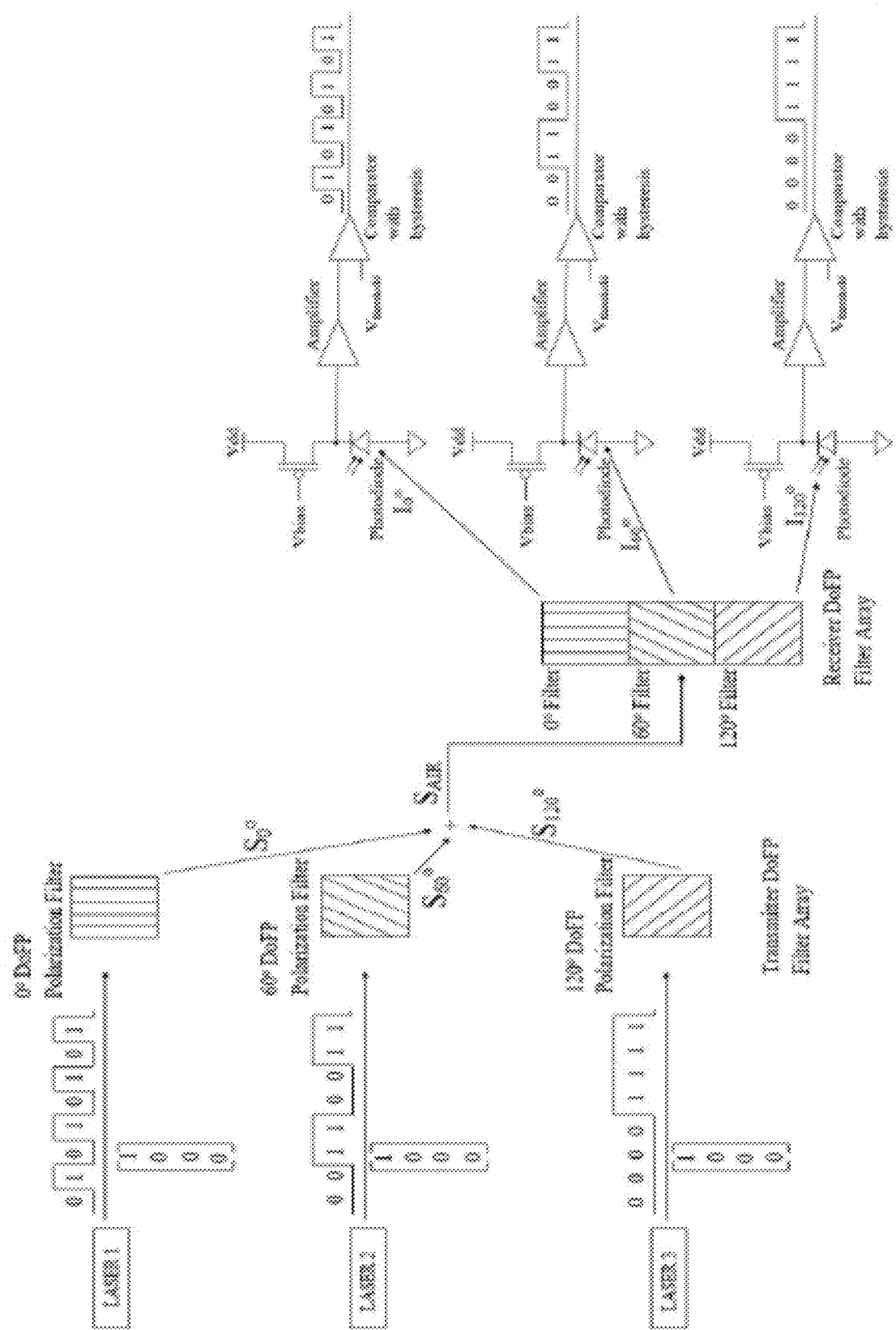
FIG. 69: Three channel system with air used as transmission media.

A diagram of the three channel VLC PDM system with air used as transmission media is shown in FIG. 69. The transmitter side of the system has three lasers that illuminate three light beams using three distinct and different binary patterns creating all eight possible binary combinations.

Laser 1 illuminates the light beam in binary pattern b'01010101', laser 2 illuminates the light beam in binary pattern b'00110011' and laser 3 illuminates the light beam in binary pattern b'00001111'. All three light beams are not polarized when they are initially transmitted from the lasers and before they reach the filter array at the transmitter.

After the transmitter filter array, the 0°, 60° and 120° polarized light beams are combined into one light beam as they travel through the air that is used as transmission media and they are again separated by 0°, 60° and 120° DoFP polarization filters that are bonded on the surface of the receiver chip.

Figure 70:
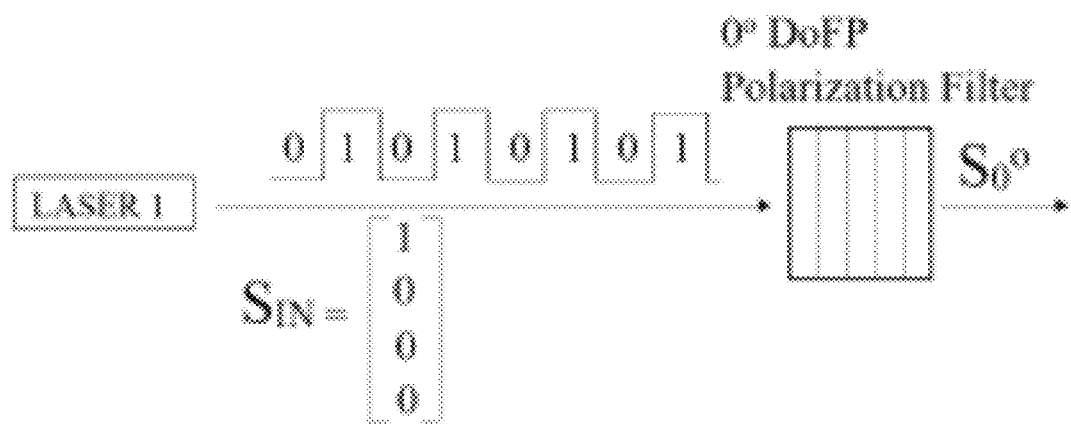
FIG. 70: Transmitter 1 illuminates light in binary sequence b'01010101'.

Analysis of the three channel system with air used as transmission media is performed as above. FIG. 70 shows transmitter chip's laser 1 that illuminates light using binary sequence b'01010101'.

The output of the 0° DoFP polarization filter is the light beam that represents the binary sequence b'01010101' and its Stokes vector representation is defined as $S_{0°}$ which represents the Stokes vector for 0° polarized light. The Stokes vector $S_{0°}$ is shown below.

$$S_{0°} = M_{0°}S_{IN} = \frac{1}{2}\begin{bmatrix}(p_x^2 + p_y^2) \\ (p_x^2 - p_y^2)\cos(2\Theta) \\ (p_x^2 - p_y^2)\sin(2\Theta) \\ 0\end{bmatrix} \quad (6.14)$$

Again, we can use the measured values for parameters T and D. Since the polarization angle θ=0° we can see that $S_{0°}$ can be represented as $$S_{0°} = \frac{1}{2}\begin{bmatrix}T \\ TD\cos(0°) \\ TD\sin(0°) \\ 0\end{bmatrix} = \frac{1}{2}\begin{bmatrix}\frac{1}{2} \\ 0.99 \\ \frac{2}{0} \\ 0\end{bmatrix} = \begin{bmatrix}0.25 \\ 0.2475 \\ 0 \\ 0\end{bmatrix} \quad (6.15)$$

Figure 71:
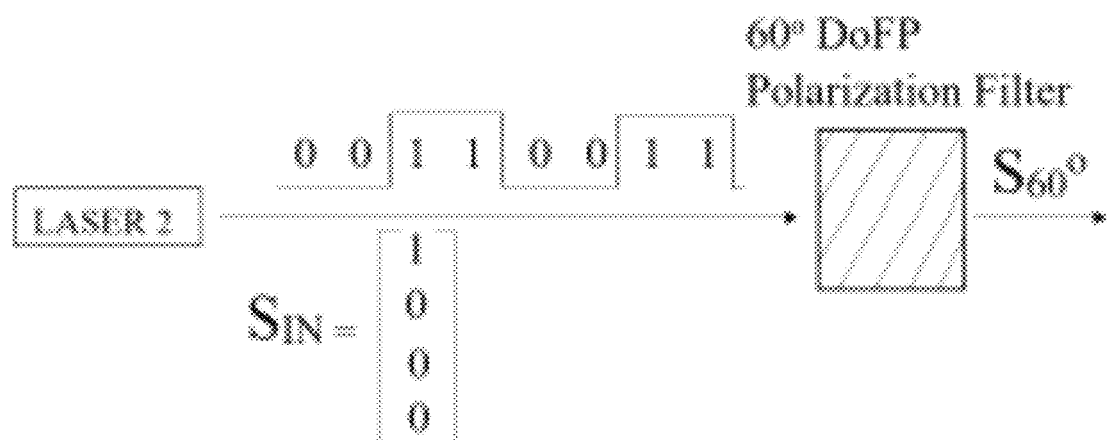
FIG. 71: Transmitter 2 illuminates light in binary sequence b'00110011'.

FIG. 71 shows transmitter chip's laser 2 that illuminates light using binary sequence b'00110011'. That light source is also represented with Stokes vector SIN=[1 0 0 0]$^T$. This light beam is polarized with 60° DoFP polarization filter that has the same Mueller matrix representation MΘ as the 0° DoFP polarization filter has but evaluated with 60° polarization angle.

The output of the 60° DoFP polarization filter is $S_{60°}$ which is shown below.

$$S_{90°} = M_{90°}S_{IN} = \frac{1}{2}\begin{bmatrix}(p_x^2+p_y^2)\\(p_x^2-p_y^2)\cos(2\Theta)\\(p_x^2-p_y^2)\sin(2\Theta)\\0\end{bmatrix} \quad (6.16)$$

Again, we can use the measured values for T and D. Since the polarization angle $\theta=60°$ we can see that $S_{60°}$ can be represented as $$S_{90°} = \frac{1}{2}\begin{bmatrix}T\\TD\cos(120°)\\TD\sin(120°)\\0\end{bmatrix} = \frac{1}{2}\begin{bmatrix}\frac{1}{2}\\-0.99\frac{1}{2}\\0.99\frac{\sqrt{2}}{2}\frac{1}{2}\\0\end{bmatrix} = \begin{bmatrix}0.25\\-0.124\\0.2145\\0\end{bmatrix} \quad (6.17)$$

Figure 72:
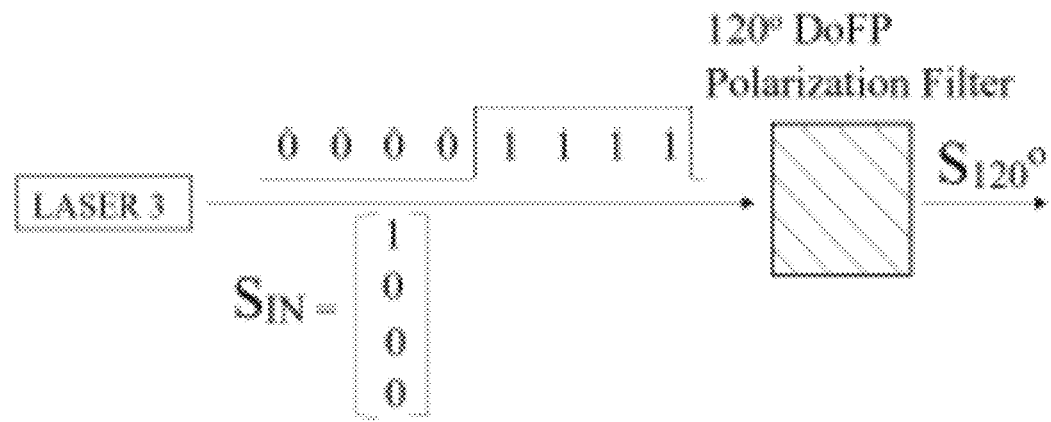
FIG. 72: Transmitter 3 illuminates light in binary sequence b'00001111'.

FIG. 72 shows transmitter chip laser 3 that illuminates light using binary sequence b'00001111'. This light beam is polarized with 120° DoFP polarization filter that has the same Mueller matrix representation $M\Theta$ as the 0° DoFP polarization filter has but evaluated for 120° polarization angle.

The Stokes vector $S_{120°}$ is shown below.

$$S_{180°} = M_{180°}S_{IN} = \frac{1}{2}\begin{bmatrix}(p_x^2+p_y^2)\\(p_x^2-p_y^2)\cos(2\Theta)\\(p_x^2-p_y^2)\sin(2\Theta)\\0\end{bmatrix} \quad (6.18)$$

Since the polarization angle $\theta=120°$ we can see that $S_{120°}$ can be represented as $$S_{120°} = \frac{1}{2}\begin{bmatrix}T\\TD\cos(240°)\\TD\sin(240°)\\0\end{bmatrix} = \frac{1}{2}\begin{bmatrix}\frac{1}{2}\\-0.99\frac{1}{2}\\-0.99\frac{1}{2}\frac{\sqrt{2}}{2}\\0\end{bmatrix} = \begin{bmatrix}0.25\\-0.124\\-0.2145\\0\end{bmatrix} \quad (6.19)$$

Figure 73:
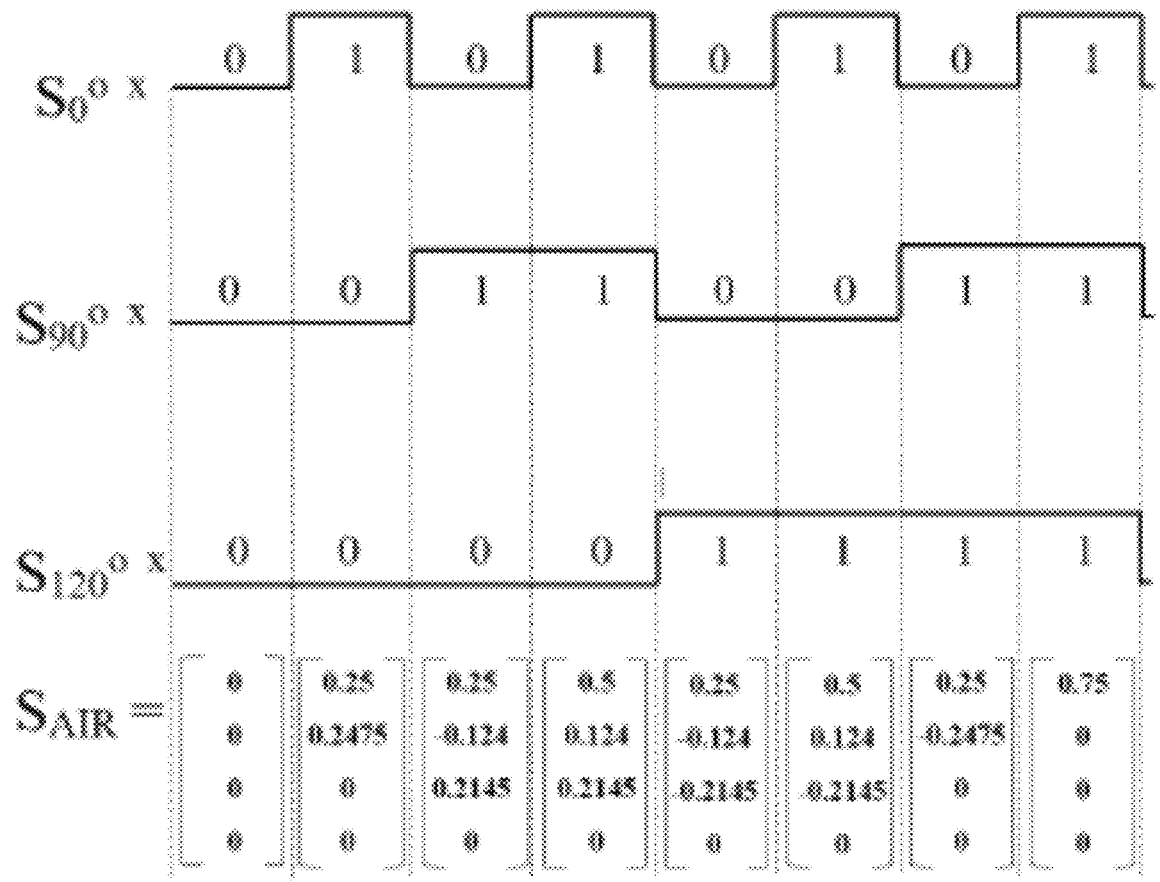
FIG. 73: Three combined light signals.

Three polarized light beams are added together in the air as shown in FIG. 73. The combined light beam is defined as $$S_{AIR} = b_0 S_{0°} + b_{60} S_{60°} + b_{120} S_{120°} \quad (6.20)$$

The combined light beam $S_{AIR}$ is filtered through each of the three 0°, 60° and 120° DoFP polarization filters on the receiver and from here the light inputs to receiver's output channels photodiodes $I_{0°}$, $I_{60°}$ and $I_{120°}$ are defined as $$I_{0°} = [1\ 0\ 0\ 0]M_{0°}S_{AIR} \quad (6.21)$$
$$= [1\ 0\ 0\ 0]M_{0°}[S_0\ S_1\ S_2\ S_3]^T \quad (6.22)$$
$$= \frac{1}{4}S_0 + \frac{0.99}{4}S_1 \quad (6.23)$$

-continued $$I_{90°} = [1\ 0\ 0\ 0]M_{90°}S_{AIR} \quad (6.24)$$
$$= [1\ 0\ 0\ 0]M_{90°}[S_0\ S_1\ S_2\ S_3]^T \quad (6.25)$$
$$= \frac{1}{4}S_0 - \frac{0.99}{8}S_1 + 0.99\frac{\sqrt{3}}{2}S_2 \quad (6.26)$$

$$I_{120°} = [1\ 0\ 0\ 0]M_{120°}S_{AIR} \quad (6.27)$$
$$= [1\ 0\ 0\ 0]M_{90°}[S_0\ S_1\ S_2\ S_3]^T \quad (6.28)$$
$$= \frac{1}{4}S_0 - \frac{0.99}{8}S_1 - 0.99\frac{\sqrt{3}}{2}S_2 \quad (6.29)$$

Now we can calculate all eight values for each of three channels to obtain Table 6.2. The table shows each of the three channels' photodiode light inputs ($I_{0°}$, $I_{60°}$ and $I_{120°}$). Using a threshold of 0.1, it is possible to resolve all eight input combinations. As we can see, noise margins for three channel system are wide enough so that all three input binary sequence are recovered at the receiver's outputs.

TABLE 6.2

Outputs from air 3 channel system.

| $I_{120°}$ | $I_{60°}$ | $I_{0°}$ | Output$_{120°}$ | Output$_{60°}$ | Output$_{0°}$ |
|---|---|---|---|---|---|
| 0 | 0 | 0 | 0 | 0 | 0 |
| 0.031872 | 0.031872 | 0.123756 | 0 | 0 | 1 |
| 0.031869 | 0.123821 | 0.03181 | 0 | 1 | 0 |
| 0.063679 | 0.155631 | 0.15569 | 0 | 1 | 1 |
| 0.123821 | 0.031869 | 0.03181 | 1 | 0 | 0 |
| 0.155631 | 0.063679 | 0.15569 | 1 | 0 | 1 |
| 0.15569 | 0.15569 | 0.06362 | 1 | 1 | 0 |
| 0.1875 | 0.1875 | 0.1875 | 1 | 1 | 1 |

Four Channel System

Figure 74:
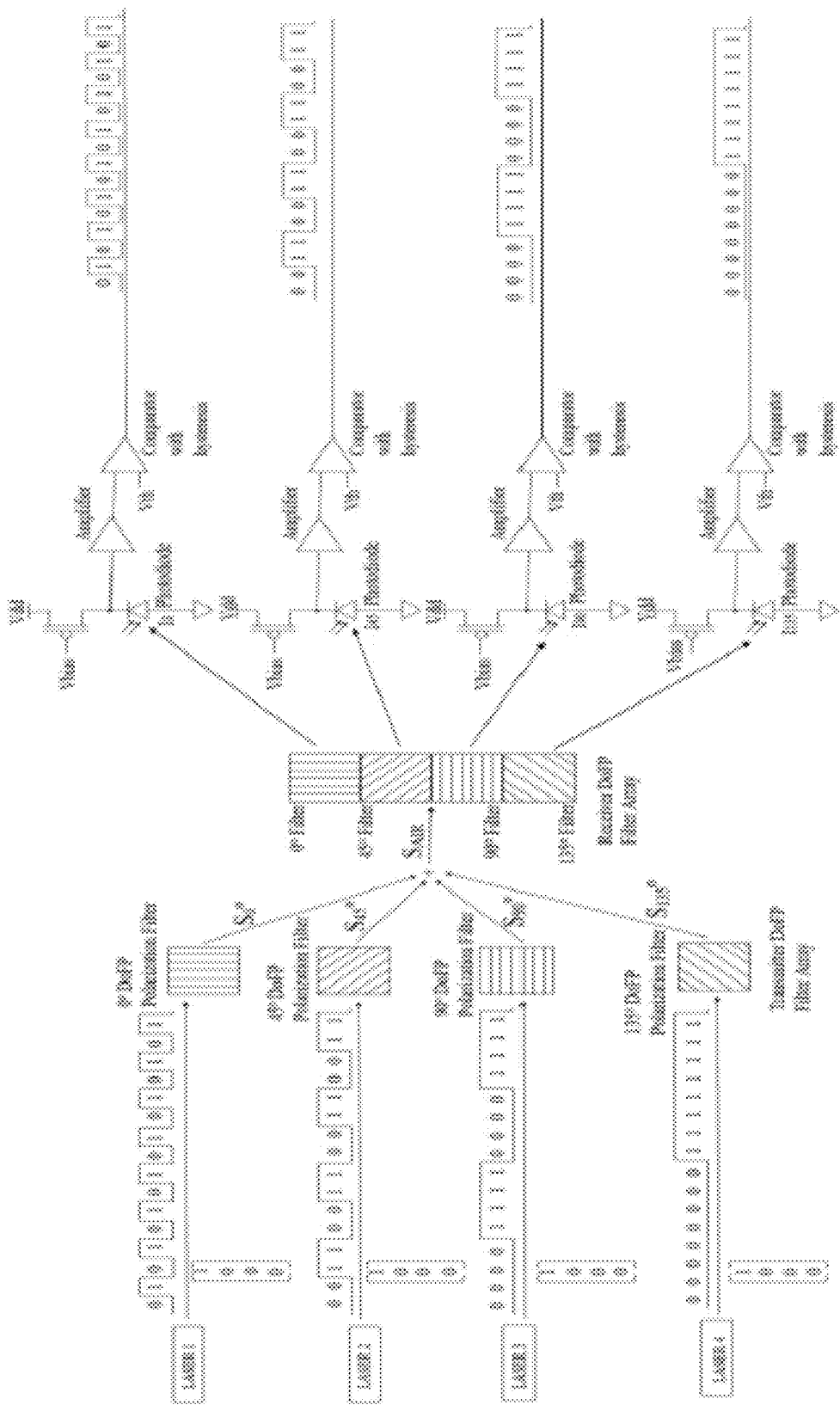
FIG. 74: Four channel system with air used as transmission media.

The four channel system with air as the transmission media is shown in FIG. 74.

The laser 1 light beam is polarized by the 0° DoFP polarization filter, the laser 2 beam is polarized by the 45° DoFP polarization filter, the laser 3 beam is polarized by the 90° DoFP polarization filter and the laser 4 beam is polarized by 135° DoFP polarization filter.

Figure 75:
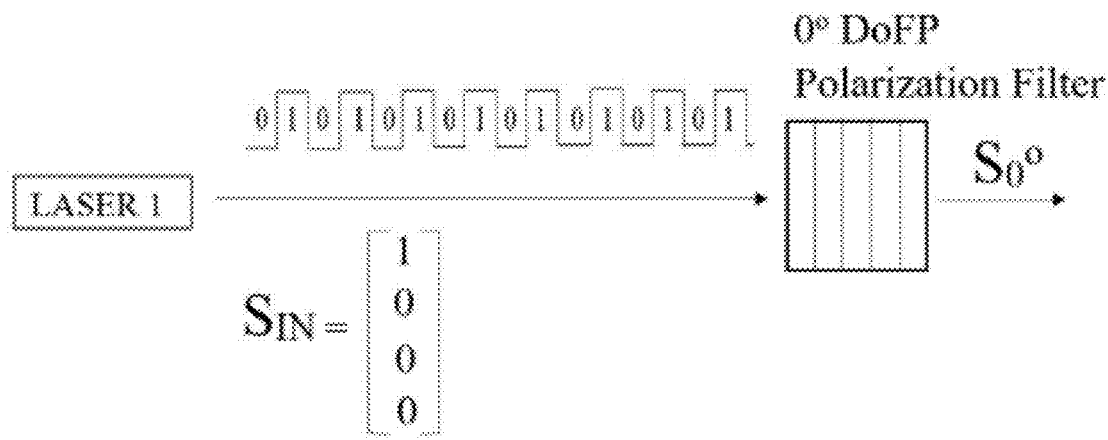
FIG. 75: Transmitter 1 sends sequence b'0101010101010101'.

FIG. 75 shows the transmitter chip's laser 1 that illuminates light using binary sequence b'0101010101010101'.

The Stokes vector $S_{0°}$ is shown below $$S_{0°} = M_{0°}S_{IN} = \frac{1}{2}\begin{bmatrix}(p_x^2+p_y^2)\\(p_x^2-p_y^2)\cos(2\Theta)\\(p_x^2-p_y^2)\sin(2\Theta)\\0\end{bmatrix} \quad (6.30)$$

and $$S_{0°} = \frac{1}{2}\begin{bmatrix}T\\TD\cos(0°)\\TD\sin(0°)\\0\end{bmatrix} = \frac{1}{2}\begin{bmatrix}\frac{1}{2}\\\frac{0.99}{2}\\0\\0\end{bmatrix} = \begin{bmatrix}0.25\\0.2475\\0\\0\end{bmatrix} \quad (6.31)$$

Figure 76:
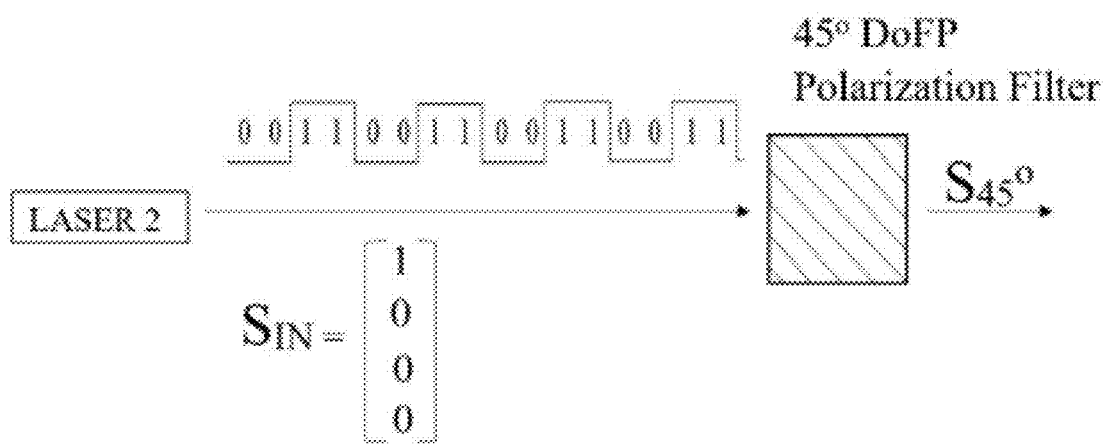
FIG. 76: Transmitter 2 sends sequence b'0011001100110011'.

FIG. 76 shows the transmitter chip's laser 2 that illuminates light in binary sequence b'0011001100110011'.

The Stokes vector $S_{45°}$ is shown below $$S_{45°} = M_{45°}S_{IN} = \frac{1}{2}\begin{bmatrix}(p_x^2 + p_y^2)\\(p_x^2 - p_y^2)\cos(2\Theta)\\(p_x^2 - p_y^2)\sin(2\Theta)\\0\end{bmatrix} \quad (6.32)$$

and $$S_{45°} = \frac{1}{2}\begin{bmatrix}T\\TD\cos(90°)\\TD\sin(90°)\\0\end{bmatrix} = \frac{1}{2}\begin{bmatrix}\frac{1}{2}\\0\\\frac{0.99}{2}\\0\end{bmatrix} = \begin{bmatrix}0.25\\0\\0.2475\\0\end{bmatrix} \quad (6.33)$$

Figure 77:
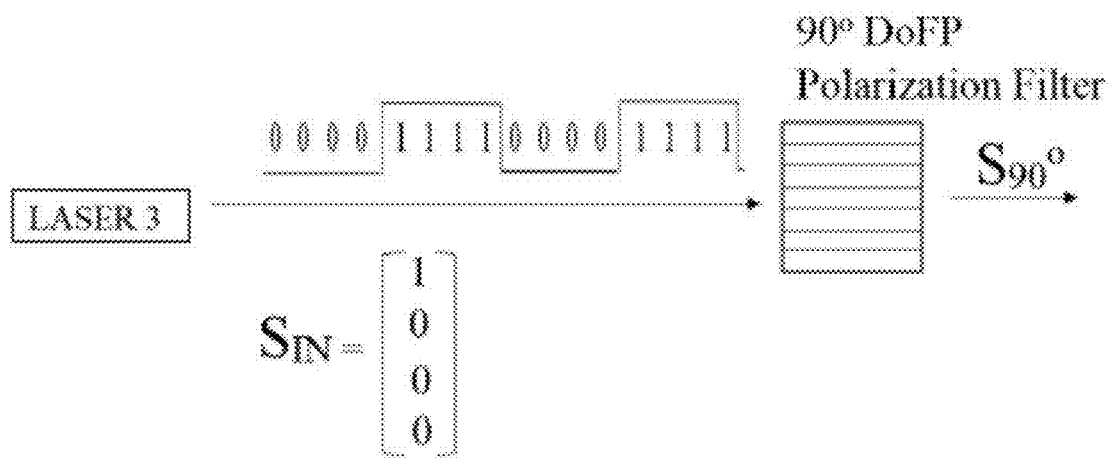
FIG. 77: Transmitter 3 sends sequence b'0000111100001111'.

FIG. 77 shows the transmitter chip's laser 3 that illuminates light using binary sequence b'0000111100001111'.

The Stokes vector $S_{90°}$ is shown below $$S_{90°} = M_{90°}S_{IN} = \frac{1}{2}\begin{bmatrix}(p_x^2 + p_y^2)\\(p_x^2 - p_y^2)\cos(2\Theta)\\(p_x^2 - p_y^2)\sin(2\Theta)\\0\end{bmatrix} \quad (6.34)$$

and $$S_{90°} = \frac{1}{2}\begin{bmatrix}T\\TD\cos(180°)\\TD\sin(180°)\\0\end{bmatrix} = \frac{1}{2}\begin{bmatrix}\frac{1}{2}\\-0.99\\2\\0\\0\end{bmatrix} = \begin{bmatrix}0.25\\-0.2475\\0\\0\end{bmatrix} \quad (6.35)$$

Figure 78:
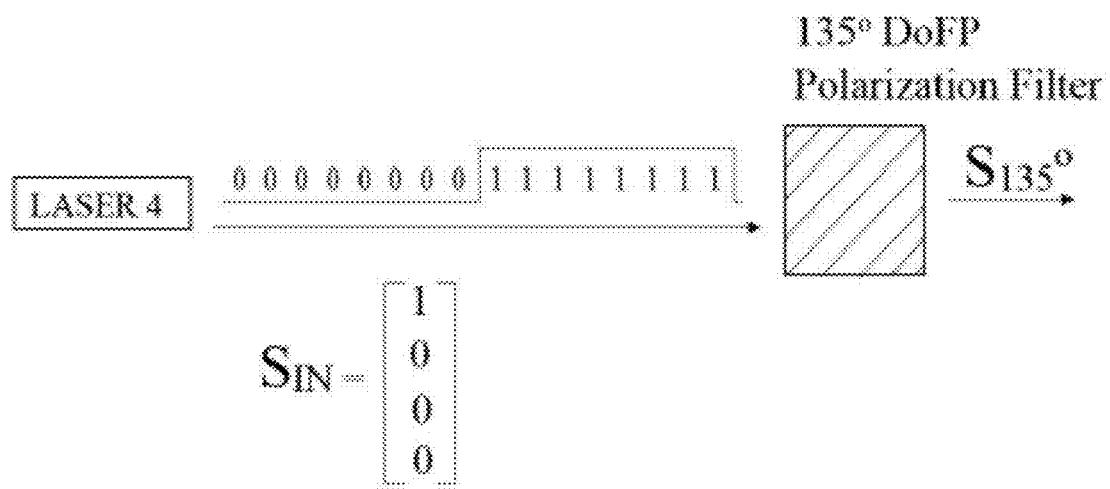
FIG. 78: Transmitter 4 sends sequence b'0000000011111111'.

FIG. 78 shows the transmitter chip's laser 4 that illuminates light using binary sequence b'0000000011111111'.

The Stokes vector $S_{135°}$ is shown below.

$$S_{135°} = M_{135°}S_{IN} = \frac{1}{2}\begin{bmatrix}(p_x^2 + p_y^2)\\(p_x^2 - p_y^2)\cos(2\Theta)\\(p_x^2 - p_y^2)\sin(2\Theta)\\0\end{bmatrix} \quad (6.36)$$

and $$S_{135°} = \frac{1}{2}\begin{bmatrix}T\\TD\cos(270°)\\TD\sin(270°)\\0\end{bmatrix} = \frac{1}{2}\begin{bmatrix}\frac{1}{2}\\0\\-\frac{0.99}{2}\\0\end{bmatrix} = \begin{bmatrix}0.25\\0\\-0.2475\\0\end{bmatrix} \quad (6.37)$$

Figure 79:
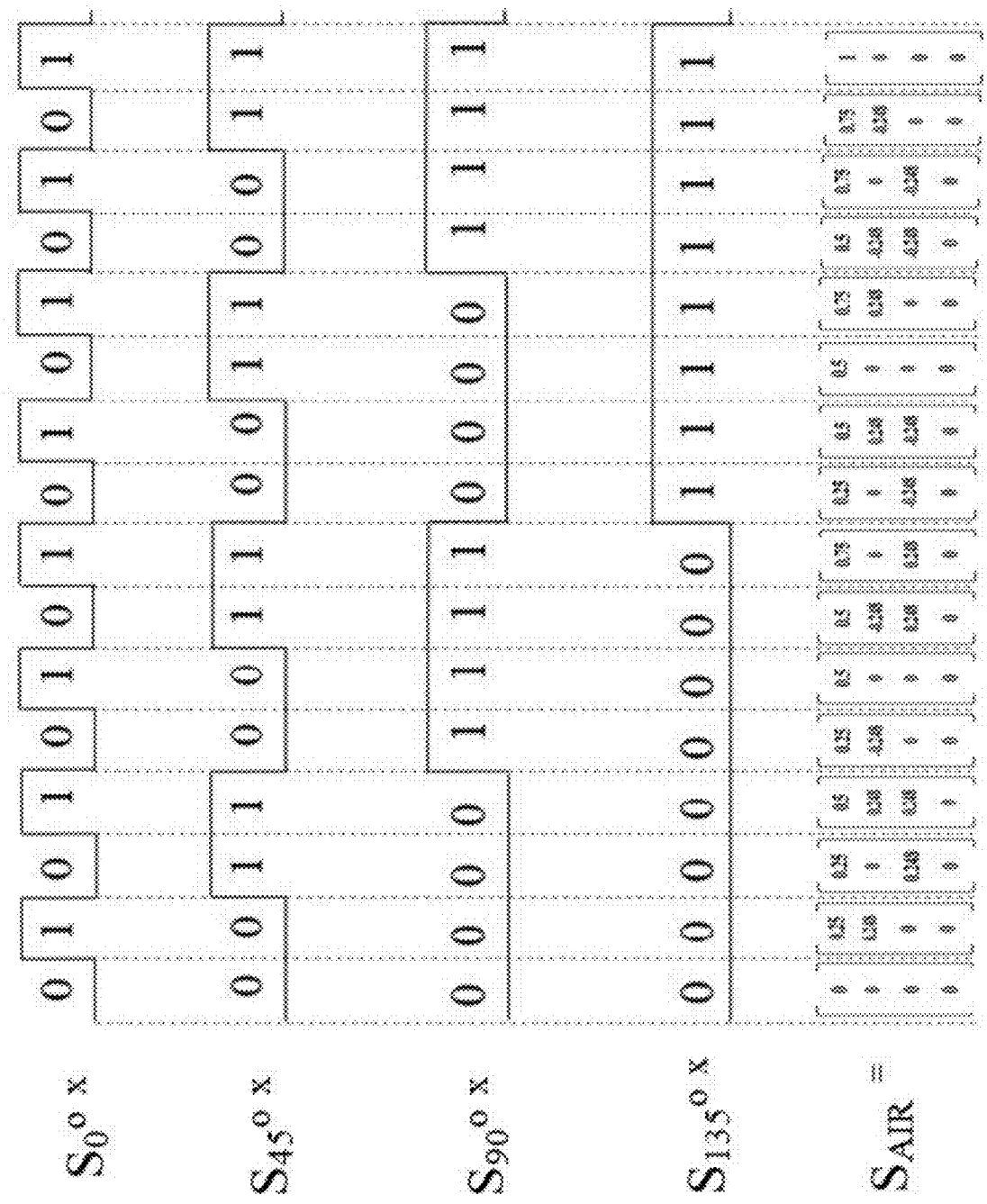
FIG. 79: Four polarized light beams combined in the air.

Four polarized light beams are combined in the air as shown in FIG. 79. The combined light beam is defined as $$S_{AIR} = b_0 S_{0°} + b_{45} S_{45°} + b_{90} S_{90°} + b_{125} S_{125°} \quad (6.38)$$

The combined light beam $S_{AIR}$ will be filtered through each of the 0°, 45°, 90° and 135° filters on the receiver. These channels' photodiode inputs $I_{0°}$, $I_{45°}$, $I_{90°}$ and $I_{135°}$ are $$\begin{aligned}I_{0°} &= [1\;0\;0\;0]M_{0°}S_{AIR} & (6.39)\\&= [1\;0\;0\;0]M_{0°}[S_0\;S_1\;S_2\;S_3]^T & (6.40)\\&= \frac{1}{4}S_0 + \frac{0.99}{4}S_1 & (6.41)\end{aligned}$$

$$\begin{aligned}I_{45°} &= [1\;0\;0\;0]M_{45°}S_{AIR} & (6.42)\\&= [1\;0\;0\;0]M_{45°}[S_0\;S_1\;S_2\;S_3]^T & (6.43)\\&= \frac{1}{4}S_0 + \frac{0.99}{4}S_2 & (6.44)\end{aligned}$$

$$\begin{aligned}I_{90°} &= [1\;0\;0\;0]M_{90°}S_{AIR} & (6.45)\\&= [1\;0\;0\;0]M_{90°}[S_0\;S_1\;S_2\;S_3]^T & (6.46)\\&= \frac{1}{4}S_0 - \frac{0.99}{4}S_1 & (6.47)\end{aligned}$$

$$\begin{aligned}I_{135°} &= [1\;0\;0\;0]M_{135°}S_{AIR} & (6.48)\\&= [1\;0\;0\;0]M_{135°}[S_0\;S_1\;S_2\;S_3]^T & (6.49)\\&= \frac{1}{4}S_0 - \frac{0.99}{4}S_2 & (6.50)\end{aligned}$$

If we calculate all sixteen values for each of the four channels, we will see that it is impossible to reconstruct all 16 values with a positive noise margin. This can be seen fairly readily in FIG. 79, in which the Stokes vector $S_{AIR}$ is the same, $[0.5\;0\;0\;0]^T$, for both input symbols 0101 and 1010. If $S_{AIR}$ is the same for that pair of input symbols, we cannot separate them in the receiver. In order to address this issue we introduce simple channel coding techniques on both the input transmitter side and output receiver side of the system to get correct binary sequences for all channels.

The techniques are all variations of the approach introduced in Example 3. On the input side, we introduce different amplitudes for transmitters' lasers for each channel. On the output side at the receivers' end we introduce multi-threshold decoders to obtain the correct binary sequences for each of four channels.

For the four channel system, we have four input laser sources that represent four distinct input data channels for polarization angles of 0°, 45°, 90° and 135°. Each binary value is represented by the Stokes vector $S\Theta = [S_0\;S1\;S2\;S3]^T$.

For $S_{0°}$ we use matrix (6.31) as the starting point to apply channel coding on the transmitter's input side. For So if the light signal is sent from the laser and then polarized with 0° DoFP filter which is defined with the Mueller Matrix representation M$\Theta$ evaluated at polarization angle of 0°, the Stokes vector is defined as $S_{0°} = 0.833[0.25\;0.2475\;0\;0]^T = [0.20825\;0.20617\;0\;0]^T$, and if the light signal is not sent the Stokes vector is defined as $S_{0°} = [0\;0\;0\;0]^T$.

Note that amplitude of light signal is set up to 0.833 of the amplitude of 0.25, which represents channel coding on the input channel 1 side of the four channel VLC with PDM system. Table 6.3 shows 0° input laser data channel that represents binary stream b'0101010101010101' after the polarization filter at the source.

TABLE 6.3

0° channel laser polarized light.

| Binary input | 0 | 1 |
|---|---|---|
| Stokes vector | 0 | 0.280 |
| | 0 | 0.206 |

TABLE 6.3-continued

0° channel laser polarized light.

| Binary input | 0 | 1 |
|---|---|---|
| | 0 | 0 |
| | 0 | 0 |

Table 6.4 shows the 45° polarized laser data channel representing b'0011001100110011' binary stream. For $S_{45°}$ we use matrix (6.33) as the starting point to apply channel coding on the transmitter's input side. For $S_{45°}$ if the light signal is sent from the laser and then polarized with 45° DoFP filter that is defined with the Mueller Matrix representation MΘ evaluated at polarization angle of 45°, it can be defined as $S_{45°}$=0.611[0.25 0 0.2475 0]$^T$=[0.15275 0 0.15122 0]$^T$.

If the light signal is off (binary 0) then $S_{45°}$=[0 0 0 0]$^T$.

TABLE 6.4

45° channel laser polarized light.

| Binary input | 0 | 1 |
|---|---|---|
| Stokes vector | 0 | 0.153 |
| | 0 | 0 |
| | 0 | 0.151 |
| | 0 | 0 |

Table 6.5 shows 90° input laser data channel that represents binary stream b'0000111100001111' For $S_{90°}$ we use matrix (6.35) as the starting point to apply channel coding on the transmitter's input side. For $S_{90°}$ if the light signal is sent from the laser and then polarized with 90° DoFP filter that is defined with the Mueller Matrix representation $M_{90°}$, then $S_{90°}$=0.944[0.25 0.2475 0 0]$^T$=[0.236−0.234 0 0]$^T$ and if the light signal is a binary 0 then $S_{90°}$=0.611[0.25, −0.2475, 0, 0]$^T$=[0.15275, −0.15122, 0, 0]$^T$.

TABLE 6.5

90° channel Laser polarized light.

| Binary input | 0 | 1 |
|---|---|---|
| Stokes vector | 0.153 | 0.236 |
| | −0.15 | −0.23 |
| | 0 | 0 |
| | 0 | 0 |

Table 6.6 shows 135° input laser data channel that represents binary stream b'0000000011111111'. For $S_{135°}$ we use matrix (6.37) as the starting point to apply channel coding on the transmitter's input side. For $S_{135°}$ if the light signal is sent and then polarized with 135° filter that is defined with the Mueller Matrix representation $M_{135°}$, $S_{135°}$=[0.25 0.2475 0 0]$^T$ and if the light signal is not sent with this laser $S_{135°}$=[0 0 0]$^T$.

TABLE 6.6

135° channel laser polarized light.

| Binary input | 0 | 1 |
|---|---|---|
| Stokes vector | 0 | 0.25 |
| | 0 | 0 |
| | 0 | −0.248 |
| | 0 | 0 |

Table 6.7 shows all 4 channels combined optical signals into one one optical signal as it travels thru the air between the transmitter's input and the receiver's output polarization filter arrays.

TABLE 6.7

All 4 polarized channels' light signals combined.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $S_{AIR}$ | 0.153 | 0.361 | 0.306 | 0.514 | 0.236 | 0.444 | 0.389 | 0.597 | 0.303 | 0.011 | 0.586 | 0.704 | 0.480 | 0.696 | 0.629 | 0.647 |
| | −0.15 | 0.55 | −0.15 | 0.085 | −0.23 | −0.03 | −0.23 | −0.03 | −0.15 | 0.086 | −0.15 | 0.055 | −0.23 | −0.03 | −0.23 | −0.03 |
| | 0 | 0 | 0.151 | 0.151 | 0 | 0 | 0.151 | 0.151 | −0.25 | −0.25 | −0.1 | −0.1 | −0.25 | −0.25 | −0.1 | −0.1 |
| | 0 | 0 | 0 | 0 | 0 | 0 | 0 | 0 | 0 | 0 | 0 | 0 | 0 | 0 | 0 | 0 |

The receiver has polarized light inputs for each channel photodiode $I_{45°}$, $I_{90°}$ and $I_{135°}$ are shown in Table 6.8.

TABLE 6.8

All 4 receiver channels' photodiode input light signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{0°}$ | 0.001 | 0.104 | 0.030 | 0.142 | 0.001 | 0.104 | 0.039 | 0.142 | 0.063 | 0.166 | 0.101 | 0.205 | 0.064 | 0.167 | 0.102 | 0.285 |
| $I_{45°}$ | 0.038 | 0.09 | 0.114 | 0.165 | 0.058 | 0.111 | 0.135 | 0.187 | 0.039 | 0.091 | 0.116 | 0.167 | 0.06 | 0.112 | 0.126 | 0.188 |
| $I_{90°}$ | 0.076 | 0.077 | 0.114 | 0.115 | 0.117 | 0.118 | 0.155 | 0.156 | 0.138 | 0.139 | 0.176 | 0.177 | 0.129 | 0.18 | 0.218 | 0.219 |
| $I_{135°}$ | 0.038 | 0.09 | 0.030 | 0.091 | 0.068 | 0.111 | 0.06 | 0.112 | 0.162 | 0.214 | 0.163 | 0.215 | 0.188 | 0.235 | 0.184 | 0.334 |

Using a threshold of 0.103, Table 6.9 shows the receiver's 0° polarization data channel output binary stream is b'0101010101010101' as is expected.

TABLE 6.9

0° polarization data receiver output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0° output | 0 | 1 | 0 | 1 | 0 | 1 | 0 | 1 | 0 | 1 | 0 | 1 | 0 | 1 | 0 | 1 |

Receiver output $I_{45°}$ for 45° polarization data channel is obtained by applying comparator threshold 0.113 on the data from Table 6.8. Table 6.10 shows the receiver's 45° polarization data channel output binary stream is b'0011001100110011' as is expected.

TABLE 6.10

45° polarization data receiver output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 45° output | 0 | 0 | 1 | 1 | 0 | 0 | 1 | 1 | 0 | 0 | 1 | 1 | 0 | 0 | 1 | 1 |

The receiver $I_{135°}$ for the 135° polarization data channel is obtained by applying comparator threshold 0.115 on the data from Table 6.8. Table 6.11 shows the 135° polarization data channel output binary stream is b'0000000011111111' as is expected.

TABLE 6.11

135° polarization data receiver output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 135° output | 0 | 0 | 0 | 0 | 0 | 0 | 0 | 0 | 1 | 1 | 1 | 1 | 1 | 1 | 1 | 1 |

Finally, the receiver output for the 90° polarization data channel is obtained by applying two comparators with thresholds 0.115 and 0.178 on data from the Table 6.8. The outputs from both comparators is shown in Table 6.12.

Using the circuit of FIG. 64, the output value of the 135° channel is used to select between the two comparator outputs.

TABLE 6.12

90° polarization data receiver two comparator outputs.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{90°} > 0.115$ | 0 | 0 | 0 | 0 | 1 | 1 | 1 | 1 | 1 | 1 | 1 | 1 | 1 | 1 | 1 | 1 |
| $I_{90°} > 0.178$ | 0 | 0 | 0 | 0 | 0 | 0 | 0 | 0 | 0 | 0 | 0 | 1 | 1 | 1 | 1 | 1 |

If the 135° output is equal to b'0', then $I_{90°}$ data with comparator threshold of 0.115 is selected as the 90° channel output and if the 135° output is equal to b'1', then $I_{90°}$ data with comparator threshold of 0.178 is selected as the 90° channel output.

This multi-threshold decoding of the 90° data channel is shown in Table 6.13. As we can see from this table, the 90° data channel output binary stream is b'0000111100001111' as is expected.

TABLE 6.13

90° polarization data receiver output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 90° output | 0 | 0 | 0 | 0 | 1 | 1 | 1 | 1 | 0 | 0 | 0 | 0 | 1 | 1 | 1 | 1 |

Simulation of Polarization Division Multiplexing Systems

Figure 80:
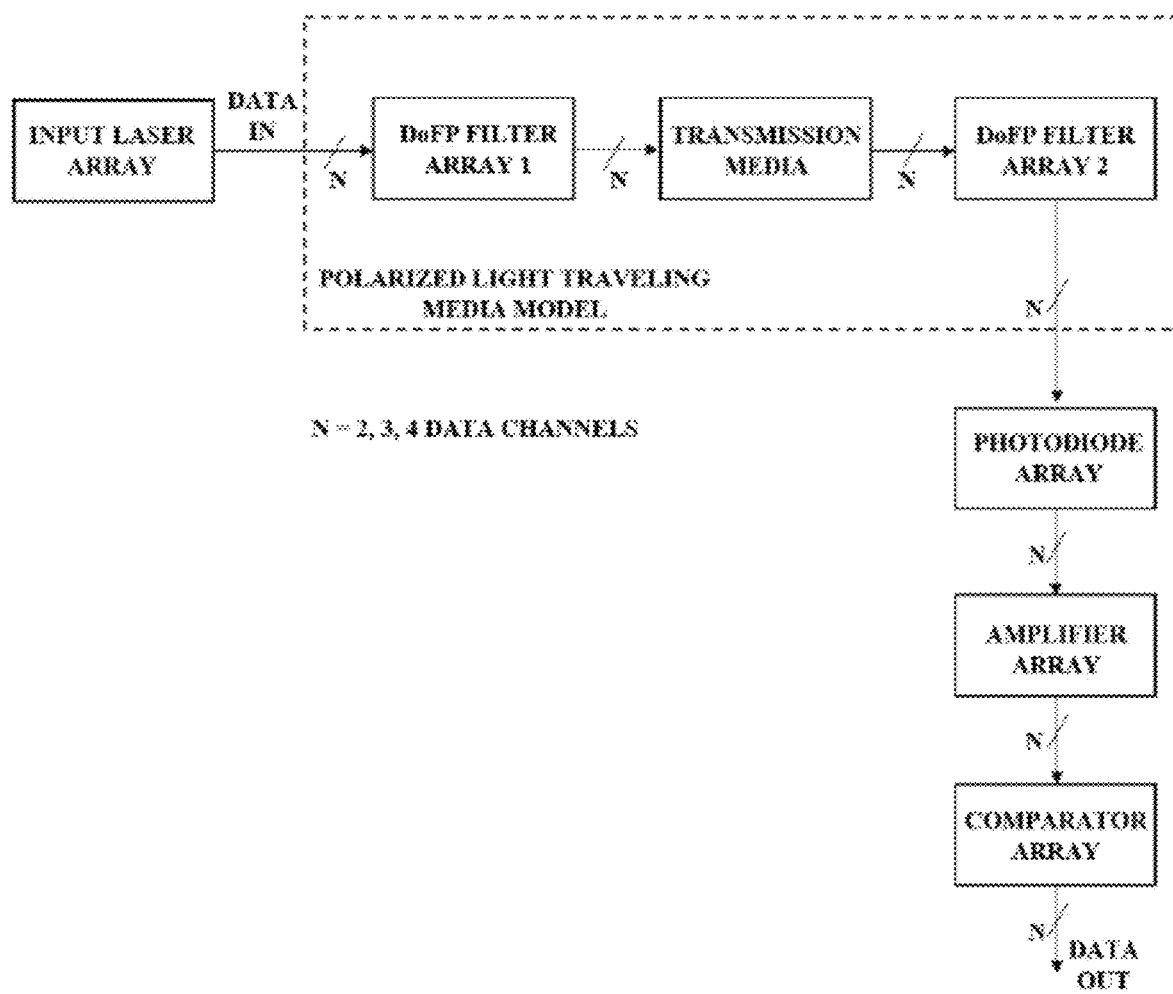
FIG. 80: VLC PDM system Cadence simulation model block diagram.

We used the Cadence simulation tool set to model the 2, 3 and 4 channel VLC PDM systems described above with air used as the transmission media. A block diagram of this simulation is shown in FIG. 80.

The simulation model is decomposed into the following parts:
1. Input Laser Array is used to simulate input light data from the lasers. These input lasers are simulated in Cadence as voltage sources with periodic square wave voltages. The square wave voltage represents light source optical power [mW/cm] of present (or binary b'1') or not present (or binary b'0') light signal that is transmitted out of the transmitter's input laser array. These input lasers optical signals (2, 3 or 4 signals) are travelling from the input lasers towards DoFP Filter Array 1.
2. DoFP Filter Array 1 or transmitters' DoFP filter array is used to simulate input laser data channels' polarization. This DoFP Filter Array 1 is represented with a Mueller matrix model that is designed using VerilogA. Each DoFP filter takes one voltage source from the Input Laser Array and polarizes it. Note that this DoFP Filter Array 1 is part of a single Cadence simulation part (Polarized Light Traveling Media Model) together with Transmission Media and DoFP Filter Array 2.
3. Transmission Media is either air, fiber optic cable or some other media (e.g., mirrors, waveguides) used for polarized light data channels to travel from the input laser array transmitter side to the photodiode receiver side of the VLC PDM system. In the transmission media, all channels are combined and they travel together through it. If the transmission media is air, there is no attenuation of the input light data signals. If the transmission media is fiber or waveguides then the media is represented by the Mueller matrix model appropriate to that media and it will attenuate the light signals. Transmission Media is also designed using VerilogA and it is part of the Cadence simulation part called Polarized Light Traveling Media Model.
4. DoFP Filter Array 2 or Receiver's DoFP Filter Array is used to model the polarized light data channels' separation at the receiver side of the VLC PDM system. The DOFP Filter Array 2 is also represented with a Mueller matrix model that is designed using VerilogA.
5. Photodiode Array is used to convert separated polarized light signals into electrical current signals. Each photodiode is designed VerilogA and implements the model described in Example 1. The input is a voltage signal that is indicative of the light intensity represented by a Stokes vector and the output is a current signal.
6. Amplifier Array is used to convert the data channel's electrical current signal into a voltage signal and then amplify it. This part of the system is a CMOS circuit designed to shape data channel electrical signal for the Comparator Array. It follows the design described in Example 1.
7. Comparator Array is used to decide whether the data channel output is binary value of '0' or binary value of '1'. This part of the system is also designed as a CMOS circuit. Example 1 also describes the details of this part of the system design.

Cadence Simulation of Two Channel System

Figure 81:
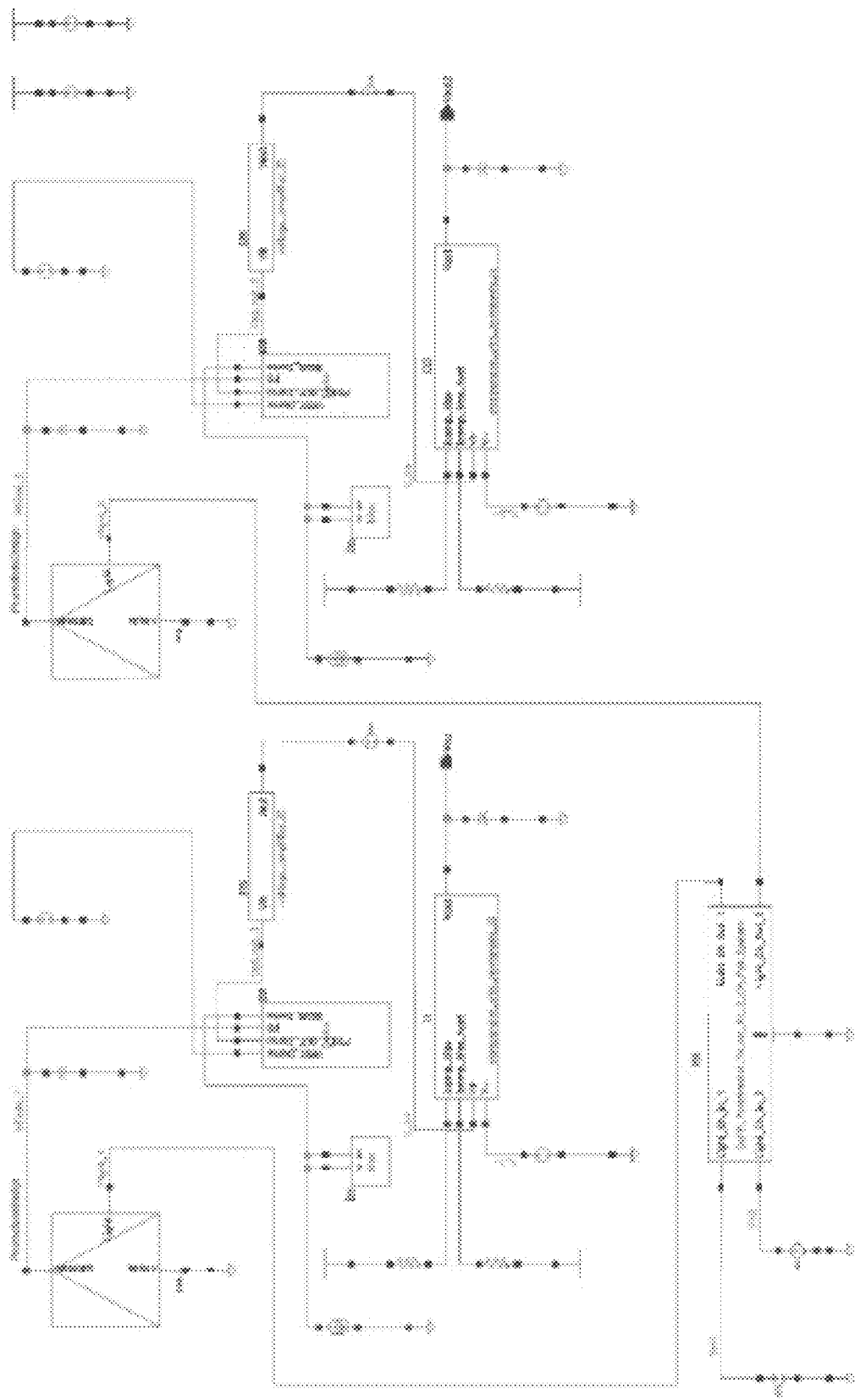
FIG. 81: Cadence model of two channel system.

The Cadence simulation model of the two channel system with air used as the transmission media is shown in FIG. 81. It directly follows the structure of FIG. 80.

In FIG. 81, the Input Laser Array is defined with two voltage sources V IN1 and $V_{IN2}$. The input voltage (light) signal $V_{IN1}$ outputs a square wave of 1 MHz frequency with amplitude of 200 mV. This voltage source $V_{IN1}$ is modeling an input laser source that generates binary sequence b'0101'.

The input voltage (light) signal V m outputs a square wave of 0.5 MHz frequency with amplitude of 200 mV. This voltage source $V_{IN2}$ is modeling an input laser source that generates binary sequence b'0011'.

In FIG. 81, the Polarized Light Traveling Media Model is defined with VerilogA component DoFP_Polarimeter_TxAir_Rx_2_Ch_Full_System that is the Cadence component model for two DoFP filter arrays 1 and 2 and air as the transmission media, as it is shown in FIG. 80.

Both DoFP Filter Arrays 1 and 2 are represented with 4-by-4 Mueller matrices and air is modeled as free space with no losses. In FIG. 81, the two voltage (light) signals $V_{IN1}$ and $V_{IN2}$ are inputs to the VerilogA component and inside this component each light signal is represented with non-polarized Stokes vector SIN=[VIN 0 0 0]$^T$.

Figure 82:
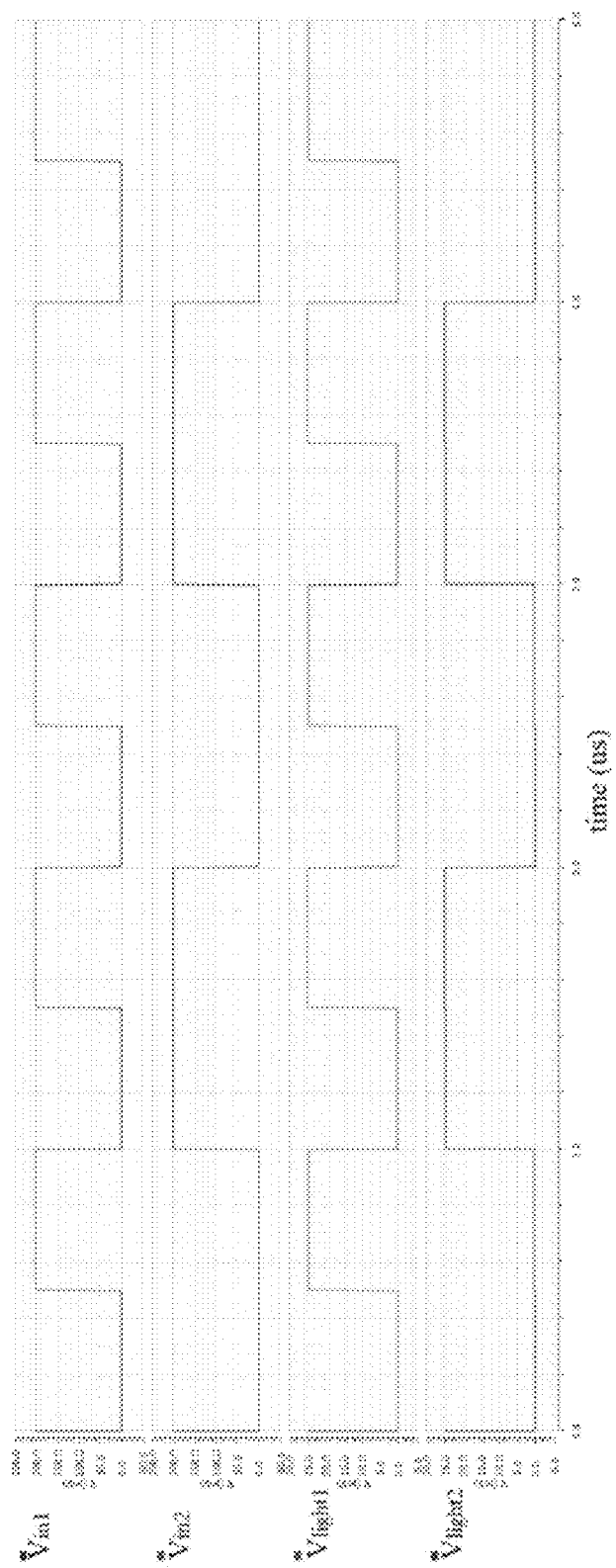
FIG. 82: Input laser array light signals $V_{IN1}$ and $V_{IN2}$ and output light signals of the receiver DoFP filters $V_{light1}$ and $V_{light2}$ for the 2 channel system.

FIG. 82 shows two non-polarized input voltage (light) signals $V_{IN1}$ and $V_{IN2}$ and two polarized voltage (light) signals $V_{light1}$ and $V_{light2}$ that are the outputs of the 2nd filter array. The signals shown in FIG. 82 correspond with the predictions of Table 6.1. The only difference is that all values from the table have to be scaled by 200 mV amplitude in order to obtain the signal levels shown in the figure.

The light signals $V_{light1}$ and $V_{light2}$ signals are next input to two separate data channels where they are converted to electrical currents and then to electrical voltages and amplified to appropriate voltage levels for input to the channel's comparator. Before these voltage signals are processed through the comparator a noise voltage signal+/−50 mV is added to the voltage signals to model noise sources in the receiver circuit.

Figure 83:
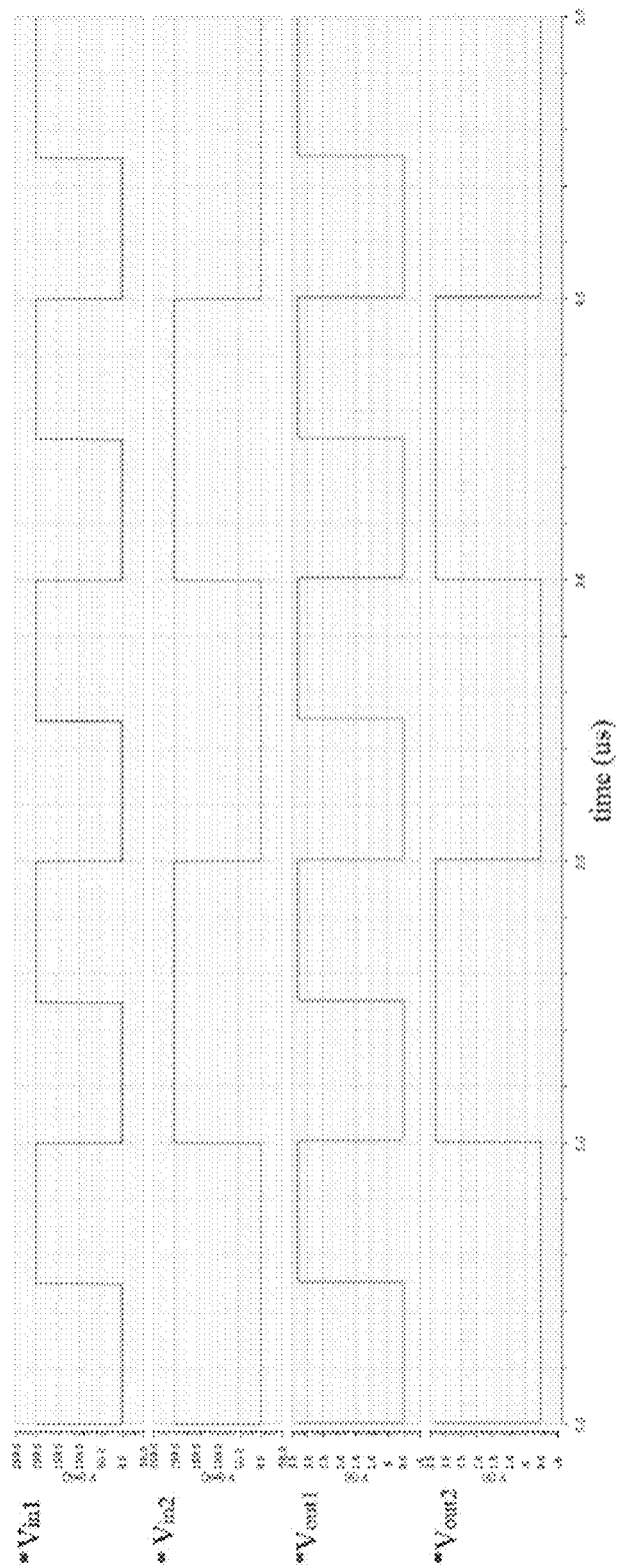
FIG. 83: Input laser array light signals $V_{IN1}$ and $V_{IN2}$ and output voltage signals of the receiver data channels $V_{OUT1}$ and $V_{OUT2}$ for the two channel system.

Now, these voltage signals plus noise voltage signals are processed through the comparators with threshold voltage of 1.8 V. The outputs of both channels' comparators are 3.3V voltage signals that represent the 1 MHz square wave and 0.5 MHz square wave signals recovered from the input. FIG. 83 shows Cadence simulation results where two channels' system receiver's outputs match the system transmitter's input binary sequences.

Cadence Simulation of Three Channel System

Figure 84:
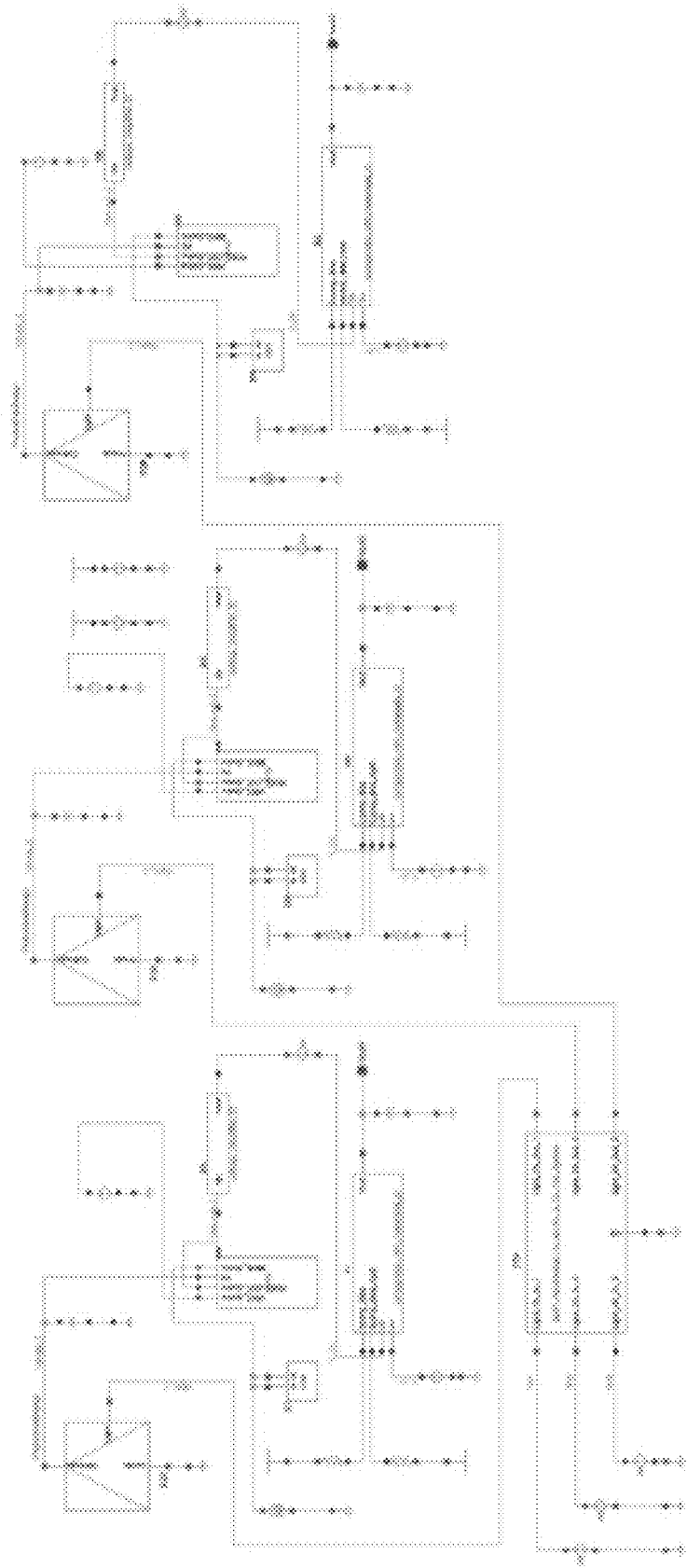
FIG. 84: Cadence model of three channel system.

The Cadence simulation model of the three channel system with air used as the transmission media is shown in FIG. 84.

The input laser array is defined with three voltage (light) sources $V_{IN1}$, $V_{IN2}$ and $V_{IN3}$. The voltage (light) source $V_{IN1}$ outputs a square wave of frequency 1 MHz with amplitude of 400 mV. The voltage (light) source $V_{IN2}$ outputs a square wave of frequency 0.5 MHz with amplitude of 400 mV. Finally, the voltage (light) source $V_{IN3}$ outputs a square wave of frequency 0.25 MHz with amplitude of 400 mV.

Figure 85:
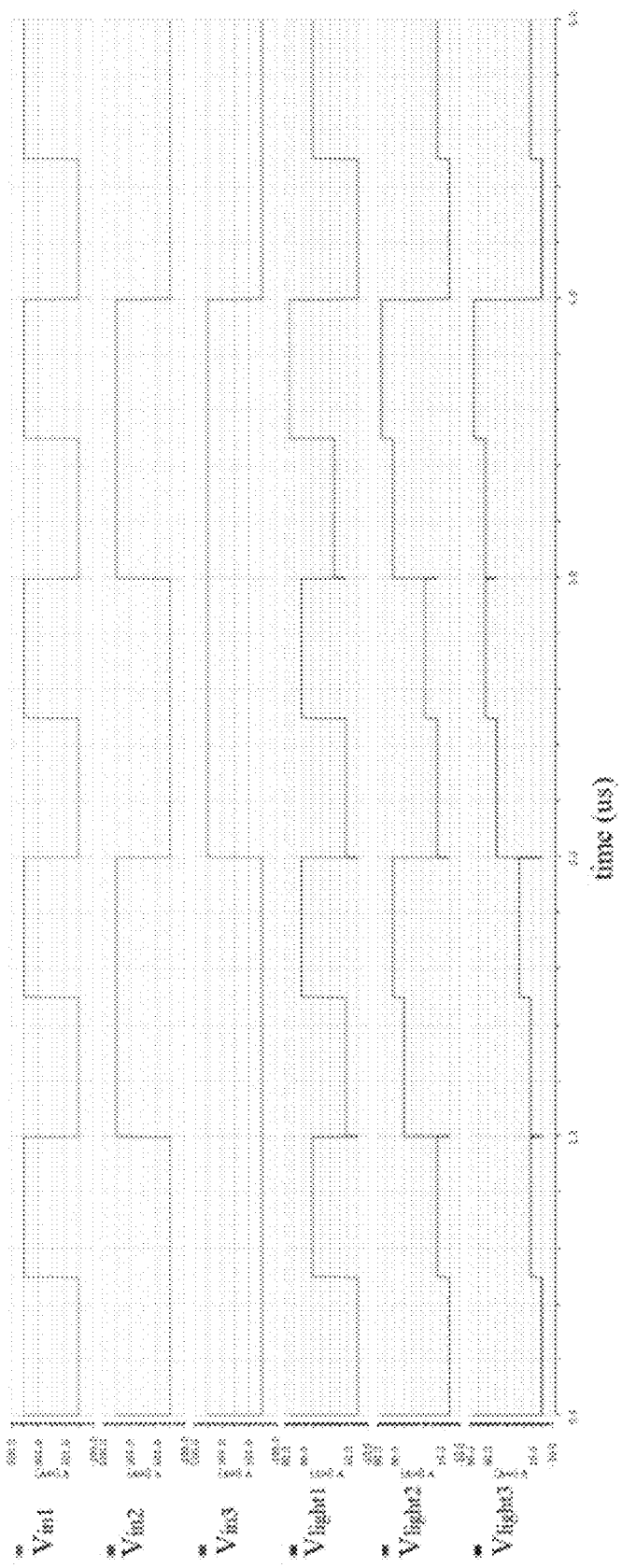
FIG. 85: Input laser array light signals $V_{IN1}$, $V_{IN2}$, and $V_{IN3}$ and output light signals of the receiver DoFP filters $V_{light1}$, $V_{light2}$ and $V_{light3}$ for the 3 channel system.

FIG. 85 shows three non-polarized input voltage (light) signals $V_{IN1}$, $V_{IN2}$ and $V_{IN3}$ and three polarized voltage signals $V_{light1}$, $V_{light2}$ and $V_{light3}$ that represent three light data channels.

The signal levels of FIG. 85 are a good match with the data of Table 6.2. The only difference is that all values from the table have to be multiplied by 400 mV amplitude in order to obtain the signal levels shown in FIG. 85.

The light signals $V_{light1}$, $V_{light2}$ and $V_{light3}$ are now input to three separate data channels where they are converted to electrical currents and then to electrical voltages and amplified to appropriate voltage levels for input to comparators. Before these voltage signals are delivered to the comparators, a noise voltage signal+1-50 mV is added to the voltage signals to model noise sources.

Now, these voltage signals plus noise voltage signals are processed through the comparators with threshold voltages of 2.57 V. The outputs of all three channels' comparators are 3.3V voltage signals that represent a 1 MHz square wave, a 0.5 MHz square wave and a 0.25 MHz square wave which are recovered from the source.

Figure 86:
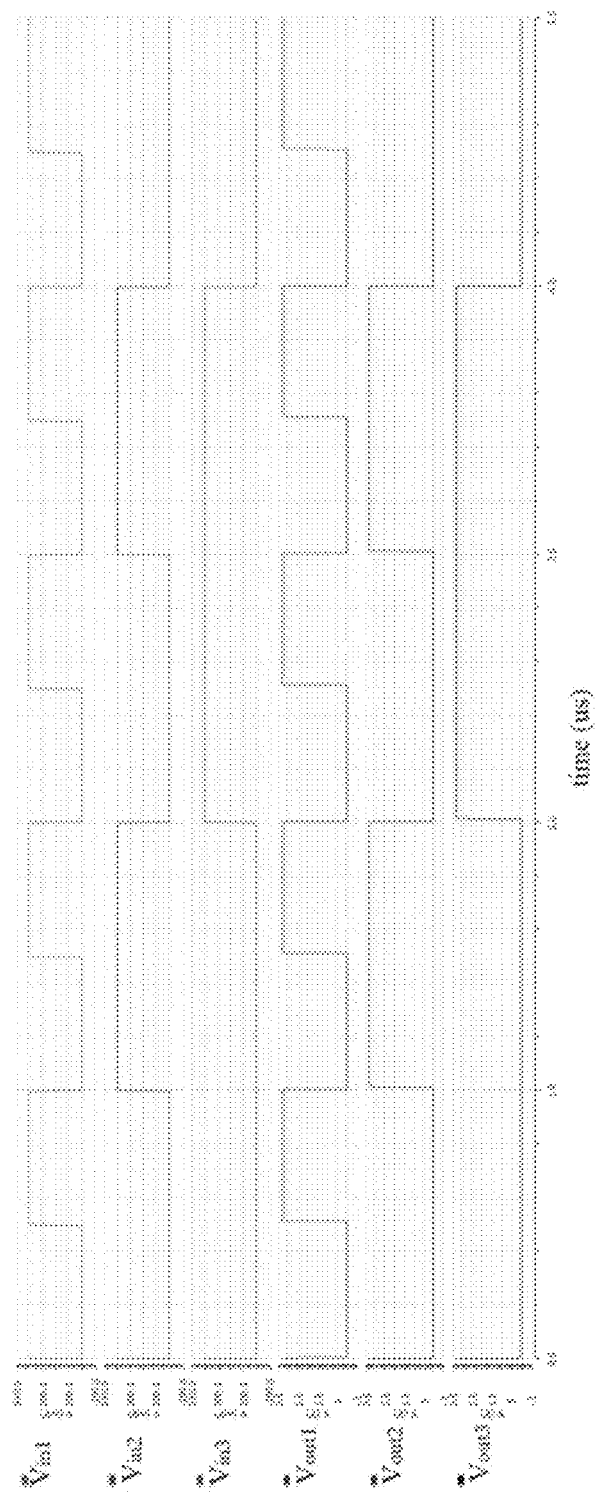
FIG. 86: Input laser array light signals $V_{IN1}$, $V_{IN2}$, and $V_{IN3}$ and output voltage signals of the receiver data channels $V_{OUT1}$, $V_{OUT2}$, and $V_{OUT3}$ for the three channel system.

FIG. 86 shows input laser array light signals $V_{IN1}$, $V_{IN2}$ and $V_{IN3}$ and output receiver array voltage signals $V_{OUT1}$, $V_{OUT2}$ and $V_{OUT3}$. As we can from the figure, the Cadence three channel system is operating as expected.

Cadence Simulation of the Four Channel System

Figure 87:
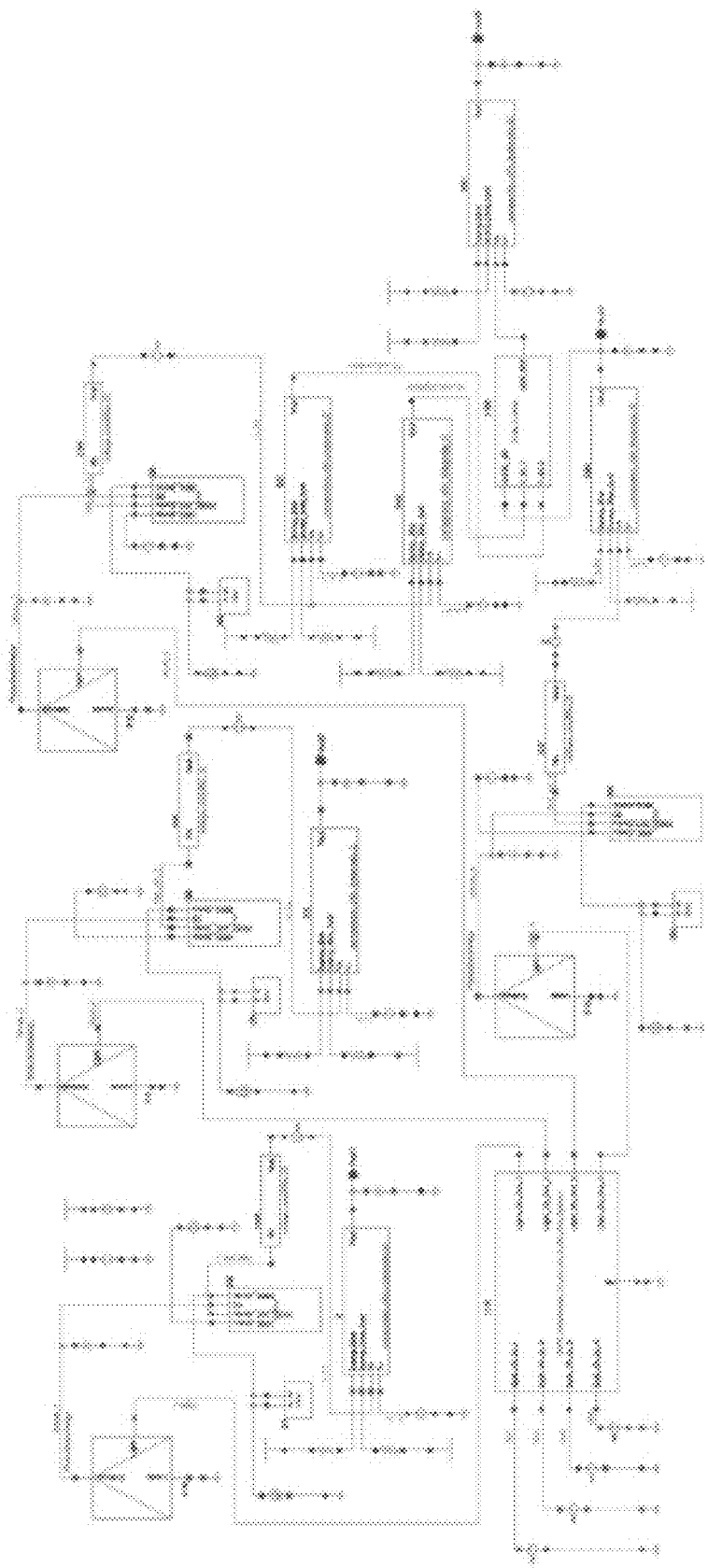
FIG. 87: Cadence model of four channel system.

The Cadence simulation model of the four channel system with air used as the transmission media is shown in FIG. 87.

In FIG. 87, the input laser array is defined with four voltage (light) sources $V_{IN1}$, $V_{IN2}$, $V_{IN3}$, and $V_{IN4}$, outputting square waves with frequency 1 MHz (at amplitude 153 mV), 0.5 MHz (at amplitude 139 mV), 0.25 MHz (at amplitude 150 mV), and 0.125 MHz (at amplitude 140 mV) respectively.

Channel coding on the input transmitter side means that all four input channels $V_{IN1}$, $V_{IN2}$, $V_{IN3}$ and $V_{IN4}$ have different amplitudes and in addition input channel $V_{IN3}$ has two different amplitudes applied for binary '0' and binary '1'.

Figure 88:
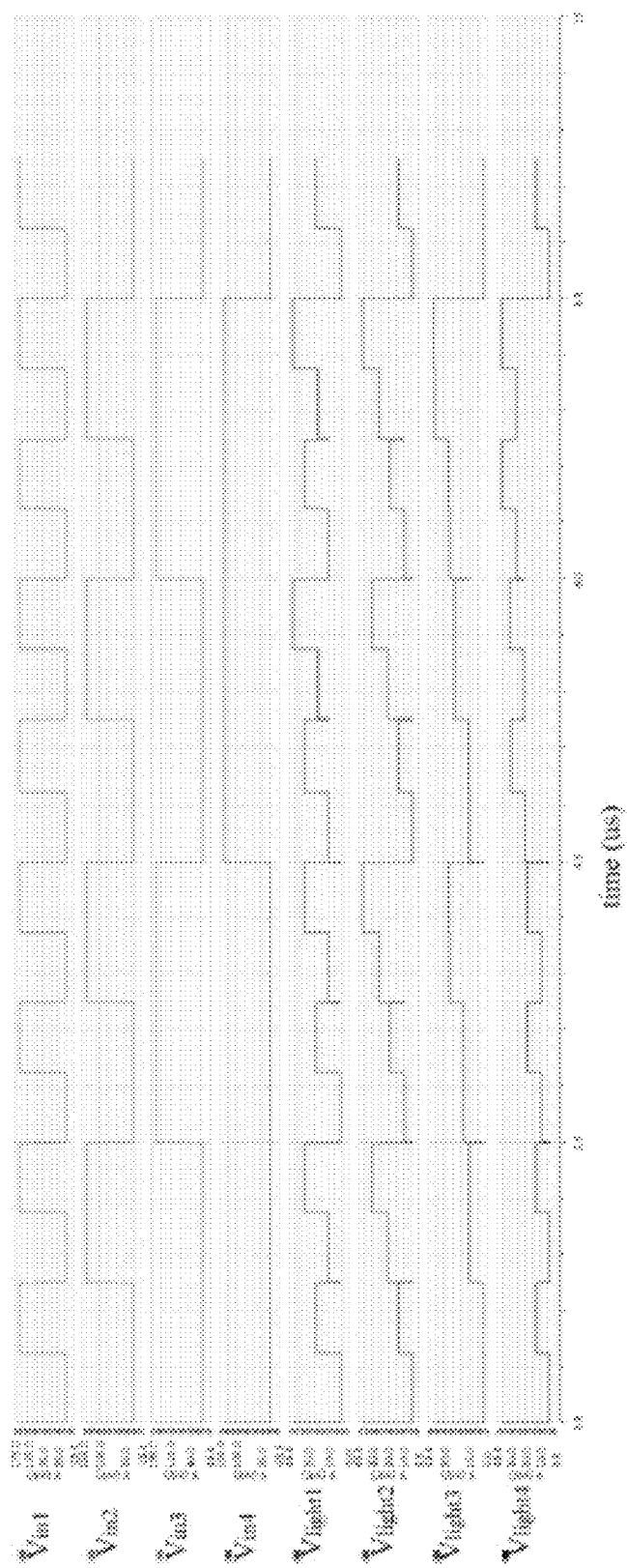
FIG. 88: Input laser array light signals $V_{IN1}$, $V_{IN2}$, $V_{IN3}$ and $V_{IN4}$ and output light signals of the receiver DoFP filters $V_{light1}$, $V_{light2}$, $V_{light3}$ and $V_{light4}$ for the four channel system.

FIG. 88 shows four non-polarized input voltage (light) signals $V_{IN1}$, $V_{IN2}$, $V_{IN3}$, and $V_{IN4}$ and four polarized voltage signals $V_{light1}$, $V_{light2}$, $V_{light3}$, and $V_{light4}$ that represent four light data channels. These results closely match the analytical results presented earlier.

Figure 89:
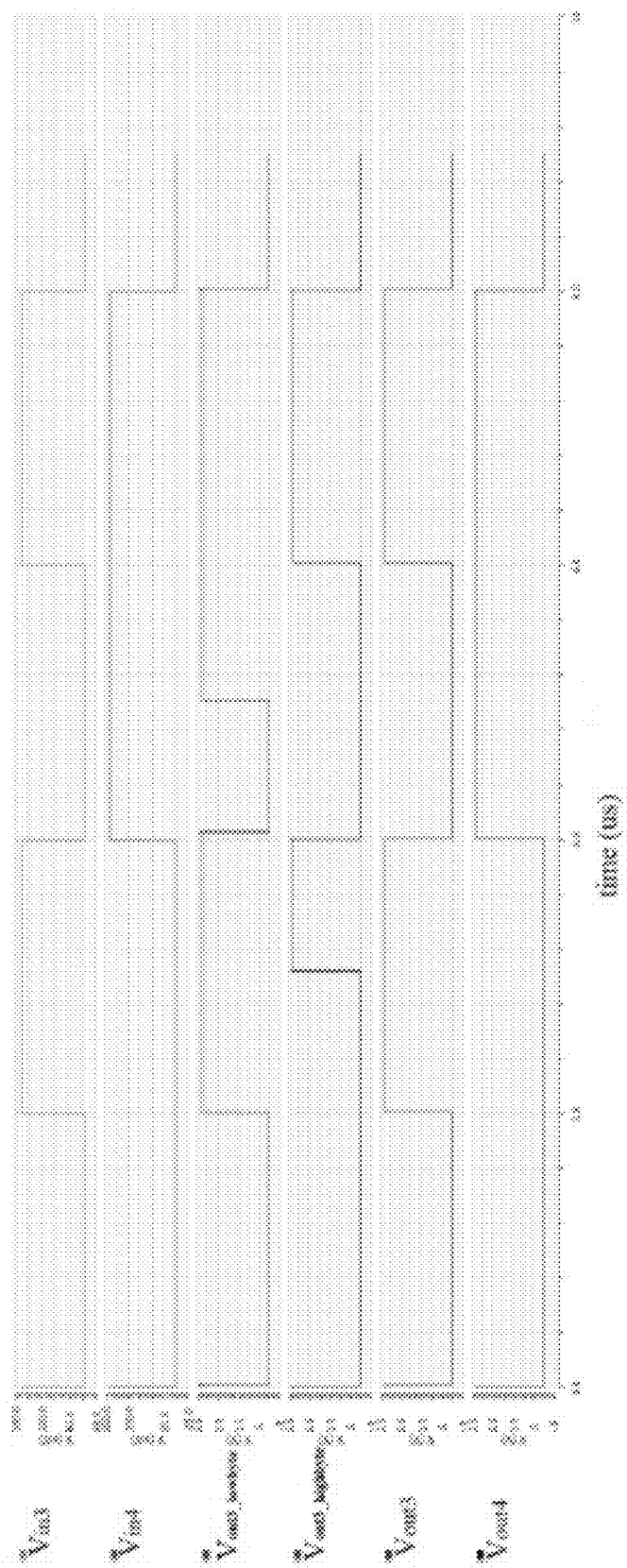
FIG. 89: Input laser array light signals $V_{IN3}$ and $V_{IN4}$, two 90° data channel comparators' outputs $V_{OUT3}$_lowbyte and $V_{OUT3}$_highbyte and 90° and 135° data channel outputs $V_{OUT3}$ and $V_{OUT4}$ for the 4 channel system.

FIG. 89 shows input laser array light signals $V_{IN3}$ and $V_{IN4}$. It also shows two 90° data channel comparator outputs $V_{OUT3}$_lowbyte and $V_{OUT3}$_highbyte and 90° and 135° data channel outputs $V_{OUT3}$ and $V_{OUT4}$. As we can from the figure, the simple channel coding applied on the 90° data channel helped out in the recovery of a proper output signal for that channel. We conclude that the four channel systems have tight noise margins and they are even worse if different transmission media is used to replace air (e.g., fiber optic cable).

Figure 90:
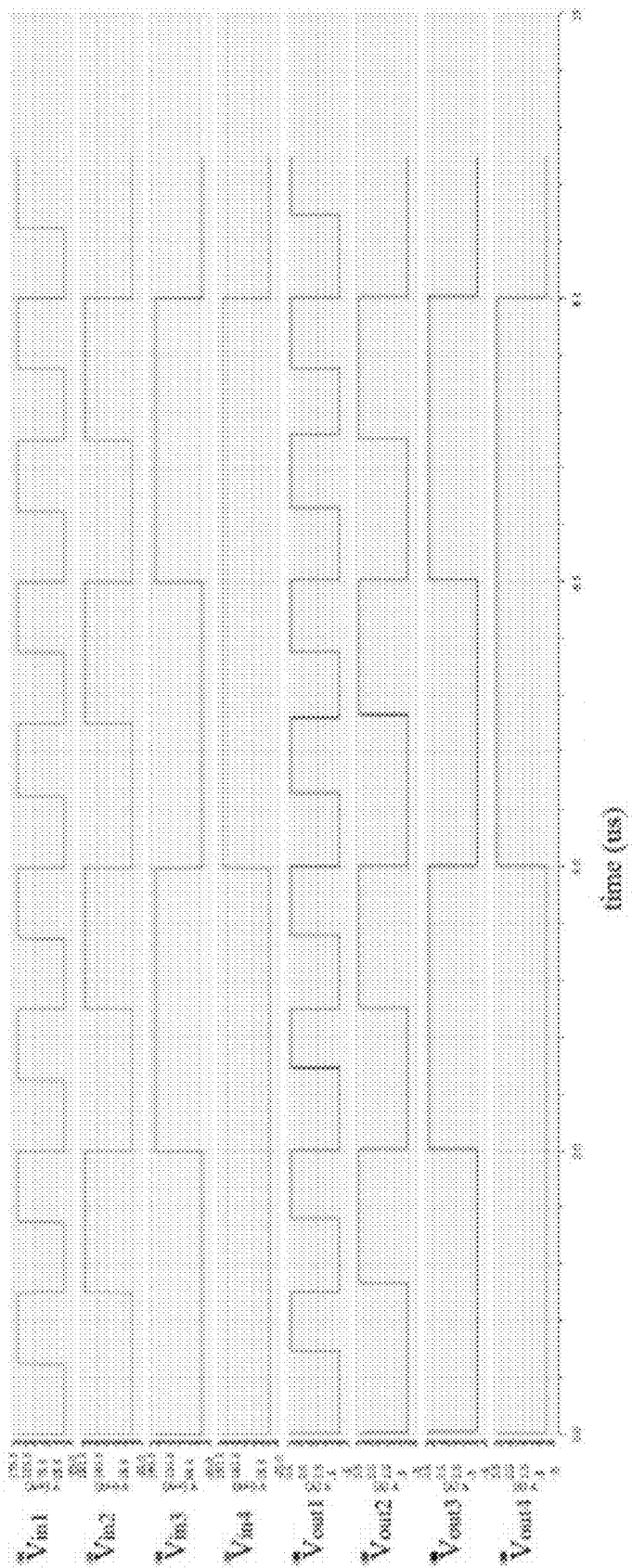
FIG. 90: Input laser array light signals $V_{IN1}$, $V_{IN2}$, $V_{IN3}$, and $V_{IN4}$ and output voltage signals of the receiver data channels $V_{OUT1}$, $V_{OUT2}$, $V_{OUT3}$, and $V_{OUT4}$ for the four channel system.

FIG. 90 shows all four input laser array light signals $V_{IN1}$, $V_{IN2}$, $V_{IN3}$, and $V_{IN4}$ and all four receiver channel output voltage signals $V_{OUT1}$, $V_{OUT2}$, $V_{OUT3}$, and $V_{OUT4}$. We conclude that the four channel system with air used as the transmission media is working, however, within very tight noise margins.

Figure 91:
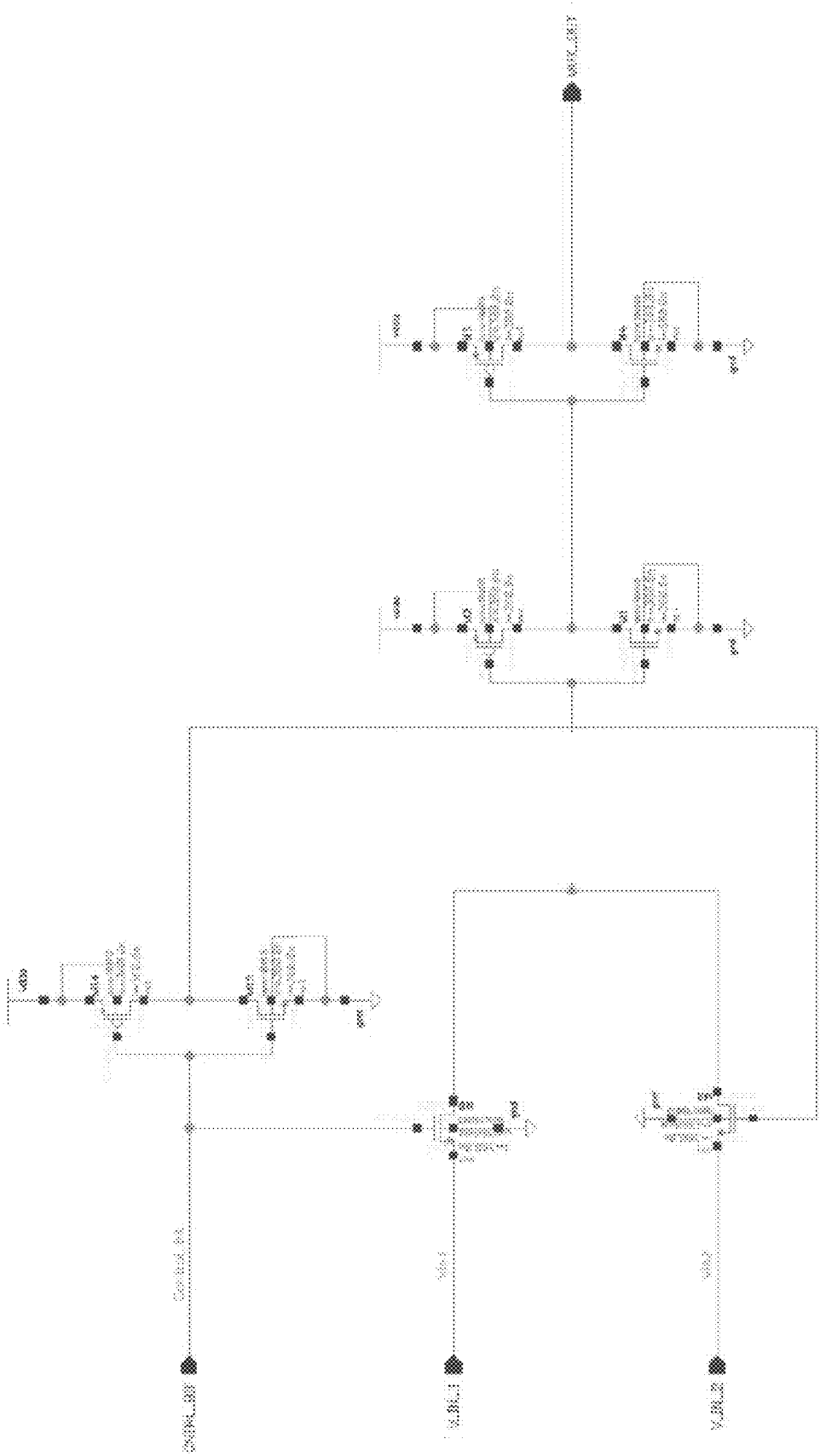
FIG. 91: 2-to-1 multiplexer design for channel coding of 90° data channel.

FIG. 91 shows 2-to-1 multiplexer design that is used for channel coding of 90° data channel.

Fiber Optic Cable Transmission Media

Just as we performed 2, 3 and 4 channel analysis of systems with air used as the transmission media we will perform analysis of 2, 3 and 4 channel systems with a fiber optic cable used as the transmission media. The analysis is the same as the analysis of the system with air as the transmission media with the only difference being that we need to introduce a Mueller matrix MFIBER for the fiber optic cable.

Mueller Matrix for Fiber Optic Cable

Figure 92:
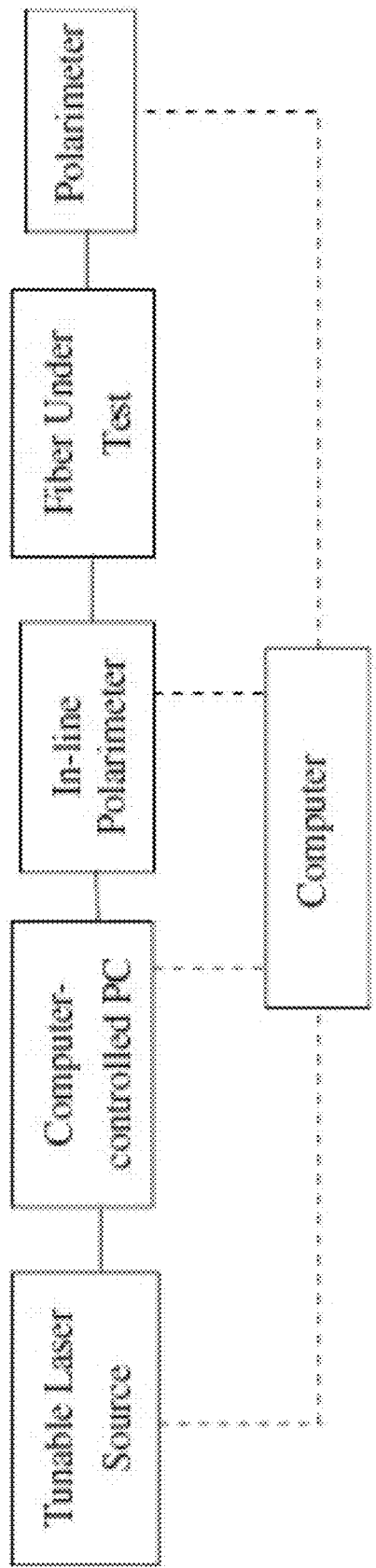
FIG. 92: Experimental configuration for MFIBER measurement.
Figure 93A:
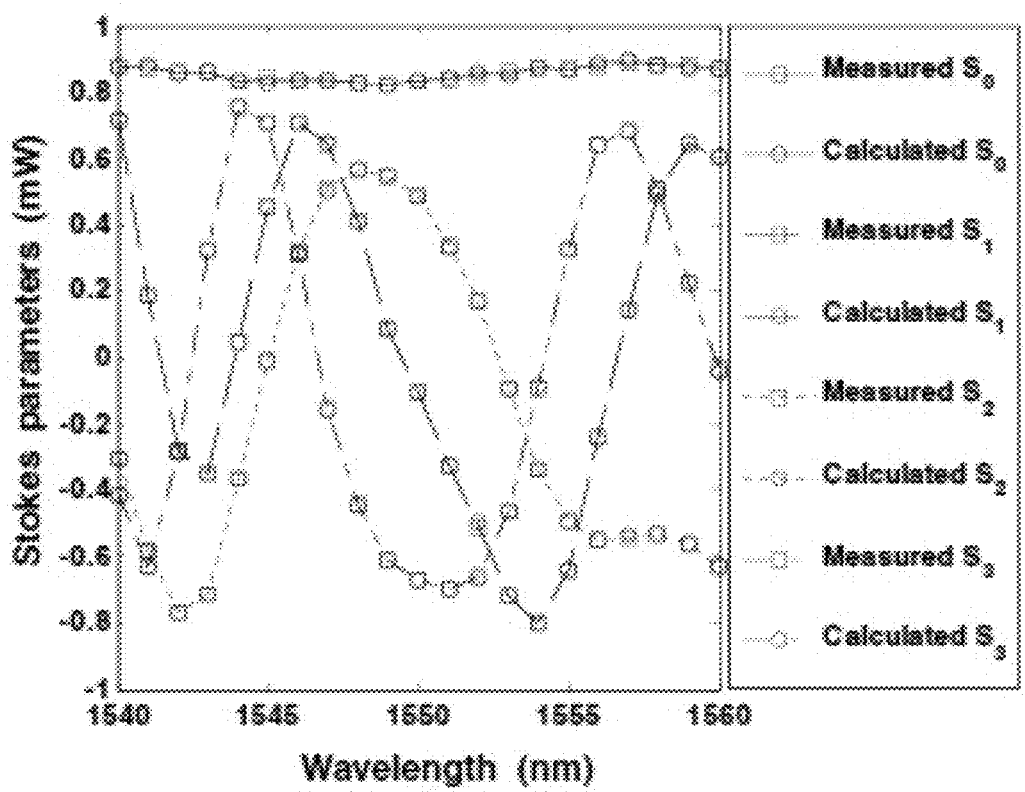
FIG. 93A: Measured and calculated output Stokes parameters corresponding to input polarization state $[1\ 1\ 0\ 0]^T$.
Figure 93B:
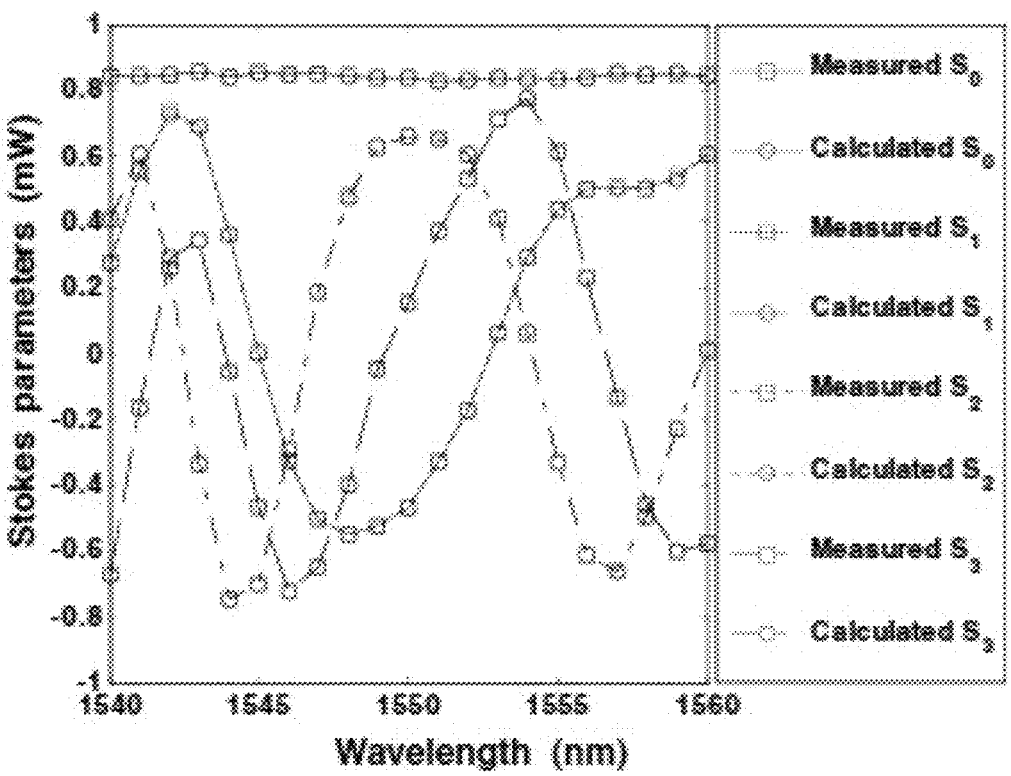
FIG. 93B: Measured and calculated output Stokes parameters corresponding to input polarization state $[1\ -1\ 0\ 0]^T$.
Figure 93C:
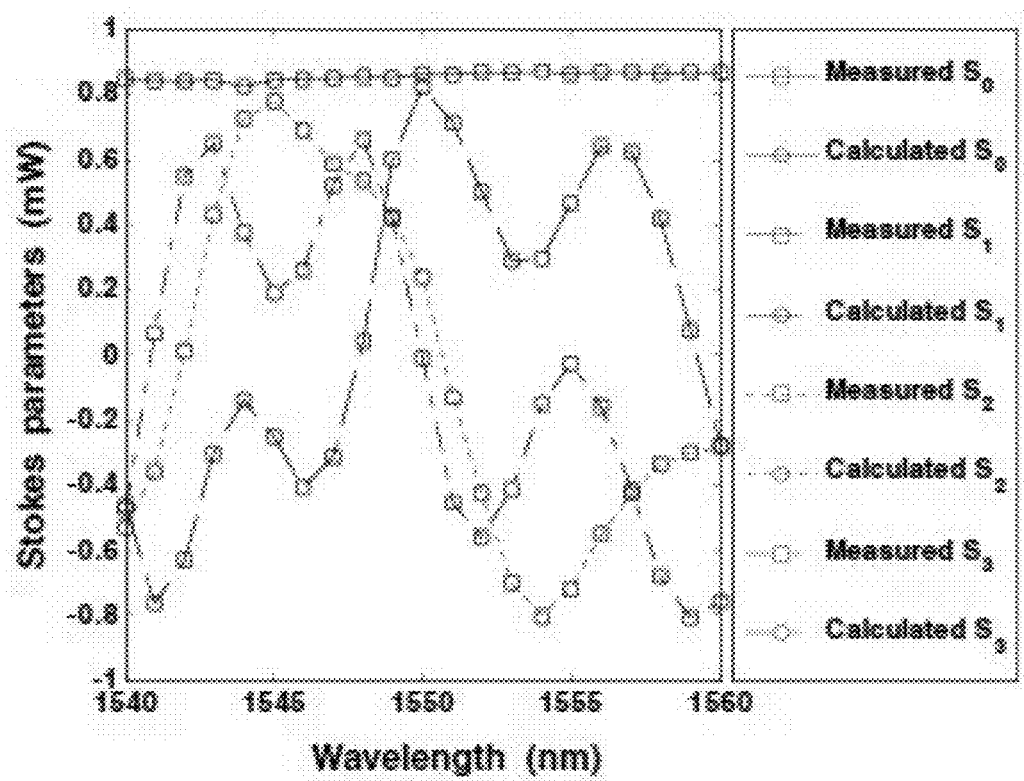
FIG. 93C: Measured and calculated output Stokes parameters corresponding to input polarization state $[1\ 0\ 1\ 0]^T$.
Figure 93D:
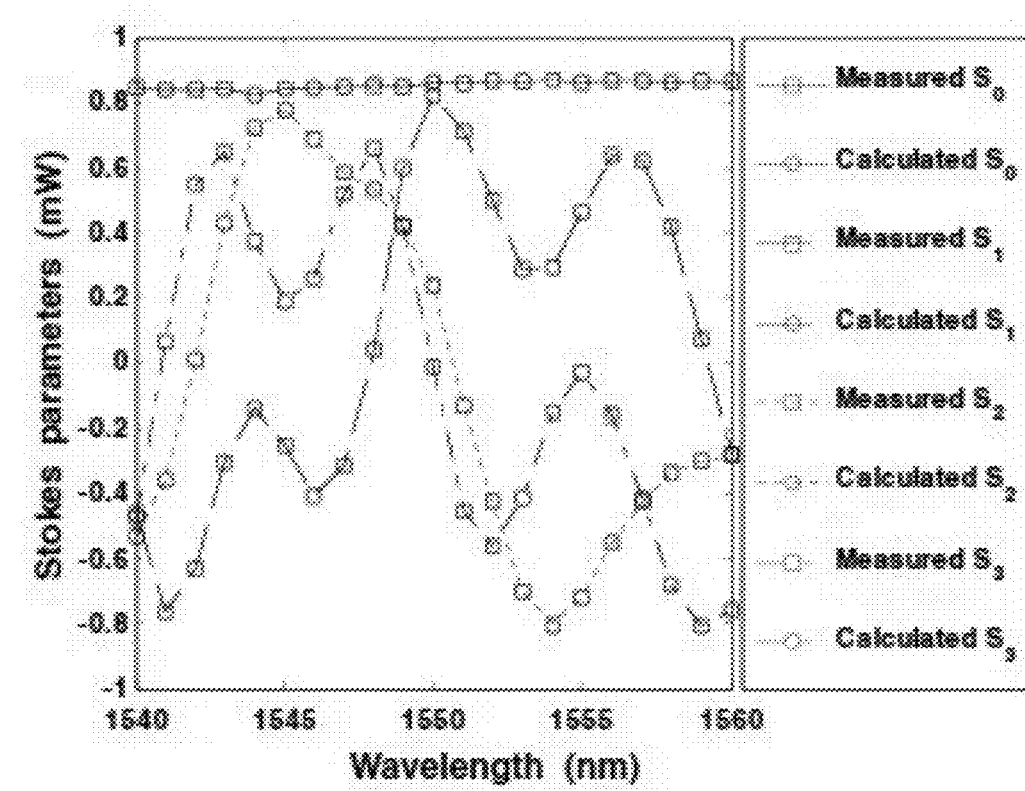
FIG. 93D: Measured and calculated output Stokes parameters corresponding to input polarization state $[1\ 0\ 0\ 1]^T$.

The fiber optics cable is defined with Mueller matrix MFIBER. The Mueller matrix MFIBER used for fiber optic cable modeling is derived from previously published work. The Mueller matrix MFIBER for a 10 km single-mode fiber (SMF) has been measured experimentally and defined analytically and both results match each other with less than 1.5% error. FIG. 92 shows the experimental set up that was used to determine the Mueller matrix of the fiber.

In the first step, using the experimental setup shown in FIG. 92 four pre-determined Stokes parameter inputs $I_0[1\ 1\ 0\ 0]^T$, $I_0[1\ -1\ 0\ 0]^T$, $I_0[1\ 0\ 1\ 0]^T$ and $I_0[1\ 0\ 0\ 1]^T$ with $I_0=2$ mW are generated with the Computer, Tunable Laser Source, Computer-controlled Polarization Controller (PC) and in-line Polarimeter.

These Stokes parameter inputs are monitored and controlled using the Computer-controlled PC and in-line Polarimeter. The in-line Polarimter at the end is used to measure the output Stokes parameters.

In the second step three Stokes parameter inputs $I_0[1\ 1\ 0\ 0]^T$, $I_0[1 -0.5\ 0.866\ 0]^T$ and $I_0[1 -0.5 -0.866\ 0 1T$ are generated one by one and their corresponding outputs are measured. Then the theoretical outputs corresponding to the first four pre-determined Stokes parameter inputs are calculated from the measured data of the three input-output pairs using the following Mueller matrix MFIBER for the fiber.

$$M_{VIBER} = \begin{bmatrix} \frac{1}{2}\left(\frac{I_1}{I_0}+\frac{I_2}{I_0}\right) & \frac{1}{2}\left(\frac{I_1}{I_0}-\frac{I_2}{I_0}\right) & \frac{I_1}{I_0}-\frac{1}{2}\left(\frac{I_1}{I_0}+\frac{I_2}{I_0}\right) & \frac{I_1}{I_0}-\frac{1}{2}\left(\frac{I_1}{I_0}+\frac{I_2}{I_0}\right) \\ \frac{1}{2}\left(a_1\frac{I_1}{I_0}+b_1\frac{I_2}{I_0}\right) & \frac{1}{2}\left(a_1\frac{I_1}{I_0}-b_1\frac{I_2}{I_0}\right) & \frac{I_1}{I_0}-\frac{1}{2}\left(a_1\frac{I_1}{I_0}+b_1\frac{I_2}{I_0}\right) & \frac{I_1}{I_0}-\frac{1}{2}\left(a_1\frac{I_1}{I_0}+b_1\frac{I_2}{I_0}\right) \\ \frac{1}{2}\left(a_2\frac{I_1}{I_0}+b_2\frac{I_2}{I_0}\right) & \frac{1}{2}\left(a_2\frac{I_1}{I_0}-b_2\frac{I_2}{I_0}\right) & \frac{I_1}{I_0}-\frac{1}{2}\left(a_2\frac{I_1}{I_0}+b_2\frac{I_2}{I_0}\right) & \frac{I_1}{I_0}-\frac{1}{2}\left(a_2\frac{I_1}{I_0}+b_2\frac{I_2}{I_0}\right) \\ \frac{1}{2}\left(a_3\frac{I_1}{I_0}+b_3\frac{I_2}{I_0}\right) & \frac{1}{2}\left(a_3\frac{I_1}{I_0}-b_3\frac{I_2}{I_0}\right) & \frac{I_1}{I_0}-\frac{1}{2}\left(a_3\frac{I_1}{I_0}+b_3\frac{I_2}{I_0}\right) & \frac{I_1}{I_0}-\frac{1}{2}\left(a_3\frac{I_1}{I_0}+b_3\frac{I_2}{I_0}\right) \end{bmatrix} \quad (6.51)$$

In the final step, the measured and calculated four output Stokes parameter vectors are compared in the wavelength range from 1540 nm to 1560 nm as shown in FIG. 93.

We will use data extracted from this figure to determine the Mueller matrix MFIBER. Choosing data for the 1546 nm wavelength we obtain the following four Stokes parameters vectors:

1. The input Stokes parameters vector $[1\ 1\ 0\ 0]^T$ yields the output Stokes parameters vector $[0.83\ 0.75\ 0.3\ 0.3]^T = 0.83\ [1\ 0.9\ 0.36\ 0.36]^T = I1[1\ a1\ a2\ a3]^T$, where we have MFIBER calculation parameters I1=0.83, a1=0.9, a2=0.36, and a3=0.36.
2. The input Stokes parameters vector $[1\ -1\ 0\ 0]^T$ yields the output Stokes parameters vector $[0.83\ -0.75\ -0.3\ -0.3]^T = 0.83\ [1\ -0.9\ -0.36\ -0.36]^T = I2[1\ b_1\ b2\ b3]^T$, where we have MFIBER calculation parameters I2=0.83, $b_1$=−0.9, b2=−0.36, and b3=−0.36.
3. The input Stokes parameters vector $[1\ 0\ 1\ 0]^T$ yields the output Stokes parameters vector $[0.83\ -0.4\ 0.75\ 0.25]^T = 0.83[1\ -0.48\ 0.9\ 0.3]^T = I3[1\ c1\ c2\ c3]^T$, where we have MFIBER calculation parameters I3=0.83, c1=−0.48, c2=0.9, and c3=0.3.
4. The input Stokes parameters vector $[1\ 0\ 0\ 1]^T$ yields the output Stokes parameters vector $[0.83\ -0.4\ 0.25\ 0.75]^T = 0.83[1\ -0.48\ 0.3\ 0.9]^T = I4[1\ d1\ d2\ d3]^T$, where we have MFIBER calculation parameters I4=0.83, d1=−0.48, d2=0.3 and d3=0.9.

If we use parameters I1, I2, I3, I4, and parameters (a1a2a3), ($b_1$b2b3), (c1c2c3), (d1d2d3) and $I_0$=1 we can represent a 10 km fiber Mueller matrix MFIBER as shown below:

$$M_{FIBER} = \begin{bmatrix} 0.83 & 0 & 0 & 0 \\ 0 & 0.747 & -0.3984 & -0.3984 \\ 0 & 0.2988 & 0.757 & 0.249 \\ 0 & 0.2988 & 0.249 & 0.747 \end{bmatrix} \quad (6.52)$$

Now we can use this Mueller matrix to model 2, 3 and 4 channel VLC PDM systems with a fiber optic cable used as the transmission media.

Two Channel System

A two channel system with fiber optic cable used as the transmission media can be represented the same as in FIG. 65 with one difference. The difference is that the light path represented in the figure by $S_{AIR}$ will be replaced with SFIBER.

The transmitter (of FIGS. 66 and 67) is unchanged, resulting in the same Stokes vectors $S_{0°}$ and $S_{90°}$.

$$S_{0°} = \frac{1}{2}\begin{bmatrix} T \\ TD\ \cos(0°) \\ TD\ \sin(0°) \\ 0 \end{bmatrix} = \frac{1}{2}\begin{bmatrix} 1 \\ 0.99 \\ 2 \\ 0 \\ 0 \end{bmatrix} = \begin{bmatrix} 0.25 \\ 0.2475 \\ 0 \\ 0 \end{bmatrix} \quad (6.53)$$

$$S_{90°} = \frac{1}{2}\begin{bmatrix} T \\ TD\ \cos(180°) \\ TD\ \sin(180°) \\ 0 \end{bmatrix} = \frac{1}{2}\begin{bmatrix} 1 \\ -0.99 \\ 2 \\ 0 \\ 0 \end{bmatrix} = \begin{bmatrix} 0.25 \\ -0.2475 \\ 0 \\ 0 \end{bmatrix} \quad (6.54)$$

Two polarized light beams are combined and launched into the fiber optic cable together. The combined light beam that exists the fiber is defined as $$S_{FIBER} = M_{FIBER}(b_0 S_{0°} + b_{90} S_{90°}) \quad (6.55)$$

For the two channel system we can now calculate SFIBER and FIG. 94 shows this Stokes vector for all 2-bit binary combinations.

The combined light beam SFIBER exits the fiber optic cable and illuminates the receiver chip's DoFP polarization filter array. The photodiode light inputs $I_{0°}$ and $I_{90°}$ are evaluated as $$I_{0°} = [1\ 0\ 0\ 0]M_{0°}S_{FIBER} \quad (6.56)$$

$$I_{90°} = [1\ 0\ 0\ 0]M_{90°}S_{FIBER} \quad (6.57)$$

We can now calculate all four values for each channel and we obtain Table 6.14. In this case if we assign threshold 0.02 for both 00 and 900 channels between binary value '0' and binary value '1' we can successfully decode the transmitted signals.

TABLE 6.14

Outputs from two channel system with fiber media.

| $I_{90°}$ | $I_{0°}$ | Output$_{90°}$ | Output$_{0°}$ |
|---|---|---|---|
| 0 | 0 | 0 | 0 |
| 0.006117 | 0.097633 | 0 | 1 |
| 0.097633 | 0.006117 | 1 | 0 |
| 0.10375 | 0.10375 | 1 | 1 |

Three Channel System

For a three channel system, we can refer to FIG. 69 and again replace $S_{AIR}$ with SFIBER. The transmitter represented in FIGS. 70, 71, and 72 is unchanged, resulting in the same Stokes vectors $S_{0°}$, $S60°$, and $S_{120°}$.

$$S_{0°} = \frac{1}{2}\begin{bmatrix} T \\ TD\ \cos(0°) \\ TD\ \sin(0°) \\ 0 \end{bmatrix} = \frac{1}{2}\begin{bmatrix} 1 \\ 0.99 \\ 2 \\ 0 \\ 0 \end{bmatrix} = \begin{bmatrix} 0.25 \\ 0.2475 \\ 0 \\ 0 \end{bmatrix} \quad (6.58)$$

$$S_{90°} = \frac{1}{2}\begin{bmatrix} T \\ TD\ \cos(120°) \\ TD\ \sin(120°) \\ 0 \end{bmatrix} = \frac{1}{2}\begin{bmatrix} 1 \\ -0.99 \cdot \frac{1}{2} \\ 0.99 \frac{\sqrt{3}}{2} \cdot \frac{1}{2} \\ 0 \end{bmatrix} = \begin{bmatrix} 0.25 \\ -0.124 \\ 0.2145 \\ 0 \end{bmatrix} \quad (6.59)$$

$$S_{120°} = \frac{1}{2}\begin{bmatrix} T \\ TD\ \cos(240°) \\ TD\ \sin(240°) \\ 0 \end{bmatrix} = \frac{1}{2}\begin{bmatrix} 1 \\ -0.99 \cdot \frac{1}{2} \\ -0.99 \frac{\sqrt{3}}{2} \cdot \frac{1}{2} \\ 0 \end{bmatrix} = \begin{bmatrix} 0.25 \\ -0.124 \\ -0.2145 \\ 0 \end{bmatrix} \quad (6.60)$$

Figure 95:
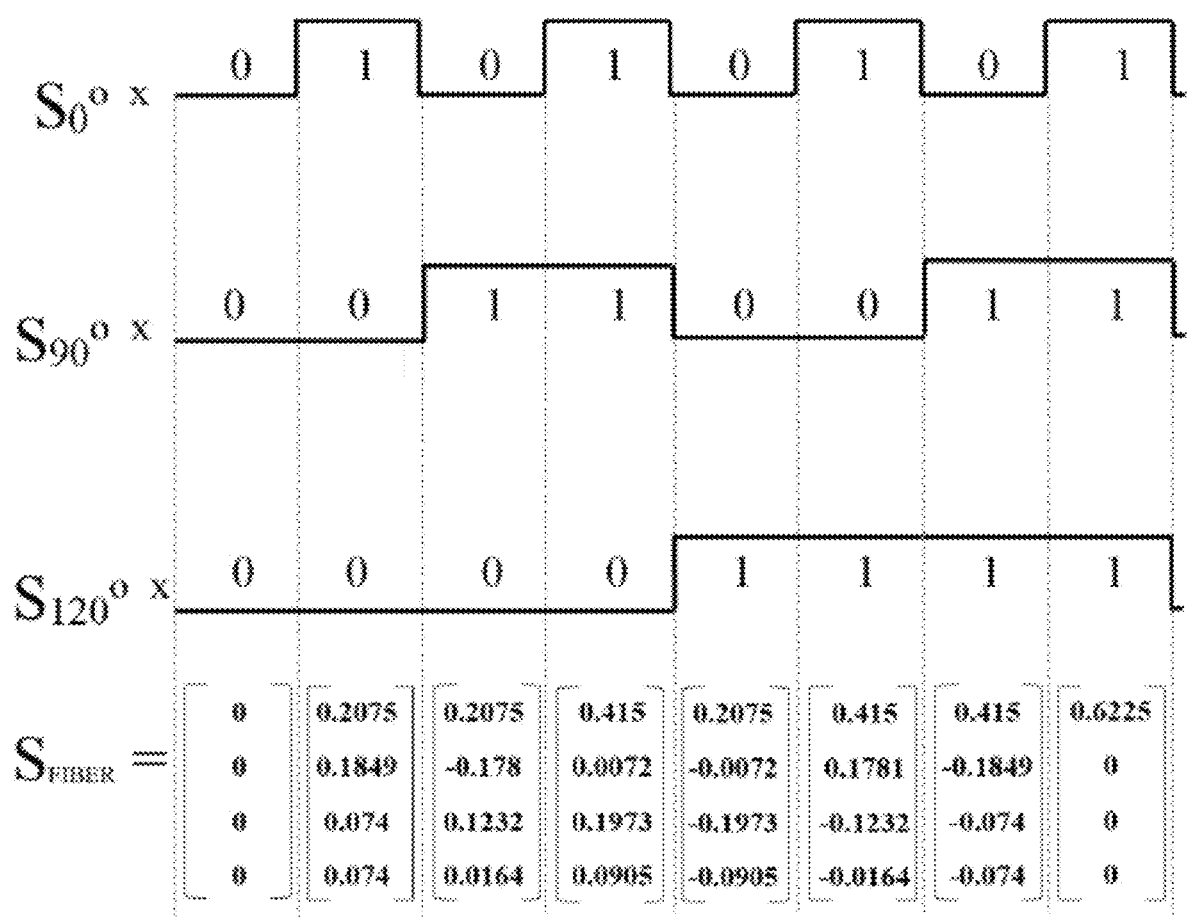
FIG. 95: Three channel light signal exiting the fiber.

Three polarized light beams are combined and launched into the fiber optic cable and the combined light beam that exits the fiber is defined as $$S_{FIBER} = M_{FIBER}(b_0 S_{0°} + b_{90} S_{90°} + b_{120} S_{120°}) \quad (6.61)$$

where MFIBER is defined as specified in (6.52). FIG. 95 shows the signal as it exits the fiber.

The combined light beam SFIBER exits the fiber and illuminates the receiver chip's polarization filter array. The photodiode light inputs $I_{0°}$, $I_{60°}$ and $I_{120°}$ are evaluated as $$I_{0°} = [1\ 0\ 0\ 0] M_{0°} S_{FIBER} \qquad (6.62)$$

$$I_{60°} = [1\ 0\ 0\ 0] M_{60°} S_{FIBER} \qquad (6.63)$$

$$I_{120°} = [1\ 0\ 0\ 0] M_{120°} S_{FIBER} \qquad (6.64)$$

Table 6.15 shows each of three channel 00, 600 and 1200 photodiode light inputs $I_{0°}$, $I_{60°}$ and $I_{120°}$ and the corresponding channel outputs when compared with a threshold value of 0.075.

TABLE 6.15

Outputs from three channel system with fiber media.

| $I_{120°}$ | $I_{60°}$ | $I_{0°}$ | Output$_{120°}$ | Output$_{60°}$ | Output$_{0°}$ |
|---|---|---|---|---|---|
| 0 | 0 | 0 | 0 | 0 | 0 |
| 0.013145 | 0.044847 | 0.097633 | 0 | 0 | 1 |
| 0.04751 | 0.100316 | 0.007799 | 0 | 1 | 0 |
| 0.060577 | 0.145148 | 0.105525 | 0 | 1 | 1 |
| 0.095048 | 0.010477 | 0.0501 | 1 | 0 | 0 |
| 0.108115 | 0.505309 | 0.147826 | 1 | 0 | 1 |
| 0.14248 | 0.110778 | 0.057992 | 1 | 1 | 0 |
| 0.155625 | 0.155625 | 0.155625 | 1 | 1 | 1 |

Four Channel System

For a four channel system, we refer to FIG. 79 and replace $S_{AIR}$ with SFIBER.

In order to recover all four channels on the receiver outputs we will have to apply similar coding techniques as those described earlier for four channel systems. On the input side, we will apply different amplitudes for each channel. On the output side, we will use multiple threshold detectors. Rather than a single channel requiring the multi-thresholding at the receiver, in this case it will be used on two of the channels.

Analysis of this four channel system with fiber will follow the path we have already established. The output of the 0° DoFP polarization filter is the light beam whose Stokes vector representation is $S_{0°}$, defined as shown below.

$$S_{0°} = 0.75 M_{0°} S_{IN} = 0.75 \frac{1}{2} \begin{bmatrix} (p_x^2 + p_y^2) \\ (p_x^2 - p_y^2) \cos(2\Theta) \\ (p_x^2 - p_y^2) \sin(2\Theta) \\ 0 \end{bmatrix} \qquad (6.65)$$

Note that for this channel we use 0.75 of its amplitude to apply channel coding on the input of the system. This yields $$S_{0°} = 0.75 \frac{1}{2} \begin{bmatrix} T \\ TD\cos(0°) \\ TD\sin(0°) \\ 0 \end{bmatrix} = \qquad (6.66)$$

$$0.75 \frac{1}{2} \begin{bmatrix} 1 \\ 0.99 \\ 2 \\ 0 \\ 0 \end{bmatrix} = 0.75 \begin{bmatrix} 0.25 \\ 0.2475 \\ 0 \\ 0 \end{bmatrix} = \begin{bmatrix} 0.1875 \\ 0.185625 \\ 0 \\ 0 \end{bmatrix}$$

The Stokes vector $S_{45°}$ is defined as shown below.

$$S_{45°} = 0.8 M_{45°} S_{IN} = \begin{bmatrix} 0.2 \\ 0 \\ 0.198 \\ 0 \end{bmatrix} \qquad (6.67)$$

Note that for this channel we use 0.8 of its amplitude to apply channel coding on the input of the system.

As an additional step in the coding, the 90° channel sends light for both binary levels. For binary '0' $S_{90°}$ is:

$$S_{90°} = 0.611 M_{90°} S_{IN} = \begin{bmatrix} 0.15275 \\ -0.15122 \\ 0 \\ 0 \end{bmatrix} \qquad (6.68)$$

For binary '1' $S_{90°}$ is:

$$S_{90°} = M_{90°} S_{IN} = \begin{bmatrix} 0.25 \\ -0.2475 \\ 0 \\ 0 \end{bmatrix} \qquad (6.69)$$

The Stokes vector $S_{135°}$ is defined as shown below. It uses an amplitude of 1.1.

$$S_{180°} = 1.1 M_{180°} S_{IN} = \begin{bmatrix} 0.275 \\ 0 \\ -0.27225 \\ 0 \end{bmatrix} \qquad (6.70)$$

Four polarized light beams are added together in the fiber optics cable and the combined light beam is defined as $$S_{FIBER} = M_{FIBER}(b_0 S_{0°} + b_{65} S_{65°} + b_{135} S_{135°}) \qquad (6.71)$$

where MFIBER is again defined as specified in (6.52).

Figure 96:
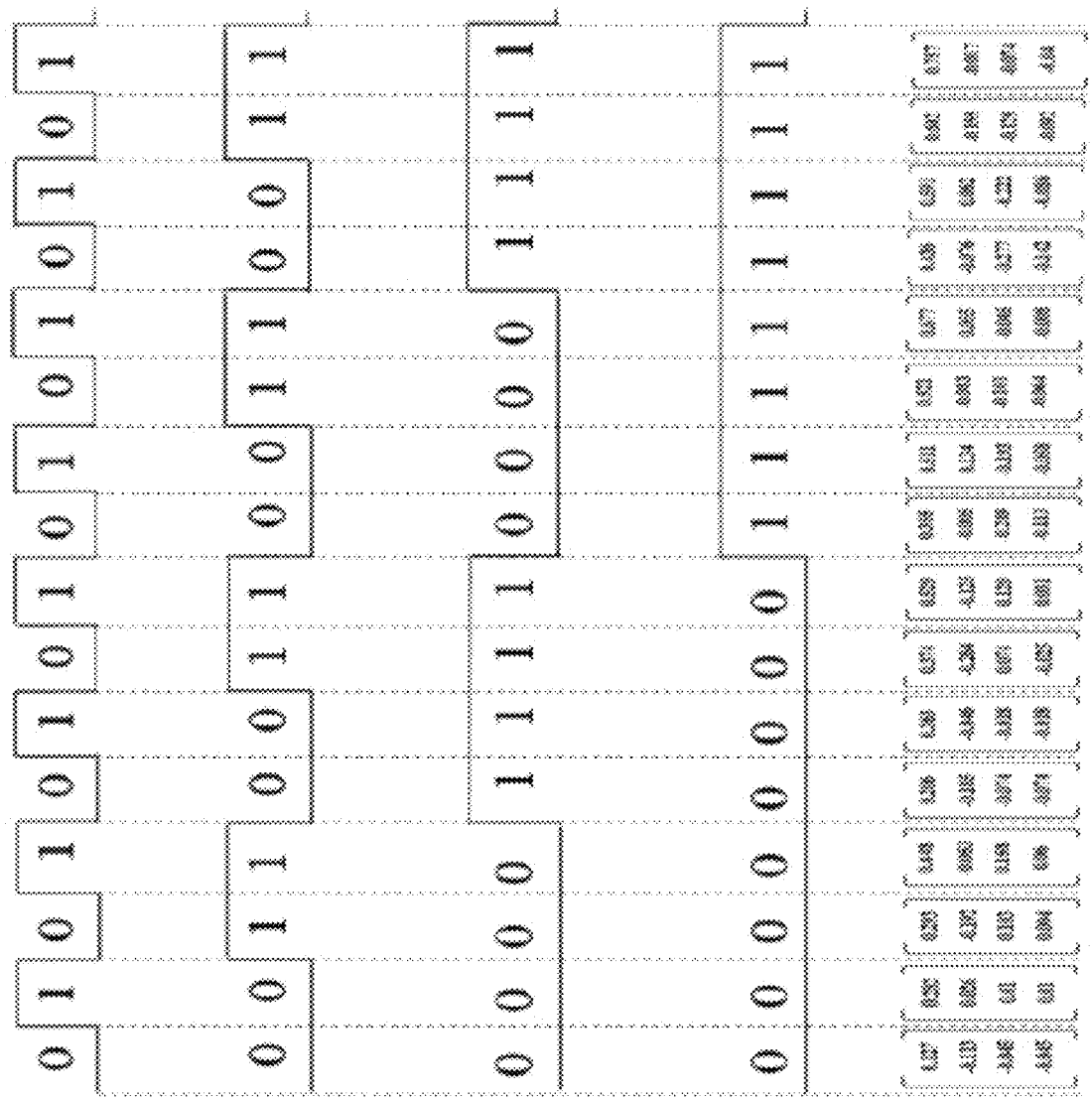
FIG. 96: Four channel light signal exiting the fiber.

FIG. 96 shows all 4 channels' optical signal as it exits the fiber.

The photodiode light inputs $I_{0°}$, $I_{45°}$, $I_{90°}$ o and $I_{135°}$ are as follows. Their numerical values are Oven in Table 6.16.

$$I_{0°} = [1\ 0\ 0\ 0] M_{0°} S_{FIBER} \qquad (6.72)$$

$$I_{45°} = [1\ 0\ 0\ 0] M_{45°} S_{FIBER} \qquad (6.73)$$

$$I_{90°} = [1\ 0\ 0\ 0] M_{90°} S_{FIBER} \qquad (6.74)$$

$$I_{135°} = [1\ 0\ 0\ 0] M_{135°} S_{FIBER} \qquad (6.75)$$

TABLE 6.16

All 4 receiver channels' photodiode input light signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_0$ | 0.094 | 0.077 | 0.920 | 0.099 | 0.096 | 0.079 | 0.023 | 0.101 | 0.095 | 0.161 | 0.11 | 0.153 | 0.09 | 0.163 | 0.112 | 0.185 |
| $I_{45}$ | 0.021 | 0.073 | 0.096 | 0.151 | 0.034 | 0.086 | 0.112 | 0.164 | 0.021 | 0.08 | 0.105 | 0.158 | 0.1 | 0.998 | 0.118 | 0.171 |
| $I_{90}$ | 0.06 | 0.064 | 0.121 | 0.125 | 0.098 | 0.102 | 0.159 | 0.163 | 0.09 | 0.991 | 0.151 | 0.155 | 0.128 | 0.132 | 0.189 | 0.198 |
| $I_{135}$ | 0.063 | 0.009 | 0.038 | 0.073 | 0.05 | 0.095 | 0.075 | 0.1 | 0.15 | 0.125 | 0.155 | 0.18 | 0.178 | 0.203 | 0.182 | 0.207 |

The receiver output for the 45° polarization data channel is obtained by applying comparator threshold 0.097 on the data from Table 6.16. Similarly, receiver output for the 135° channel is obtained by applying threshold 0.11. Tables 6.17 and 6.18 show the output for these channels, which are operating correctly.

TABLE 6.17

45° polarization data receiver output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 45° output | 0 | 0 | 1 | 1 | 0 | 0 | 1 | 1 | 0 | 0 | 1 | 1 | 0 | 0 | 1 | 1 |

TABLE 6.18

135° polarization data receiver output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 135° output | 0 | 0 | 0 | 0 | 0 | 0 | 0 | 0 | 1 | 1 | 1 | 1 | 1 | 1 | 1 | 1 |

Figure 97:
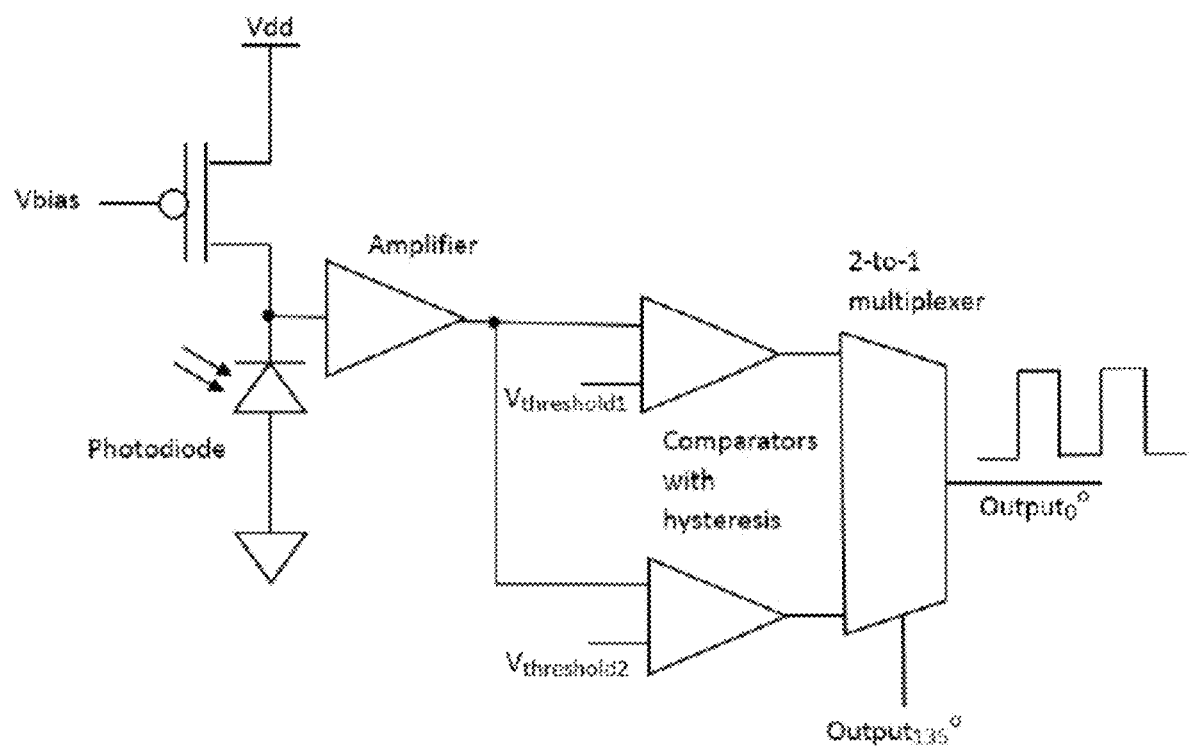
FIG. 97: 0° data channel circuit with 2 comparators and 2-to-1 multiplexer.

The receiver output for the 0° polarization data channel is obtained by applying two comparators with thresholds of 0.04 and 0.115 on data from Table 6.16 as illustrated in FIG. 97. The results out of these comparators are shown in Table 6.19

TABLE 6.19

0° polarization data receiver 2 comparators' outputs.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{0°} > 0.04$ | 0 | 1 | 0 | 1 | 0 | 1 | 0 | 1 | 1 | 1 | 1 | 1 | 1 | 1 | 1 | 1 |
| $I_{0°} > 0.115$ | 0 | 0 | 0 | 0 | 0 | 0 | 0 | 0 | 0 | 1 | 0 | 1 | 0 | 1 | 0 | 1 |

Controlling the multiplexer with the output of the 135° channel, the resulting channel output is shown in Table 6.20.

TABLE 6.20

0° polarization data receiver output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0° output | 0 | 1 | 0 | 1 | 0 | 1 | 0 | 1 | 0 | 1 | 0 | 1 | 0 | 1 | 0 | 1 |

Figure 98:
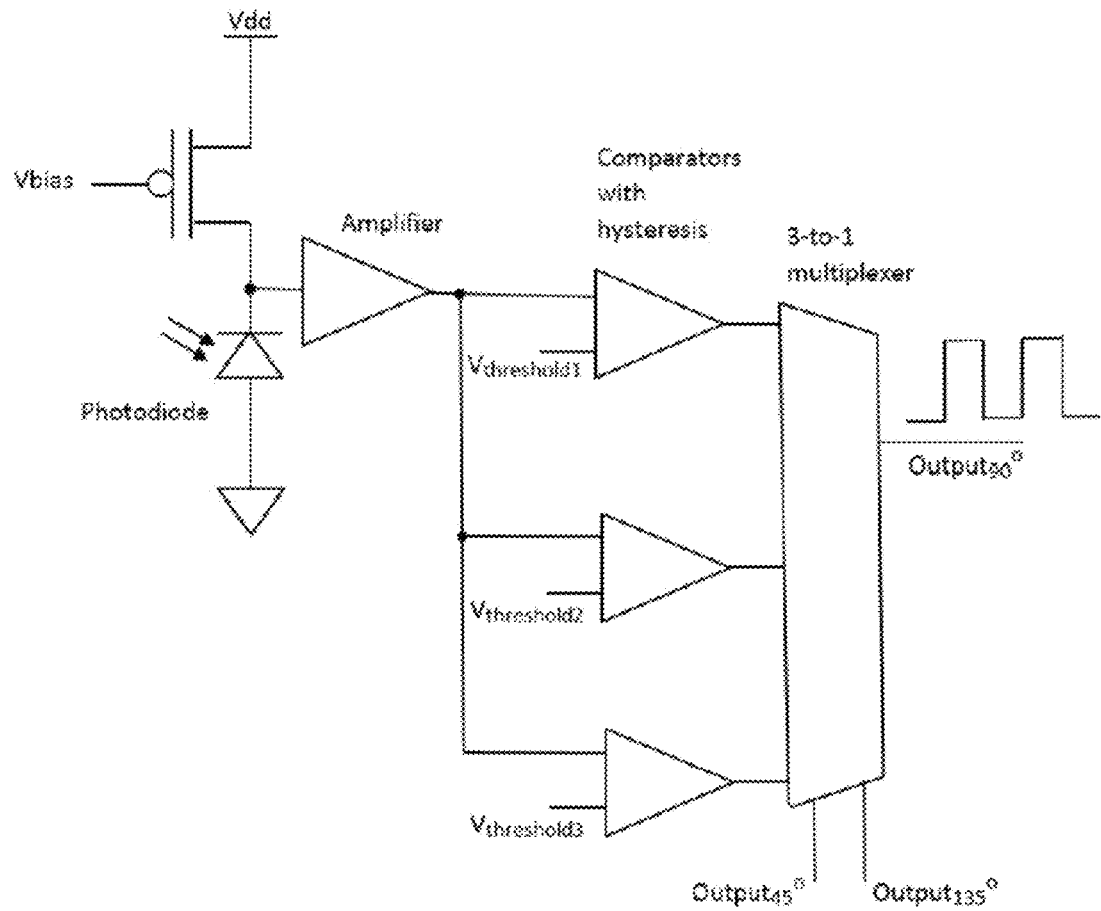
FIG. 98: 90° data channel circuit with 3 comparators and 3-to-1 multiplexer.

Finally, the receiver output for the 90° polarization data channel is obtained by applying three comparators with thresholds 0.07, 0.126 and 0.17 on data from Table 6.16 as shown in FIG. 98. This results in the comparator outputs of Table 6.21.

TABLE 6.21

90° polarization data receiver 3 comparators' outputs.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{90°} > 0.07$ | 0 | 0 | 1 | 1 | 1 | 1 | 1 | 1 | 1 | 1 | 1 | 1 | 1 | 1 | 1 | 1 |
| $I_{90°} > 0.126$ | 0 | 0 | 0 | 0 | 0 | 0 | 1 | 1 | 0 | 0 | 1 | 1 | 1 | 1 | 1 | 1 |
| $I_{90°} > 0.17$ | 0 | 0 | 0 | 0 | 0 | 0 | 0 | 0 | 0 | 0 | 0 | 0 | 0 | 0 | 1 | 1 |

If the 135° and 45° output are both equal to b'0' then the 0.07 threshold is used to determine the 90° output. If the 135° and 45° output are both equal to b'1' then the 0.17 threshold is used to determine the 90° output. If the 135° and 45° outputs are not equal to each other than the 0.126 threshold is used to determine the 90° output. The results of these choices are shown in Table 6.22.

TABLE 6.22

90° polarization data receiver output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 90° output | 0 | 0 | 0 | 0 | 1 | 1 | 1 | 1 | 0 | 0 | 0 | 0 | 1 | 1 | 1 | 1 |

Chip-to-Chip VLC PDM System with Mirrors

Figure 99:
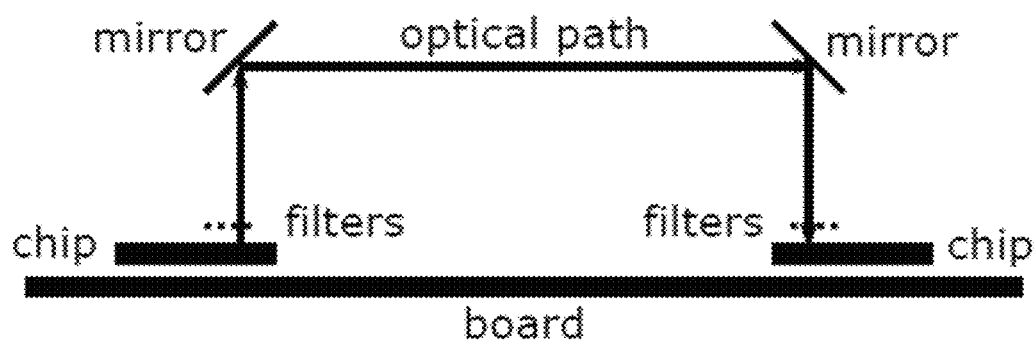
FIG. 99: Chip-to-chip system with mirrors.

An alternative system design that uses air as the transmission medium is illustrated in FIG. 99. The intended use case here is communication between two chips that are on the same board (or other common substrate). In this design, vertical cavity lasers on the left chip launch the light signal up, it is reflected off a pair of mirrors, and is received on the right chip.

In the previous analysis of VLC PDM systems with air used as transmission media, it was defined how multiple input laser light signals are polarized, how they travel combined through the air, and how they are detected at the receiver. We will use the same analysis techniques in this chip-to-chip system, adding the polarization implications of the two mirrors in the optical path.

We analyze 2, 3 and 4 channel chip-to-chip systems. The Mueller matrix for the mirrors, MR, is herein.

Two Channel Chip-to-Chip System

Figure 100:
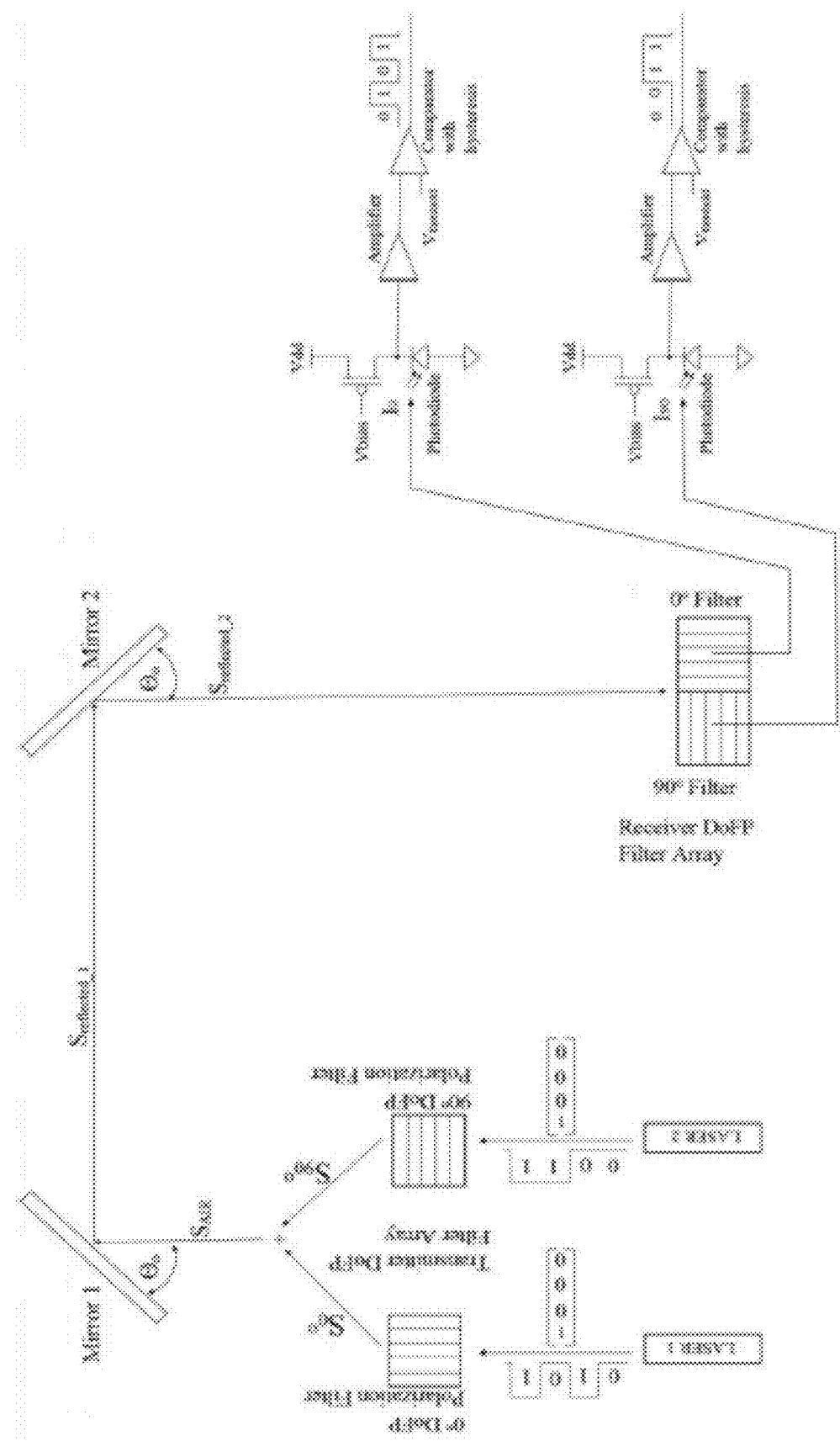
FIG. 100: Two channel chip-to-chip system with mirrors.

A diagram of the two channel chip-to-chip mirror-based system is shown in FIG. 100.

Both polarized light signals $S_{0°}$ and $S_{90°}$ are combined into signal $S_{AIR}$ that travels from the transmitter to the first aluminum mirror. $S_{AIR}$ is calculated $S_{AIR}$ for all four binary combinations of two channels system is shown in FIG. 68. The light beam SARI reaches the first aluminum mirror by incident angle $\Theta_O=45°$ and reflects off this mirror by the same angle. The light beam that reflects of the first mirror is defined as $S_{reflected\_1}$ and it is calculated as $$S_{reflected\_1} = M_R S_{AIR} \quad (6.77)$$

$S_{reflected\_1}$ for all four binary combinations of two channels system is shown in FIG. 101.

This light signal $S_{reflected\_1}$ travels to the second aluminum mirror and it reaches the mirror with incident angle $\Theta_O=45°$ and reflects of this mirror by the same angle. The light beam that reflects of the second mirror is defined as $S_{reflected\_2}$ and it is calculated as $$S_{reflected\_2} = M_R S_{reflected\_1} \quad (6.78)$$

and $S_{reflected\_2}$ for all four binary combinations of the two channel system is shown in FIG. 102.

The light signal $S_{reflected\_2}$ travels to the receiver chip and illuminates the receiver's filter array. Each channel photodiode's input light signal can be calculated as $$I_{0°} = [1\ 0\ 0\ 0] M_{0°} S_{reflected\_2} \quad (6.79)$$

$$I_{90°} = [1\ 0\ 0\ 0] M_{90°} S_{reflected\_2} \quad (6.80)$$

We can now calculate all four values for each channel and obtain Table 6.23 that shows photodiode light inputs $I_{0°}$ and $I_{90°}$ for each channel. A threshold comparison to 0.005 gives the expected binary outputs.

TABLE 6.23

Outputs from two channel chip-to-chip system.

| $I_{90°}$ | $I_{0°}$ | Output$_{90°}$ | Output$_{0°}$ |
|---|---|---|---|
| 0 | 0 | 0 | 0 |
| 0.001914 | 0.008766 | 0 | 1 |
| 0.372096 | 0.001914 | 1 | 0 |
| 0.37401 | 0.01068 | 1 | 1 |

Three Channel Chip-to-Chip System

Figure 103:
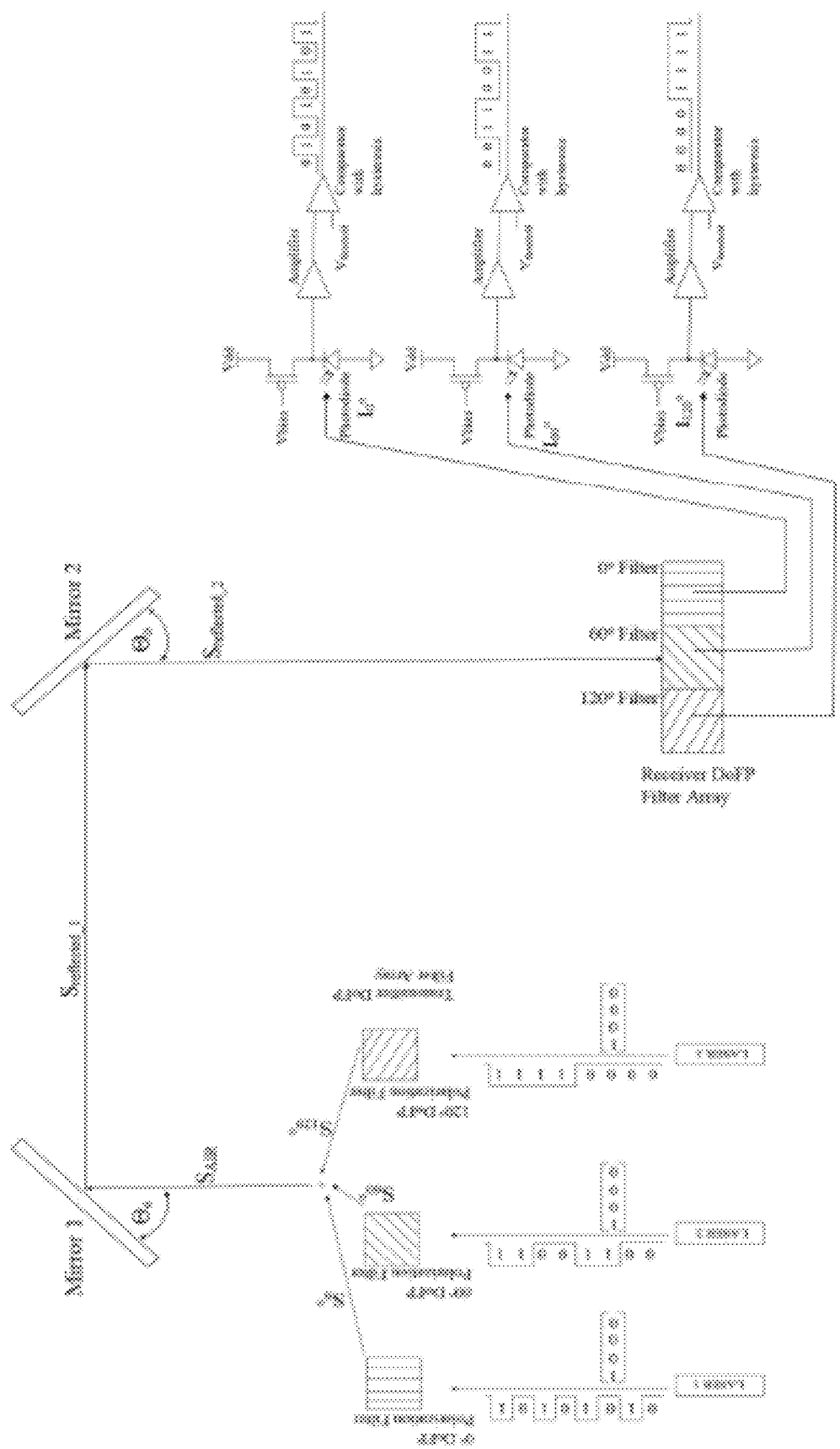
FIG. 103: Three channel chip-to-chip system with mirrors.

FIG. 103 shows a three channel chip-to-chip mirror-based system.

Three polarized light signals are combined into signal SAW that travels from the transmitter to the first aluminum mirror. $S_{AIR}$ for all binary combinations of three channels system is calculated using the following equation.

$$S_{AIR} = b_0 S_{0°} + b_{60} S_{60°} + b_{120} S_{120°} \quad (6.81)$$

$S_{AIR}$ for all eight binary combinations of three channels system is shown in FIG. 73.

The light beam $S_{AIR}$ reaches the first aluminum mirror by incident angle $\Theta_O=45°$ and reflects off this mirror by the same angle. The light beam that reflects off the first mirror is defined as $S_{reflected\_1}$ and it is calculated as $$S_{reflected\_1} = M_R S_{AIR} \quad (6.82)$$

$S_{reflected\_1}$ for all eight binary combinations of three channels system is shown in FIG. 104.

This light signal $S_{reflected\_1}$ travels to the second aluminum mirror and it reaches the mirror with incident angle $\Theta_O=45°$ and reflects off this mirror by the same angle. The light beam 142 that reflects off the second mirror is defined as $S_{reflected\_2}$ and it is calculated as $$S_{reflected\_2} = M_R S_{reflected\_1} \quad (6.83)$$

The reflected signal off the second mirror $S_{reflected\_2}$ is presented for all eight possible binary combinations for the chip-to-chip three channel system in FIG. 105.

This light signal $S_{reflected\_2}$ travels to the receiver chip and when it reaches the DoFP filter array the receiver three data channels for 0°, 60° and 120° polarized light are separated and each channel photodiode input light signal can be calculated as $$I_{0°}=[1\ 0\ 0\ 0]M_{0°}S_{reflected\_2} \quad (6.84)$$

$$I_{60°}=[1\ 0\ 0\ 0]M_{60°}S_{reflected\_2} \quad (6.85)$$

$$I_{120°}=[1\ 0\ 0\ 0]M_{120°}S_{reflected\_2} \quad (6.86)$$

We can now calculate all eight output values for each of the three channel that results in Table 6.24. The table shows all three receiver's channel 0°, 60° and 120° photodiode light inputs $I_{0°}$, $I_{60°}$ and $I_{120°}$.

TABLE 6.24

Outputs from three channel chip-to-chip system.

| $I_{120}$ | $I_{60}$ | $I_0$ | Output$_{120}$ | Output$_{60}$ | Output$_0$ |
|---|---|---|---|---|---|
| 0 | 0 | 0 | 0 | 0 | 0 |
| 0.003627 | 0.003627 | 0.008766 | 0 | 0 | 1 |
| 0.193532 | 0.227886 | 0.003623 | 0 | 1 | 0 |
| 0.19688 | 0.231234 | 0.012396 | 0 | 1 | 1 |
| 0.227886 | 0.193532 | 0.003623 | 1 | 0 | 0 |
| 0.231234 | 0.19688 | 0.012396 | 1 | 0 | 1 |
| 0.421139 | 0.421139 | 0.007254 | 1 | 1 | 0 |
| 0.424766 | 0.424766 | 0.016019 | 1 | 1 | 1 |

The 0° channel photodiode light input is compared inside the comparator with threshold value of 0.008 to yield binary value '0' or binary value '1' at its output.

At the same time, 60° and 120° channel photodiode light inputs are compared inside separate comparators with threshold values of 0.2 to yield binary value '0' or binary value '1' at their outputs.

Four Channel Chip-to-Chip System

Figure 106:
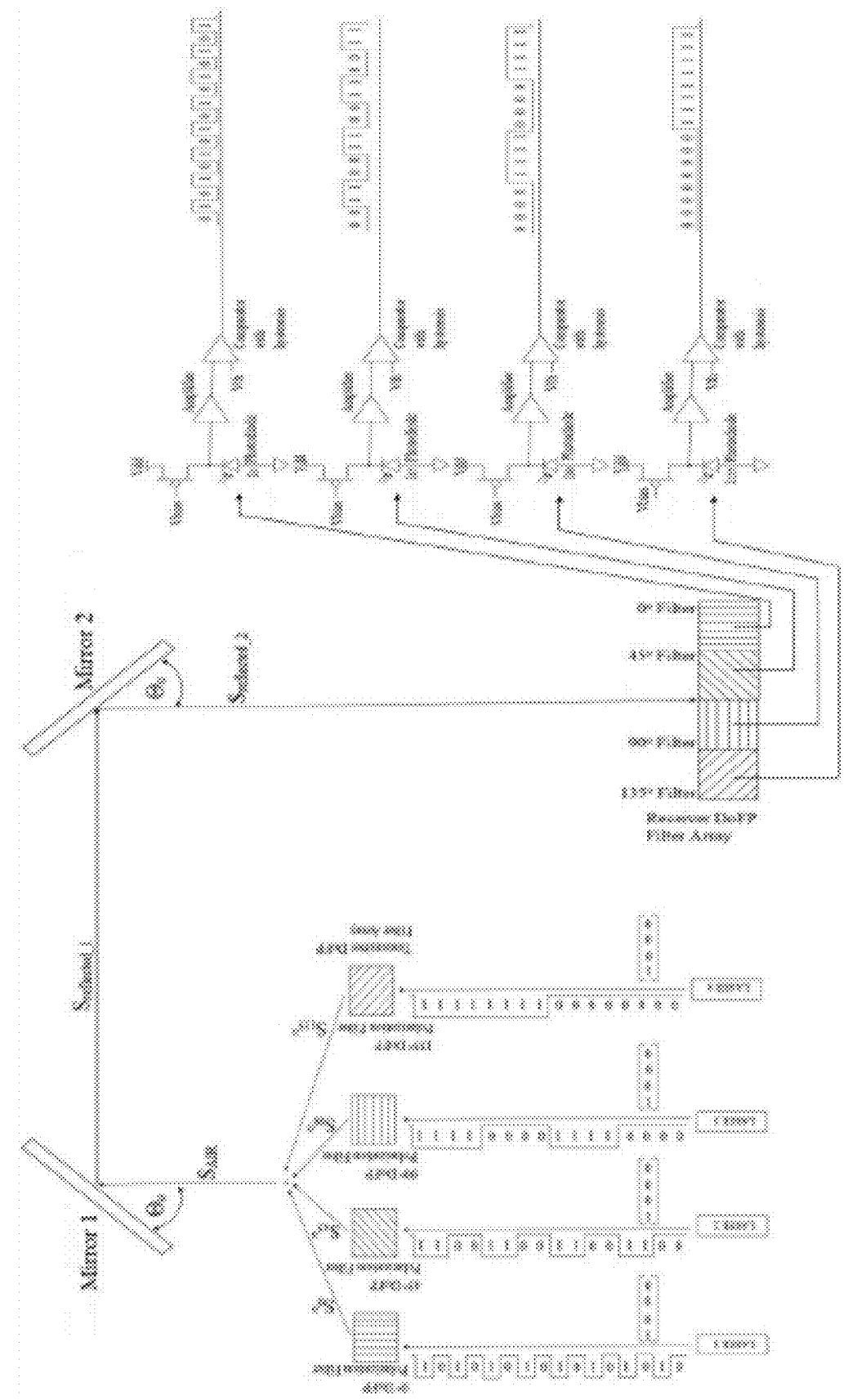
FIG. 106: Four channel chip-to-chip system with mirrors.

FIG. 106 shows the four channel chip-to-chip system with mirrors.

To apply channel coding on the input transmitter side of the system, we apply different amplitudes for every channel's input laser on the transmitter chip. We apply 0.75 of the amplitude we used in all previous analysis examples for the 0° polarization angle data channel. For the 45° polarization angle channel we apply 0.8 of the same reference amplitude. For 90° polarization angle channel, we apply the same reference amplitude when the light signal is ON and we apply 0.611 of the reference amplitude when the light signal is OFF. So in this case we never turn OFF light for that channel. Finally, for 135° polarization angle channel we apply 1.5 times the reference amplitude.

These four 0°, 45°, 90° and 135° polarized light signals are combined in air into light signal $S_{AIR}$ and they travel from the transmitter chip to the first aluminum mirror.

$$S_{AIR}=b_0S_{0°}+b_{45}S_{45°}+b_{90}S_{90°}+b_{135}S_{135°} \quad (6.87)$$

In addition, $S_{AIR}$ for all possible sixteen binary combinations of the four channels is shown in FIG. 107.

The light beam $S_{AIR}$ travels from the transmitter to the first aluminum mirror. It reaches the mirror with incident angle $\Theta_O=45°$ as shown in FIG. 106. This light beam $S_{AIR}$ reflects of the mirror by the same angle of 45°. This reflected light beam is defined as $S_{reflected\_1}$ and is calculated as $$S_{reflected\_1}=M_RS_{AIR} \quad (6.88)$$

Recall that MR is the Mueller matrix of the aluminum mirror and it is given by equation (2.79).

$S_{reflected\_1}$ for all sixteen binary combinations of the four channels system is shown in FIG. 108.

The first mirror's reflected light signal $S_{reflected\_1}$ travels to the second aluminum mirror. The light signal $S_{reflected\_1}$ reaches the mirror with incident angle $\Theta_O=45°$ and it reflects of this mirror by the same angle of 45°. The light beam that reflects of the second mirror is defined as $S_{reflected\_2}$ and it is calculated using the following equation $$S_{reflected\_2}=M_RS_{reflected\_1} \quad (6.89)$$

Again, MR is the Mueller matrix of the aluminum mirror.

The reflected signal off of the second mirror $S_{reflected\_2}$ is shown in FIG. 109.

The light signal $S_{reflected\_2}$ travels to the receiver chip and when it reaches DoFP filter array that is bonded on the surface of the receiver four data channels of 0°, 45°, 90° and 135° polarized light are separated as shown below $$I_{0°}=[1\ 0\ 0\ 0]M_{0°}S_{reflected\_2} \quad (6.90)$$

$$I_{45°}=[1\ 0\ 0\ 0]M_{45°}S_{reflected\_2} \quad (6.91)$$

$$I_{90°}=[1\ 0\ 0\ 0]M_{90°}S_{reflected\_2} \quad (6.92)$$

$$I_{135°}=[1\ 0\ 0\ 0]M_{135°}S_{reflected\_2} \quad (6.93)$$

If we calculate all sixteen values for each of four channels, we will see that due to noise margin limitations there will be some errors in channels binary sequences. Light signals interfere between each other causing some error at each data channel.

In order to fix this issue we introduce simple channel coding routines on output to get correct binary sequences for all four channels. We apply different comparators with different thresholds for each channel. We also use multiple comparators with different thresholds for some channels. In addition, we use multiplexers for some channels to obtain correct outputs all the time.

Receiver input light signals $I_{0°}$, $I_{45°}$, $I_{90°}$, and $I_{135°}$ are shown in the Table 6.25. These light signals are inputs to the channel photodiodes.

TABLE 6.25

All 4 receiver channels' photodiode input light signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_0$ | 0.003 | 0.008 | 0.805 | 0.012 | 0.082 | 0.008 | 0.008 | 0.015 | 0.009 | 0.016 | 0.013 | 0.02 | 0.01 | 0.016 | 0.014 | 0.021 |
| $I_{45}$ | 0.114 | 0.118 | 0.21 | 0.215 | 0.187 | 0.101 | 0.282 | 0.286 | 0.224 | 0.228 | 0.379 | 0.323 | 0.297 | 0.301 | 0.598 | 0.305 |
| $I_{90}$ | 0.227 | 0.229 | 0.277 | 0.378 | 0.372 | 0.374 | 0.522 | 0.523 | 0.508 | 0.509 | 0.657 | 0.689 | 0.965 | 0.356 | 0.502 | 0.635 |
| $I_{135}$ | 0.136 | 0.118 | 0.173 | 0.177 | 0.187 | 0.101 | 0.246 | 0.25 | 0.293 | 0.297 | 0.351 | 0.355 | 0.386 | 0.37 | 0.425 | 0.428 |

The receiver output for the 135° polarization data channel is obtained by applying a comparator with threshold 0.26 on data points from Table 6.25, yielding Table 6.26.

TABLE 6.26

135° polarization data receiver output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 135° | 0 | 0 | 0 | 0 | 0 | 0 | 0 | 0 | 1 | 1 | 1 | 1 | 1 | 1 | 1 | 1 |

Figure 110:
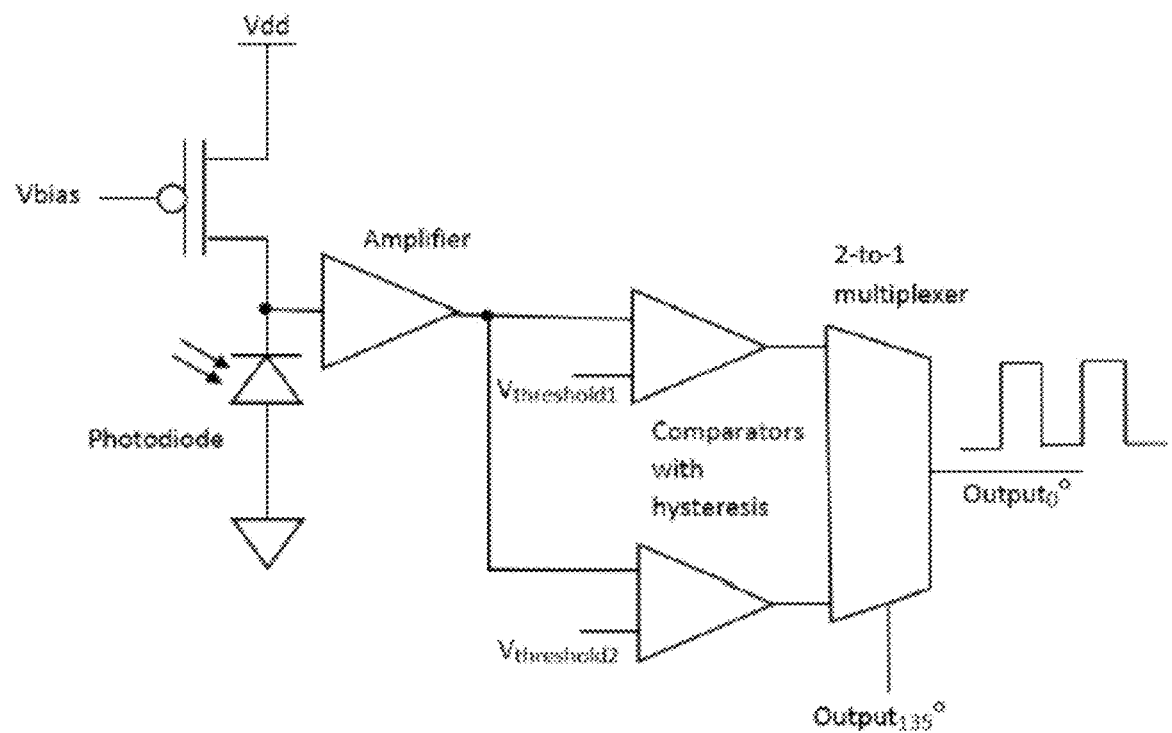
FIG. 110: 0° data channel circuit with two comparators and 2-to-1 multiplexer.

The receiver output for the 0° polarization data channel is obtained by applying two comparators with thresholds of 0.007 and 0.015 on data from Table 6.25. This decoding scheme is shown in FIG. 110. The outputs of the comparators are shown in Table 6.27.

TABLE 6.27

0° polarization data receiver channel 2 comparators output signals.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{0°} > 0.007$ | 0 | 1 | 0 | 1 | 0 | 1 | 0 | 1 | 1 | 1 | 1 | 1 | 1 | 1 | 1 | 1 |
| $I_{0°} > 0.015$ | 0 | 0 | 0 | 0 | 0 | 0 | 0 | 0 | 0 | 1 | 0 | 1 | 0 | 1 | 0 | 1 |

If the 135° output is equal to b'0', then $I_{0°}$ polarization signal with comparator threshold of 0.007 is the data channel output and if the 135° output is equal to b'1', then $I_{0°}$ polarization signal with comparator threshold of 0.015 is the data channel output. The final output is shown in Table 6.28.

The receiver output for the 45° polarization data channel is also obtained by applying two comparators, in this case with thresholds of 0.2 and 0.31, on data from Table 6.25. The outputs of the two comparators are given in Table 6.29.

TABLE 6.28

0° polarization data receiver output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0° output | 0 | 1 | 0 | 1 | 0 | 1 | 0 | 1 | 0 | 1 | 0 | 1 | 0 | 1 | 0 | 1 |

TABLE 6.29

45° polarization data receiver 2 comparators' outputs.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{45°} > 0.2$ | 0 | 0 | 1 | 1 | 0 | 0 | 1 | 1 | 1 | 1 | 1 | 1 | 1 | 1 | 1 | 1 |
| $I_{45°} > 0.31$ | 0 | 0 | 0 | 0 | 0 | 0 | 0 | 0 | 0 | 1 | 1 | 0 | 0 | 1 | 1 |

If the 135° output is equal to b'0', then $I_{45°}$ polarization data with comparator threshold of 0.2 is the data channel output. If the 135° output is equal to b'1', then $I_{45°}$ polarization data with comparator threshold of 0.31 is the data channel output. This is shown in Table 6.30.

TABLE 6.30

45° polarization data receiver output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 45° output | 0 | 0 | 1 | 1 | 0 | 0 | 1 | 1 | 0 | 0 | 1 | 1 | 0 | 0 | 1 | 1 |

Figure 111:
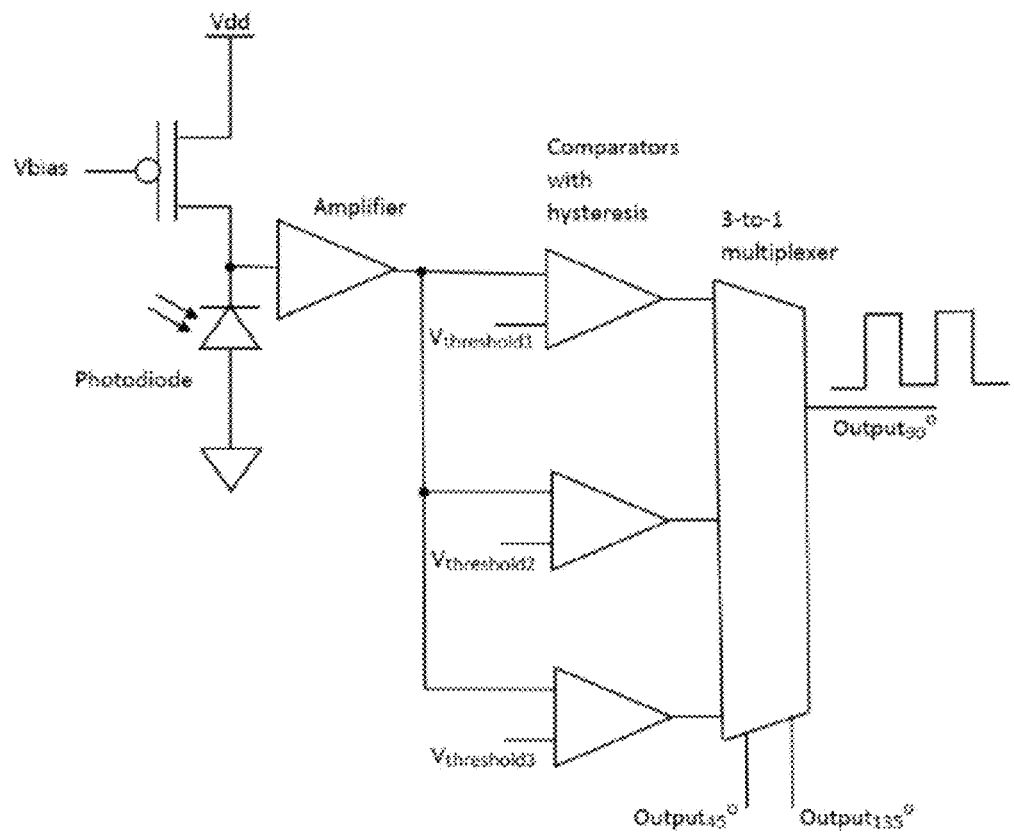
FIG. 111: 90° data channel circuit with three comparators and 3-to-1 multiplexer.

Finally, the receiver output for the 90° polarization data channel is obtained by applying three comparators with thresholds 0.24, 0.51, and 0.7 on data from Table 6.25 as is shown in FIG. 111. The outputs from the three comparators are shown in Table 6.31.

The 3-to-1 multiplexer decision logic works as a function of $I_{135°}$ and $I_{45°}$. If the 135° and 45° outputs are both equal to b'0' then the 0.24 threshold is used to determine the 90° output. If the 135° and 45° outputs are both equal to b'1' then the 0.7 threshold is used to determine the 90° output. If the 135° and 45° outputs are not equal to each other, then the 0.51 threshold is used to determine the 90° output. The results of these choices are shown in Table 6.32.

Table 6.32 shows 90° polarization data channel output. This table shows that $I_{90°}$ or 90° polarization data channel output binary stream is b'0000111100001111' as it is expected.

TABLE 6.31

90° polarization data receiver 3 comparators' outputs.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $I_{90°} > 0.24$ | 0 | 0 | 1 | 1 | 1 | 1 | 1 | 1 | 1 | 1 | 1 | 1 | 1 | 1 | 1 | 1 |
| $I_{90°} > 0.51$ | 0 | 0 | 0 | 0 | 0 | 0 | 1 | 1 | 0 | 0 | 1 | 1 | 1 | 1 | 1 | 1 |
| $I_{90°} > 0.7$ | 0 | 0 | 0 | 0 | 0 | 0 | 0 | 0 | 0 | 0 | 0 | 0 | 0 | 0 | 1 | 1 |

TABLE 6.32

90° polarization data receiver output signal.

| Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 90° output | 0 | 0 | 0 | 0 | 1 | 1 | 1 | 1 | 0 | 0 | 0 | 0 | 1 | 1 | 1 | 1 |

Example 5: Analysis of Design Trade-Offs

Example 5 describes noise properties of the system and end-to-end comparison of the system.

In this example, we will express the relationships between optical power, number of channels, and noise margins that are pertinent to the polarization division multiplexing communication system.

Noise Properties

The VLC PDM system noise properties can be separated into two distinct domains:
Noise properties of the optical portions of the system
Noise properties of electrical portions of the system
We will address each in turn below.

Noise Properties of Optical Subsystem 2, 3 or 4 channel VLC PDM systems have various optical characteristics that impact optical noise properties of the system. As the input transmitter's light beams are launched towards the receiver, they are characterized with the unpolarized Stokes vector $SIN=[IT\ 0\ 0\ 0]^T$ where IT represents light intensity of a transmitter. The light intensity IT is the first parameter of the optical part of the system that impacts system noise properties.

Each unpolarized input light beam is filtered through the transmitter DoFP filter array and the light beams become polarized. Each filter from the array is defined by its Mueller matrix MΘ—transmitter. These Mueller matrices MΘ—transmitter also impact system noise properties.

All polarized light beams are combined into one light beam and they travel from the transmitter's DoFP filter array to the receiver's DoFP filter array via some transmission media that for example can be air, fiber or waveguide. System noise properties are impacted by the number of channel rich in the system because polarized light channels are interfering between each other as they travel through the transmission media.

In addition, system noise properties are impacted by transmission media that is defined by Mueller matrix MFIBER if system transmission media is fiber or matrix MR if a mirror is used.

In addition, system noise properties are also impacted by the receiver's DoFP filter array. These filters separate every polarized light beam into receiver output data channels. Each filter from the array is defined by its Mueller matrix MΘ-receiver. Each receiver's channel light beam can be defined as IΘ where Θ is a VLC PDM system data channel polarization angle. These light beams are then send to photodiode circuits and converted into electrical currents.

Therefore we can define that each receiver channel light beam IΘ is a function of Input light intensity IT
Mueller matrix of transmitter DoFP filter MΘ-transmitter
The system number of channel $n_{ch}$
Media path $m_p$—Transmission media Mueller matrices for fiber, MFIBER, and mirrors, MR, when either is present
Mueller matrix of receiver DoFP filter MΘ-receiver
Each receiver channel's input light beam IΘ can be expressed as a function of these elements.

$$I_\Theta = f(I_T, M_{\Theta-transmitter}, n_{ch}, m_p, M_{\Theta-receiver}) \quad (7.1)$$

Various forms that this function can take have been illustrated in the previous examples. Each receiver channel's input light beam IΘ has two distinct nominal values:

IΘ-H which represents binary value of b'1' and IΘ-L which represents binary value of b'0'.

Manufacturing variations may alter these nominal values, as illustrated in Example 1 for the aluminum nanowire filter implementation.

However, as we have previously seen, the actual values received can vary not only based on the factors expressed above, but also on the values being transmitted by the other channels. In fact, for the three and four channel designs, it is this latter effect, inter-channel interference, that dominates.

Considering worst-case scenarios for the manufacturing variability and inter-channel interference, we can re-express the input light beam as a minimum value for a b'1' input, IΘ-H(MIN), and a maximum value for a b'0' input, IΘ-L(MAX).

Noise Properties of Electrical Subsystem

Figure 112:
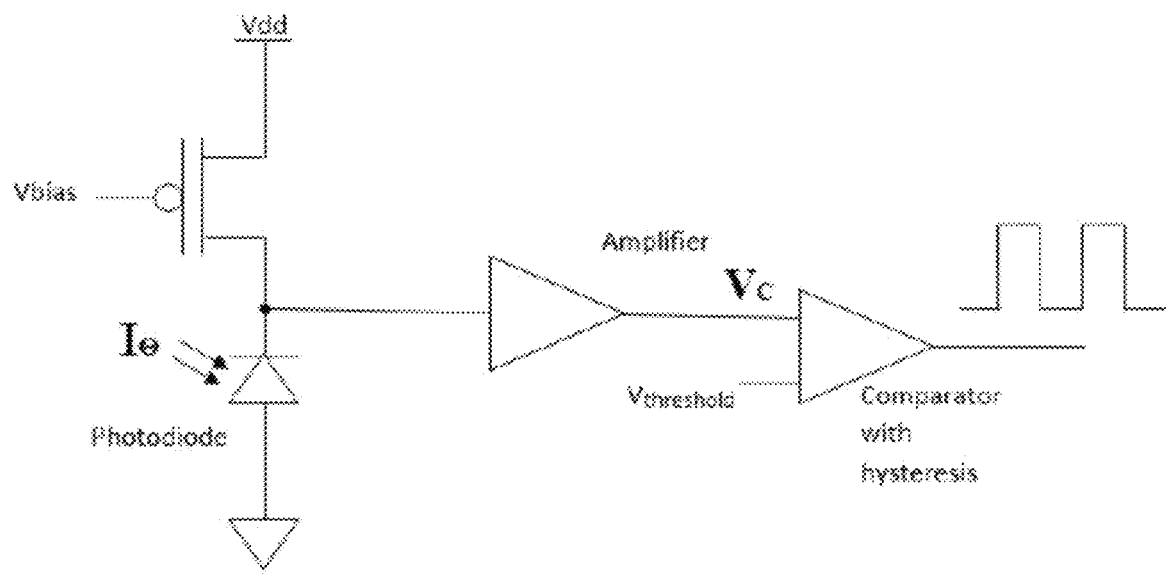
FIG. 112: Receiver data channel.

FIG. 112 shows a general VLC PDM system receiver data channel. The receiver's data channel input light beam IΘ reaches the channel's photodiode where it is converted into a current signal.

Then the current signal is converted into a voltage signal which is amplified before it reaches the comparator as is shown in FIG. 112. The data channel voltage signal VC can be defined as $$V_C = G_{IE} G_{DI} I_\Theta \pm \epsilon_{out} \quad (7.2)$$

In equation (7.2), GOI specifies the gain of the photodiode that converts the input light signal IΘ into current, GIE specifies the gain of the transimpedance amplification that converts photodiode current into voltage, and gout represents the electrical noise in the channel reflected at the output.

Alternatively, one can express the electrical noise reflected at the input of the first-stage amplifier $$V_C = G_{IE}(G_{OI} I_\Theta \pm \epsilon_{in}). \quad (7.3)$$

High noise margin is $$V_{N-H} = V_{C-H(MIN)} - V_{threshold} \quad (7.6)$$

Low noise margin is $$V_{N-L} = V_{threshold} - V_{C-L(MAX)} \quad (7.7)$$

We next apply the above noise assessment on the 2 and 3 channel VLC PDM systems based on the linear CMOS sensor from Example 2 to provide quantitative values for the noise margins.

Noise Margin of Two Channel System

From FIG. 56 mean and standard deviation voltage readings for 2 Channel (0° and 90°) system design are used to determine noise margins of a 2 channel VLC PDM system based on the linear CMOS sensor.

Table 7.1 shows outputs of both receivers' 0° and 90° data channels as function of comparator input voltage VC mean values (VC-H(MEAN) and VC-L(MEAN)) without any electrical noise considerations yet applied.

TABLE 7.1

Two channel system comparator voltages only with optical noise.

| $V_{C\_90}$ | $V_{C\_0}$ | Output$_{90}$ | Output$_0$ |
|---|---|---|---|
| 0 | 0 | 0 | 0 |
| 0.038 | 2.864 | 0 | 1 |
| 2.864 | 0.038 | 1 | 0 |
| 2.902 | 2.902 | 1 | 1 |

For 0° polarization angle for voltage 2.902V standard deviation is σ1=0.035 V and for voltage 2.864V standard deviation is σ2=0.034 V. Also for 90° polarization angle this value is σ3=0.003 V. If we apply these three values on equations (7.4) and (7.5) we obtain the following values for $$V_{C-H} = \begin{cases} V_{C-H(MAX)} = G_{IE}G_{OI}I_{\Theta-H(MAX)} + \epsilon_{out} = 2.902 + \partial\sigma_1 = 2.902 + 0.21 = 3.112V \\ V_{C-H(MIN)} = G_{IE}G_{OI}I_{\Theta-H(MIN)} - \epsilon_{out} = 2.846 - \partial\sigma_2 = 2.846 - 0.204 = 2.642V \end{cases} \quad (7.8)$$

$$V_{C-L} = \begin{cases} V_{C-L(MAX)} = G_{IE}G_{OI}I_{\Theta-L(MAX)} + \epsilon_{out} = 0.038 + \partial\sigma_3 = 0.038 + 0.018 = 0.056V \\ V_{C-L(MIN)} = G_{IE}G_{OI}I_{\Theta-L(MIN)} - \epsilon_{out} = 0.038 - \partial\sigma_3 = 0.038 - 0.018 = 0.02V \end{cases} \quad (7.9)$$

Since we have access to empirical data for output-reflected noise (from Example 2), we will utilize equation (7.2) in what follows.

Since the optical interference can be characterized as static (i.e., it is not a function of time) and the electrical noise is dynamic, we will separate their contributions to the noise margins and describe the worst-case electrical inputs to the comparator as follows $$V_{C-H(MIN)} = G_{IE} G_{OI} I_{\Theta-H(MIN)} - \epsilon_{out} \quad (7.4)$$

and $$V_{C-H(MAX)} = G_{IE} G_{OI} I_{\Theta-L(MAX)} - \epsilon_{out} \quad (7.5)$$

Figure 113:
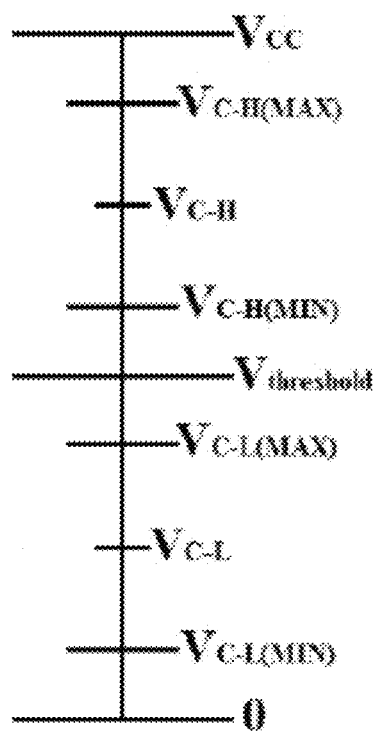
FIG. 113: Receiver data channel comparator input voltage VC range.

FIG. 113 illustrates the entire voltage range for receiver data channel voltage VC, including a threshold voltage for the comparator.

The high and low noise margins are defined as follows (illustrated in FIG. 113).

The worst case scenario for noise margins is VC-H(MIN)= 2.642 V and VC-L(MAX)=0.056 V. If we apply a comparator threshold voltage halfway between VC-H(MIN) and VC-L(MAX) we get $$V_{thrshold} = \frac{V_{C-H(MIN)} + V_{C-L(MAX)}}{2} = 1.349V \quad (7.10)$$

From defined VC-H(MIN), VC-L(MAX) and Vthreshold in worst case noise margins scenario we obtain Table 7.2 shown below.

TABLE 7.2

Two channel system with optical and electrical noise.

| $V_{C\_90}$ | $V_{C\_0}$ | Output$_{90}$ | Output$_0$ |
|---|---|---|---|
| 0 | 0 | 0 | 0 |
| 0.056 | 2.642 | 0 | 1 |

TABLE 7.2-continued

Two channel system with optical and electrical noise.

| $V_{C\_90}$ | $V_{C\_0}$ | Output$_{90}$ | Output$_0$ |
|---|---|---|---|
| 2.642 | 0.056 | 1 | 0 |
| 2.692 | 2.692 | 1 | 1 |

Using equations (7.6) and (7.7) we calculate $$V_{N-H}=V_{C-H(MIN)}-V_{threshold}=1.293 \ V \quad (7.11)$$

$$V_{N-L}=V_{threshold}-V_{C-L(MAX)}=1.293 \ V. \quad (7.12)$$

Clearly, for the two channel system, the noise margins are sufficient for reliable operation.

Noise Margin of Three Channel System

We next perform the same noise analysis on 3 channel system design as we just performed on 2 channel system design. From FIG. 56, the mean and standard deviation voltage readings for 3 channel (0°, 60° and 120°) are used to determine noise margins of 3 channel VLC PDM system based on the linear low-noise CMOS sensor.

Table 7.3 shows outputs for three receiver's 0°, 60° and 120° data channels outputs as function of comparator input voltage VC mean values (VC-H(MEAN) and VC-L(MEAN)) without standard deviation noise margins applied.

TABLE 7.3

Three channel VLC PDM system only with optical noise.

| $V_{C\_120}$ | $V_{C\_60}$ | $V_{C\_0}$ | Output$_{120}$ | Output$_{60}$ | Output$_0$ |
|---|---|---|---|---|---|
| 0 | 0 | 0 | 0 | 0 | 0 |
| 0.802 | 0.724 | 2.846 | 0 | 0 | 1 |
| 0.724 | 2.846 | 0.724 | 0 | 1 | 0 |
| 1.526 | 3.5 | 3.5 | 0 | 1 | 1 |
| 2.846 | 0.724 | 0.802 | 1 | 0 | 0 |
| 3.5 | 1.448 | 3.5 | 1 | 0 | 1 |
| 3.5 | 3.5 | 1.526 | 1 | 1 | 0 |
| 3.5 | 3.5 | 3.5 | 1 | 1 | 1 |

Adding in the electrical noise, we get $$V_{C-H} = \begin{cases} V_{C-H(MAX)} = G_{IE}G_{OI}I_{\Theta-H(MAX)} + \epsilon_{out} = 3.5 + \partial\sigma_1 = 3.5 + 0.246 = 3.746 \ V \\ V_{C-H(MIN)} = G_{IE}G_{OI}I_{\Theta-H(MIN)} - \epsilon_{out} = 2.846 - \partial\sigma_2 = 2.846 - 0.204 = 2.642 \ V \end{cases} \quad (7.8)$$

$$V_{C-L} = \begin{cases} V_{C-L(MAX)} = G_{IE}G_{OI}I_{\Theta-L(MAX)} + \epsilon_{out} = 1.526 + \partial\sigma_3 = 1.526 + 0.120 = 1.646 \ V \\ V_{C-L(MIN)} = G_{IE}G_{OI}I_{\Theta-L(MIN)} - \epsilon_{out} = 0.724 - \partial\sigma_3 = 0.724 - 0.072 = 0.652 \ V \end{cases} \quad (7.9)$$

The worst noise margins case scenario is if the system has VC-H(MIN) 2.642 V and VC-L(MAX)=1.646 V. If we apply a comparator threshold voltage half way between VC-H(MIN) and VC-L(MAX)-120 we get $$V_{threshold} = \frac{V_{C-H(MIN)} + V_{C-H(MAX)}}{2} = 2.144 \ V \quad (7.15)$$

From defined VC-H(MIN), VC-L(MAX), and Vthreshold in the worst case scenario we obtain Table 7.4.

Using equations (7.6) and (7.7) we calculate $$V_{N-H}=V_{C-H(MIN)}-V_{threshold}=0.498 \ V \quad (7.16)$$

$$V_{N-L}=V_{threshold}-V_{C-L(MAX)}=0.498 \ V. \quad (7.17)$$

TABLE 7.4

Three channel VLC PDM system with optical and electrical noise.

| $V_{C\_120}$ | $V_{C\_60}$ | $V_{C\_0}$ | Output$_{120}$ | Output$_{60}$ | Output$_0$ |
|---|---|---|---|---|---|
| 0 | 0 | 0 | 0 | 0 | 0 |
| 0.88 | 0.796 | 2.642 | 0 | 0 | 1 |
| 0.796 | 2.642 | 0.796 | 0 | 1 | 0 |
| 1.646 | 3.254 | 3.254 | 0 | 1 | 1 |
| 2.642 | 0.796 | 0.88 | 1 | 0 | 0 |
| 3.254 | 1.562 | 3.254 | 1 | 0 | 1 |
| 3.254 | 3.254 | 1.646 | 1 | 1 | 0 |
| 3.254 | 3.254 | 3.254 | 1 | 1 | 1 |

While not as robust as the noise margins for the two channel system, these noise margins are also sufficient to enable the system to be quite reliable.

PAM4 Modulation of a Two Channel System

Noise analysis of two and three channel linear low-noise CMOS sensor based VLC PDM air systems showed that noise margins are good enough for that type of VLC PDM system. Four channel system needs channel coding on the transmitter and on the receiver's side as we show in Example 3 in order to properly function.

Figure 114:
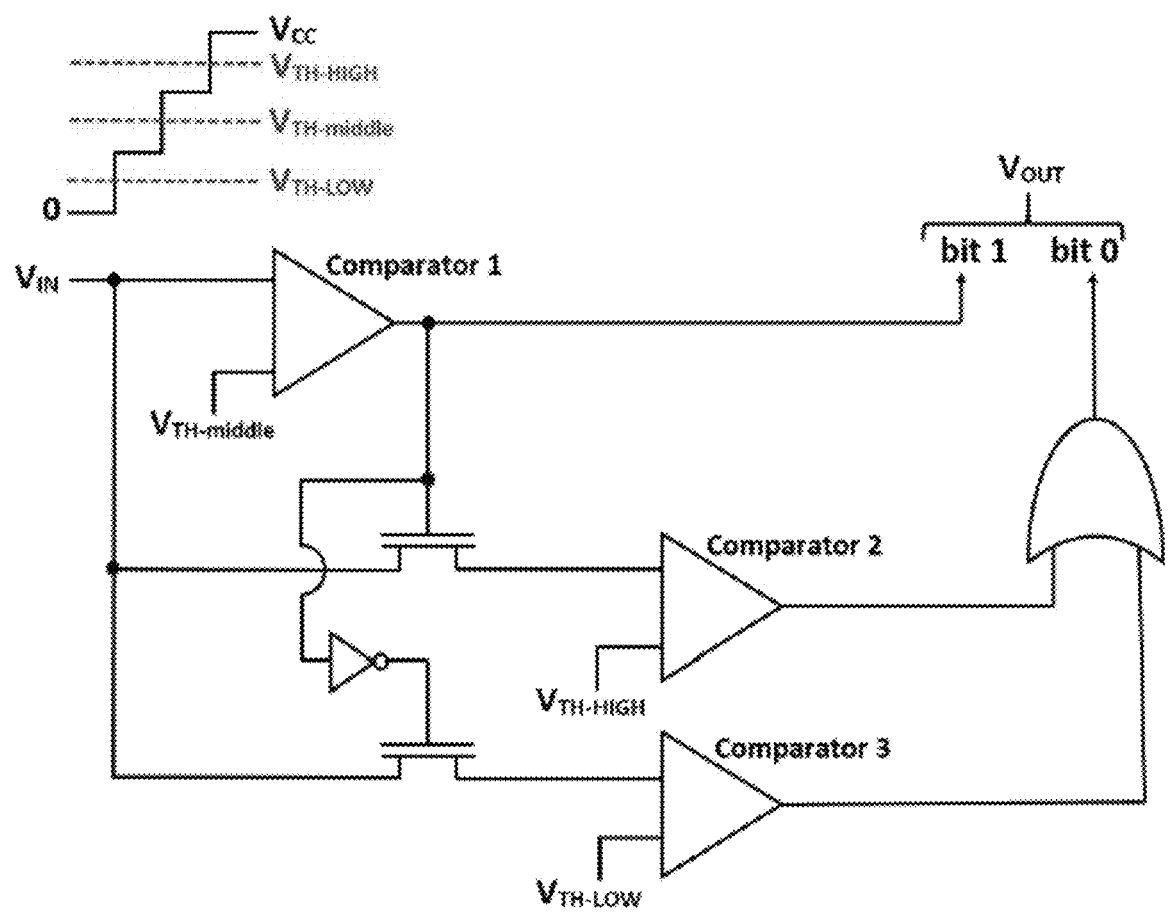
FIG. 114: VLC PDM receiver data channel based on PAM4.

An alternative approach to increasing the data rate is alternative modulation, and in this example we explore the notion of using Pulse-Amplitude Modulation with 4 levels (PAM4) in conjunction with the two channel system. FIG. 114 shows a VLD PDM receiver data channel based on PAM4. As we can see from FIG. 114, we use four voltage levels in entire voltage range 0 to VCC and three comparators with three distinct thresholds VTH-LOW, VTH-middle and VTH-HIGH to get two bits of data per single channel.

We next apply a candidate PAM4 on the two channel VLC PDM air system. Four nominal voltage levels at the receiver are used in this design: 0.5, 1.5, 2.5 and 3.5 V. In addition, the following comparator thresholds are used in this design: VTH-LOW=1.0 V, VTH-middle=2.0 V and VTH-HIGH=3.0 V.

Next, we apply expected noise to these nominal signals to show that a two channel PAM4 air VLC PDM system has good noise margins.

If we apply equation (4.1) to all four voltage levels 0.5, 1.5, 2.5 and 3.5 V we obtain the following electrical noise for each voltage level:

For 0.5 V voltage level, from equation (4.1) $\sigma=\pm0.009$ and noise levels for this voltage level are $6\sigma=\pm0.054$ which yields maximum value of 0.557 V.

For 1.5 V voltage level, from equation (4.1) $\sigma=\pm0.02$ and noise levels for this voltage level are $6\sigma=\pm0.12$ which yields minimum and maximum values of 1.383 V and 1.623 V.

For 2.5 V voltage level, from equation (4.1) $\sigma=\pm0.03$ and noise levels for this voltage level are $6\sigma=\pm0.18$ which yields minimum and maximum values of 2.323 V and 2.683 V.

For 3.5 V voltage level, from equation (4.1) $\sigma=\pm0.041$ and noise levels for this voltage level are $6\sigma=\pm0.246$ which yields minimum value of 3.257 V.

Also we need to add optical interference noise between 0° and 90° polarized light signals to all four voltage levels 0.5, 1, 2.5 and 3.5 V. Optical interference for each voltage level is:

For 0.5 V voltage level, optical interference noise between 0° and 90° polarized light signals is 0.007 V.
For 1 V voltage level, optical interference noise between 0° and 90° polarized light signals is 0.02 V.
For 2.5 V voltage level, optical interference noise between 0° and 90° polarized light signals is 0.033 V.
For 3.5 V voltage level optical interference noise between 0° and 90° polarized light signals is 0.047 V.

We apply the worst noise cases to each of the three channel thresholds VTH-LOW=1.0 V, VTH-middle=2.0 V and VTH-HIGH=3.0 V to determine the noise margins.

First, we test worst case noise for VTH-LOW=1.0 V and VTH-HIGH=3.0 V. Table 7.5 shows the worst case noise for thresholds VTH-LOW and VTH-HIGH.

For threshold VTH-LOW=1.0 V, we have VC-H(MIN)= 1.387 V and VC-L(MAX)=0.601 V which yields:

$$V_{N-H}=1.387-V_{TH-LOW}=0.387\ V \quad (7.18)$$

$$V_{N-L}=V_{TH-LOW}-0.601=0.399\ V. \quad (7.19)$$

TABLE 7.5

Two channel PAM4 system worst case noise for $V_{TH-LOW}$ and $V_{TH-HIGH}$.

| | | Output$_{90}$ | | Output$_0$ | |
|---|---|---|---|---|---|
| $V_{C\_90}$ | $V_{C\_0}$ | bit 3 | bit 2 | bit 1 | bit 0 |
| 0.561 | 0.561 | 0 | 0 | 0 | 0 |
| 0.574 | 1.387 | 0 | 0 | 0 | 1 |
| 0.587 | 2.687 | 0 | 0 | 1 | 0 |
| 0.601 | 3.261 | 0 | 0 | 1 | 1 |
| 1.387 | 0.574 | 0 | 1 | 0 | 0 |
| 1.4 | 1.4 | 0 | 1 | 0 | 1 |
| 1.413 | 2.7 | 0 | 1 | 1 | 0 |
| 1.427 | 3.274 | 0 | 1 | 1 | 1 |
| 2.687 | 0.587 | 1 | 0 | 0 | 1 |
| 2.7 | 1.413 | 1 | 0 | 1 | 0 |
| 2.713 | 2.713 | 1 | 0 | 1 | 0 |
| 2.727 | 3.287 | 1 | 0 | 1 | 1 |
| 3.261 | 0.601 | 1 | 1 | 0 | 0 |
| 3.274 | 1.427 | 1 | 1 | 0 | 1 |
| 3.287 | 2.727 | 1 | 1 | 1 | 0 |
| 3.301 | 3.301 | 1 | 1 | 1 | 1 |

For threshold VTH-HIGH=3.0 V, we have VC-H(MIN)= 3.261V and VC-L(MAX)=2.727 V which yields:

$$V_{N-H}=3.261-V_{TH-HIGH}=0.261\ V \quad (7.20)$$

$$V_{N-L}=V_{TH-HIGH}-2.727=0.273\ V. \quad (7.21)$$

Second worst case noise analysis is testing noise margins for VTH-middle=2.0 V. Table 7.6 shows the worst case noise for threshold VTH-middle.

If we apply 6σ noise requirements for threshold VTH-middle=2.0 V, we have VC-H(MIN)=2.327V and VC-L(MAX)=1.667V which yields:

TABLE 7.6

Two channel PAM4 system worst case noise for $V_{TH-middle}$.

| | | Output$_{90}$ | | Output$_0$ | |
|---|---|---|---|---|---|
| $V_{C\_90}$ | $V_{C\_0}$ | bit 3 | bit 2 | bit 1 | bit 0 |
| 0.561 | 0.561 | 0 | 0 | 0 | 0 |
| 0.574 | 1.627 | 0 | 0 | 0 | 1 |
| 0.587 | 2.687 | 0 | 0 | 1 | 0 |
| 0.601 | 3.261 | 0 | 0 | 1 | 1 |
| 1.627 | 0.574 | 0 | 1 | 0 | 0 |
| 1.64 | 1.64 | 0 | 1 | 0 | 1 |
| 1.653 | 2.687 | 0 | 1 | 1 | 0 |
| 1.667 | 3.274 | 0 | 1 | 1 | 1 |
| 2.327 | 0.587 | 1 | 0 | 0 | 1 |
| 2.34 | 1.653 | 1 | 0 | 1 | 0 |
| 2.353 | 2.687 | 1 | 0 | 1 | 0 |
| 2.367 | 3.287 | 1 | 0 | 1 | 1 |
| 3.261 | 0.601 | 1 | 1 | 0 | 0 |
| 3.274 | 1.667 | 1 | 1 | 0 | 1 |
| 3.287 | 2.687 | 1 | 1 | 1 | 0 |
| 3.301 | 3.301 | 1 | 1 | 1 | 1 |

$$V_{N-H}=2.327-V_{TH-middle}=0.327\ V \quad (7.22)$$

$$V_{N-L}=V_{TH-middle}-1.667=0.333\ V. \quad (7.23)$$

These noise margins are also completely compatible with a robust system.

The result is a monotonic decrease in noise margin as we move from a two channel system with binary modulation, to a three channel system with binary modulation, to a two channel system with PAM4 modulation (effectively four channels).

What is claimed is:

1. A polarization division multiplexed (PDM) optical transmission system comprising:
   a. two or more optical signal transmitters configured to produce two or more linearly polarized optical signals, wherein each of the two or more linearly polarized optical signals comprises a different and constant signal polarization angle;
   b. a transmission medium configured to transmit a polarization division multiplexed signal comprising the two or more linearly polarized optical signals received from the two or more optical signal transmitters; and
   c. a signal receiver configured to receive and decode the polarization division multiplexed signal from the transmission medium, the signal receiver comprising a division of focal plane (DoFP) array comprising two or more receiver channels comprising a first and second receiver channel, each receiver channel corresponding to one linearly polarized optical signal, each receiver channel comprising a polarization filter configured to transmit a portion of the PDM signal with the signal polarization angle of the one linearly polarized optical signal, a photodetector configured to convert a light intensity of the portion of the PDM signal transmitted through the polarization filter into an electrical signal, and two or more decoders operatively coupled to the two or more channels comprising a first and second decoder, wherein:
   the first decoder comprises a comparator operatively coupled to the first receiver channel and configured to produce a first digital signal comprising 0 or LOW if the electrical signal of the first receiver channel is below a first signal threshold and a first digital signal of 1 or HIGH if the electrical signal is above the first signal threshold; and the second decoder comprises at least two additional comparators comprising first and second additional comparators operatively coupled to the second receiver channel, and further comprises a multiplexer operatively coupled to the comparator of the first receiver channel and the first and second additional comparators, wherein:
   the first and second additional comparators are configured to produce first and second additional digital signals comprising 0 or LOW if the electrical signal of the second receiver channel is below first and second additional signal thresholds, respectively, and first and second additional digital signals of 1 or HIGH if the electrical signal of the second receiver channel is above first and second additional signal thresholds, respectively; and
   the multiplexer is configured to select and transmit the first or second additional digital signal based on the first digital signal received from the first receiver channel decoder.

2. The system of claim 1, wherein the transmission medium is selected from a group consisting of free space, free space with a pair of mirrors, and an optical fiber.

3. The system of claim 1, wherein the digital signals produced by the two or more decoders are combined into a digital data stream.

4. The system of claim 1, wherein the two or more linearly polarized optical signals comprise:
   a. three linearly polarized optical signals comprising signal polarization angles of 0°, 60° and 120°, respectively; or
   b. four linearly polarized optical signals comprising signal polarization angles of 0°, 45°, 90°, and 135°, respectively.

5. The system of claim 1, wherein the signal receiver is a CMOS integrated chip (IC) and each photodetector of the DoFP array is a high-speed silicon photodiode.

6. The system of claim 1, wherein:
   the signal threshold of each comparator is constant and the first additional signal threshold is not equal to the second additional signal threshold.

7. The system of claim 5, wherein each polarization filter of the DoFP array comprises an aluminum nanowire filter attached to a surface of the CMOS integrated chip (IC).

8. The system of claim 7, wherein each polarization filter from the DoFP array has an independent polarization angle matching a signal polarization angle of a corresponding channel of the DofP array.

9. A method of polarization division multiplexing comprising:
   a. producing two or more linearly polarized optical signals using two or more optical signal transmitters, wherein each of the two or more linearly polarized optical signals comprises a constant and different signal polarization angle;
   b. transmitting a polarization division multiplexed (PDM) signal comprising the two or more linearly polarized optical signals received from the two or more optical signal transmitters through a transmission medium;
   c. receiving the PDM signal from the transmission medium using a signal receiver, the signal receiver comprising a division of focal plane (DoFP) array comprising two or more receiver channels, each channel corresponding to one linearly polarized optical signal, each receiver channel comprising: a polarization filter a photodetector, and a decoder;
   d. filtering the PDM signals through the polarization filters of the Division of Focal Plane (DoFP) array, each polarization filter configured to transmit a portion of the PDM signal with the signal polarization angle of the one linearly polarized optical signal;
   e. converting a light intensity of each portion of the PDM signal transmitted through the polarization filters into an electrical signal using the photodetector for each channel of the DoFP array; and
   f. decoding the electrical signals of the at least two receiver channels into at least two digital signals using at least two decoders comprising first and second decoders, wherein:
      the first decoder comprises a comparator operatively coupled to the first receiver channel to produce a first digital signal comprising 0 or LOW if the electrical signal of the first receiver channel is below a first signal threshold and a first digital signal of 1 or HIGH if the electrical signal is above the first signal threshold;
      the second decoder comprises at least two additional comparators comprising first and second additional comparators operatively coupled to the second receiver channel, and a multiplexer operatively coupled to the comparator of the first receiver channel and the first and second additional comparators, wherein:
         the first and second additional comparators produce first and second additional digital signals comprising 0 or LOW if the electrical signal of the second receiver channel is below first and second additional signal thresholds, respectively, and first and second additional digital signals of 1 or HIGH if the electrical signal of the second receiver channel is above first and second additional signal thresholds, respectively; and
         the multiplexer selects and transmits the first or second additional digital signal based on the first digital signal received from the first receiver channel decoder.

10. The method of claim 9, wherein the transmission medium is selected from a group consisting of free space, free space with a pair of mirrors, and an optical fiber.

11. The method of claim 9, further comprising combining the digital signals from all channels of the DoFP array into a digital data-stream.

12. The method of claim 9, wherein the two or more linearly polarized optical signals comprise:
   a. three linearly polarized optical signals comprising signal polarization angles of 0°, 60° and 120°, respectively; or
   b. four linearly polarized optical signals comprising signal polarization angles of 0°, 45°, 90°, and 135°, respectively.

13. The method of claim 9, wherein:
   the signal threshold of each comparator is constant and the first additional signal threshold is not equal to the second additional signal threshold.

* * * * *